(12) United States Patent
Iwaki et al.

(10) Patent No.: US 8,405,070 B2
(45) Date of Patent: Mar. 26, 2013

(54) COMPOSITE MATERIAL, AND LIGHT EMITTING ELEMENT AND LIGHT EMITTING DEVICE USING THE COMPOSITE MATERIAL

(75) Inventors: Yuji Iwaki, Atsugi (JP); Satoshi Seo, Kawasaki (JP); Daisuke Kumaki, Tokamachi (JP); Harue Nakashima, Atsugi (JP); Kumi Kojima, Machida (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 28 days.

(21) Appl. No.: 12/575,488

(22) Filed: Oct. 8, 2009

(65) Prior Publication Data
US 2010/0084645 A1    Apr. 8, 2010

Related U.S. Application Data

(62) Division of application No. 11/371,217, filed on Mar. 9, 2006, now Pat. No. 7,649,197.

(30) Foreign Application Priority Data

| Mar. 23, 2005 | (JP) | 2005-085035 |
| Apr. 27, 2005 | (JP) | 2005-130619 |
| May 17, 2005 | (JP) | 2005-144252 |
| Jun. 24, 2005 | (JP) | 2005-185018 |

(51) Int. Cl.
*H01L 35/24* (2006.01)
(52) U.S. Cl. ............ 257/40; 257/E51.001; 548/440
(58) Field of Classification Search .......... 257/40, 257/E51.001; 548/440
See application file for complete search history.

(56) References Cited

U.S. PATENT DOCUMENTS 5,756,248 A    5/1998 Tanaka et al.
(Continued)

FOREIGN PATENT DOCUMENTS

CN    1362464    8/2002
(Continued)

OTHER PUBLICATIONS

Thomas et al, "Light-Emitting Carbazole Derivatives: Potential Electroluminescent Materials," J. Am. Chem. Soc., 2001, 123, pp. 9404-9411.*

(Continued)

*Primary Examiner* — Anthony Ho
(74) *Attorney, Agent, or Firm* — Eric J. Robinson; Robinson Intellectual Property Law Office, P.C.

(57) ABSTRACT

An object is to provide a light emitting element with low drive voltage which contains an organic compound and an inorganic compound. One feature of a light emitting element of the present invention is to include a layer containing a light emitting material between a pair of electrodes, in which the layer containing a light emitting material has a layer containing a carbazole derivative represented by General Formula (1) and an inorganic compound which exhibits an electron accepting property to the carbazole derivative represented by General Formula (1). With such a structure, the inorganic compound accepts electrons from the carbazole derivative, carriers are generated internally, and a drive voltage of the light emitting element can be reduced.

28 Claims, 77 Drawing Sheets

(1)

U.S. PATENT DOCUMENTS

| | | |
|---|---|---|
| 6,172,459 B1 | 1/2001 | Hung et al. |
| 6,237,529 B1 | 5/2001 | Spahn |
| 6,242,115 B1 | 6/2001 | Thomson et al. |
| 6,451,461 B2 | 9/2002 | Lee et al. |
| 6,650,023 B2 | 11/2003 | Kim |
| 6,660,410 B2 | 12/2003 | Hosokawa |
| 6,863,997 B2 | 3/2005 | Thompson et al. |
| 6,979,414 B2 | 12/2005 | Hosokawa |
| 7,226,546 B2 | 6/2007 | Hosokawa |
| 7,227,027 B2 | 6/2007 | Qiu et al. |
| 7,431,997 B2 | 10/2008 | Hwang et al. |
| 7,737,627 B2 | 6/2010 | Hwang et al. |
| 7,892,657 B2 | 2/2011 | Nakashima et al. |
| 8,021,764 B2 | 9/2011 | Hwang et al. |
| 2003/0189401 A1 | 10/2003 | Kido et al. |
| 2004/0144321 A1 | 7/2004 | Grace et al. |
| 2004/0151944 A1 | 8/2004 | Onikubo et al. |
| 2005/0106419 A1 | 5/2005 | Endoh et al. |
| 2005/0170208 A1 | 8/2005 | Yatsunami et al. |
| 2006/0008740 A1 | 1/2006 | Kido et al. |
| 2006/0115680 A1 | 6/2006 | Hwang et al. |
| 2007/0182317 A1 | 8/2007 | Kido et al. |
| 2007/0200125 A1 | 8/2007 | Ikeda et al. |
| 2007/0231503 A1 | 10/2007 | Hwang et al. |
| 2007/0248841 A1 | 10/2007 | Hosokawa |
| 2008/0107919 A1 | 5/2008 | Hwang et al. |
| 2008/0254318 A1 | 10/2008 | Nakashima et al. |
| 2009/0058267 A1 | 3/2009 | Nakashima et al. |

FOREIGN PATENT DOCUMENTS

| | | |
|---|---|---|
| CN | 1447629 | 10/2003 |
| EP | 1 130 129 | 9/2001 |
| EP | 1 293 585 | 3/2003 |
| EP | 1 351 558 | 10/2003 |
| EP | 1 443 127 | 8/2004 |
| EP | 1 524 706 | 4/2005 |
| EP | 1 530 245 | 5/2005 |
| EP | 1 661 888 | 5/2006 |
| EP | 1 862 524 | 12/2007 |
| JP | 62-280850 | 12/1987 |
| JP | 09-063771 | 3/1997 |
| JP | 09-301934 | 11/1997 |
| JP | 10-265773 | 10/1998 |
| JP | 11-307259 | 11/1999 |
| JP | 3210481 | 7/2001 |
| JP | 2001-291589 | 10/2001 |
| JP | 2003-129043 | 5/2003 |
| JP | 2003-129043 A | 5/2003 |
| JP | 2003-272860 | 9/2003 |
| JP | 2004-134395 | 4/2004 |
| JP | 2004-288380 | 10/2004 |
| JP | 2005-026121 | 1/2005 |
| JP | 2006-028176 | 2/2006 |
| JP | 2006-186333 | 7/2006 |
| JP | 2006/303421 | 11/2006 |
| KR | 2003-0023330 | 3/2003 |
| KR | 2004-0069281 | 8/2004 |
| KR | 2005-0016846 | 2/2005 |
| WO | WO 2005/031798 | 4/2005 |
| WO | 2006/059736 | 6/2006 |
| WO | 2006/059745 | 6/2006 |
| WO | WO 2006/070912 | 7/2006 |

OTHER PUBLICATIONS

Thomas et al, "Cyanocarbazole Derivatives for High-Performance Electroluminescent Devices," Advanced Functional Materials, 2004, 14, No. 4, Apr., pp. 387-392.*

Yang, et al., "Polyaniline as a Transparent Electrode for Polymer Light-Emitting Diodes: Lower Operating Voltage and Higher Efficiency," Applied Physics Letters, Mar. 07, 1994, vol. 64, No. 10, pp. 1245-1247.

Office Action (Application No. 200610071838.5) Dated Sep. 11, 2009.

Liu, D., et al. "Enhancement in brightness and efficiency of organic electroluminescent device using novel N,N-di(9-ethylcarbaz-3-yl)-3-methylaniline as hole injecting and transporting material," Synthetic Metals, Aug. 7, 2004, vol. 146, No. 1, pp. 85-89.

Balionyte, A., et al. "Synthesis and properties of polymers containing aromatic amino groups in the main chain and their glass-forming model compounds," European Polymer Journal, Apr. 30, 2004, vol. 40, No. 8, pp. 1645-1650.

Balionyte, A., et al. "Potential hole-transport materials prepared by Ullmann coupling," Environmental and Chemical Physics, Jan. 1, 2002, vol. 24, No. 1, pp. 30-34.

Korean Office Action (Application No. 2011-0025790) dated Aug. 29, 2012.

Korean Office Action (Application No. 2011-0025791) dated Aug. 29, 2012.

* cited by examiner

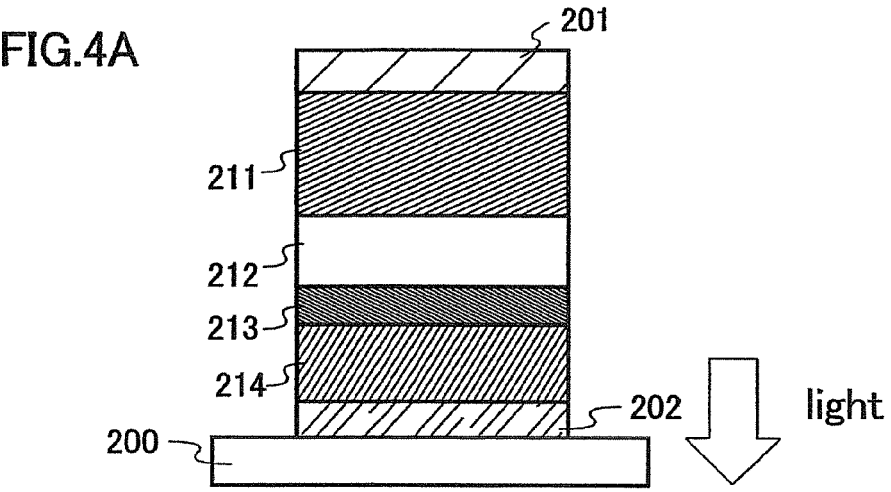
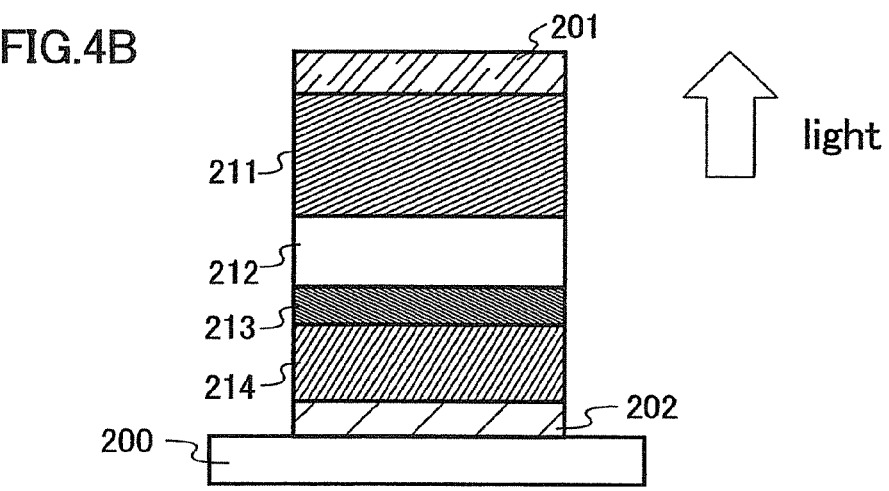
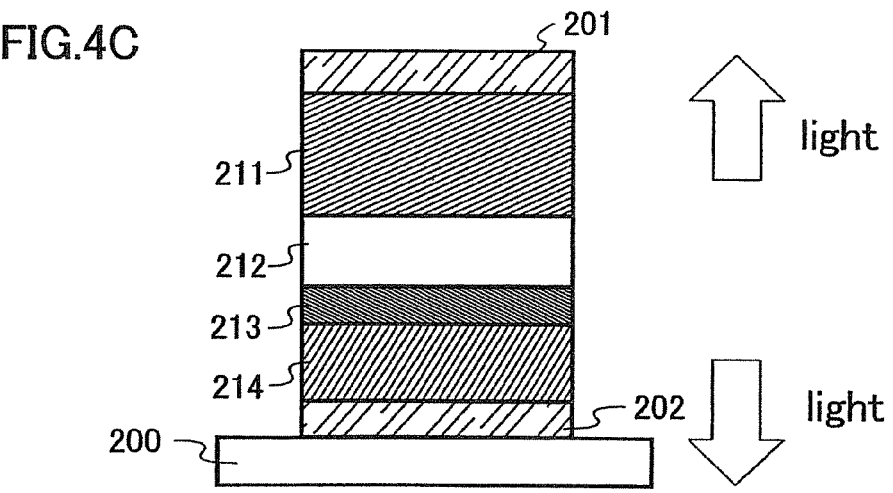

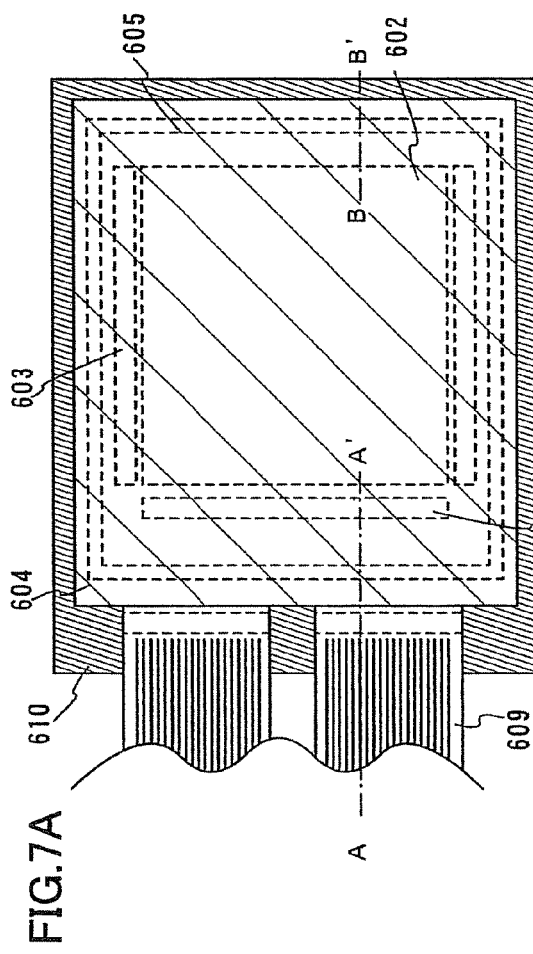
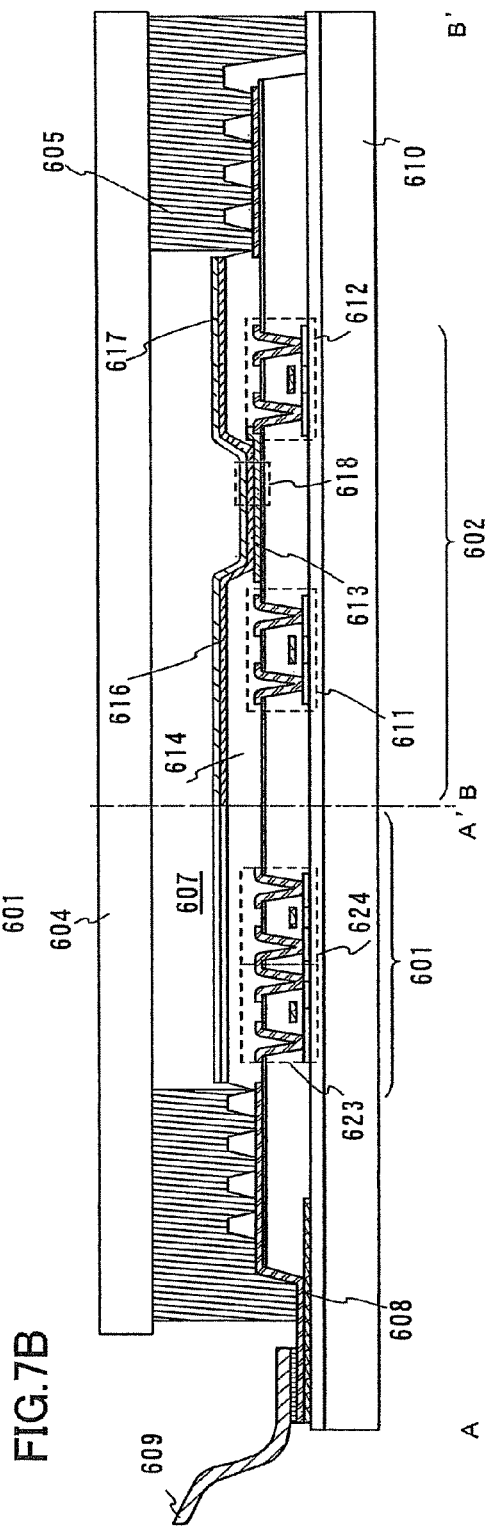
FIG.7A
FIG.7B

COMPOSITE MATERIAL, AND LIGHT EMITTING ELEMENT AND LIGHT EMITTING DEVICE USING THE COMPOSITE MATERIAL

BACKGROUND OF THE INVENTION

1. Field of the Invention

The present invention relates to a composite material of an organic compound and an inorganic compound, which has an excellent carrier transport property and carrier injection property into the organic compound and also has excellent visible light transmittance. The invention also relates to a current-excitation light emitting element using the composite material. The invention further relates to a light emitting device having the light emitting element.

2. Description of the Related Art

In recent years, a light emitting element using a light emitting organic compound has been actively researched and developed. A basic structure of this light emitting element is that a layer containing a light emitting organic compound is sandwiched between a pair of electrodes. By applying a voltage to this element, electrons and holes are separately injected from the pair of electrodes into the layer containing a light emitting organic compound, and current flows. Then, recombination of these carriers (the electrons and holes) causes the light emitting organic compound to form an excited state and to emit light when the excited state returns to a ground state. Owing to such a mechanism, such a light emitting element is referred to as a current-excitation light emitting element.

Note that an excited state of an organic compound can be a singlet excited state and a triplet excited state. Light emission from the singlet excited state is referred to as fluorescence, and light emission from the triplet excited state is referred to as phosphorescence.

A great advantage of such a light emitting element is that the light emitting element can be manufactured to be thin and lightweight, since the light emitting element is formed of an organic thin film, for example, with a thickness of approximately 0.1 μm. In addition, extremely high response speed is another advantage, since time between carrier injection and light emission is approximately 1 μsec or less. These characteristics are considered suitable for a flat panel display element.

Such a light emitting element is formed in a film shape. Thus, surface emission can be easily obtained by forming a large-area element. This characteristic is hard to be obtained by a point light source typified by an incandescent lamp or an LED or a line light source typified by a fluorescent lamp. Therefore, the above described light emitting element also has a high utility value as a surface light source which is applicable to lighting or the like.

As described above, the current-excitation light emitting element using the light emitting organic compound is expected to be applied to a light emitting device, lighting, and the like. However, there are still many issues. One of the issues is a reduction in power consumption. It is important to reduce a drive voltage of the light emitting element in order to reduce power consumption. Since emission intensity of the current-excitation light emitting element depends on the amount of current flowing therethrough, it is necessary to make a large amount of current to flow at low voltage in order to reduce the drive voltage.

It has been attempted so far to provide a buffer layer between an electrode and a layer containing a light emitting organic compound, as a technique for reducing a drive voltage. For example, it is known that a drive voltage can be reduced by providing a buffer layer which is formed of polyaniline (PANI) doped with camphorsulfonic acid between indium tin oxide (ITO) and a light emitting layer (for example, Reference 1: Y. Yang et. al., Applied Physics Letters, Vol. 64 (10), 1245-1247 (1994)). It is explained that this is because PANI has a superior carrier injection property into the light emitting layer. Note that PANI which is the buffer layer is considered as part of the electrode in Reference 1.

However, as stated in Reference 1, PANI has a problem in that transmittance thereof becomes lower as a thickness thereof increases. Specifically, it is reported that a transmittance is below 70% when a thickness is approximately 250 nm. In other words, there is a problem with transparency of a material itself which is used for the buffer layer; therefore, light generated inside an element cannot be extracted efficiently.

According to Reference 2, it is attempted to improve a luminance per certain current density, in other words, current efficiency by serially connecting light emitting elements (referred to as light-emitting units in Reference 2) (Reference 2: Japanese Patent Laid-Open No. 2003-272860). In Reference 2, a mixed layer of an organic compound and metal oxide (specifically, vanadium oxide and rhenium oxide) is used for a connecting portion at the time of serially connecting the light emitting elements, and it is assumed that this layer can inject holes and electrons into the light-emitting unit.

However, as can be understood from the embodiment, the mixed layer of an organic compound and metal oxide, which is disclosed in Reference 2, has a strong absorption peak in a visible light region (in the vicinity of 500 nm) as well as an infrared region, and also has a problem with transparency. Consequently, after all, light generated inside the element cannot be extracted efficiently, and luminous efficiency of the element is lowered.

SUMMARY OF THE INVENTION

It is an object of the present invention to provide a composite material of an organic compound and an inorganic compound, which has an excellent carrier transport property and carrier injection property into the organic compound and also has excellent visible light transmittance.

It is another object to provide a light emitting element with low drive voltage by using the composite material for a current-excitation light emitting element. It is still another object to provide a light emitting device with low power consumption by manufacturing a light emitting device using the light emitting element.

As a result of keen examinations, the present inventors have found that the objects can be achieved by using a layer containing an organic compound and an inorganic compound which exhibits an electron accepting property to the organic compound.

In other words, one feature of a composite material of the present invention is to include a carbazole derivative represented by General Formula (1) and an inorganic compound which exhibits an electron accepting property to the carbazole derivative represented by General Formula (1).

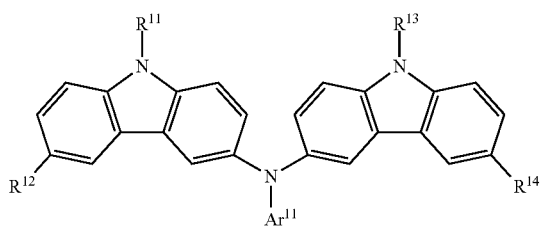

(1)

In the formula, $R^{11}$ and $R^{13}$ may be either the same or different, and each of which represents any one of hydrogen, an alkyl group having 1 to 6 carbon atoms, an aryl group having 6 to 25 carbon atoms, a heteroaryl group having 5 to 9 carbon atoms, an arylalkyl group, and an acyl group having 1 to 7 carbon atoms; $Ar^{11}$ represents one of an aryl group having 6 to 25 carbon atoms and a heteroaryl group having 5 to 9 carbon atoms; $R^{12}$ represents any one of hydrogen, an alkyl group having 1 to 6 carbon atoms, and an aryl group having 6 to 12 carbon atoms; and $R^{14}$ represents any one of hydrogen, an alkyl group having 1 to 6 carbon atoms, an aryl group having 6 to 12 carbon atoms, and a substituent represented by General Formula (2). In the substituent represented by General Formula (2), $R^{15}$ represents any one of hydrogen, an alkyl group having 1 to 6 carbon atoms, an aryl group having 6 to 25 carbon atoms, a heteroaryl group having 5 to 9 carbon atoms, an arylalkyl group, and an acyl group having 1 to 7 carbon atoms; $Ar^{12}$ represents one of an aryl group having 6 to 25 carbon atoms and a heteroaryl group having 5 to 9 carbon atoms; and $R^{16}$ represents any one of hydrogen, an alkyl group having 1 to 6 carbon atoms, and an aryl group having 6 to 12 carbon atoms.

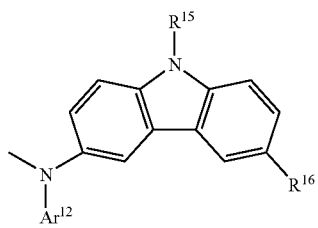

(2)

In the above structure, the inorganic compound is preferably a material which exhibits an electron accepting property to the carbazole derivative represented by General Formula (1). Specifically, it is preferably oxide of transition metal, particularly, any one or more of titanium oxide, vanadium oxide, molybdenum oxide, tungsten oxide, rhenium oxide, ruthenium oxide, chromium oxide, zirconium oxide, hafnium oxide, tantalum oxide, and silver oxide.

In General Formula (1), one of $R^{11}$ and $R^{13}$ is preferably an aryl group having 6 to 25 carbon atoms or a heteroaryl group having 5 to 9 carbon atoms. More preferably, each of $R^{11}$ and $R^{13}$ is one of an aryl group having 6 to 25 carbon atoms and a heteroaryl group having 5 to 9 carbon atoms. An effect of improvement in carrier transport property can be obtained when a substituent bonded to nitrogen of a carbazole skeleton is an aryl group having 6 to 25 carbon atoms or a heteroaryl group having 5 to 9 carbon atoms.

In General Formula (1), $R^{12}$ is preferably any one of hydrogen, tert-butyl, phenyl, and biphenyl.

In General Formula (1), $R^{14}$ is preferably any one of hydrogen, tert-butyl, phenyl, and biphenyl.

In General Formula (1), $R^{14}$ is preferably a substituent represented by General Formula (2). When $R^{14}$ is the substituent represented by General Formula (2), a higher heat-resistance carbazole derivative can be obtained. In General Formula (2), $R^{15}$ is preferably an aryl group having 6 to 25 carbon atoms or a heteroaryl group having 5 to 9 carbon atoms. When a substituent bonded to nitrogen of a carbazole skeleton is an aryl group having 6 to 25 carbon atoms or a heteroaryl group having 5 to 9 carbon atoms, an effect of improvement in carrier transport property can be obtained. In General Formula (2), $R^{16}$ is preferably any one of hydrogen, tert-butyl, phenyl, and biphenyl.

Among carbazole derivatives represented by General Formula (1), a carbazole derivative represented by the following general formula (3) is preferably used.

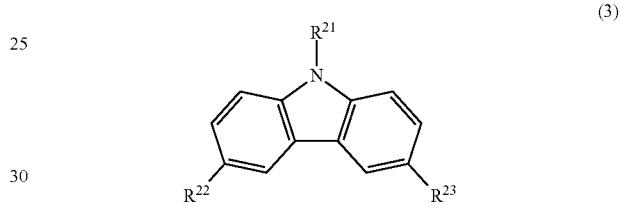

(3)

In the formula, $R^{21}$ represents any one of hydrogen, an alkyl group having 1 to 6 carbon atoms, an aryl group having 6 to 25 carbon atoms, a heteroaryl group having 5 to 9 carbon atoms, an arylalkyl group, and an acyl group having 1 to 7 carbon atoms; $R^{22}$ represents any one of hydrogen, an alkyl group having 1 to 6 carbon atoms, and an aryl group having 6 to 12 carbon atoms; and $R^{23}$ represents a substituent represented by General Formula (4). In the substituent represented by General Formula (4), $R^{24}$ represents any one of hydrogen, an alkyl group having 1 to 6 carbon atoms, an aryl group having 6 to 25 carbon atoms, a heteroaryl group having 5 to 9 carbon atoms, an arylalkyl group, and an acyl group having 1 to 7 carbon atoms; $Ar^{21}$ represents one of an aryl group having 6 to 25 carbon atoms and a heteroaryl group having 5 to 9 carbon atoms; and $R^{25}$ represents any one of hydrogen, an alkyl group having 1 to 6 carbon atoms, and an aryl group having 6 to 12 carbon atoms.

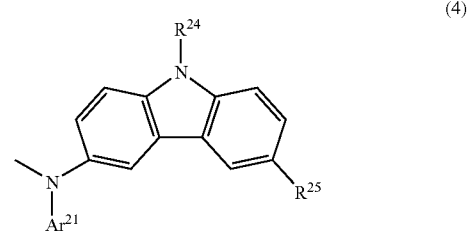

(4)

In the above structure, $R^{22}$ is preferably any one of hydrogen, tert-butyl, phenyl, and biphenyl.

More preferably, a carbazole derivative represented by General Formula (5) is used.

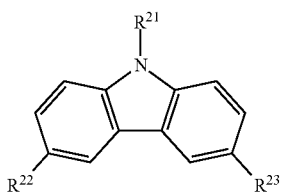

(5)

In the formula, $R^{21}$ represents any one of hydrogen, an alkyl group having 1 to 6 carbon atoms, an aryl group having 6 to 25 carbon atoms, a heteroaryl group having 5 to 9 carbon atoms, an arylalkyl group, and an acyl group having 1 to 7 carbon atoms; each of $R^{22}$ and $R^{23}$ represents a substituent represented by General Formula (6). In the substituent represented by General Formula (6), $R^{24}$ represents any one of hydrogen, an alkyl group having 1 to 6 carbon atoms, an aryl group having 6 to 25 carbon atoms, a heteroaryl group having 5 to 9 carbon atoms, an arylalkyl group, and an acyl group having 1 to 7 carbon atoms; $Ar^{21}$ represents one of an aryl group having 6 to 25 carbon atoms and a heteroaryl group having 5 to 9 carbon atoms; and $R^{25}$ represents any one of hydrogen, an alkyl group having 1 to 6 carbon atoms, and an aryl group having 6 to 12 carbon atoms.

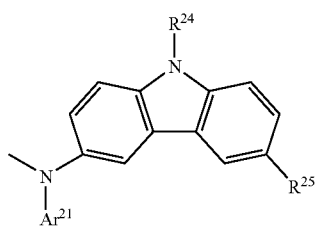

(6)

In the above structure, $R^{25}$ is preferably any one of hydrogen, tert-butyl, phenyl, and biphenyl.

In the above structure, $R^{21}$ is preferably an aryl group having 6 to 25 carbon atoms or a heteroaryl group having 5 to 9 carbon atoms.

When a substituent bonded to nitrogen of a carbazole skeleton is an aryl group having 6 to 25 carbon atoms or a heteroaryl group having 5 to 9 carbon atoms, an effect of improvement in carrier transport property can be obtained.

Preferably, a carbazole derivative represented by General Formula (7) is used.

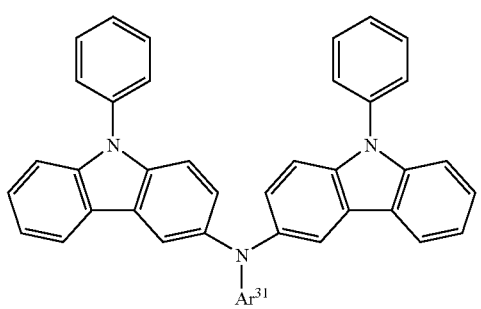

(7)

In the formula, $Ar^{31}$ represents phenyl or naphthyl.

Preferably, a carbazole derivative represented by General Formula (8) is used.

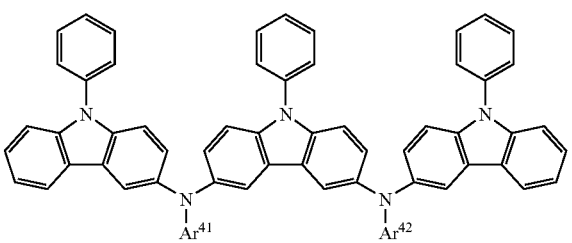

(8)

In the formula, $Ar^{41}$ and $Ar^{42}$ may be either the same or different, each of which represents phenyl or naphthyl.

The composite material of the invention can be used for a light emitting element. Thus, one feature of a light emitting element of the invention is to include a layer containing a light emitting material between a pair of electrodes, in which the layer containing a light emitting material has a layer containing the above-described composite material.

In the above structure, the layer containing the composite material of the present invention may be provided to be in contact with an electrode serving as an anode of the pair of electrodes, or may be provided to be in contact with an electrode serving as a cathode. Alternatively, a plurality of layers containing the composite material may be provided. Specifically, one layer of the plurality of layers containing the composite material is provided so as to be in contact with one of the pair of electrodes and another layer of the plurality of layers containing the composite material is provided so as to be in contact with the other one of the pair of electrodes.

The invention includes a light emitting device having the above-described light emitting element in its scope. The light emitting device in this specification includes an image display device and a light source (including a lighting device). Further, the light emitting device also includes all of the following modules: a module having a light emitting device provided with a connector such as an FPC (Flexible Printed Circuit), a TAB (Tape Automated Bonding) tape, or a TCP (Tape Carrier Package); a module having a TAB tape or a TCP provided with a printed wiring board at the end thereof; and a module having an IC (Integrated Circuit) directly mounted on a light emitting element by a COG (Chip On Glass) method.

Further, an electronic device using the light emitting element of the invention in a display portion is also included in the scope of the invention. Consequently, one feature of an electronic device of the invention is to include a display portion, in which the display portion is provided with the above-described light emitting element and a control means to control light emission of the light emitting element.

By carrying out the invention, the composite material of an organic compound and an inorganic compound, which has an excellent carrier transport property and carrier injection property into the organic compound and also has excellent visible light transmittance, can be provided.

Since the light emitting element of the invention has a layer containing the carbazole derivative represented by General Formula (1) and an inorganic compound exhibiting an electron accepting property to the carbazole derivative represented by General Formula (1), the inorganic compound accepts electrons from the carbazole derivative, and carriers are generated therein. Due to internal generation of carriers, a drive voltage can be reduced.

In addition, since the composite material of the invention has high visible light transmittance, a light emitting element with high luminous efficiency can be obtained by using the composite material of the invention for the light emitting element.

Further, since the composite material of the present invention has excellent heat resistance, a light emitting element with excellent heat resistance and durability can be obtained.

Moreover, a light emitting device with low power consumption and few defects can be provided by using the light emitting element of the invention.

BRIEF DESCRIPTION OF DRAWINGS

FIGS. 4A to 4C are diagrams for explaining a light emitting element of the present invention.

FIGS. 7A and 7B are diagrams for explaining a light emitting device of the present invention.

DETAILED DESCRIPTION OF THE INVENTION

Figure 1A:
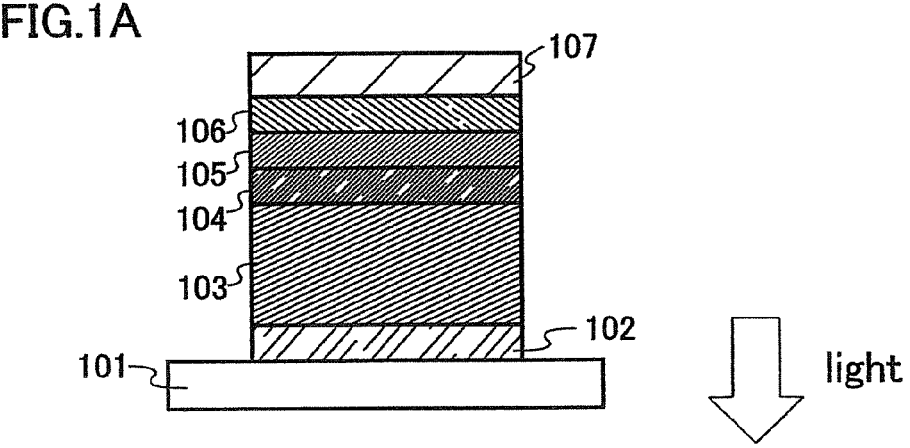
FIGS. 1A to 1C are diagrams for explaining a light emitting element of the present invention.

Hereinafter, embodiments of the present invention are explained in detail with reference to the drawings. However, the present invention is not limited to the following description. As is easily known to a person skilled in the art, the mode and the detail of the invention can be variously changed without departing from the spirit and the scope of the present invention. Thus, the present invention is not interpreted while limiting to the following description of the embodiments.

Embodiment 1

In this embodiment, a composite material of the present invention is explained. The composite material of the invention contains a carbazole derivative represented by the following general formula (1) and an inorganic compound.

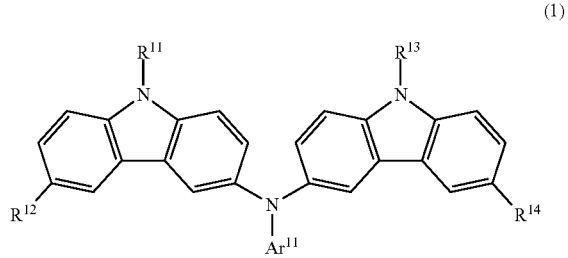

(1)

In the formula, $R^{11}$ and $R^{13}$ may be either the same or different, each of which represents any one of hydrogen, an alkyl group having 1 to 6 carbon atoms, an aryl group having 6 to 25 carbon atoms, a heteroaryl group having 5 to 9 carbon atoms, an arylalkyl group, and an acyl group having 1 to 7 carbon atoms; $Ar^{11}$ represents one of an aryl group having 6 to 25 carbon atoms and a heteroaryl group having 5 to 9 carbon atoms; $R^{12}$ represents any one of hydrogen, an alkyl group having 1 to 6 carbon atoms, and an aryl group having 6 to 12 carbon atoms; $R^{14}$ represents any one of hydrogen, an alkyl group having 1 to 6 carbon atoms, an aryl group having 6 to 12 carbon atoms, and a substituent represented by General Formula (2). In the substituent represented by General Formula (2), $R^{15}$ represents any one of hydrogen, an alkyl group having 1 to 6 carbon atoms, an aryl group having 6 to 25 carbon atoms, a heteroaryl group having 5 to 9 carbon atoms, an arylalkyl group, and an acyl group having 1 to 7 carbon atoms; Ar$^{12}$ represents one of an aryl group having 6 to 25 carbon atoms and a heteroaryl group having 5 to 9 carbon atoms; and R$^{16}$ represents any one of hydrogen, an alkyl group having 1 to 6 carbon atoms, and an aryl group having 6 to 12 carbon atoms.

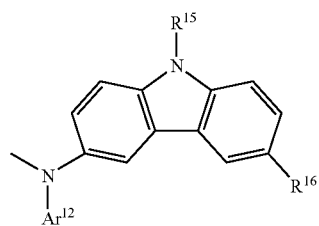

(2)

As an alkyl group having 1 to 6 carbon atoms, methyl, ethyl, n-propyl, n-butyl, n-hexyl, and the like are given specifically. Alternatively, an alkyl group having a branch, such as iso-propyl or tert-butyl may be used.

As an aryl group having 6 to 25 carbon atoms, phenyl, 4-biphenylyl, 1-naphthyl, 2-naphthyl, 9-anthryl, 9-phenanthryl, 1-pyrenyl, 9,9'-dimethyl-2-fluorenyl, spiro-9,9'-bifluorene-2-yl, and the like are given specifically. Alternatively, an aryl group having a substituent such as m-tolyl, p-tolyl, 2-fluorophenyl, 3-fluorophenyl, or 4-fluorophenyl may be used.

As a heteroaryl group having carbon atoms 5 to 9, 2-pyridyl, 8-quinolyl, 3-quinolyl, and the like are given specifically.

As an arylalkyl group, benzyl and the like are given specifically.

As an acyl group having 1 to 7 carbon atoms, acetyl, benzoyl, a propionyl, and the like are given specifically.

In General Formula (1), one of R$^{11}$ and R$^{13}$ is preferably an aryl group having 6 to 25 carbon atoms or a heteroaryl group having 5 to 9 carbon atoms. More preferably, each of R$^{11}$ and R$^{13}$ is one of an aryl group having 6 to 25 carbon atoms and a heteroaryl group having 5 to 9 carbon atoms. When a substituent bonded to nitrogen of a carbazole skeleton is an aryl group having 6 to 25 carbon atoms or a heteroaryl group having 5 to 9 carbon atoms, an effect of improvement in carrier transport property can be obtained.

In addition, in General Formula (1), R$^{12}$ is preferably any one of hydrogen, tert-butyl, phenyl, and biphenyl.

In General Formula (1), R$^{14}$ is preferably any one of hydrogen, tert-butyl, phenyl, and biphenyl.

In General Formula (1), R$^{14}$ is preferably a substituent represented by General Formula (2). When R$^{14}$ is the substituent represented by General Formula (2), a carbazole derivative having higher heat resistance can be obtained. In General Formula (2), R$^{15}$ is preferably an aryl group having 6 to 25 carbon atoms or a heteroaryl group having 5 to 9 carbon atoms. When the substituent which is bonded to nitrogen of the carbazole skeleton is an aryl group having 6 to 25 carbon atoms or a heteroaryl group having 5 to 9 carbon atoms, an effect of improvement in carrier transport property can be obtained. In addition, in General Formula (2), R$^{16}$ is preferably any one of hydrogen, tert-butyl, phenyl, and biphenyl.

Among carbazole derivatives having the structure represented by General Formula (1), a carbazole derivative having a structure represented by the following general formula (3) is preferable since it can be easily synthesized.

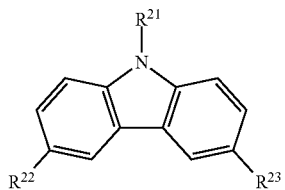

(3)

In the formula, R$^{21}$ represents any one of hydrogen, an alkyl group having 1 to 6 carbon atoms, an aryl group having 6 to 25 carbon atoms, a heteroaryl group having 5 to 9 carbon atoms, an arylalkyl group, and an acyl group having 1 to 7 carbon atoms; R$^{22}$ represents any one of hydrogen, an alkyl group having 1 to 6 carbon atoms, and an aryl group having 6 to 12 carbon atoms; R$^{23}$ represents a substituent represented by General Formula (4). In the substituent represented by General Formula (4), R$^{24}$ represents any one of hydrogen, an alkyl group having 1 to 6 carbon atoms, an aryl group having 6 to 25 carbon atoms, a heteroaryl group having 5 to 9 carbon atoms, an arylalkyl group, and an acyl group having 1 to 7 carbon atoms; Ar$^{21}$ represents one of an aryl group having 6 to 25 carbon atoms and a heteroaryl group having 5 to 9 carbon atoms; and R$^{25}$ represents any one of hydrogen, an alkyl group having 1 to 6 carbon atoms, and an aryl group having 6 to 12 carbon atoms.

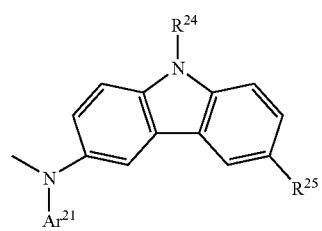

(4)

In the above structure, R$^{22}$ is preferably any one of hydrogen, tert-butyl, phenyl, and biphenyl.

In addition, a carbazole derivative having a structure represented by the following general formula (5) is preferable.

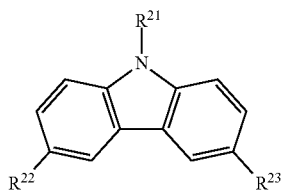

(5)

In the formula, R$^{21}$ represents any one of hydrogen, an alkyl group having 1 to 6 carbon atoms, an aryl group having 6 to 25 carbon atoms, a heteroaryl group having 5 to 9 carbon atoms, an arylalkyl group, and an acyl group having 1 to 7 carbon atoms; each of R$^{22}$ and R$^{23}$ represents a substituent represented by General Formula (6). In the substituent represented by General Formula (6), $R^{24}$ represents any one of hydrogen, an alkyl group having 1 to 6 carbon atoms, an aryl group having 6 to 25 carbon atoms, a heteroaryl group having 5 to 9 carbon atoms, an arylalkyl group, and an acyl group having 1 to 7 carbon atoms; $Ar^{21}$ represents one of an aryl group having 6 to 25 carbon atoms and a heteroaryl group having 5 to 9 carbon atoms; and $R^{25}$ represents any one of hydrogen, an alkyl group having 1 to 6 carbon atoms, and an aryl group having 6 to 12 carbon atoms.

(6)

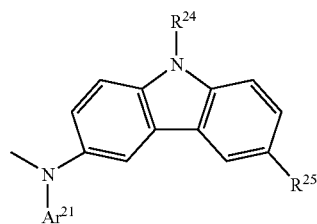

In the above structure, $R^{25}$ is preferably any one of hydrogen, tert-butyl, phenyl, and biphenyl.

In the above structure, $R^{24}$ is preferably an aryl group having 6 to 25 carbon atoms or a heteroaryl group having 5 to 9 carbon atoms.

In the above structure, $R^{21}$ is preferably an aryl group having 6 to 25 carbon atoms or a heteroaryl group having 5 to 9 carbon atoms.

In addition, a carbazole derivative having a structure represented by the following general formula (7) is preferable.

(7)

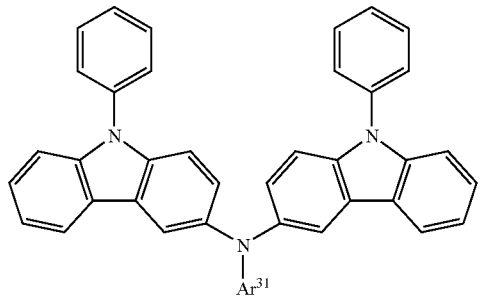

In the formula, $Ar^{31}$ represents phenyl or naphthyl.

In addition, a carbazole derivative having a structure represented by the following general formula (8) is preferable.

(8)

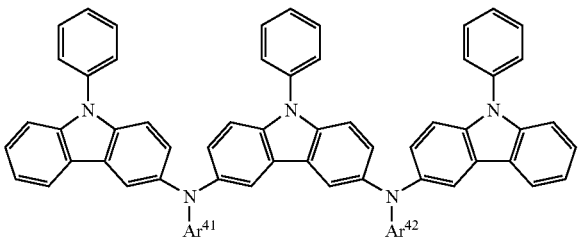

In the formula, $Ar^{41}$ and $Ar^{42}$ may be either the same or different, each of which represents phenyl or naphthyl.

As a specific example of a carbazole derivative used for the invention, carbazole derivatives represented by the following structural formulae (9) to (71) can be given. However, the invention is not limited thereto.

(9)

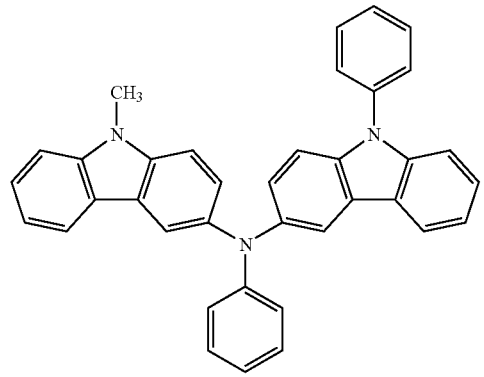

(10)

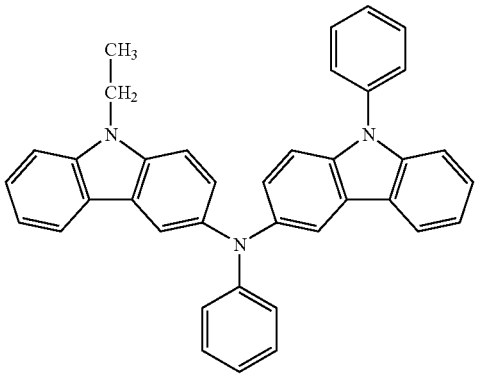

(11)

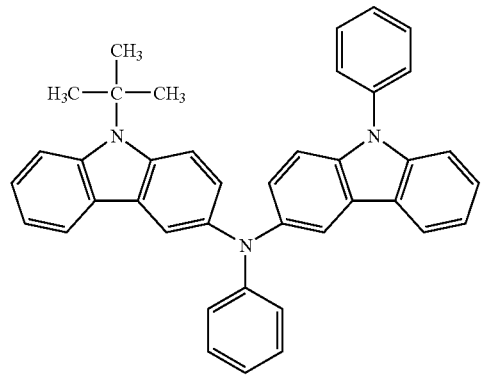

(12)

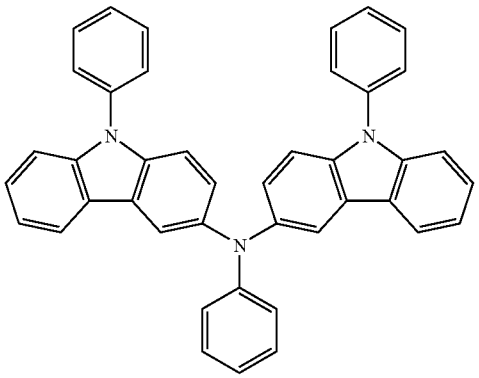

-continued
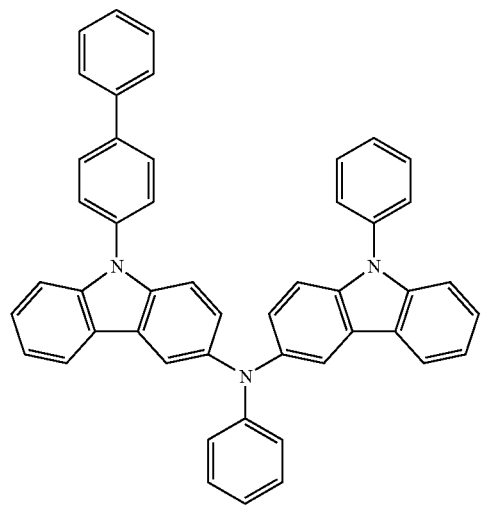
(13)
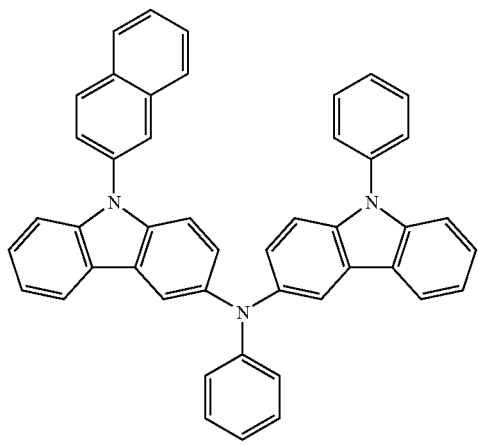
(14)
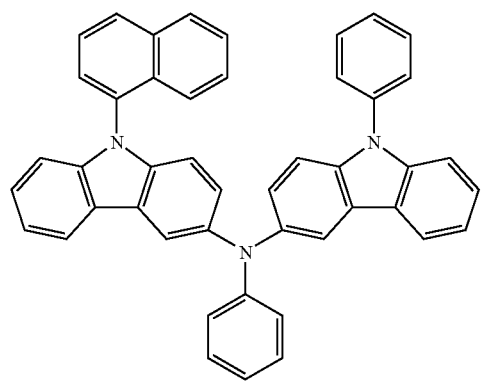
(15)
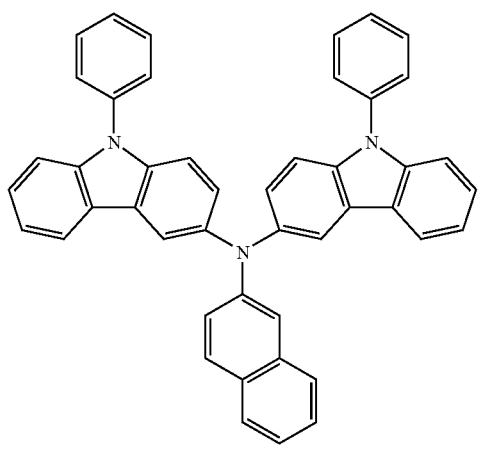
(16)
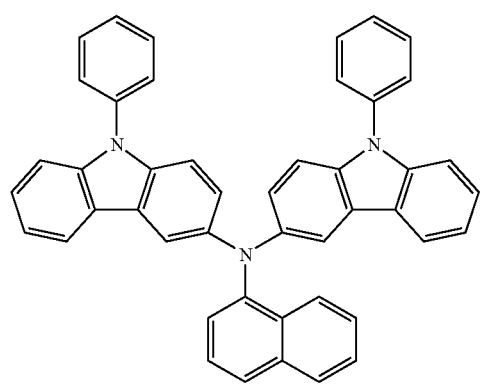
(17)
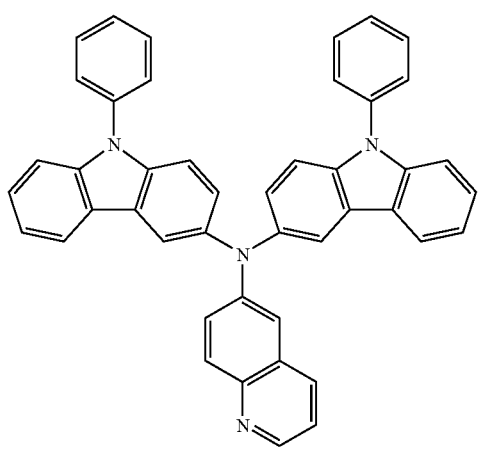
(18)

(19)
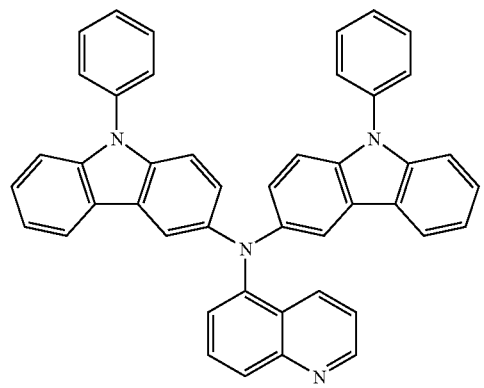
(20)
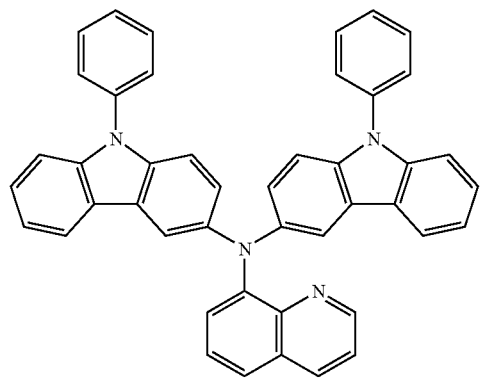
(21)
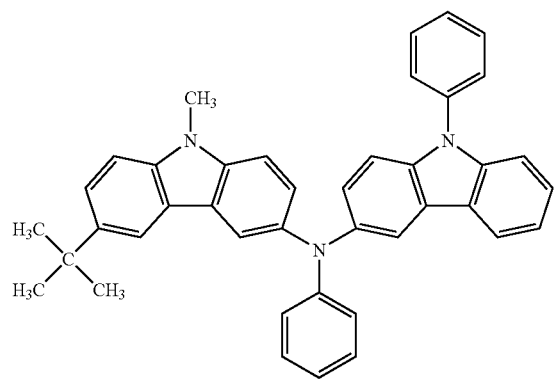
(22)
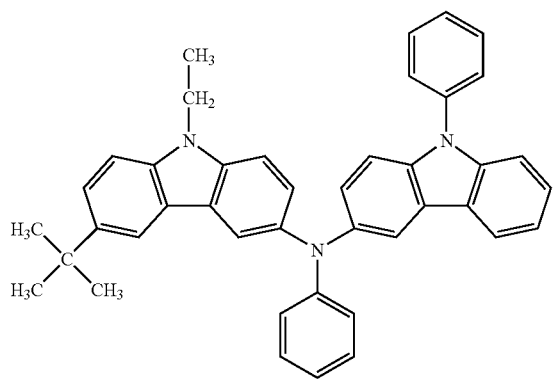
(23)
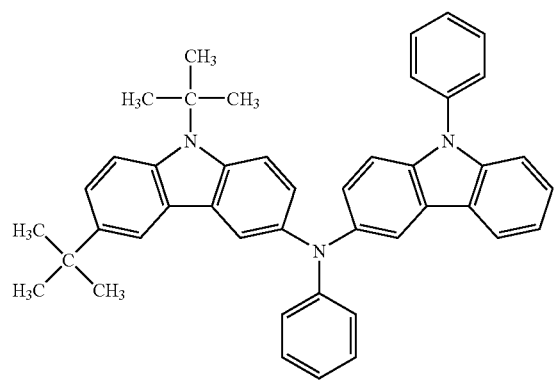
(24)
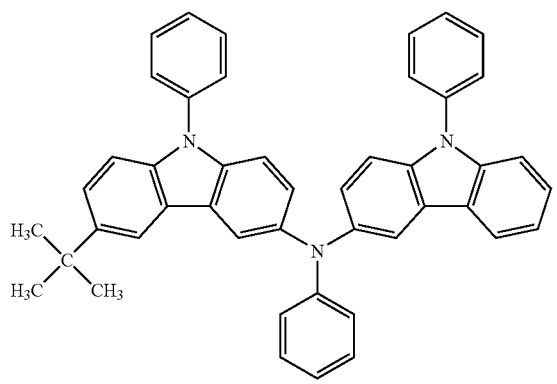

-continued
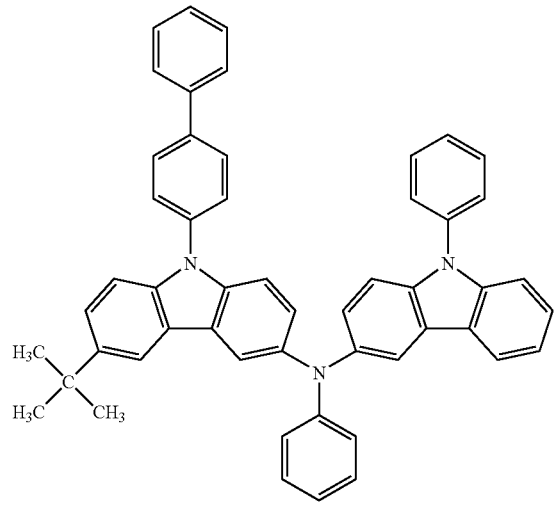
(25)
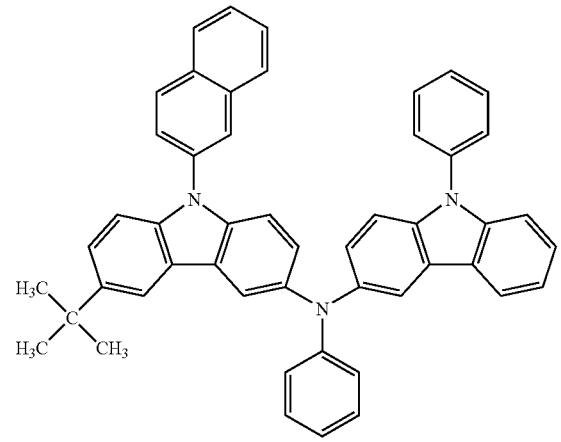
(26)
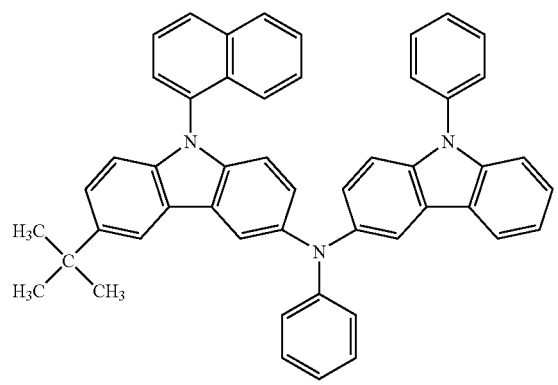
(27)
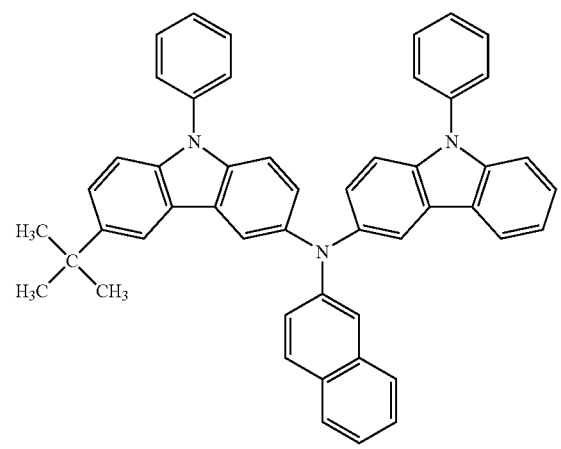
(28)
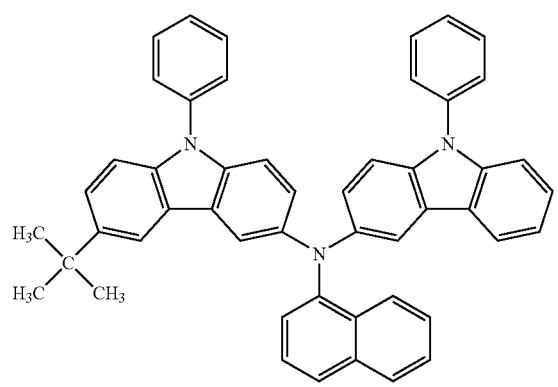
(29)
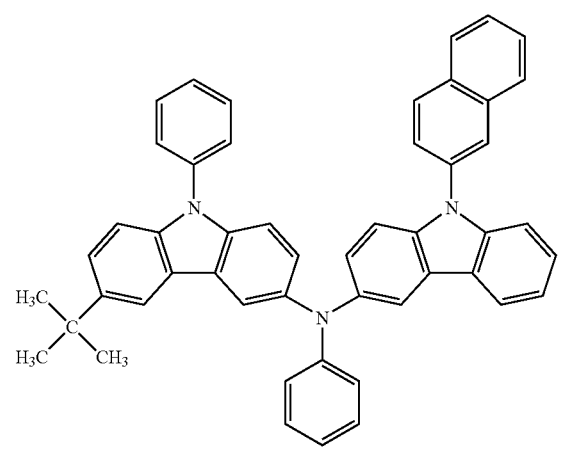
(30)

-continued
(31)
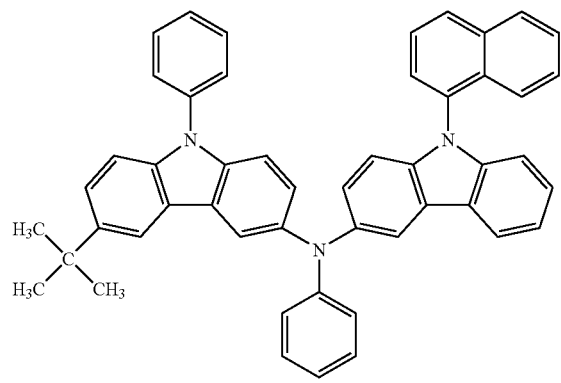
(32)
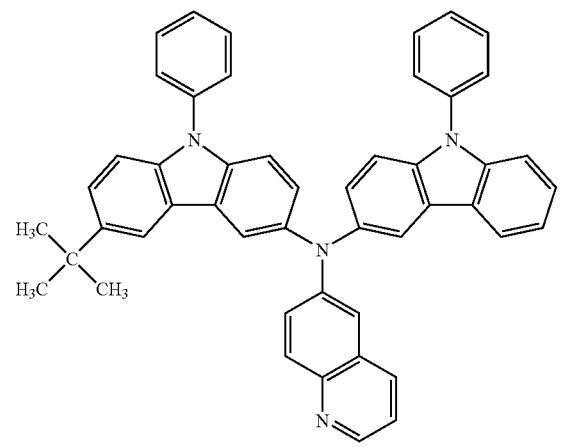
(33)
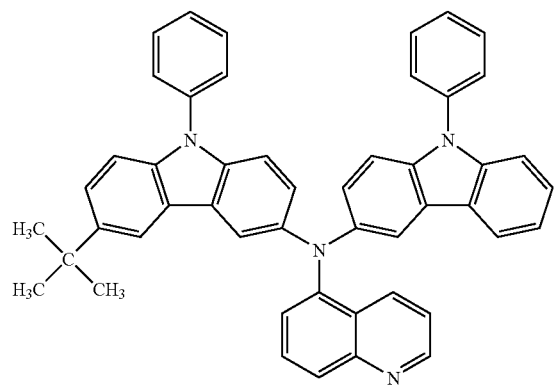
(34)
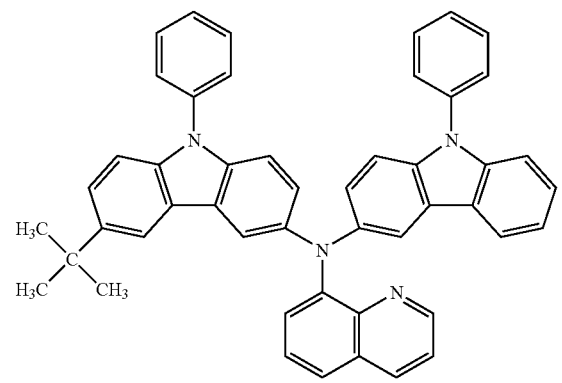
(35)
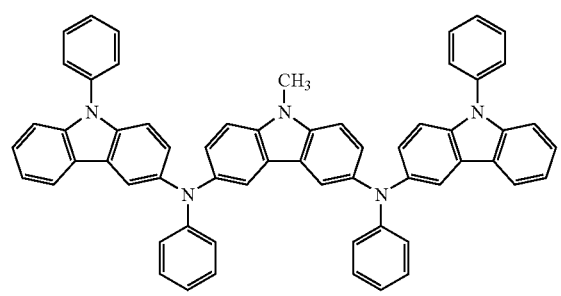
(36)
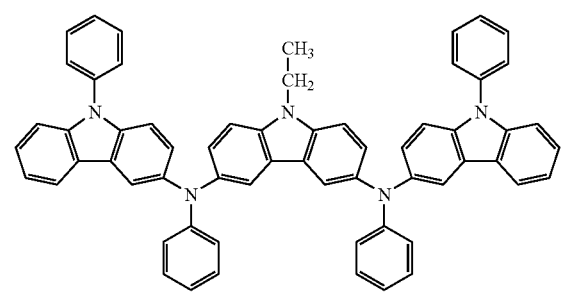
(37)
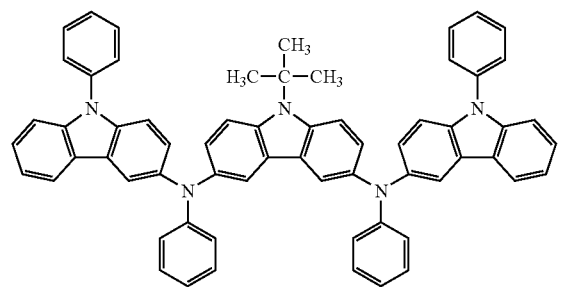
(38)
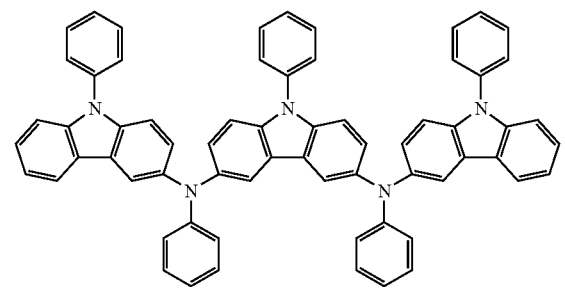

-continued
(39)
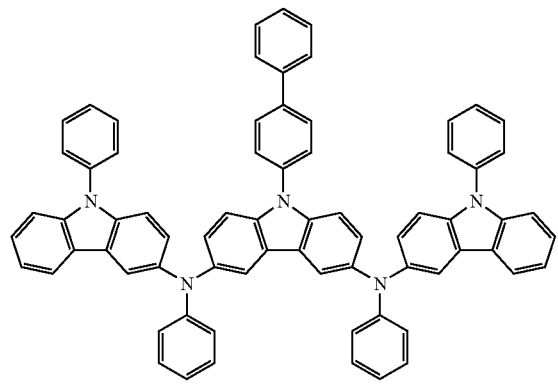
(40)
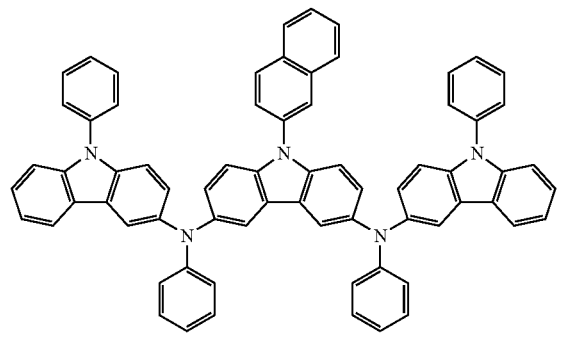
(41)
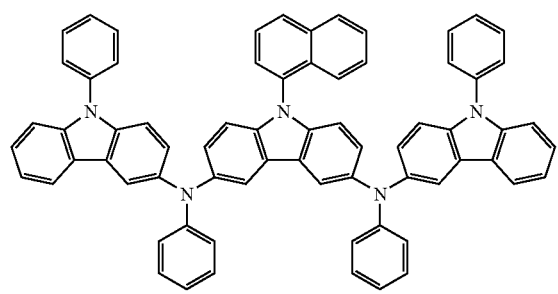
(42)
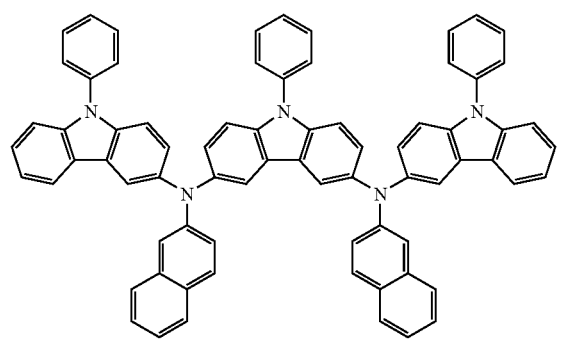
(43)
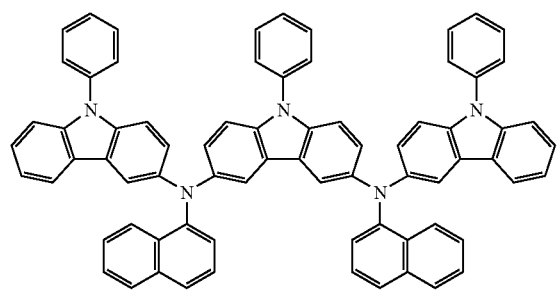
(44)
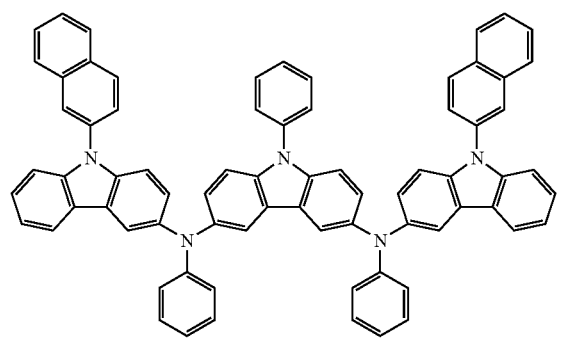
(45)
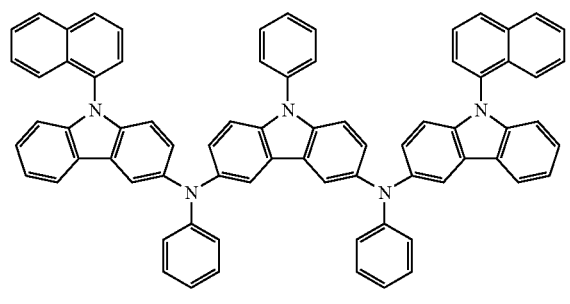
(46)
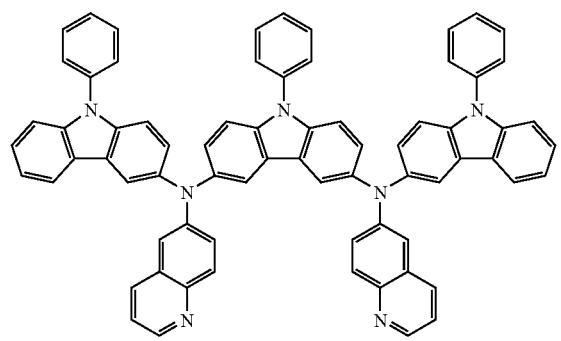

-continued
(47)
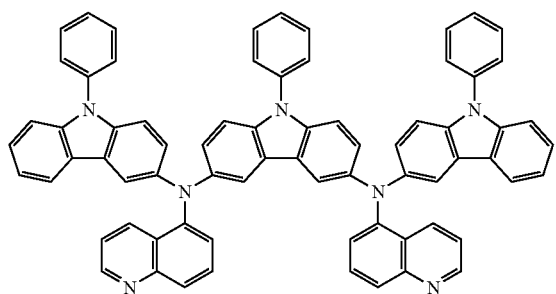
(48)
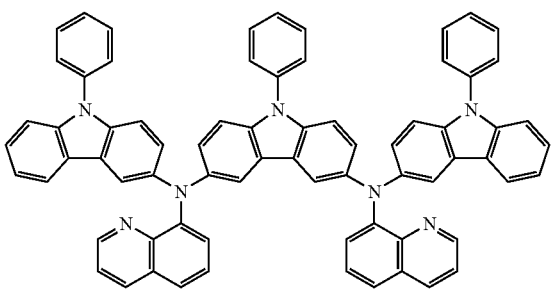
(49)
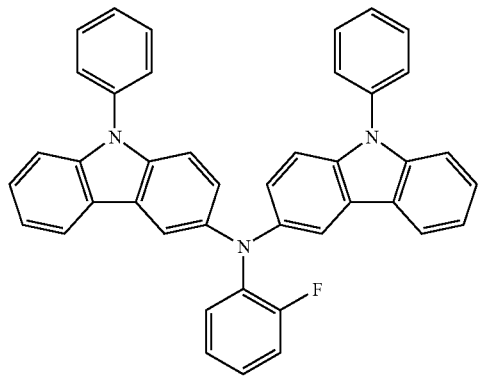
(50)
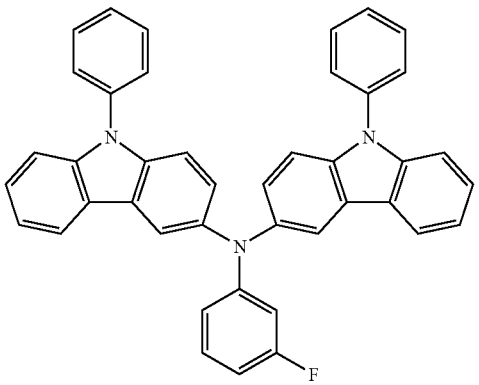
(51)
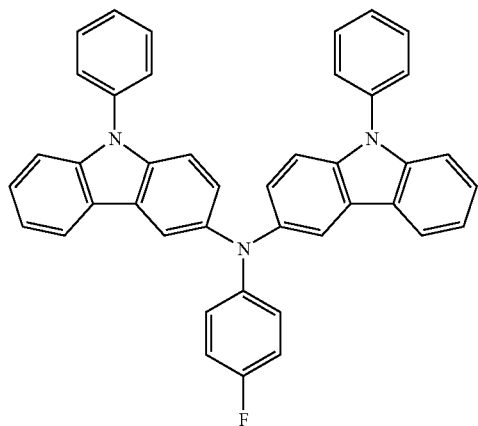
(52)
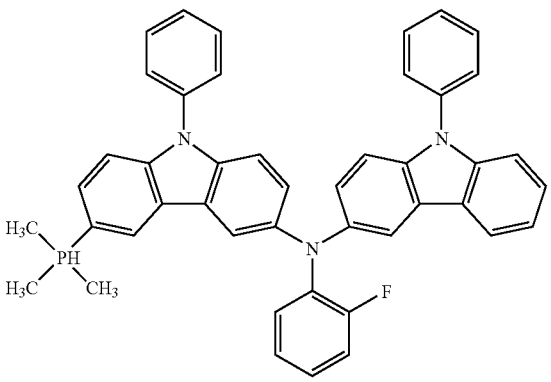
(53)
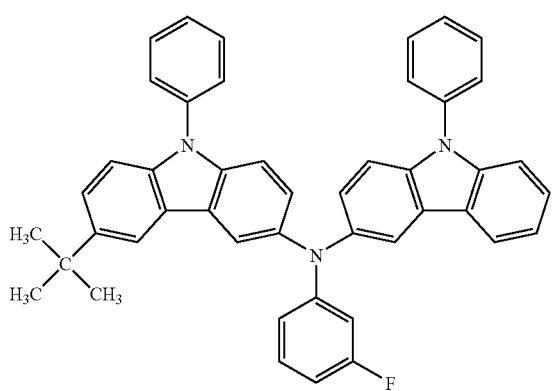
(54)
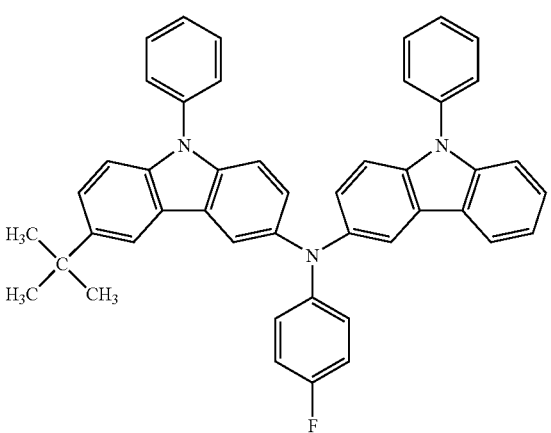

-continued
(55)
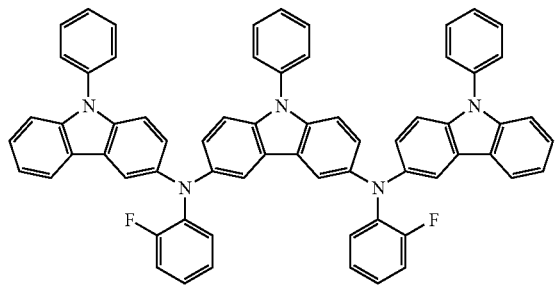
(56)
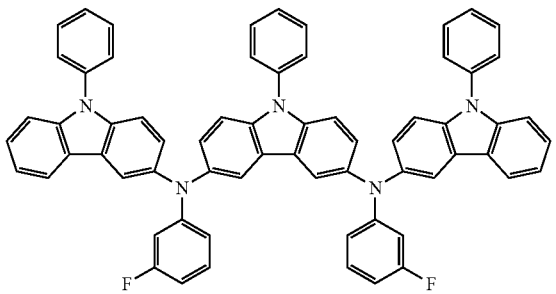
(57)
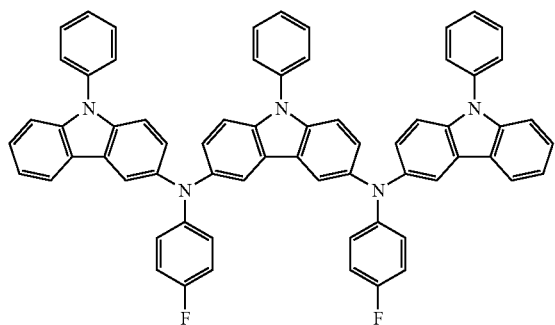
(58)
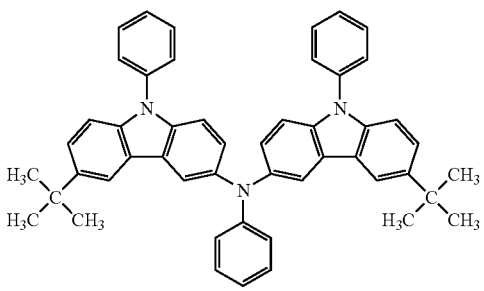
(59)
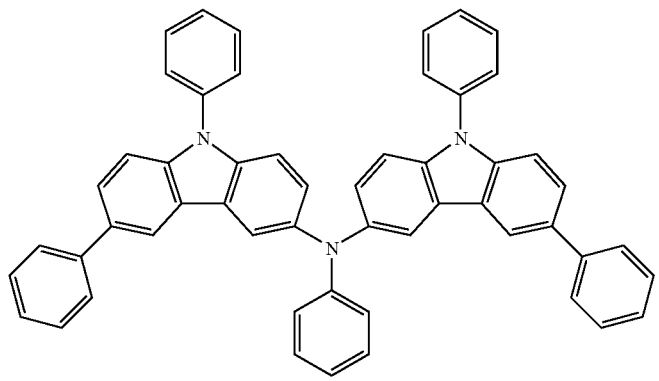
(60)
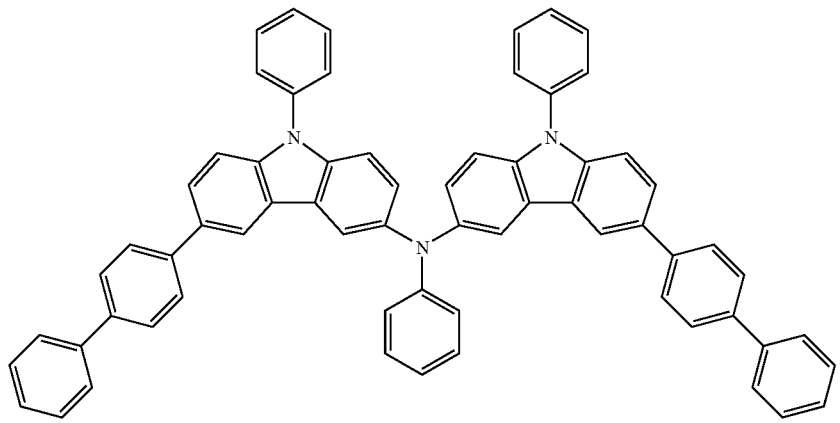

-continued
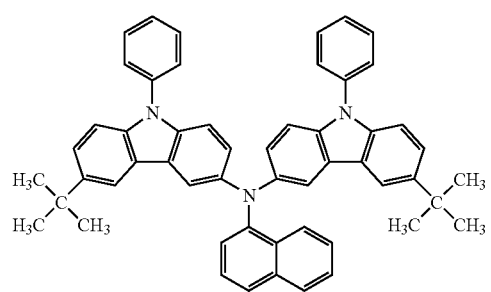
(61)
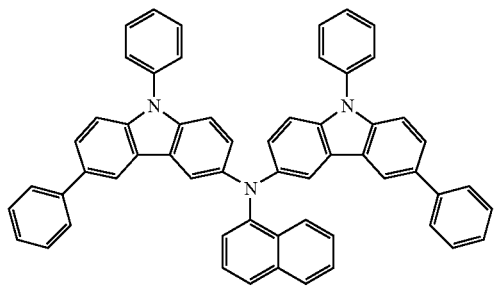
(62)
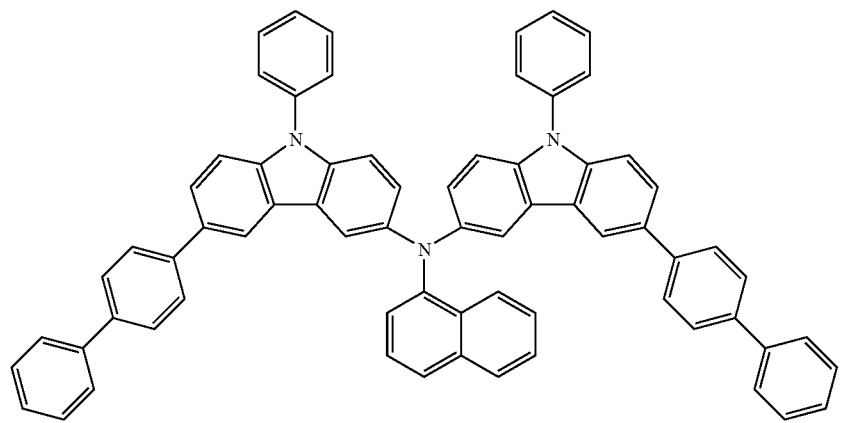
(63)
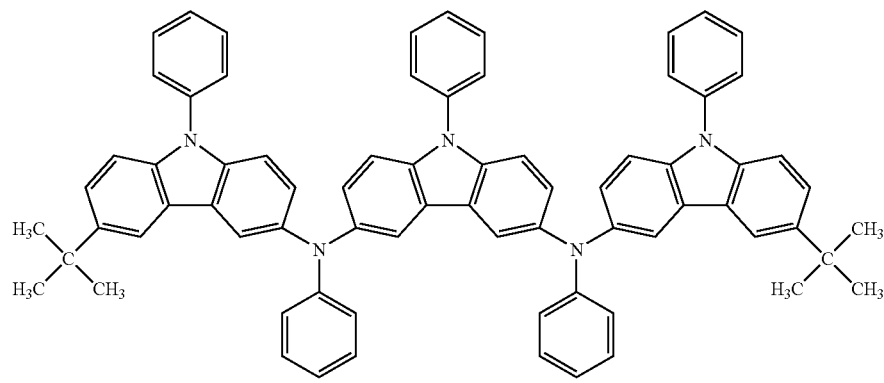
(64)
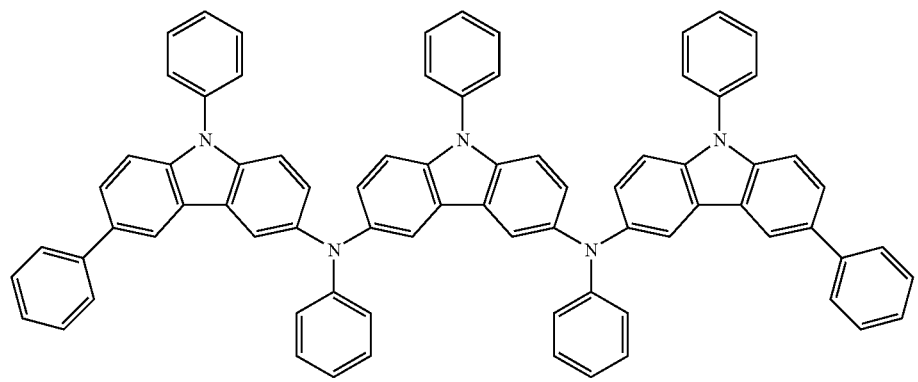
(65)

-continued
(66)
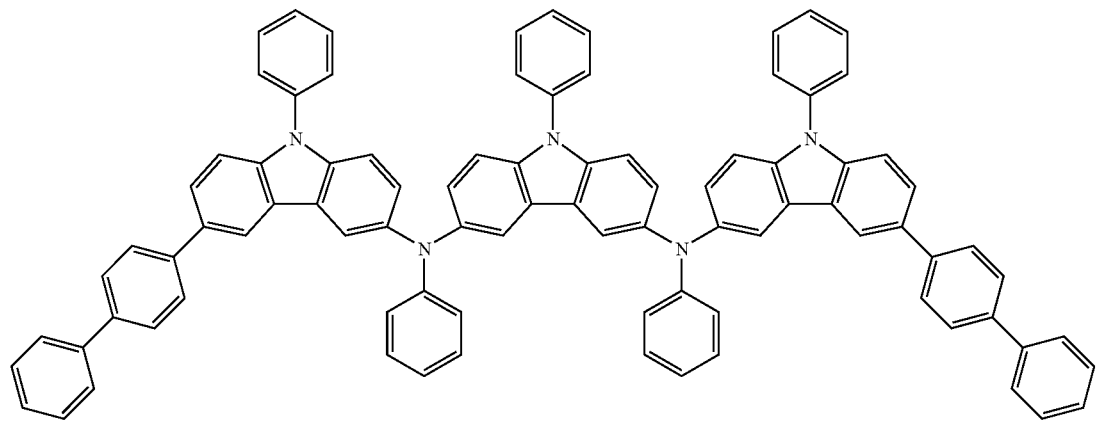
(67)
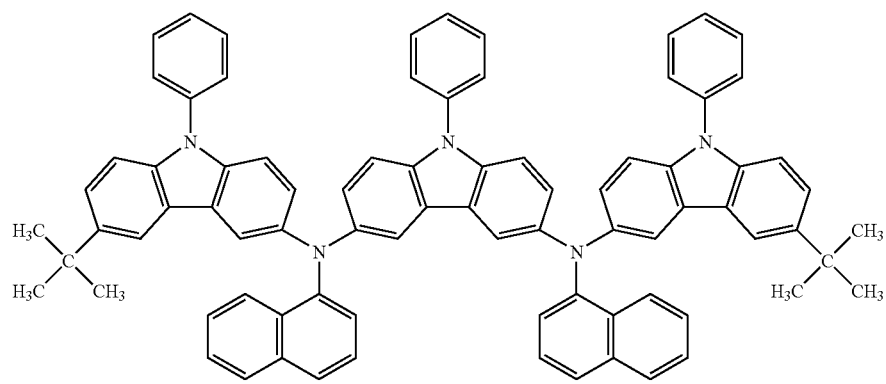
(68)
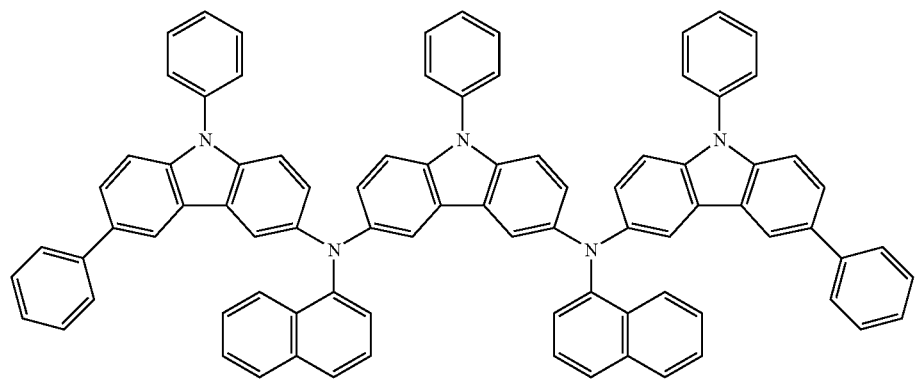
(69)
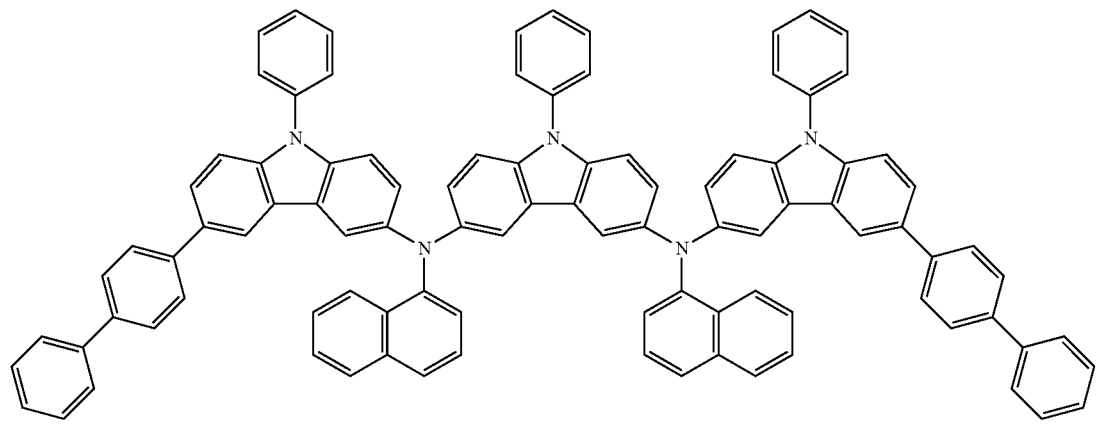

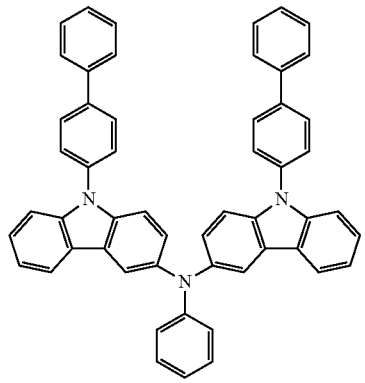
(70)

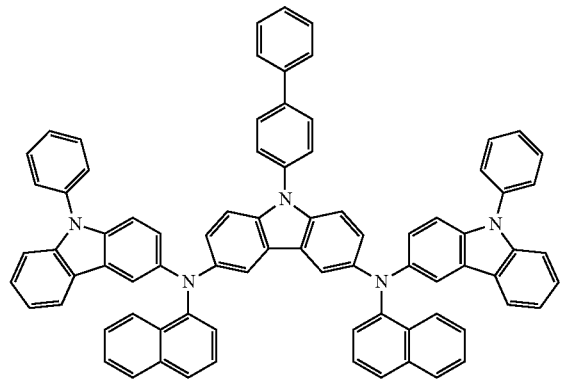
(71)

The carbazole derivatives represented by Structural Formulae (9) to (20) have hydrogen as $R^{12}$ in General Formula (1), whereas the carbazole derivatives represented by Structural Formulae (21) to (34) have an alkyl group as $R^{12}$ in General Formula (1).

Each of the carbazole derivatives represented by Structural Formulae (35) to (48) has a structure in which the same substituents are bonded to a carbazole skeleton, and can be synthesized more easily than a carbazole derivative having a structure in which different substituents are bonded. In other words, when $R^{22}$ and $R^{23}$ in General Formula (3) have the same structure, which is represented by General Formula (4), the same substituents may be bonded to the carbazole skeleton; thus, synthesis becomes easier.

A carbazole derivative of the invention may contain fluorine as represented by Structural Formulae (49) to (57).

An alkyl group having 1 to 6 carbon atoms or an aryl group having 6 to 12 carbon atoms is preferably bonded to the 6 position of the carbazole skeleton as represented by Structural Formulae (58) to (69). Due to a substituent of an alkyl group having 1 to 6 carbon atoms or an aryl group having 6 to 12 carbon atoms, at the 6 position of the carbazole skeleton, the carbazole skeleton becomes chemically stable, and a side reaction can be suppressed.

As a synthesis method of a carbazole derivative used for the invention, various reactions can be applied. For example, there are methods represented by the following reaction schemes (A-1) and (A-2). However, the synthesis method of a carbazole derivative used for the invention is not limited thereto.

(A-1)

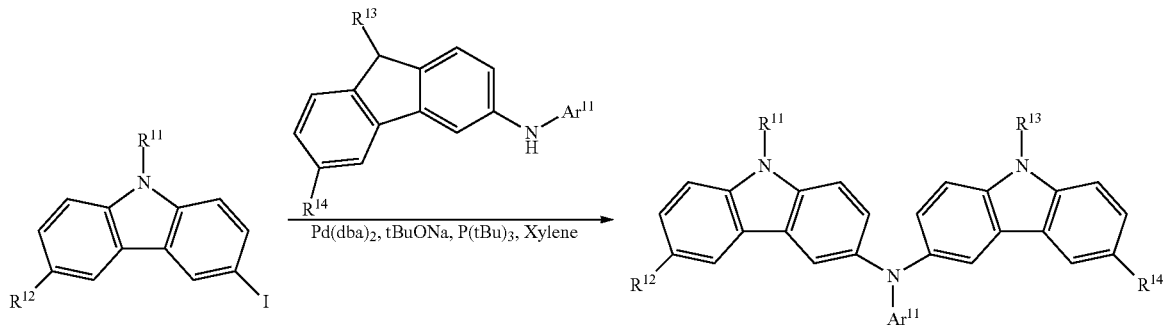

(A-2)

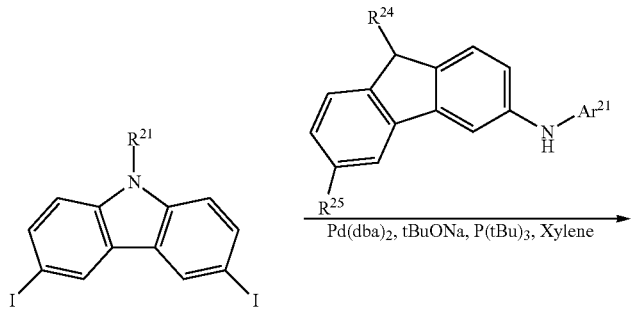

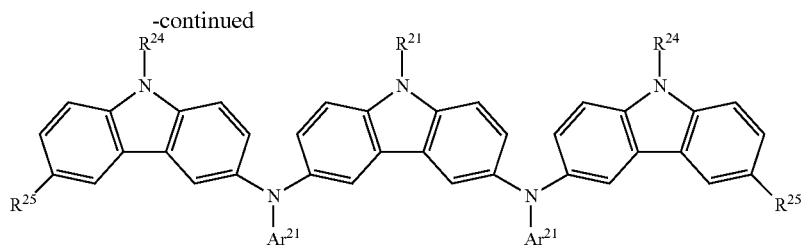

As an inorganic compound used for the composite material of the invention, oxide of transition metal is preferable, and specifically, titanium oxide, zirconium oxide, hafnium oxide, vanadium oxide, niobium oxide, tantalum oxide, chromium oxide, molybdenum oxide, tungsten oxide, manganese oxide, rhenium oxide, or the like can be used. In particular, vanadium oxide, molybdenum oxide, tungsten oxide, and rhenium oxide are preferable due to their high electron accepting properties. Among them, molybdenum oxide is particularly preferable since it is stable even in the atmosphere and easy to handle.

Note that any technique of both a wet method and a dry method may be used as a method for producing a composite material of the invention. For example, the composite material of the invention can be produced by co-evaporation of a carbazole derivative and an inorganic compound. Note that molybdenum oxide is easy to evaporate in vacuum and is preferable in terms of a producing process.

A composite material without an absorption peak in a visible light region can be obtained when it contains the carbazole derivative represented by General Formula (1) and an inorganic compound. Therefore, a composite material having high visible light transmittance can be obtained.

In addition, when a composite material contains a carbazole derivative represented by General Formula (1) and an inorganic compound, the carbazole derivative represented by General Formula (1) and the inorganic compound interact with each other; thus, a composite material having an excellent carrier injection property and carrier transport property can be obtained. Note that when the carbazole derivative represented by General Formula (1) and the inorganic compound interact strongly, an absorption spectrum is generated in the near-infrared region; therefore, the composite material of the invention preferably has an absorption peak in the range of 800 nm to 1300 nm.

Since the carbazole derivative represented by General Formula (1) has a high glass transition point, the composite material of the invention has excellent heat resistance.

Therefore, the composite material of the invention can be used for a light emitting element or a semiconductor element such as a photoelectric conversion element or a thin film transistor. A drive voltage can be reduced by using the composite material of the invention. Since the composite material of the invention has excellent visible light transmittance, a highly efficient semiconductor element can be obtained when the composite material of the invention is used for a light emitting element or a photoelectric conversion element.

Embodiment 2

A light emitting element of the present invention has a plurality of layers between a pair of electrodes. The plurality of layers is a laminate of a combination of layers formed of a material having a high carrier injection property and a material having a high carrier transport property such that a light emitting region is formed apart from the electrodes, in other words, such that carriers are recombined in a portion distant from the electrodes.

One mode of the light emitting element of the invention is hereinafter explained with reference to FIG. 1A.

In this embodiment, the light emitting element includes a first electrode 102, a first layer 103, a second layer 104, a third layer 105, and a fourth layer 106 which are sequentially laminated over the first electrode 102, and a second electrode 107 which is further provided thereover. Note that in this embodiment, explanation is made hereinafter assuming that the first electrode 102 functions as an anode and the second electrode 107 functions as a cathode.

A substrate 101 is used as a support of the light emitting element. For the substrate 101, glass, plastic, or the like can be used, for example. Note that another material is also acceptable as long as it functions as a support in a manufacturing process of the light emitting element.

The first electrode 102 can be formed with various kinds of metal, alloys, conductive compounds and a mixture thereof. For example, indium tin oxide (ITO), indium tin oxide containing silicon, indium zinc oxide (IZO) in which indium oxide is mixed with zinc oxide (ZnO) of 2 wt % to 20 wt %, gold (Au), platinum (Pt), nickel (Ni), tungsten (W), chromium (Cr), molybdenum (Mo), iron (Fe), cobalt (Co), titanium (Ti), copper (Cu), palladium (Pd), aluminum (Al), aluminum-silicon (Al—Si), Aluminum-titanium (Al—Ti), aluminum-silicon-copper (Al—Si—Cu), nitride of a metal material (TiN or the like), or the like can be used. When used as an anode, the first electrode is preferably formed of a material having a high work function (a work function of 4.0 eV or more) among them.

Note that in the light emitting element of the invention, the first electrode 102 is not limited to a material having a high work function, and a material having a low work function can also be used.

The first layer 103 is a layer containing the composite material described in Embodiment 1. In other words, it is a layer containing the carbazole derivative represented by General Formula (1) and an inorganic compound.

The second layer 104 is a layer formed of a material having a high hole transport property, for example, an aromatic amine compound (in other words, a compound having a benzene ring-nitrogen bond) such as 4,4'-bis[N-(1-naphthyl)-N-phenylamino]biphenyl (abbr.: α-NPD), N,N'-bis(3-methylphenyl)-N,N'-diphenyl-[1,1'-biphenyl]-4,4'-diamine (abbr.: TPD), 4,4',4''-tris(N,N-diphenylamino)triphenylamine (abbr.: TDATA), or 4,4',4''-tris[N-(3-methylphenyl)-N-phenylamino]triphenylamine (abbr.: MTDATA). The materials mentioned here are mainly materials, each of which has a hole mobility of $10^{-6}$ cm$^2$/Vs or more. However, a material other than the above-described materials may be used as long as it has a higher hole transport property than an electron transport property. Note that the second layer 104 may not only be a single layer but also a laminated layer of two or more layers formed of the above materials.

The third layer 105 is a layer which contains a material having a high light emitting property. For example, it is formed by freely combining a material having a high light emitting property such as N,N'-dimethylquinacridon (abbr.: DMQd) or 3-(2-benzothiazolyl)-7-diethylaminocoumarin (abbr.: coumarin 6) with a material having a high carrier transport property and high film quality (in other words, hard to be crystallized) such as tris(8-quinolinolato)aluminum (abbr.: Alq$_3$) or 9,10-di(2-naphthyl)anthracene (abbr.: DNA). However, each of Alq$_3$ and DNA is a material which also has a high light emitting property; therefore, a structure of using this material alone may be used as the third layer 105.

The fourth layer 106 is a layer formed of a material having a high electron transport property, for example, a metal complex having a quinoline skeleton or a benzoquinoline skeleton such as tris(8-quinolinolato)aluminum (abbr.: Alq$_3$), tris(5-methyl-8-quinolinolato)aluminum (abbr.: Almq$_3$), bis(10-hydroxybenzo[h]-quinolinato)beryllium (abbr.: BeBq$_2$), or bis(2-methyl-8-quinolinolato)-4-phenylphenolato-aluminum (abbr.: BAlq), or the like. Alternatively, a metal complex having an oxazole or thiazole ligand such as bis[2-(2-hydroxyphenyl)-benzoxazolato]zinc (abbr.: Zn(BOX)$_2$) or bis[2-(2-hydroxyphenyl)-benzothiazolato]zinc (abbr.: Zn(BTZ)$_2$), or the like can be used. In addition to the metal complex, 2-(4-biphenylyl)-5-(4-tert-butylphenyl)-1,3,4-oxadiazole (abbr.: PBD), 1,3-bis[5-(p-tert-butylphenyl)-1,3,4-oxadiazol-2-yl]benzene (abbr.: OXD-7), 3-(4-tert-butylphenyl)-4-phenyl-5-(4-biphenylyl)-1,2,4-triazole (abbr.: TAZ), 3-(4-tert-butylphenyl)-4-(4-ethylphenyl)-5-(4-biphenylyl)-1,2,4-triazole (abbr.: p-EtTAZ), bathophenanthroline (abbr.: BPhen), bathocuproin (abbr.: BCP), or the like can be used. The materials mentioned here are mainly materials, each of which has an electron mobility of $10^{-6}$ cm$^2$/Vs or more. Note that a material other than the above-described materials can be used for the fourth layer 106 as long as it has a higher electron transport property than a hole transport property. In addition, the fourth layer 106 may not only be a single layer but also a laminated layer of two or more layers formed of the above materials.

As a material for forming the second electrode 107, metal, an alloy, or a conductive compound having a low work function (a work function of 3.8 eV or less), a mixture thereof, or the like, can be used. As a specific example of such a cathode material, an element belonging to Group 1 or 2 of the Periodic Table, in other words, alkali metal such as lithium (Li) or cesium (Cs), alkaline earth metal such as magnesium (Mg), calcium (Ca), or strontium (Sr), or an alloy containing the same (Mg:Ag, Al:Li) can be given. However, by providing a layer having a function of promoting electron injection between the second electrode 107 and the light emitting layer so as to be laminated with the second electrode, various conductive materials such as Al, Ag, ITO, or ITO containing silicon can be used as the second electrode 107 regardless of the magnitude of the work function.

Note that for the layer having a function of promoting electron injection, a compound of alkali metal or alkaline earth metal, such as lithium fluoride (LiF), cesium fluoride (CsF), or calcium fluoride (CaF$_2$) can be used. Alternatively, a layer formed of a material having an electron transport property, in which alkali metal or alkaline earth metal is contained, for example, Alq$_3$ in which magnesium (Mg) is contained or the like can be used.

The first layer 103, the second layer 104, the third layer 105, and the fourth layer 106 may be formed, for example, by an evaporation method, an ink-jet method, a spin coating method, or the like. In addition, different methods may be separately used to form the electrodes or the layers.

In the light emitting element of the invention having the above-described structure, current flows due to a potential difference made between the first electrode 102 and the second electrode 107; holes and electrons are recombined in the third layer 105 that is a layer containing a highly light emitting material; and then, light is emitted. In other words, a light emitting region is formed in the third layer 105. However, the whole of the third layer 105 need not serve as the light emitting region. For example, the light emitting region may be formed only on a second layer 104 side or a fourth layer 106 side of the third layer 105.

Figure 1B:
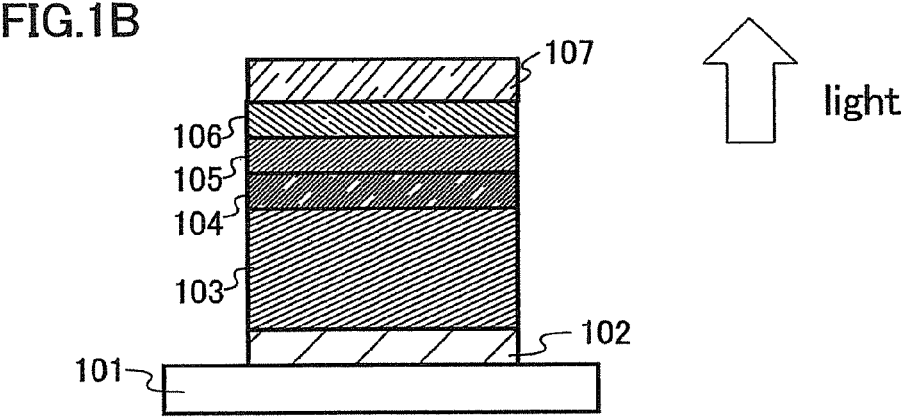
Figure 1C:
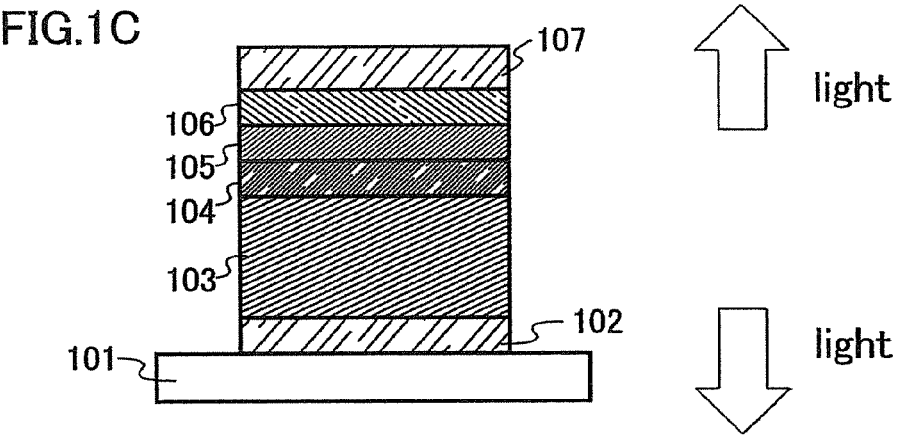

Light emission is extracted outside through either or both the first electrode 102 and the second electrode 107. Accordingly, either or both the first electrode 102 and the second electrode 107 are formed of a light-transmitting material. When only the first electrode 102 is formed of a light-transmitting material, light emission is extracted from a substrate side through the first electrode 102 as shown in FIG. 1A. When only the second electrode 107 is formed of a light-transmitting material, light emission is extracted from the side opposite to the substrate through the second electrode 107 as shown in FIG. 1B. When both the first electrode 102 and the second electrode 107 are formed of a light-transmitting material, light emission is extracted from both the substrate side and the opposite side through the first electrode 102 and the second electrode 107 as shown in FIG. 1C.

Note that a structure of the layers provided between the first electrode 102 and the second electrode 107 is not limited to the structure described above. Another structure may be employed as long as it has a structure in which a region where holes and electrons are recombined with each other is provided in a portion distant from the first electrode 102 and the second electrode 107 so as to suppress quenching caused by approach of the light emitting region to metal, and which has a layer containing the composite material described in Embodiment 1.

In other words, a lamination structure of the layers is not particularly limited, and the layers may be structured by freely combining layers formed of a material having a high electron transport property, a material having a high hole transport property, a material having a high electron injection property, a material having a high hole injection property, a material having a bipolar property (a material having a high electron and hole transport property), or the like with the layer containing the composite material of the invention. Alternatively, a structure in which a carrier recombination portion is controlled by providing a layer formed of a silicon oxide film or the like over the first electrode 102 may be employed.

Figure 2:
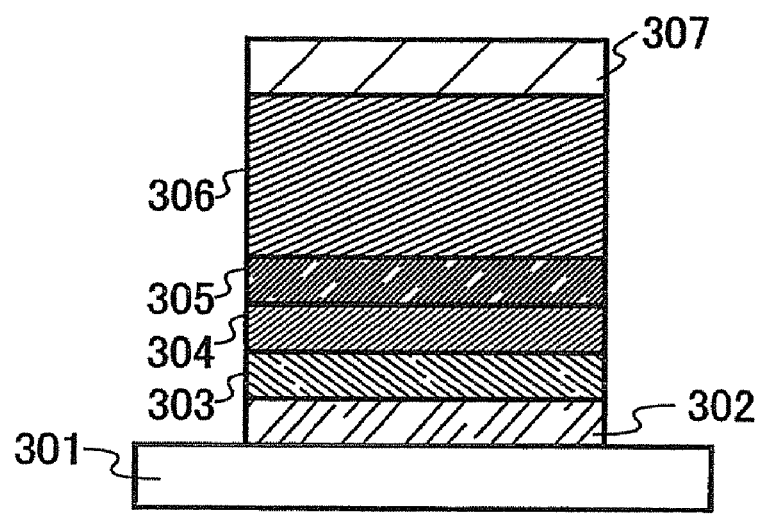
FIG. 2 is a diagram for explaining a light emitting element of the present invention.

A light emitting element shown in FIG. 2 has a structure in which a first layer 303 formed of a material having a high electron transport property, a second layer 304 containing a material having a high light emitting property, a third layer 305 formed of a material having a high hole transport property, a fourth layer 306 which is a layer containing the composite material of the invention, and a second electrode 307 functioning as an anode are sequentially laminated over a first electrode 302 functioning as a cathode. Note that reference numeral 301 denotes a substrate.

In this embodiment, the light emitting element is manufactured over a substrate formed of glass, plastic, or the like. A passive display device can be manufactured by manufacturing a plurality of such light emitting elements over one substrate. The light emitting elements may be manufactured over, for example, a thin film transistor (TFT) array substrate other than the substrate formed of glass, plastic, or the like. This makes it possible to manufacture an active matrix light emitting device, in which the drive of the light emitting element is controlled by the TFT. Note that the structure of the TFT is not particularly limited. The TFT may be a staggered type or an inversely staggered type. Further, a driver circuit formed over the TFT array substrate may include either an n-type TFT or a p-type TFT, or both of them.

The light emitting element of the invention has a layer containing the composite material described in Embodiment 1, in other words, the carbazole derivative represented by General Formula (1) and an inorganic compound. The composite material of the invention has high conductivity because of internal carrier generation, which can achieve drive of the light emitting element at lower voltage.

In addition, the composite material used in the invention has high visible light transmittance; therefore, light generated in the light emitting layer can be extracted outside efficiently.

Further, the composite material used in the invention has high visible light transmittance; therefore, reduction of light extraction efficiency can be suppressed even when the layer containing the composite material is thickened. Consequently, it becomes possible to optimize the thickness of the layer containing the composite material so as to increase external light extraction efficiency while suppressing an increase of a drive voltage.

Moreover, improvement in color purity by optical design can be realized without increasing a drive voltage.

In addition, the composite material of the invention contains an inorganic compound as well as an organic compound having a high glass transition point and has excellent heat resistance; therefore, the light emitting element of the invention has excellent heat resistance and durability.

Further, since a short circuit due to dust, impact, or the like can be prevented by thickening the layer containing the composite material, a reliable light emitting element can be obtained. For example, a thickness between electrodes of a typical light emitting element is 100 nm to 150 nm, whereas a thickness between electrodes of a light emitting element using the layer containing the composite material can be 100 nm to 500 nm, preferably, 200 nm to 500 nm.

In addition, the layer containing the composite material, which is used for the light emitting element of the invention, can form an ohmic contact with the electrode, and has low contact resistance with the electrode. Therefore, an electrode material can be selected without considering a work function or the like. In other words, the electrode material can be selected from a wider range of materials.

Embodiment 3

In this embodiment, a light emitting element having a structure different from that described in Embodiment 2 is explained with reference to FIGS. 5A to 5C and 6A to 6C. In a structure to be described in this embodiment, a layer containing the composite material of the invention can be provided to be in contact with an electrode serving as a cathode.

Figure 5A:
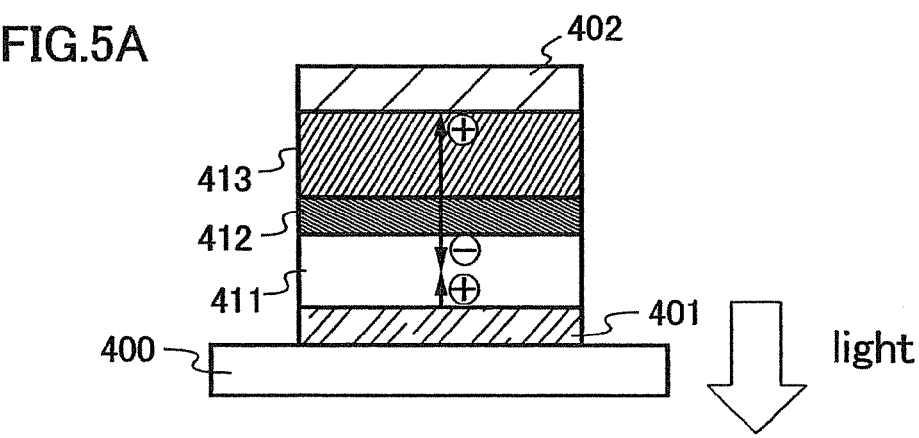
FIGS. 5A to 5C are diagrams for explaining a light emitting element of the present invention.

An example of a structure of a light emitting element of the invention is shown in FIG. 5A. In the structure, a first layer 411, a second layer 412, and a third layer 413 are laminated between a first electrode 401 and a second electrode 402. In this embodiment, the case where the first electrode 401 functions as an anode and the second electrode 402 functions as a cathode, is explained.

The first electrode 401 and the second electrode 402 can employ the same structure as that in Embodiment 2. The first layer 411 is a layer which contains a material having a high light emitting property. The second layer 412 is a layer which contains one compound selected from electron donating materials and a compound having a high electron transport property, and the third layer 413 is a layer which contains the composite material described in Embodiment 1. The electron donating material contained in the second layer 412 is preferably alkali metal, alkaline earth metal, or oxide or salt thereof. Specifically, lithium, cesium, calcium, lithium oxide, calcium oxide, barium oxide, cesium carbonate, or the like can be given.

With such a structure described above, as shown in FIG. 5A, electrons are donated and accepted in the vicinity of the interface between the second layer 412 and the third layer 413 by applying a voltage; electrons and holes are generated; and the third layer 413 transports the holes to the second electrode 402 while the second layer 412 transports the electrons to the first layer 411. In other words, the second layer 412 and the third layer 413 collectively serve as a carrier generation layer. Further, it can be said that the third layer 413 has a function of transporting holes to the second electrode 402.

In addition, the third layer 413 exhibits an extremely high hole injection property and hole transport property. Therefore, a drive voltage can be reduced. Further, when the third layer 413 is thickened, an increase of a drive voltage can be suppressed.

In addition, even when the third layer 413 is thickened, an increase of a drive voltage can be suppressed. Thus, the thickness of the third layer 413 can be freely set, and extraction efficiency of light emission from the first layer 411 can be improved. In addition, the thickness of the third layer 413 can be set so that color purity of light emission from the first layer 411 is improved. In addition, the third layer 413 has high visible light transmittance, which can suppress reduction of external extraction efficiency of light emission due to thickening.

Taking FIG. 5A as an example, damage to the first layer 411 in which a light emitting material exists can also be reduced, for example, when the second electrode 402 is formed by sputtering.

Note that the light emitting element of this embodiment also has different variations by changing materials of the first electrode 401 and the second electrode 402. Schematic diagrams thereof are shown in FIGS. 5B and 5C and FIGS. 6A to 6C. Note that reference numerals in FIG. 5A are also used in FIGS. 5B and 5C and FIGS. 6A to 6C, and reference numeral 400 denotes a substrate for supporting the light emitting element of the invention.

Figure 5B:
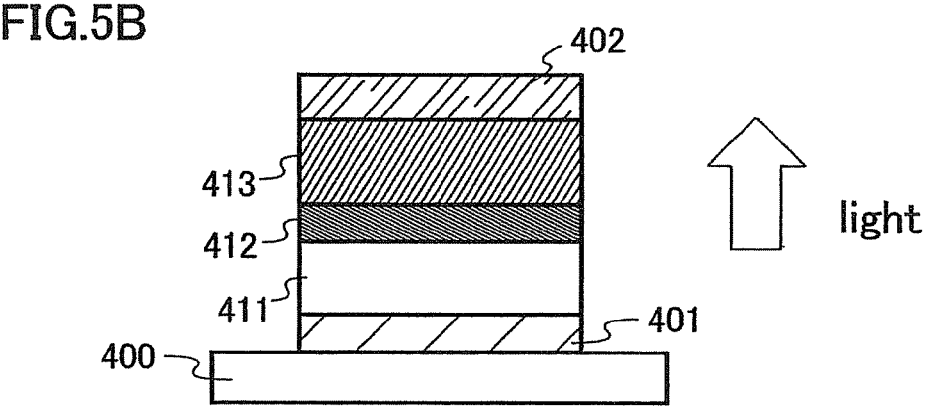
Figure 5C:
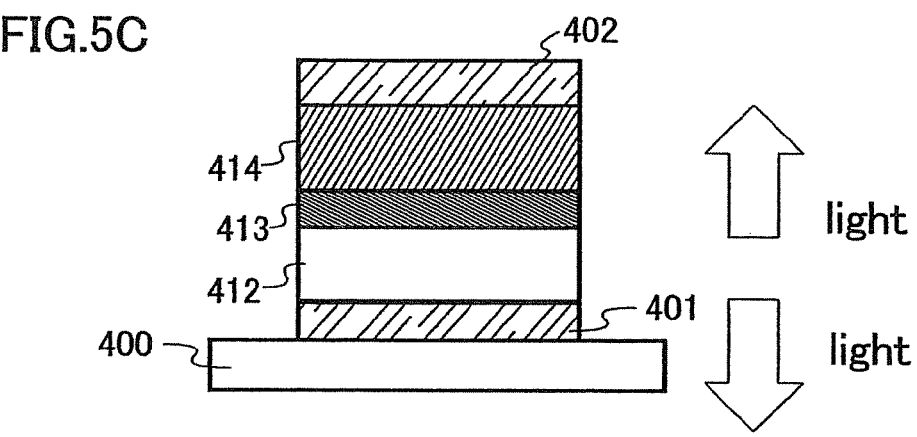

FIGS. 5A to 5C show examples of the case where the first layer 411, the second layer 412, and the third layer 413 are sequentially laminated over the substrate 400. In these examples, when the first electrode 401 has a light-transmitting property and the second electrode 402 has a light-blocking property (in particular, reflectivity), light is emitted from the substrate 400 side as shown in FIG. 5A. When the first electrode 401 has a light-blocking property (in particular, reflectivity) and the second electrode 402 has a light-transmitting property, light is emitted from the side opposite to the substrate 400 as shown in FIG. 5B. Further, when both the first electrode 401 and the second electrode 402 have light-transmitting properties, light can be emitted from both the substrate 400 side and the side opposite to the substrate 400 as shown in FIG. 5C.

Figure 6A:
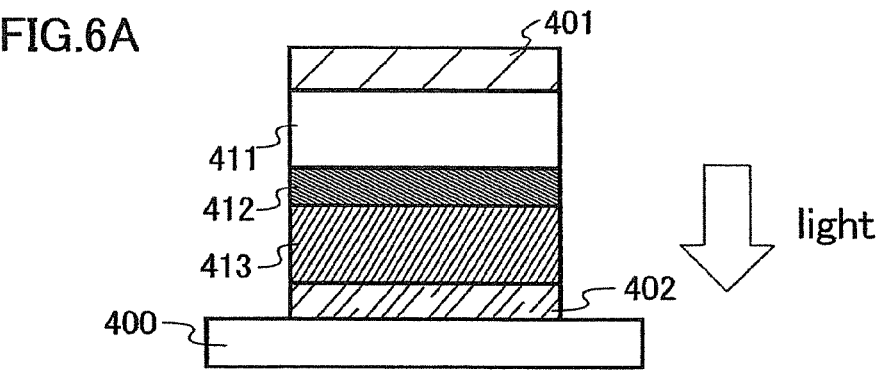
FIGS. 6A to 6C are diagrams for explaining a light emitting element of the present invention.
Figure 6B:
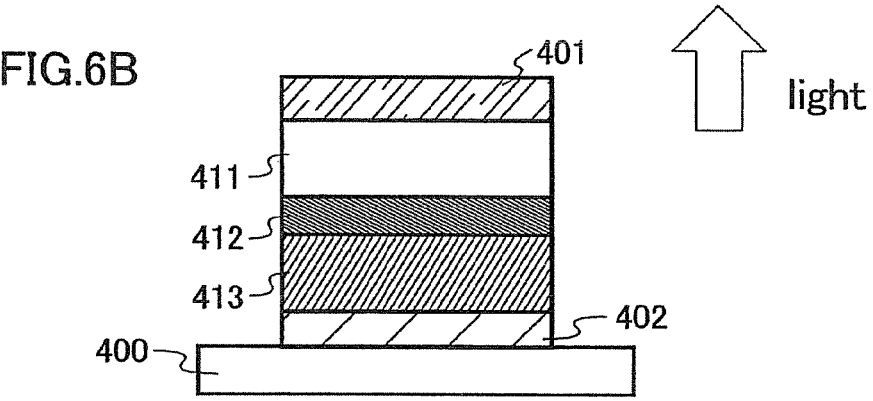
Figure 6C:
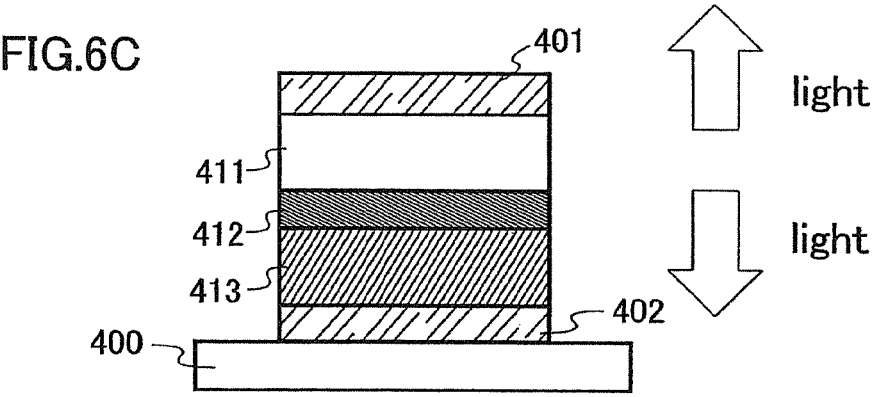

FIGS. 6A to 6C show examples of the case where the third layer 413, the second layer 412, and the first layer 411 are sequentially laminated over the substrate 400. In these examples, when the first electrode 401 has a light-blocking property (in particular, reflectivity) and the second electrode 402 has a light-transmitting property, light is extracted from the substrate 400 side as shown in FIG. 6A. When the first electrode 401 has a light-transmitting property and the second electrode 402 has a light-blocking property (in particular, reflectivity), light is extracted from the side opposite to the substrate 400 as shown in FIG. 6B. Further, when both the first electrode 401 and the second electrode 402 have light-transmitting properties, light can be emitted from both the substrate 400 side and the side opposite to the substrate 400 as shown in FIG. 6C.

Note that various methods of both a wet method and a dry method can be employed in the case of manufacturing the light emitting element of this embodiment.

As shown in FIGS. 5A to 5C, the first layer 411, the second layer 412, and the third layer 413 may be sequentially laminated after forming the first electrode 401, and then, the second electrode 402 may be formed. Alternatively, as shown in FIGS. 6A to 6C, the third layer 413, the second layer 412, and the first layer 411 may be sequentially laminated after forming the second electrode 402, and then, the first electrode 401 may be formed.

Note that this embodiment can be appropriately combined with another embodiment.

Embodiment 4

In this embodiment, a light emitting element having a structure different from those described in Embodiments 2 and 3 is explained with reference to FIGS. 3A to 3C and 4A to 4C. In a structure to be described in this embodiment, layers containing the composite material of the invention can be provided to be separately in contact with two electrodes of the light emitting element.

Figure 3A:
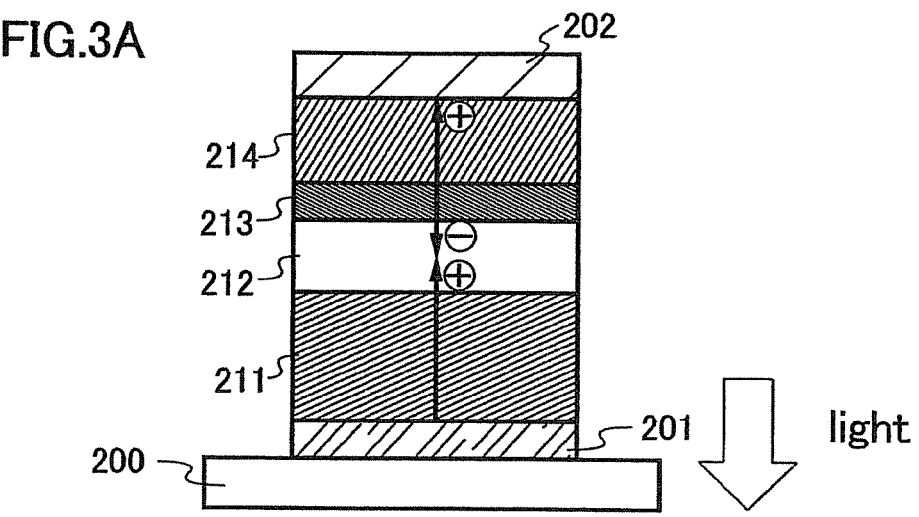
FIGS. 3A to 3C are diagrams for explaining a light emitting element of the present invention.

An example of a structure of the light emitting element of the invention is shown in FIG. 3A. In the structure, a first layer 211, a second layer 212, a third layer 213, and a fourth layer 214 are laminated between a first electrode 201 and a second electrode 202. In this embodiment, the case where the first electrode 201 functions as an anode and the second electrode 202 functions as a cathode, is explained.

The first electrode 201 and the second electrode 202 can employ the same structure as that in Embodiment 2. The first layer 211 is a layer containing the composite material described in Embodiment 1, and the second layer 212 is a layer containing a material having a high light emitting property. The third layer 213 is a layer containing an electron donating material and a compound having a high electron transport property, and the fourth layer 214 is a layer containing the composite material described in Embodiment 1. The electron donating material contained in the third layer 213 is preferably alkali metal, alkaline earth metal, or oxide or salt thereof. Specifically, lithium, cesium, calcium, lithium oxide, calcium oxide, barium oxide, cesium carbonate, or the like can be given.

With such a structure described above, as shown in FIG. 3A, electrons are donated and accepted in the vicinity of the interface between the third layer 213 and the fourth layer 214 by applying a voltage; electrons and holes are generated; and the fourth layer 214 transports the holes to the second electrode 202 while the third layer 213 transports the electrons to the second layer 212. In other words, the third layer 213 and the fourth layer 214 collectively serve as a carrier generation layer. Further, it can be said that the fourth layer 214 has a function of transporting holes to the second electrode 202. Note that a tandem light emitting element can also be formed by again laminating the second layer and the third layer between the fourth layer 214 and the second electrode 202.

In addition, the first layer 211 and the fourth layer 214 exhibit an extremely high hole injection property and hole transport property. Therefore, a drive voltage of the light emitting element can be reduced. In addition, when the first layer 211 and the fourth layer 214 are thickened, an increase of a drive voltage can be suppressed.

In addition, even when the first layer 211 and the fourth layer 214 are thickened, an increase of a drive voltage can be suppressed. Thus, thicknesses of the first layer 211 and the fourth layer 214 can be freely set, and extraction efficiency of light emission from the second layer 212 can be improved. In addition, thicknesses of the first layer 211 and the fourth layer 214 can be set so that color purity of light emission from the second layer 212 is improved. Further, the first layer 211 and the fourth layer 214 have high visible light transmittance, and reduction of external extraction efficiency of light emission due to thickening can be suppressed.

Further, in the light emitting element of this embodiment, the layer between the second layer having a light emitting function and the anode and the layers between the second layer and the cathode can be made extremely thick, and a short circuit of the light emitting element can be prevented effectively. Taking FIG. 3A as an example, damage to the second layer 212 in which a light emitting material exists can also be reduced, for example, when the second electrode 202 is formed by sputtering. Further, since layers formed of the same material can be provided on both sides to sandwich the layer having a function of light emission by forming the first layer 211 and the fourth layer 214 of the same material, an effect of suppressing stress distortion can also be expected.

Note that the light emitting element of this embodiment also has different variations by changing materials of the first electrode 201 and the second electrode 202. Schematic diagrams thereof are shown in FIGS. 3B and 3C and FIGS. 4A to 4C. Note that reference numerals in FIG. 3A are also used in FIGS. 3B and 3C and FIGS. 4A to 4C, and reference numeral 200 denotes a substrate for supporting the light emitting element of the invention.

Figure 3B:
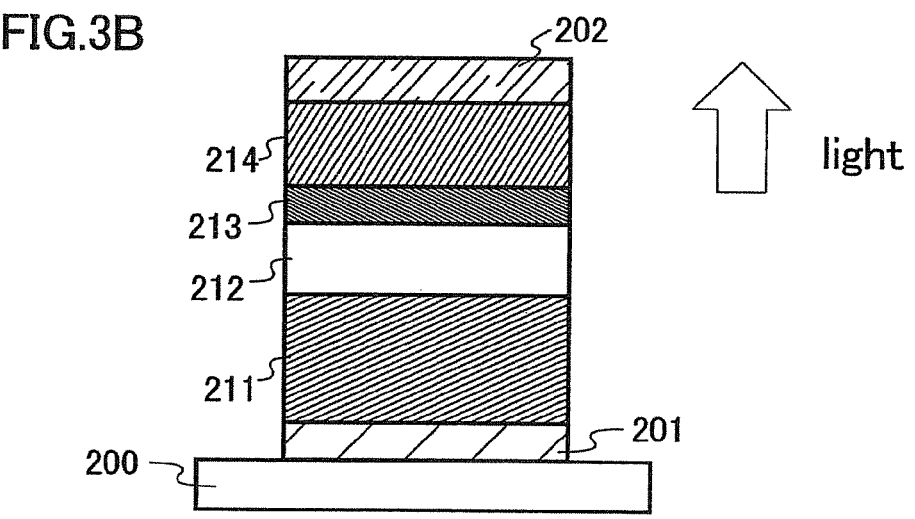
Figure 3C:
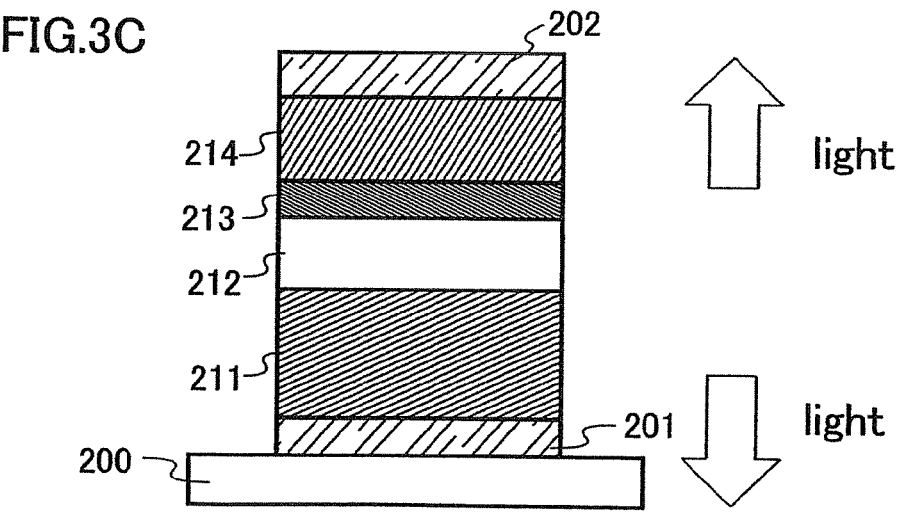

FIGS. 3A to 3C show examples of the case where the first layer 211, the second layer 212, the third layer 213, and the fourth layer 214 are sequentially laminated over the substrate 200. In these examples, when the first electrode 201 has a light-transmitting property and the second electrode 202 has a light-blocking property (in particular, reflectivity), light is emitted from the substrate 200 side as shown in FIG. 3A. When the first electrode 201 has a light-blocking property (in particular, reflectivity) and the second electrode 202 has a light-transmitting property, light is emitted from the side opposite to the substrate 200 as shown in FIG. 3B. Further, when both the first electrode 201 and the second electrode 202 have light-transmitting properties, light can be emitted from both the substrate 200 side and the side opposite to the substrate 200 as shown in FIG. 3C.

FIGS. 4A to 4C show examples of the case where the fourth layer 214, the third layer 213, the second layer 212, and the first layer 211 are sequentially laminated over the substrate 200. In these examples, when the first electrode 201 has a light-blocking property (in particular, reflectivity) and the second electrode 202 has a light-transmitting property, light is extracted from the substrate 200 side as shown in FIG. 4A. In addition, when the first electrode 201 has a light-transmitting property and the second electrode 202 has a light-blocking property (in particular, reflectivity), light is extracted from the side opposite to the substrate 200 as shown in FIG. 4B. Further, when both the first electrode 201 and the second electrode 202 have light-transmitting properties, light can be emitted from both the substrate 200 side and the side opposite to the substrate 200 as shown in FIG. 4C.

Note that another structure can also be employed in which the first layer 211 contains one compound selected from electron donating materials and a compound having a high electron transport property; the second layer 212 contains a light emitting material; the third layer 213 is a layer containing the composite material described in Embodiment 1; and the fourth layer 214 contains one compound selected from electron donating materials and a compound having a high electron transport property.

Note that various methods of both a wet method and a dry method can be employed in the case of manufacturing the light emitting element of this embodiment.

As shown in FIGS. 3A to 3C, the first layer 211, the second layer 212, the third layer 213, and the fourth layer 214 may be sequentially laminated after forming the first electrode 201, and then, the second electrode 202 may be formed. Alternatively, as shown in FIGS. 4A to 4C, the fourth layer 214, the third layer 213, the second layer 212, and the first layer 211 may be sequentially laminated after forming the second electrode 202, and then, the first electrode 201 may be formed.

Note that this embodiment can be appropriately combined with another embodiment.

Embodiment 5

In this embodiment, a light emitting element having a structure different from those described in Embodiments 2 to 4 is explained. A structure described in this embodiment is a structure in which the composite material of the invention is applied to a charge generation layer of a light emitting element having a structure in which a plurality of light emitting units is laminated.

Figure 31:
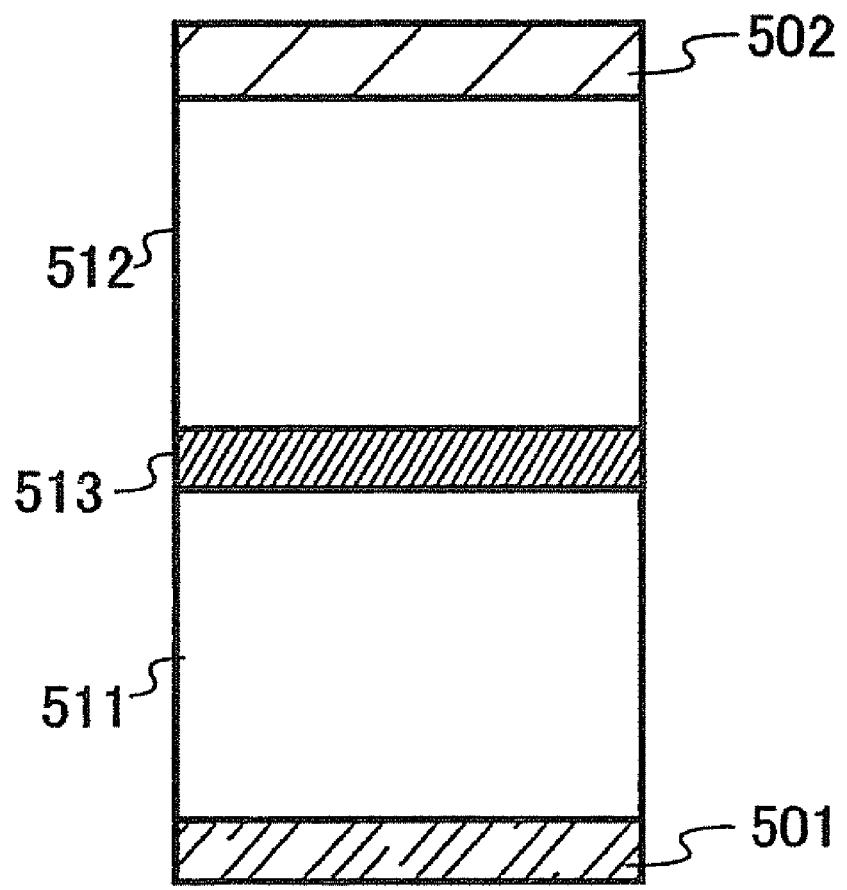
FIG. 31 is a diagram for explaining a light emitting element of the present invention.

In this embodiment, a light emitting element having a structure in which a plurality of light emitting units is laminated (hereinafter referred to as a tandem element) is explained. In other words, it is a light emitting element having a plurality of light emitting units between a first electrode and a second electrode. FIG. 31 shows a tandem element in which two light emitting units are laminated.

In FIG. 31, a first light emitting unit 511 and a second light emitting unit 512 are laminated between a first electrode 501 and a second electrode 502. A charge generation layer 513 is formed between the first light emitting unit 511 and the second light emitting unit 512.

Various materials can be used for the first electrode 501 and the second electrode 502.

The first light emitting unit 511 and the second light emitting unit 512 can each have various structures.

The charge generation layer 513 contains the composite material of the invention described in Embodiment 1. Since the composite material of the invention has high visible light transmittance, it has high transmittance of light generated in the first light emitting unit and the second light emitting unit; thus, external extraction efficiency can be improved.

Note that the charge generation layer 513 may be formed with a combination of the composite material of the invention and various materials. For example, as described in Embodiment 3, the charge generation layer 513 may be formed with a combination of a layer formed of the composite material of the invention and a layer containing one compound selected from electron donating materials and a compound having a high electron transport property. Further, it may be formed with a combination of a layer formed of the material of the invention and a transparent conductive film.

The light emitting element having two light emitting units is explained in this embodiment, but the material of the invention can be similarly applied to a light emitting element in which three or more light emitting units are laminated. For example, in a light emitting element in which three light emitting units are laminated, a first light emitting unit, a first charge generation layer, a second light emitting unit, a second charge generation layer, and a third light emitting unit are sequentially laminated. The composite material of the invention may be contained only in either of the charge generation layers or in both of the charge generation layers.

Note that this embodiment can be appropriately combined with another embodiment.

Embodiment 6

In this embodiment, an optical design of a light emitting element is explained.

In each of the light emitting elements described in Embodiments 2 to 5, light extraction efficiency of each emission color can be improved by differentiating a thickness of at least one of the layers except the first electrode and the second electrode among light emitting elements which emit each emission color.

Figure 10:
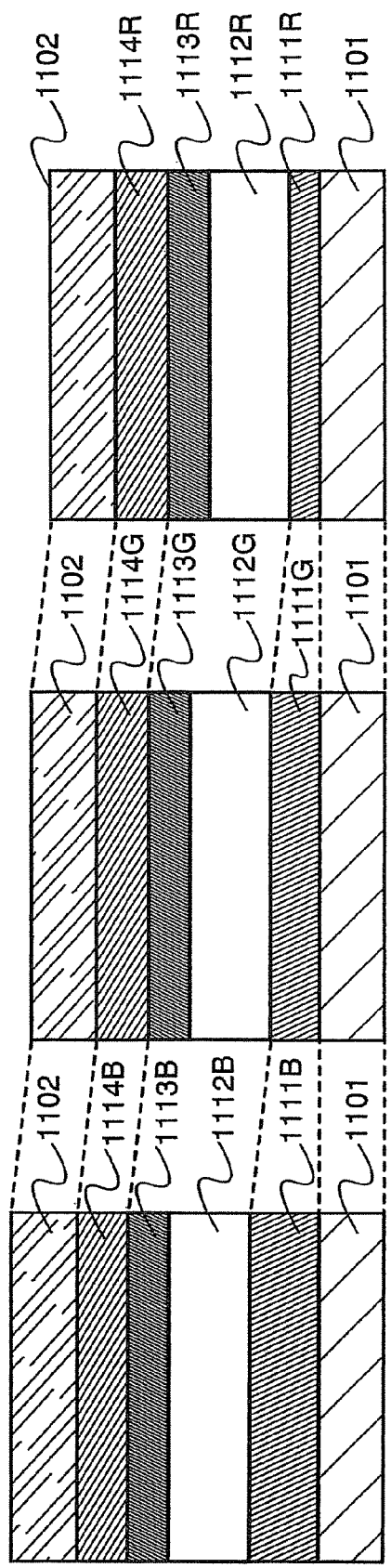
FIG. 10 is a diagram for explaining a light emitting element of the present invention.

For example, as shown in FIG. 10, light emitting elements which individually emit light of red (R), green (G), and blue (B) share a first electrode 1101 that is a reflective electrode and a second electrode 1102 having a light-transmitting property, and have first layers 1111R, 1111G, and 1111B, second layers 1112R, 1112G, and 1112B, third layers 1113R, 1113G, and 1113B, and fourth layers 1114R, 1114G, and 1114B, respectively. Then, thicknesses of the first layers 1111R, 1111G, and 1111B can be differentiated for each emission color.

Note that in each of the light emitting elements shown in FIG. 10, when a voltage is applied so that a potential of the first electrode 1101 becomes higher than that of the second electrode 1102, holes are injected from the first layer 1111(R, G, B) to the second layer 1112(R, G, B). Electrons are donated and accepted in the vicinity of the interface between the third layer 1113(R, G; B) and the fourth layer 1114(R, G, B); electrons and holes are generated; and the fourth layer 1114(R, G, B) transports the holes to the second electrode 1102 while the third layer 1113(R, G, B) transports the electrons to the second layer 1112(R, G, B). The holes and the electrons are recombined in the second layer 1112(R, G, B) to excite a light emitting material. Then, the excited light emitting material emits light when returning to a ground state.

As shown in FIG. 10, by differentiating thicknesses of the first layers 1111R, 1111G, and 1111B for each emission color, a decrease in light extraction efficiency can be prevented which is caused by a difference in light path between the case of recognizing light directly through the second electrode and the case of recognizing light reflected by the first electrode through the second electrode.

Specifically, when light enters the first electrode, phase reversal occurs in the reflected light, thereby producing a light interference effect. Consequently, in the case where an optical distance between a light emitting region and a reflecting electrode (i.e., refractive index×distance) is the emission wavelength multiplied by $(2m-1)/4$ (m is a given positive integer) or $¼, ¾, ⁵⁄₄ \ldots$ of the emission wavelength, the light external extraction efficiency is increased. In the meanwhile, in the case where the optical distance is the emission wavelength multiplied by $m/2$ (m is a given positive integer) or $½, 1, ³⁄₂ \ldots$ of the emission wavelength, the light external extraction efficiency is decreased.

Therefore, among light emitting elements of the invention, thicknesses of any of the first to fourth layers are differentiated so that the optical distance between the light emitting region and the reflecting electrode (i.e., refractive index× distance) is the emission wavelength multiplied by $(2m-1)/4$ (m is a given positive integer).

In particular, in the first to fourth layers, thicknesses of the layer between the layer in which electrons and holes are recombined and the reflecting electrode are preferably differentiated. Alternatively, thicknesses of the layer between the layer in which electrons and holes are recombined and the light-transmitting electrode may be differentiated. Further alternatively, thicknesses of both layers may be differentiated. Consequently, light can be extracted outside efficiently.

In order to differentiate thicknesses of any of the first to fourth layers, the layer needs to be thickened. One feature of the light emitting element of the invention is that a layer containing the composite material described in Embodiment 1 is used for a layer to be thickened.

Generally, it is not preferable to thicken a layer of the light emitting element, since a drive voltage is increased. However, by using the composite material described in Embodiment 1 for the layer to be thickened, the drive voltage itself can be decreased, which can suppress an increase of the drive voltage due to thickening.

Note that FIG. 10 shows the case where an optical distance between the light emitting region and the reflecting electrode of the light emitting element of red (R) is ¼ of an emission wavelength; an optical distance between the light emitting region and the reflecting electrode of the light emitting element of green (G) is ¾ of the emission wavelength; an optical distance between the light emitting region and the reflecting electrode of the light emitting element of blue (B) is ⅝ of the emission wavelength. Note that the invention is not limited to these values, and the value of m can be appropriately set. As shown in FIG. 10, values of m in $(2m-1)/4$ of the emission wavelength may be different among the light emitting elements.

By thickening any of the first to fourth layers, a short circuit between the first and second electrodes can be prevented and productivity can be improved, which is extremely preferable.

As described above, thicknesses of at least the first to fourth layers in the light emitting element of the invention can be differentiated for each mission color. At this time, thicknesses of the layers between the layer in which electrons and holes are recombined and the reflecting electrode are preferably differentiated for each emission color. If a layer containing the composite material described in Embodiment 1 is used for the layer which needs to be thickened, a drive voltage is not increased, which is preferable.

Note that this embodiment is explained using the light emitting element having the structure described in Embodiment 4, but it can be appropriately combined with another embodiment.

Embodiment 7

In this embodiment, a light emitting device having a light emitting element of the invention is explained.

A light emitting device having a light emitting element of the invention in a pixel portion is explained in this embodiment with reference to FIGS. 7A and 7B. Note that FIG. 7A is a top view showing the light emitting device and FIG. 7B is a cross-sectional view of FIG. 7A taken along line A-A' and B-B'. Reference numeral 601 indicated by dashed line denotes a driver circuit portion (a source side driver circuit); 602, a pixel portion; and 603, a driver circuit portion (a gate side driver circuit). Reference numeral 604 denotes a sealing substrate; 605, a sealant; and a portion surrounded by the sealant 605 is a space 607.

Note that a lead wiring 608 is a wiring for transmitting a signal to be inputted to the source side driver circuit 601 and the gate side driver circuit 603 and receives a video signal, a clock signal, a start signal, a reset signal, or the like from an FPC (flexible printed circuit) 609 that is an external input terminal. Note that only the FPC is shown here; however, the FPC may be provided with a printed wiring board (PWB). The light emitting device in this specification includes not only a light emitting device itself but also a light emitting device with an FPC or a PWB attached.

Subsequently, a cross-sectional structure is explained with reference to FIG. 7B. The driver circuit portion and the pixel portion are formed over an element substrate 610. Here, the source side driver circuit 601 which is the driver circuit portion and one pixel in the pixel portion 602 are shown.

Note that a CMOS circuit which is a combination of an n-channel TFT 623 and a p-channel TFT 624 is formed as the source side driver circuit 601. A TFT for forming the driver circuit may be formed using a CMOS circuit, a PMOS circuit, or an NMOS circuit. A driver integration type in which a driver circuit is formed over a substrate is described in this embodiment, but it is not necessarily required and a driver circuit can be formed outside a substrate.

The pixel portion 602 has a plurality of pixels, each of which includes a switching TFT 611, a current control TFT 612, and a first electrode 613 which is electrically connected to a drain of the current control TFT 612. Note that an insulator 614 is formed to cover an end of the first electrode 613. Here, a positive type photosensitive acrylic resin film is used.

The insulator 614 is formed to have a curved surface at an upper end or a lower end thereof in order to make the coverage favorable. For example, in the case of using positive type photosensitive acrylic as a material of the insulator 614, the insulator 614 is preferably formed to have a curved surface with a curvature radius (0.2 µm to 3 µm) only at an upper end. Either a negative type which becomes insoluble in an etchant by light irradiation or a positive type which becomes soluble in an etchant by light irradiation can be used as the insulator 614.

A layer 616 containing a light emitting material and a second electrode 617 are formed over the first electrode 613. Here, a material having a high work function is preferably used as a material used for the first electrode 613 which functions as an anode. For example, the first electrode 613 can be formed by using a single-layer film such as an ITO film, an indium tin oxide film containing silicon, an indium oxide film containing zinc oxide of 2 wt % to 20 wt %, a titanium nitride film, a chromium film, a tungsten film, a Zn film, or a Pt film; a laminated layer of a titanium nitride film and a film containing aluminum as its main component; a three-layer structure of a titanium nitride film, a film containing aluminum as its main component, and another titanium nitride film; or the like. When the first electrode 613 has a laminated structure, it can have low resistance as a wiring and form a favorable ohmic contact. Further, the first electrode can function as an anode.

In addition, the layer 616 containing a light emitting material is formed by various methods such as an evaporation method using an evaporation mask, an ink-jet method, and a spin coating method. The layer 616 containing a light emitting material has a layer containing the composite material described in Embodiment 1. Further, another material included in the layer 616 containing a light emitting material may be a low molecular material, an intermediate molecular material (including an oligomer and a dendrimer), or a high molecular material. In addition, as a material used for the layer containing a light emitting material, a single layer or a laminated layer of an organic compound is generally used. However, the invention also includes a structure in which an inorganic compound is used for part of a film formed of the organic compound.

As a material used for the second electrode 617 which is formed over the layer 616 containing a light emitting material and functions as a cathode, a material having a low work function (Al, Ag, Li, Ca, or an alloy thereof such as MgAg, MgIn, AlLi, $CaF_2$, or calcium nitride) is preferably used. In the case where light generated in the layer 616 containing a light emitting material is transmitted through the second electrode 617, a laminated layer of a metal thin film with a thin thickness and a transparent conductive film (of ITO, indium oxide containing zinc oxide of 2 wt % to 20 wt %, indium tin oxide containing silicon, zinc oxide (ZnO), or the like) is preferably used as the second electrode 617.

By attaching the sealing substrate 604 to the element substrate 610 with the sealant 605, a light emitting element 618 is provided in the space 607 surrounded by the element substrate 610, the sealing substrate 604, and the sealant 605. Note that the space 607 is filled with a filler, but there are also cases where the space 607 is filled with the sealant 605 as well as an inert gas (nitrogen, argon, or the like).

Note that an epoxy-based resin is preferably used as the sealant 605. The material preferably allows as little moisture and oxygen as possible to penetrate. As the sealing substrate 604, a plastic substrate formed of FRP (Fiberglass-Reinforced Plastics), PVF (polyvinyl fluoride), Myler, polyester, acrylic, or the like can be used besides a glass substrate or a quartz substrate.

As described above, a light emitting device having a light emitting element of the invention can be obtained.

Since the light emitting device of the invention has a layer containing the composite material described in Embodiment 1, in other words, the carbazole derivative represented by General Formula (1) and an inorganic compound, a drive voltage can be reduced and power consumption can be reduced.

Since the composite material used in the invention has high visible light transmittance, light generated in the light emitting layer can be efficiently extracted outside.

In addition, the light emitting device of the invention can suppress an increase of a drive voltage even when the layer containing the composite material is thickened. In addition, the composite material used in the invention has high visible light transmittance. Therefore, a short circuit of the light emitting element can be prevented by thickening the layer containing the composite material. In addition, improvement in external extraction efficiency of light can be achieved by optical design. Therefore, a reliable light emitting device with low power consumption can be obtained.

Figure 8:
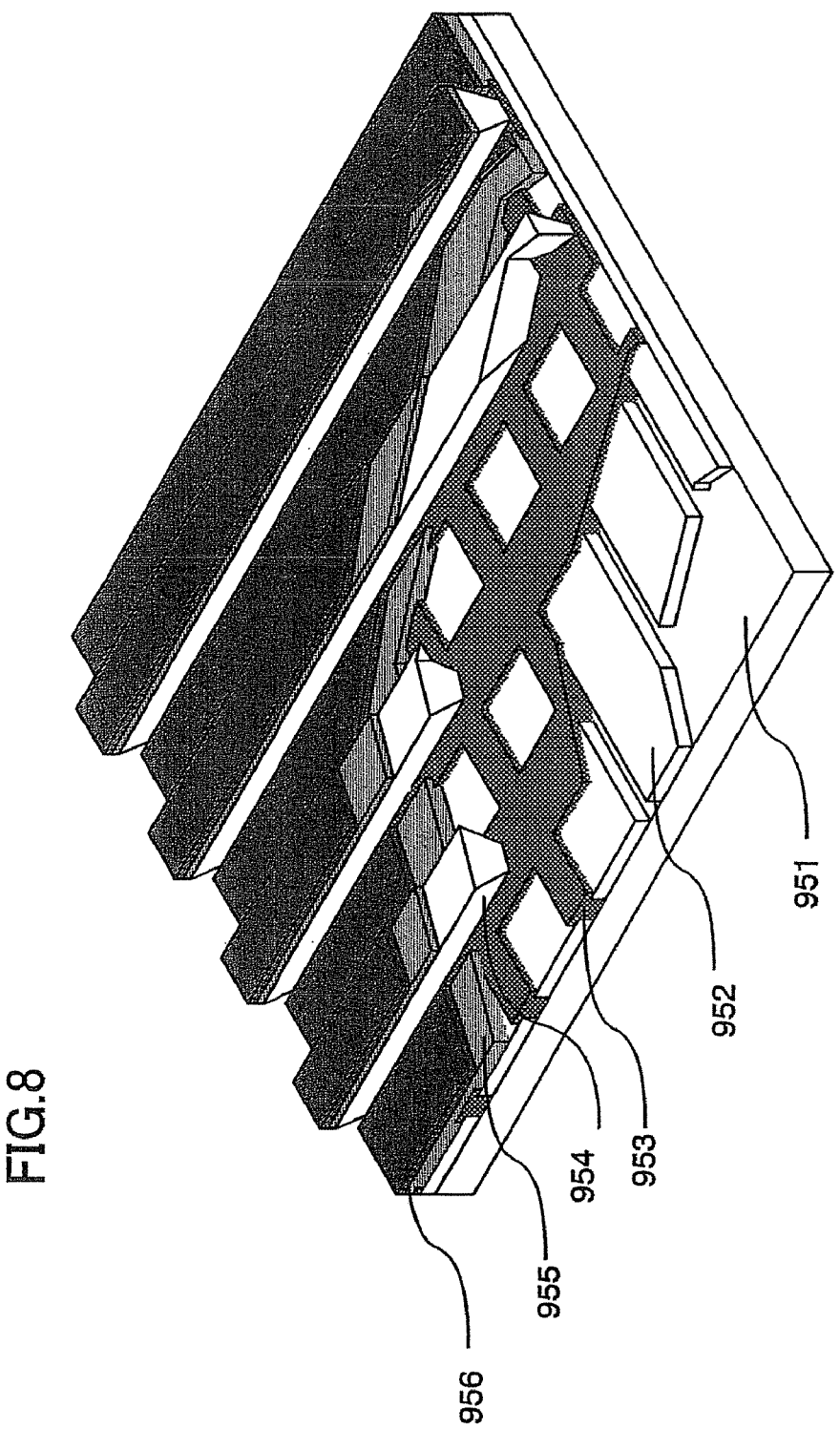
FIG. 8 is a diagram for explaining a light emitting device of the present invention.

As described above, an active light emitting device in which drive of a light emitting element is controlled by a transistor is explained in this embodiment. However, a passive light emitting device in which the light emitting element is driven without particularly providing a driving element such as a transistor may also be employed. FIG. 8 shows a perspective view of a passive light emitting device which is manufactured by applying the present invention. In FIG. 8, a layer 955 containing a light emitting material is provided between an electrode 952 and an electrode 956 over a substrate 951. An end portion of the electrode 952 is covered with an insulating layer 953. Then, a partition layer 954 is provided over the insulating layer 953. A side wall of the partition layer 954 slopes so that a distance between one side wall and the other side wall becomes narrow toward a substrate surface. In other words, a cross section of the partition layer 954 in the direction of a narrow side is trapezoidal, and a base (a side facing in the same direction as a plane direction of the insulating layer 953 and in contact with the insulating layer 953) is shorter than an upper side (a side facing in the same direction as the plane direction of the insulating layer 953 and not in contact with the insulating layer 953). A defect of the light emitting element due to static electricity or the like can be prevented by providing the partition layer 954 in this manner. In addition, the passive light emitting device can also be driven with low power consumption when it contains the light emitting element of the invention which operates at low drive voltage.

Embodiment 8

In this embodiment, an electric appliance of the present invention which includes the light emitting device described in Embodiment 7 as its part is explained. The electric appliance of the invention contains the composite material described in Embodiment 1 and has a display portion with low power consumption. In addition, it has a reliable display portion in which a short circuit due to dust, impact, or the like is suppressed.

Examples of electric appliances manufactured by using the light emitting device of the invention can be given as follows: a camera such as a video camera or a digital camera, a goggle type display, a navigation system, a sound reproducing device (car audio, an audio component, or the like), a computer, a game machine, a portable information terminal (a mobile computer, a cellular phone, a portable game machine, an electronic book, or the like), an image reproducing device provided with a recording medium (specifically, a device which can reproduce the recording medium such as a digital versatile disc (DVD) and includes a display device capable of displaying images thereof), and the like. Specific examples thereof are shown in FIGS. 9A to 9E.

Figure 9A:
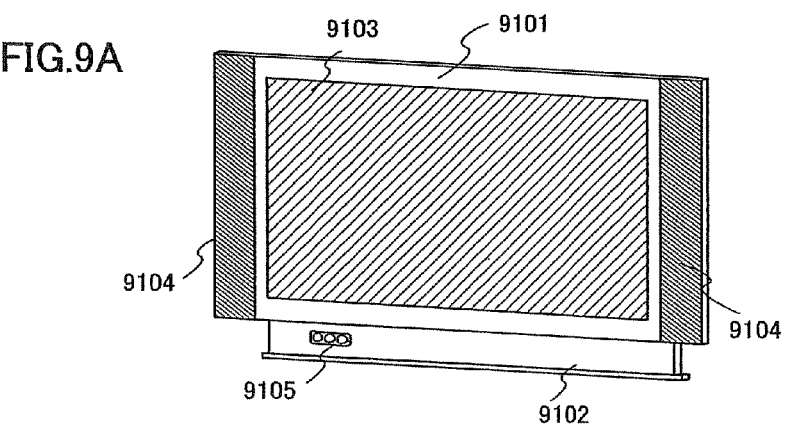
FIGS. 9A to 9E are diagrams for explaining an electric appliance using a light emitting device of the present invention.

FIG. 9A shows a television receiver, which includes a chassis 9101, a support 9102, a display portion 9103, a speaker portion 9104, a video input terminal 9105, and the like. The television receiver is manufactured by using the light emitting device of the invention for the display portion 9103. By using the light emitting device of the invention for a display portion, a television receiver having a reliable display portion with low power consumption can be provided. Note that the television receiver includes all devices used for displaying information, for example, for a personal computer, for TV broadcast reception, for advertisement display, and the like.

Figure 9B:
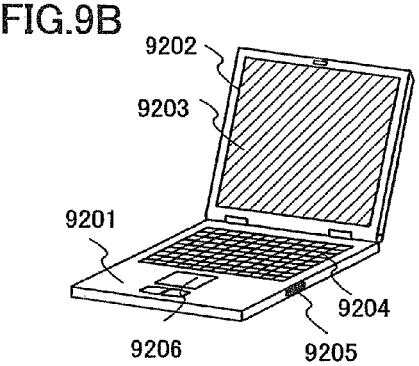

FIG. 9B shows a computer, which includes a main body 9201, a chassis 9202, a display portion 9203, a keyboard 9204, an external connection port 9205, a pointing mouse 9206, and the like. The computer is manufactured by using the light emitting device of the invention for the display portion 9203. By using the light emitting device of the invention for a display portion, a computer having a reliable display portion with low power consumption can be provided.

Figure 9C:
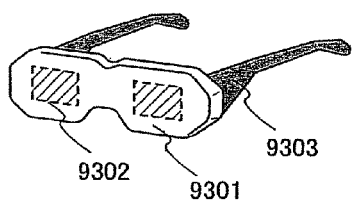

FIG. 9C shows a goggle type display, which includes a main body 9301, a display portion 9302, and an arm portion 9303. The goggle type display is manufactured by using the light emitting device of the invention for the display portion 9302. By using the light emitting device of the invention for a display portion, a goggle type display having a reliable display portion with low power consumption can be provided.

Figure 9D:
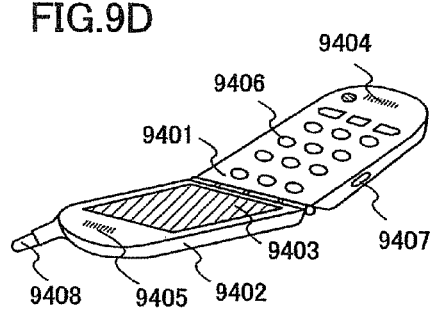

FIG. 9D shows a cellular phone, which includes a main body 9401, a chassis 9402, a display portion 9403, an audio input portion 9404, an audio output portion 9405, an operation key 9406, an external connection port 9407, an antenna 9408, and the like. The cellular phone is manufactured by using the light emitting device of the invention for the display portion 9403. Note that power consumption of the cellular phone can be reduced when the display portion 9403 displays white characters on a black background. By using the light emitting device of the invention for a display portion, a cellular phone having a reliable display portion with low power consumption can be provided.

Figure 9E:
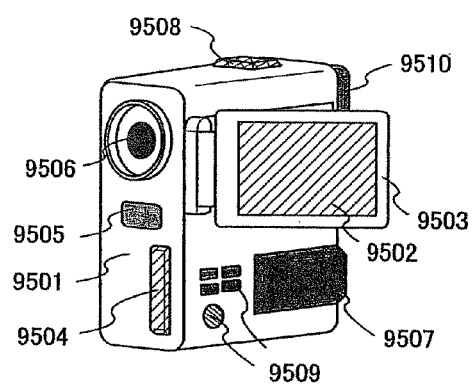

FIG. 9E shows a camera, which includes a main body 9501, a display portion 9502, a chassis 9503, an external connection port 9504, a remote control receiving portion 9505, an image receiving portion 9506, a battery 9507, an audio input portion 9508, an operation key 9509, an eye piece portion 9510, and the like. The camera is manufactured by using the light emitting device of the invention for the display portion 9502. By using the light emitting device of the invention for a display portion, a camera having a reliable display portion with low power consumption can be provided.

As described above, an application range of the light emitting device of the invention is so wide that this light emitting device can be applied to electric appliances in various fields. By using the light emitting device of the invention, an electric appliance having a reliable display portion with low power consumption can be provided.

Example 1

A synthesis method of 3-[N-(9-phenylcarbazol-3-yl)-N-phenylamino]-9-phenylcarbazole (abbr.: PCzPCA1) which is represented by Structural Formula (12) is explained as one example of a carbazole derivative of the present invention.

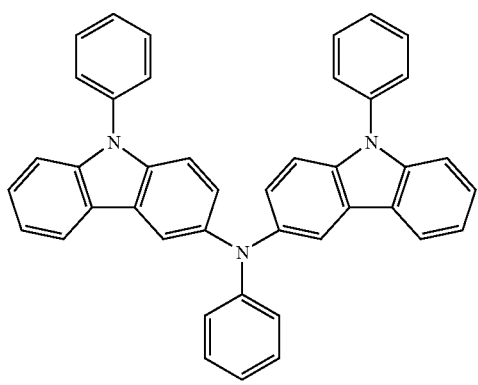

(12)

[Step 1]

A synthesis method of 3-bromo-9-phenylcarbazole is explained first. A synthesis scheme of 3-bromo-9-phenylcarbazole is shown in (A-3).

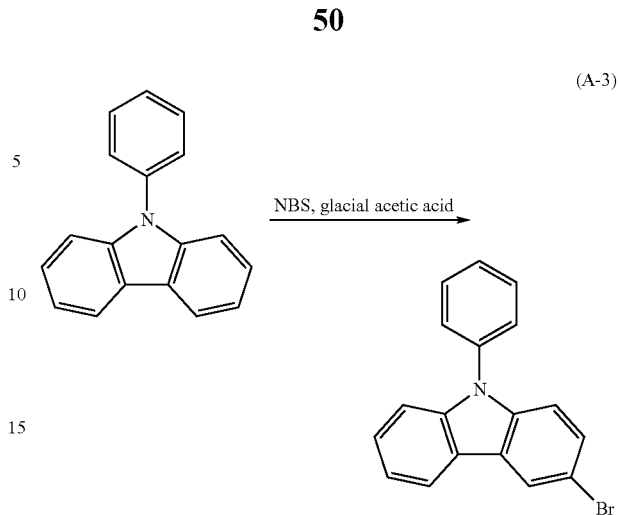

(A-3)

Firstly, 24.3 g (100 mmol) of 9-phenylcarbazole was dissolved in 600 mL of glacial acetic acid, and 17.8 g (100 mmol) of N-bromosuccinimide was slowly added thereto. The mixture was stirred overnight at a room temperature. This glacial acetic acid solution was dropped into 1 L of ice water while stirring it. A precipitated white solid was washed with water three times. This solid was dissolved in 150 mL of diethyl ether, and washed with a saturated sodium hydrogen carbonate water solution and water. This organic phase was dried with magnesium sulfate, and filtered. The obtained filtrate was concentrated. About 50 mL of methanol was added to the obtained residue and uniformly dissolved therein. This solution was left still to precipitate a white solid. This solid was collected and dried to obtain 28.4 g (yield: 88%) of 3-bromo-9-phenylcarbazole, which was white powder.

[Step 2]

A synthesis method of 3-(N-phenylamino)-9-phenylcarbazole (abbr.: PCA) is explained next. A synthesis scheme of PCA is shown in (A-4).

(A-4)

Figure 25:
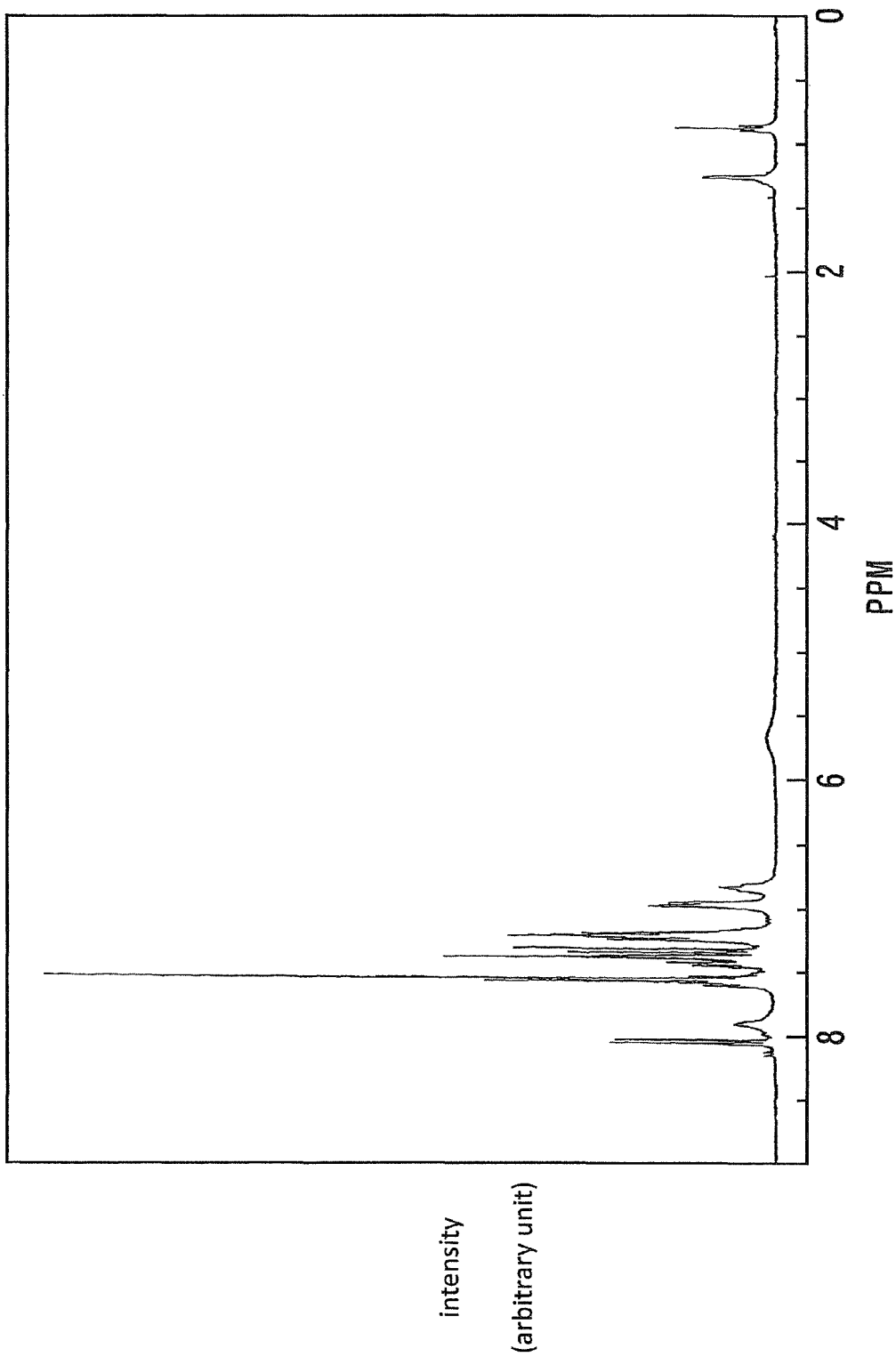
FIG. 25 shows a $^1$H-NMR chart of 3-(N-phenylamino)-9-phenylcarbazole.
Figure 26:
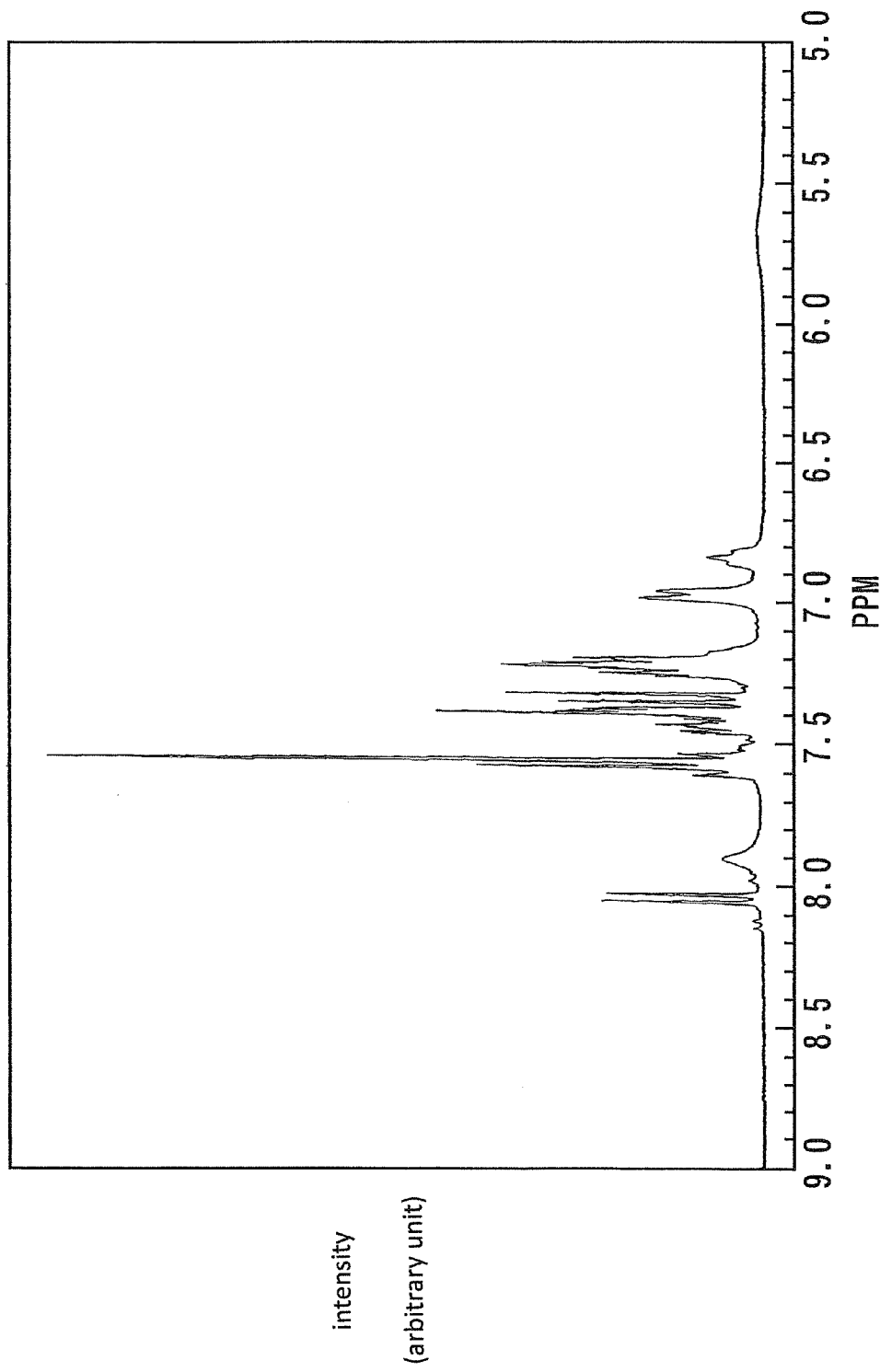
FIG. 26 shows a $^1$H-NMR chart of 3-(N-phenylamino)-9-phenylcarbazole.

Under a nitrogen atmosphere, 110 mL of dehydrated xylene and 7.0 g (75 mmol) of aniline were added to a mixture of 19 g (60 mmol) of 3-bromo-9-phenylcarbazole, 340 mg (0.6 mmol) of bis(dibenzylideneacetone)palladium (0), 1.6 g (3.0 mmol) of 1,1-bis(diphenylphosphino)ferrocene, and 13 g (180 mmol) of sodium-tert-butoxide. This mixture was stirred under a nitrogen atmosphere for 7.5 hours while heating at 90° C. After the termination of the reaction, about 500 mL of hot toluene was added to the suspension and this suspension was filtered through florisil, alumina, and Celite®. The obtained filtrate was concentrated, and its residue is mixed with hexane-ethyl acetate and irradiated with an ultrasonic wave. The obtained suspension was filtered and the residue was dried to obtain 15 g (yield: 75%) of 3-(N-phenylamino)-9-phenylcarbazole which was cream-colored powder. NMR data are shown below. $^1$H-NMR (300 MHz, CDCl$_3$): δ=6.84 (t, J=6.9, 1H), 6.97 (d, J=7.8, 2H), 7.20-7.61 (m, 13H), 7.90 (s, 1H), 8.04 (d, J=7.8, 1H). A $^1$H-NMR chart is shown in FIG. 25, and an enlarged view of a portion of 5.0 ppm to 9.0 ppm in FIG. 25 is shown in FIG. 26.

[Step 3]

A synthesis method of 3-iodo-9-phenylcarbazole is explained. A synthesis scheme of 3-iodo-9-phenylcarbazole is shown in (A-5).

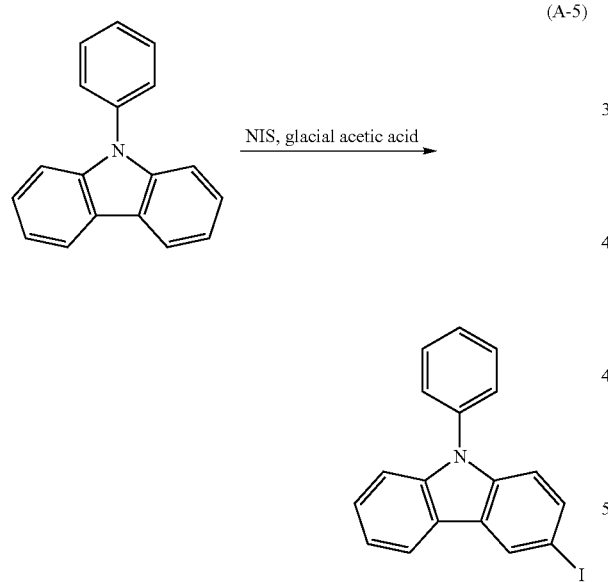

(A-5)

24.3 g (100 mmol) of 9-phenylcarbazole was dissolved in 600 mL of glacial acetic acid, 22.5 g (100 mmol) of N-iodosuccinimide was slowly added thereto, and the mixture was then stirred overnight at a room temperature. The obtained precipitate was filtered, and the residue was washed with a saturated sodium hydrogen carbonate water solution, water, and methanol and then dried. 24.7 g (yield: 67%) of 3-iodo-9-phenylcarbazole which was white powder, was obtained.

Note that 3-iodo-9-phenylcarbazole can also be synthesized by the following method. A synthesis scheme of 3-iodo-9-phenylcarbazole is shown in (A-5b).

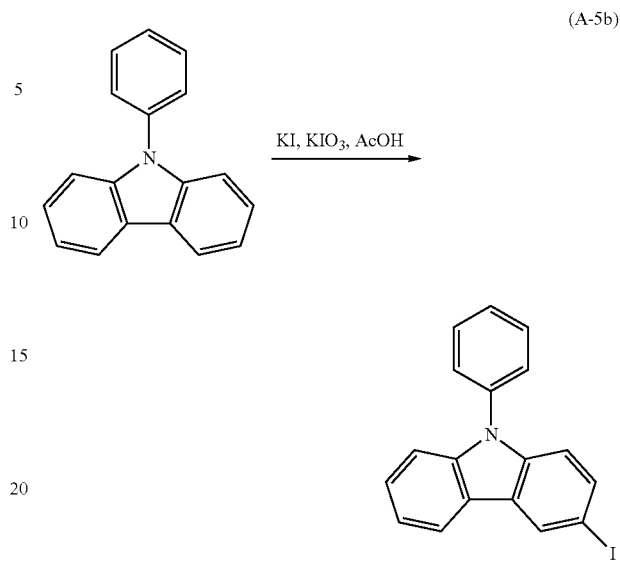

(A-5b)

10 g (10.0 mmol) of 9-phenylcarbazole, 838 mg (5.0 mmol) of potassium iodide, 1.1 g (5.0 mmol) of potassium iodate, and 30 mL of glacial acetic acid were put in a three-neck flask and refluxed for 1 hour at 120° C. After the reaction, the reaction solution was cooled sufficiently, added to water, and extracted with toluene. An organic phase was washed with a saturated sodium chloride solution once and dried with magnesium sulfate. This solution was filtered naturally, and the obtained filtrate was concentrated and recrystallized with acetone and methanol. Then, 8.0 g (yield: 50%) of a white solid, which was an objective substance, was obtained.

By employing a synthesis method shown in a synthesis scheme (A-5b), 3-iodo-9-phenylcarbazole can be synthesized using a more inexpensive material, thereby reducing costs.

[Step 4]

A synthesis method of 3-[N-(9-phenylcarbazol-3-yl)-N-phenylamino]-9-phenylcarbazole (abbr.: PCzPCA1) is explained. A synthesis scheme of PCzPCA1 is shown in (A-6).

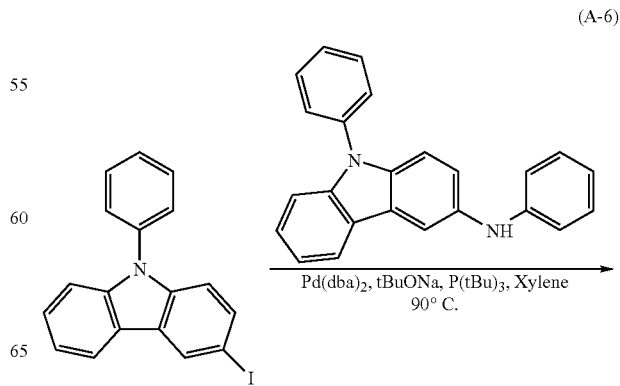

(A-6)

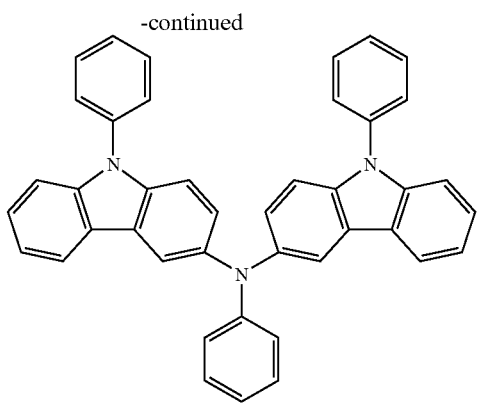

Figure 11:
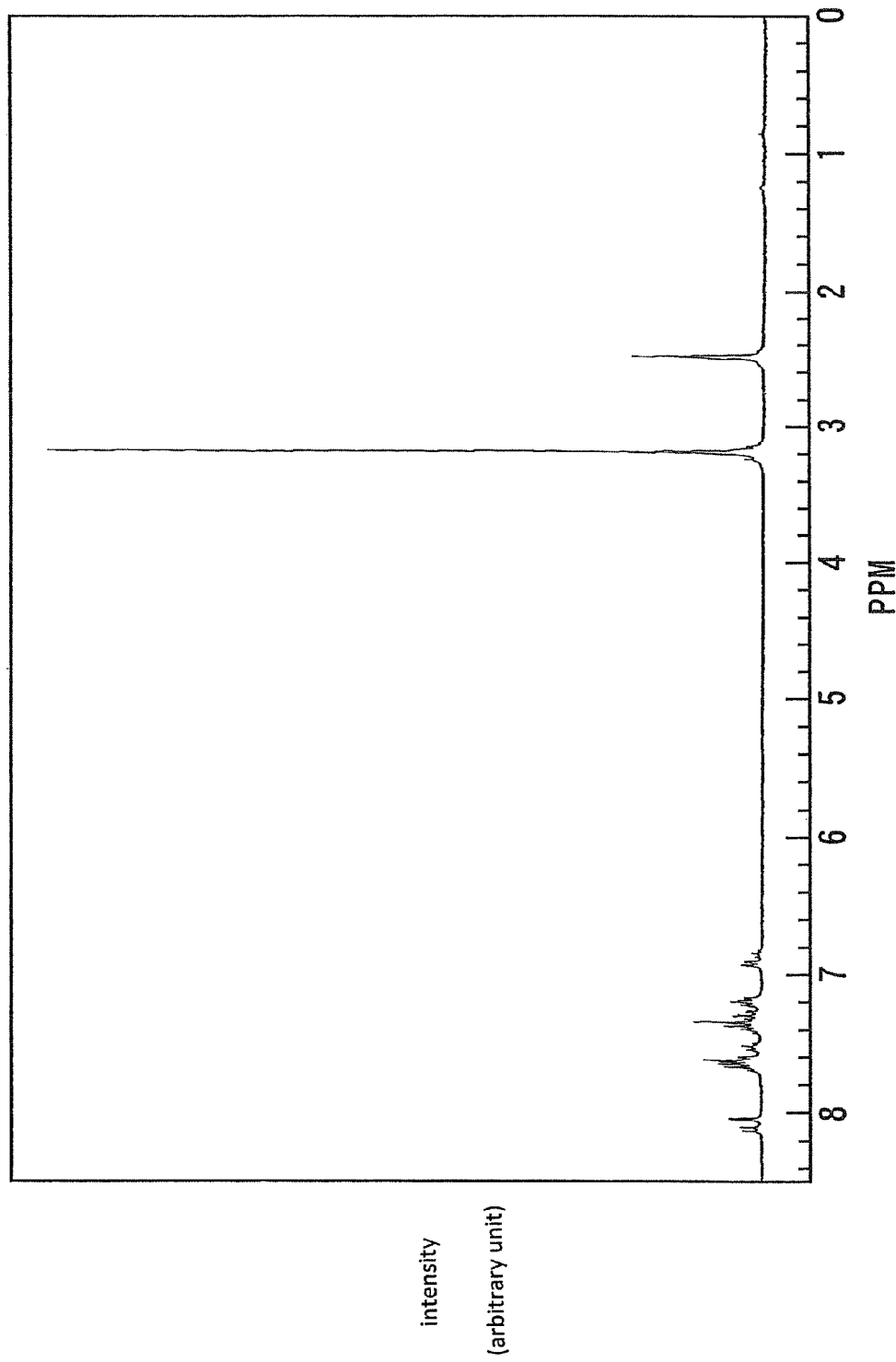
FIG. 11 shows a $^1$H-NMR chart of 3-[N-(9-phenylcarbazol-3-yl)-N-phenylamino]-9-phenylcarbazole.
Figure 12:
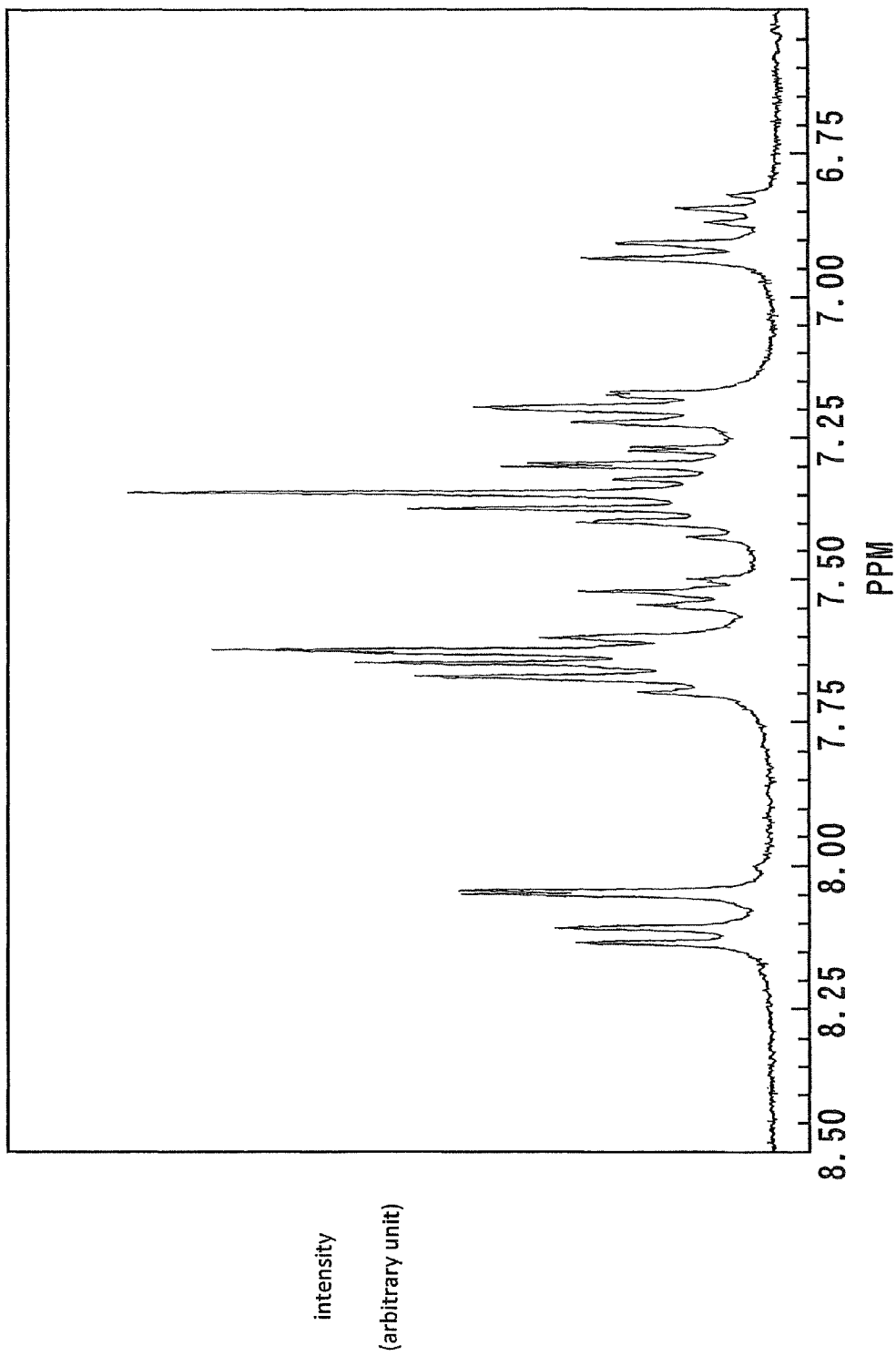
FIG. 12 shows a $^1$H-NMR chart of 3-[N-(9-phenylcarbazol-3-yl)-N-phenylamino]-9-phenylcarbazole.

Under a nitrogen atmosphere, 40 mL of dehydrated xylene was added to a mixture of 3.7 g (10 mmol) of 3-iodo-9-phenylcarbazole, 3.4 g (10 mmol) of PCA, 57 mg (0.1 mmol) of bis(dibenzylideneacetone)palladium (0), 200 mL (0.5 mmol) of a hexane solution with 49 wt % of tri-tert-butylphosphine, and 3.0 g (30 mmol) of sodium-tert-butoxide. This mixture was stirred under a nitrogen atmosphere for 6.5 hours while heating at 90° C. After the termination of the reaction, about 500 mL of hot toluene was added to the suspension and this suspension was filtered through florisil, alumina, and Celite®. The obtained filtrate was concentrated and its residue was separated by using silica gel column chromatography (toluene:hexane=1:1). This was concentrated and ethyl acetate-hexane was added to the obtained residue to conduct recrystallization. 3.2 g (yield: 56%) of 3-[N-(9-phenylcarbazol-3-yl)-N-phenylamino]-9-phenyl-carbazole which was cream-colored powder, was obtained. NMR data are shown below. $^1$H-NMR (300 MHz, DMSO-d): δ=6.85 (t, J=7.5, 1H), 6.92 (d, J=7.8, 2H), 7.17-7.70 (m, 22H), 8.05 (d, J=2.1, 2H), 8.12 (d, J=7.8, 2H). A $^1$H-NMR chart is shown in FIG. 11, and an enlarged view of a portion of 6.50 ppm to 8.50 ppm in FIG. 11 is shown in FIG. 12.

Figure 19:
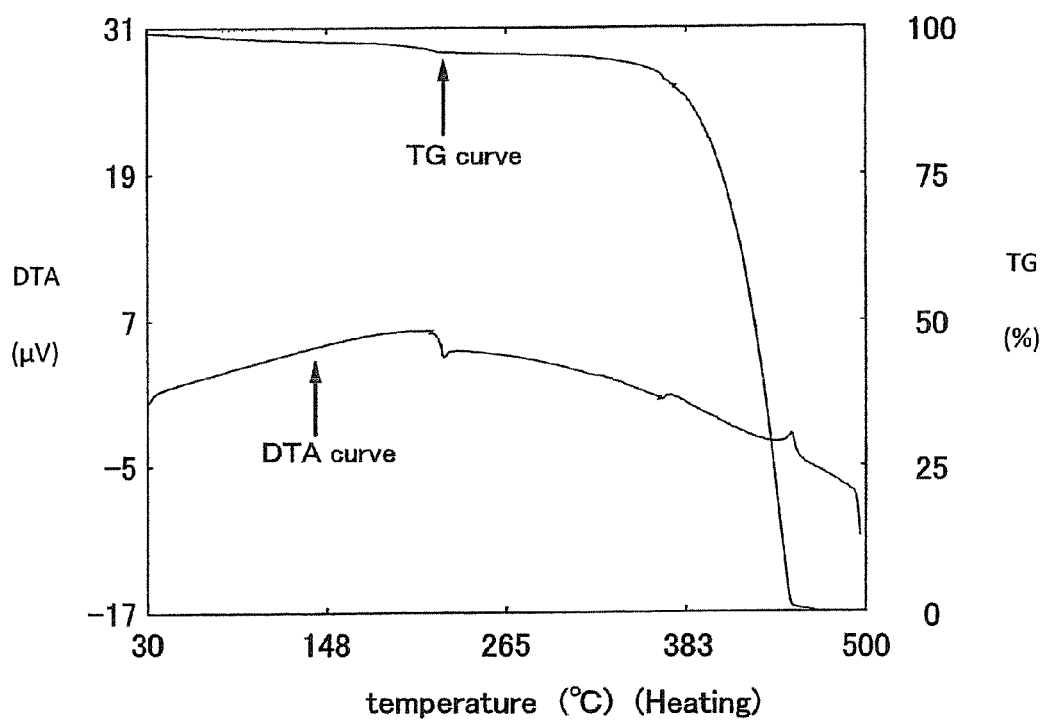
FIG. 19 shows a result of thermogravimetry of 3-[N-(9-phenylcarbazol-3-yl)-N-phenylamino]-9-phenylcarbazole.

A thermogravimetry-differential thermal analysis (TG-DTA) of the obtained PCzPCA1 was performed. The results are shown in FIG. 19. In FIG. 19, the vertical axis on the left side indicates differential heat (electromotive force of thermocouple (μV)) in the differential thermal analysis (DTA), and the vertical axis on the right side indicates gravity (%; gravity expressed assuming that gravity at the start of measurement is 100%) in the thermogravimetry (TG). Further, the lower horizontal axis indicates a temperature (° C.). By utilizing a thermo-gravimetric/differential thermal analyzer (TG/DTA 320, manufactured by Seiko Instruments Inc.), thermophysical properties were measured at a temperature rising rate of 10° C./min under a nitrogen atmosphere. As a result, from the relationship between gravity and temperature (thermogravimetry), the temperature at which the gravity becomes 95% or less of the gravity at the start of the measurement, was 375° C. under normal pressure.

Figure 13:
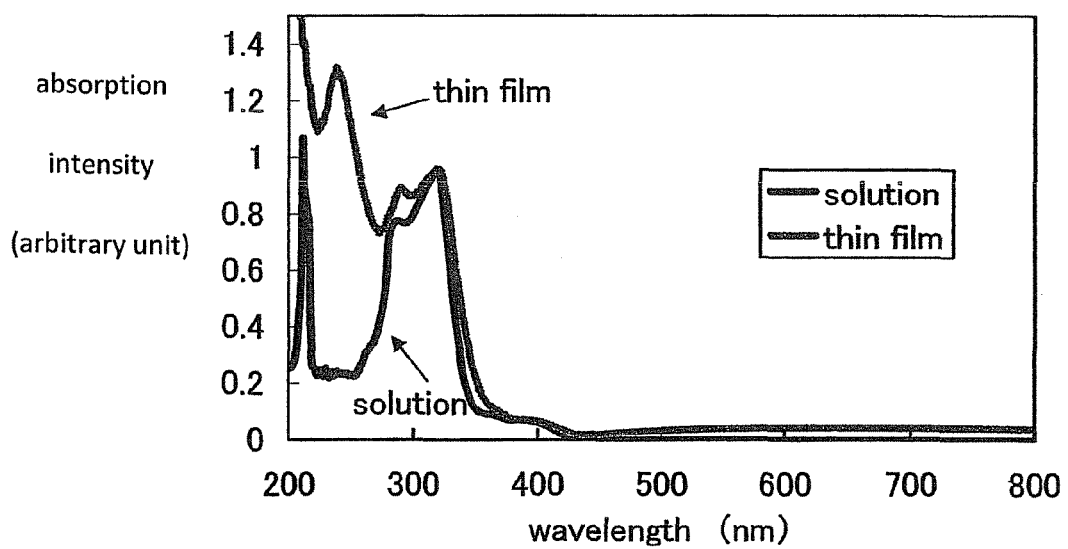
FIG. 13 shows an absorption spectrum of 3-[N-(9-phenylcarbazol-3-yl)-N-phenylamino]-9-phenylcarbazole.
Figure 14:
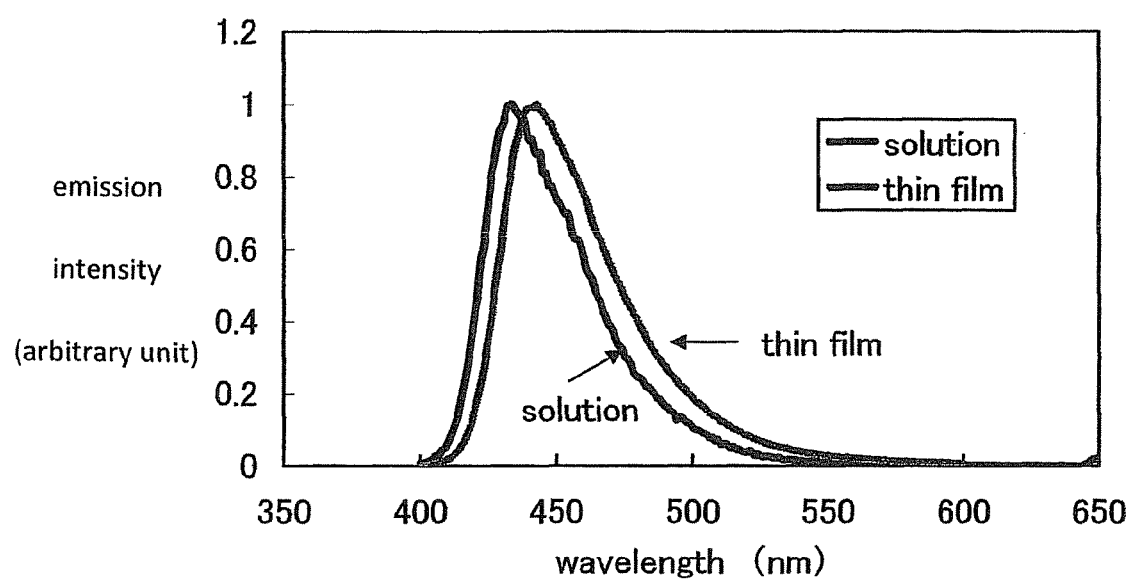
FIG. 14 shows an emission spectrum of 3-[N-(9-phenylcarbazol-3-yl)-N-phenylamino]-9-phenylcarbazole.

Absorption spectra of a toluene solution of PCzPCA1 and a thin film of PCzPCA1 are shown in FIG. 13. An ultraviolet-visible spectrophotometer (V-550, manufactured by JASCO Corporation) was used for the measurement. The solution was put in a quartz cell and the thin film was evaporated over a quartz substrate as samples, and absorption spectra of them, from which an absorption spectrum of quartz was subtracted, are shown in FIG. 13. In FIG. 13, the horizontal axis indicates wavelength (nm) and the vertical axis indicates absorption intensity (arbitrary unit). The maximum absorption wavelength was 320 nm in the case of the toluene solution of PCzPCA1, and 321 nm in the case of the thin film of PCzPCA1. Emission spectra of the toluene solution of PCzPCA1 and the thin film of PCzPCA1 are shown in FIG. 14. In FIG. 14, the horizontal axis indicates wavelength (nm) and the vertical axis indicates emission intensity (arbitrary unit). The maximum emission wavelength was 435 nm (excitation wavelength: 325 nm) in the case of the toluene solution of PCzPCA1, and 443 nm (excitation wavelength: 380 nm) in the case of the thin film of PCzPCA1.

Further, the HOMO level and LUMO level of PCzPCA1 in a thin-film state were measured. A value of the HOMO level was obtained by converting a value of ionization potential measured by a photoelectron spectrometer (AC-2, manufactured by Riken Keiki Co., Ltd.) into a negative value. A value of the LUMO level was obtained by using an absorption edge of the thin film in FIG. 13 as an energy gap and adding the value of the absorption edge to the value of the HOMO level. As a result, the HOMO level and the LUMO level were −5.17 eV and −1.82 eV, respectively.

In addition, an oxidation reaction characteristic of PCzPCA1 was examined by a cyclic voltammetry (CV) measurement. Note that an electrochemical analyzer (ALS model 600A, manufactured by BAS Inc.) was used for the measurement.

As for a solution used in the CV measurement, dehydrated dimethylformamide (DMF) was used as a solvent. Tetra-n-butylammonium perchlorate (n-Bu$_4$NClO$_4$), which was a supporting electrolyte, was dissolved in the solvent so that the concentration of the tetra-n-butylammonium perchlorate was 100 mmol/L. Further, PCzPCA1, which was an object to be measured, was dissolved therein and prepared so that the concentration thereof was 1 mmol/L. Further, a platinum electrode (PTE platinum electrode, manufactured by BAS Inc.) was used as a work electrode. A platinum electrode (VC-3 Pt counter electrode (5 cm), manufactured by BAS Inc.) was used as an auxiliary electrode. An Ag/Ag$^+$ electrode (RE 5 nonaqueous reference electrode, manufactured by BAS Inc.) was used as a reference electrode.

The oxidation reaction characteristic was measured as follows. A scan for changing a potential of the work electrode with respect to the reference electrode from 0.5 V to −0.16 V after the potential was changed from −0.16 V to 0.5 V, was considered as one cycle, and measurement was performed for 100 cycles. Further, a scanning speed of the CV measurement was set to be 0.1 V/s.

Figure 21:
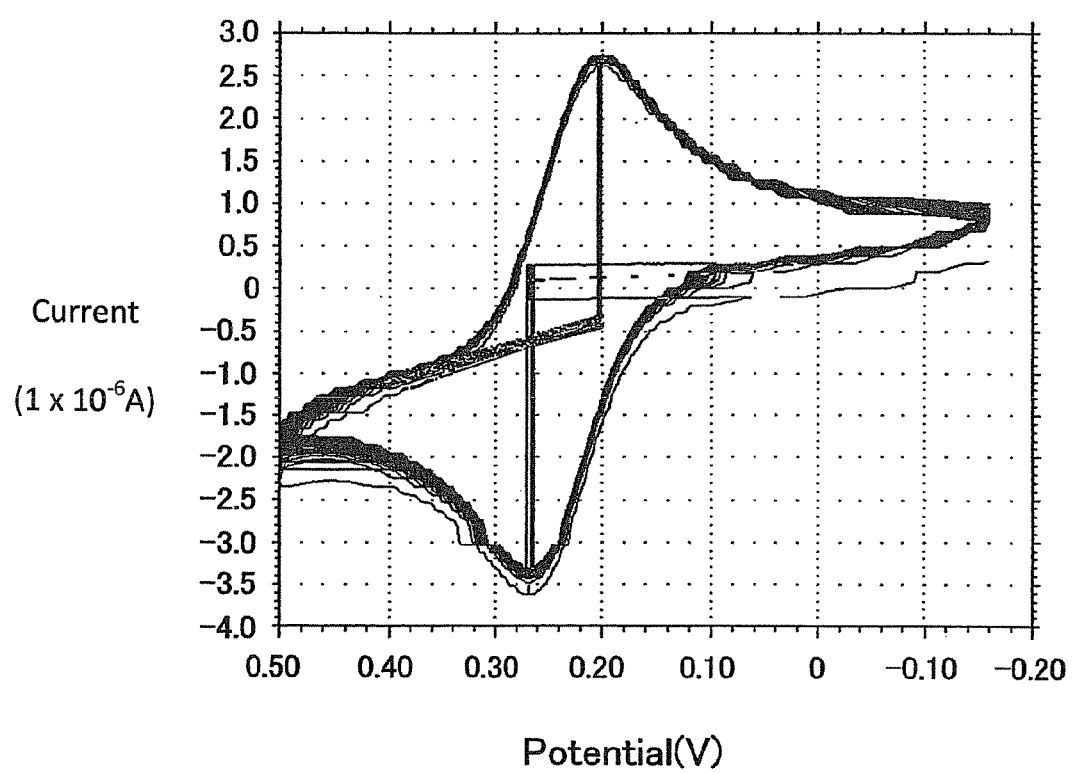
FIG. 21 shows a CV characteristic of 3-[N-(9-phenylcarbazol-3-yl)-N-phenylamino]-9-phenylcarbazole.

Results of examining the oxidation reaction characteristic of PCzPCA1 are shown in FIG. 21. In FIG. 21, the horizontal axis indicates a potential (V) of the work electrode with respect to the reference electrode, whereas the vertical axis indicates a value of current flowing between the work electrode and the auxiliary electrode (1×10$^{-6}$ A).

According to FIG. 21, it was found that an oxidation potential was 0.27 V (vs. Ag/Ag$^+$ electrode). Although the scanning was repeated for 100 cycles, changes in peak position and peak intensity of a CV curve were hardly seen in the oxidation reaction. Accordingly, it was found that the carbazole derivative of the present invention was extremely stable to the oxidation reaction.

Figure 23:
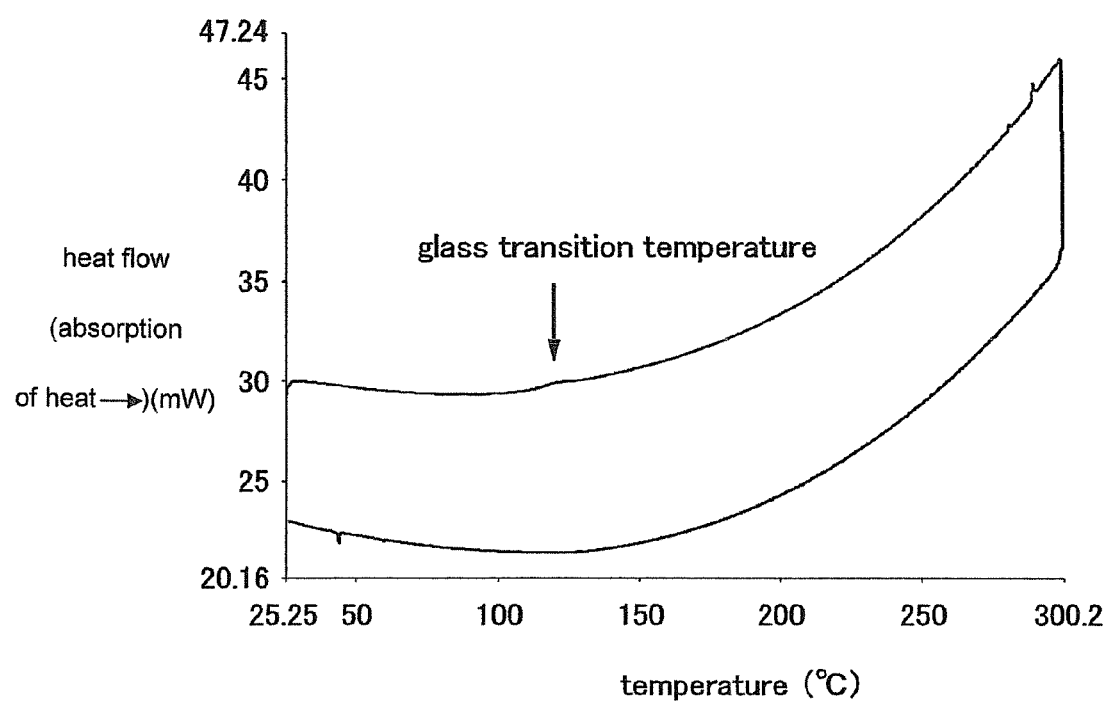
FIG. 23 shows a measurement result of differential scanning calorimetry of 3-[N-(9-phenylcarbazol-3-yl)-N-phenylamino]-9-phenylcarbazole.

A glass transition temperature of the obtained compound PCzPCA1 was examined with a differential scanning calorimeter (Pyris 1 DSC, manufactured by Perkin Elmer Co., Ltd.). Measurement results by DSC are shown in FIG. 23. According to the measurement results, it was found that the glass transition temperature of the obtained compound was 112° C. As just described, the obtained compound has a glass transition point as high as 112° C., and has favorable heat resistance. In addition, in FIG. 23, there is no peak showing crystallization of the obtained compound, and thus, it is found that the obtained compound is hard to be crystallized.

Example 2

A synthesis method of 3,6-bis[N-(9-phenylcarbazol-3-yl)-N-phenylamino]-9-phenylcarbazole (abbr.: PCzPCA2), which is represented by Structural Formula (38), is explained as one example of a carbazole derivative of the present invention.

(38)

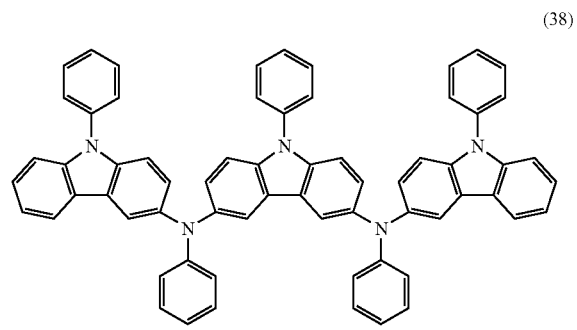

[Step 1]
A synthesis method of 3,6-diiodo-9-phenylcarbazole is explained. A synthesis scheme of 3,6-diiodo-9-phenylcarbazole is shown in (A-7).

(A-7)

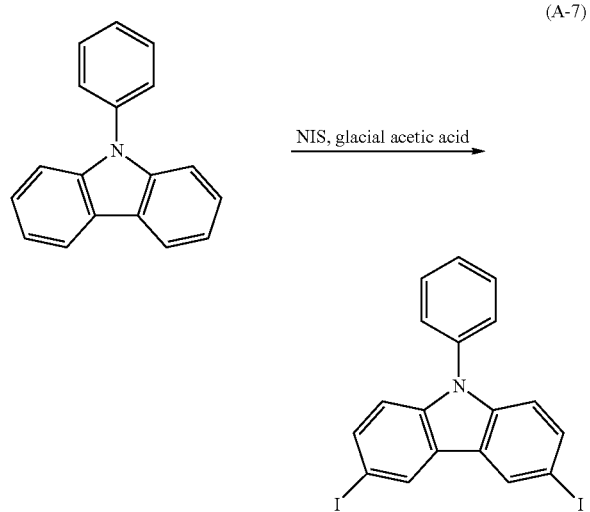

Firstly, 24.3 g (100 mmol) of 9-phenylcarbazole was dissolved in 700 mL of glacial acetic acid, and 44.9 g (200 mmol) of N-iodosuccinimide was slowly added thereto. The mixture was stirred overnight at a room temperature. The generated precipitate was filtered, and the residue was washed with a saturated sodium hydrogen carbonate water solution, water, and methanol and then dried. 47.0 g (yield: 95%) of 3,6-diiodo-9-phenylcarbazole, which was white powder, was obtained.

[Step 2]
A synthesis method of 3,6-bis[N-(9-phenylcarbazol-3-yl)-N-phenylamino]-9-phenylcarbazole (abbr.: PCzPCA2) is explained. A synthesis scheme of PCzPCA2 is shown in (A-8).

(A-8)

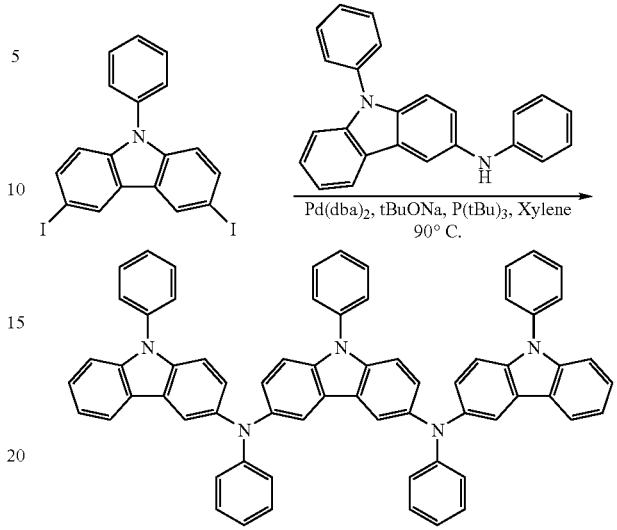

Figure 15:
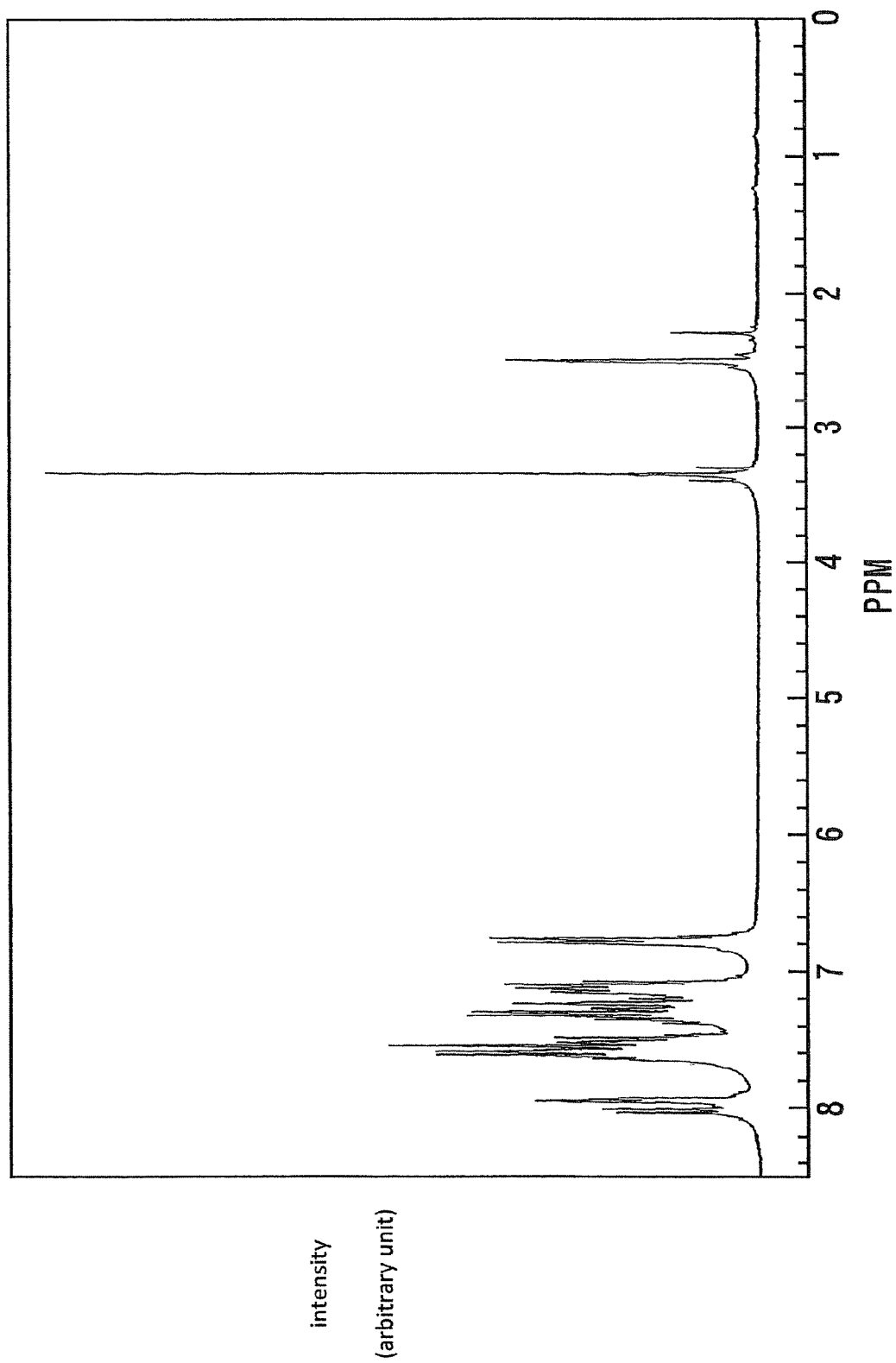
FIG. 15 shows a $^1$H-NMR chart of 3,6-bis[N-(9-phenylcarbazol-3-yl)-N-phenylamino]-9-phenylcarbazole.
Figure 16:
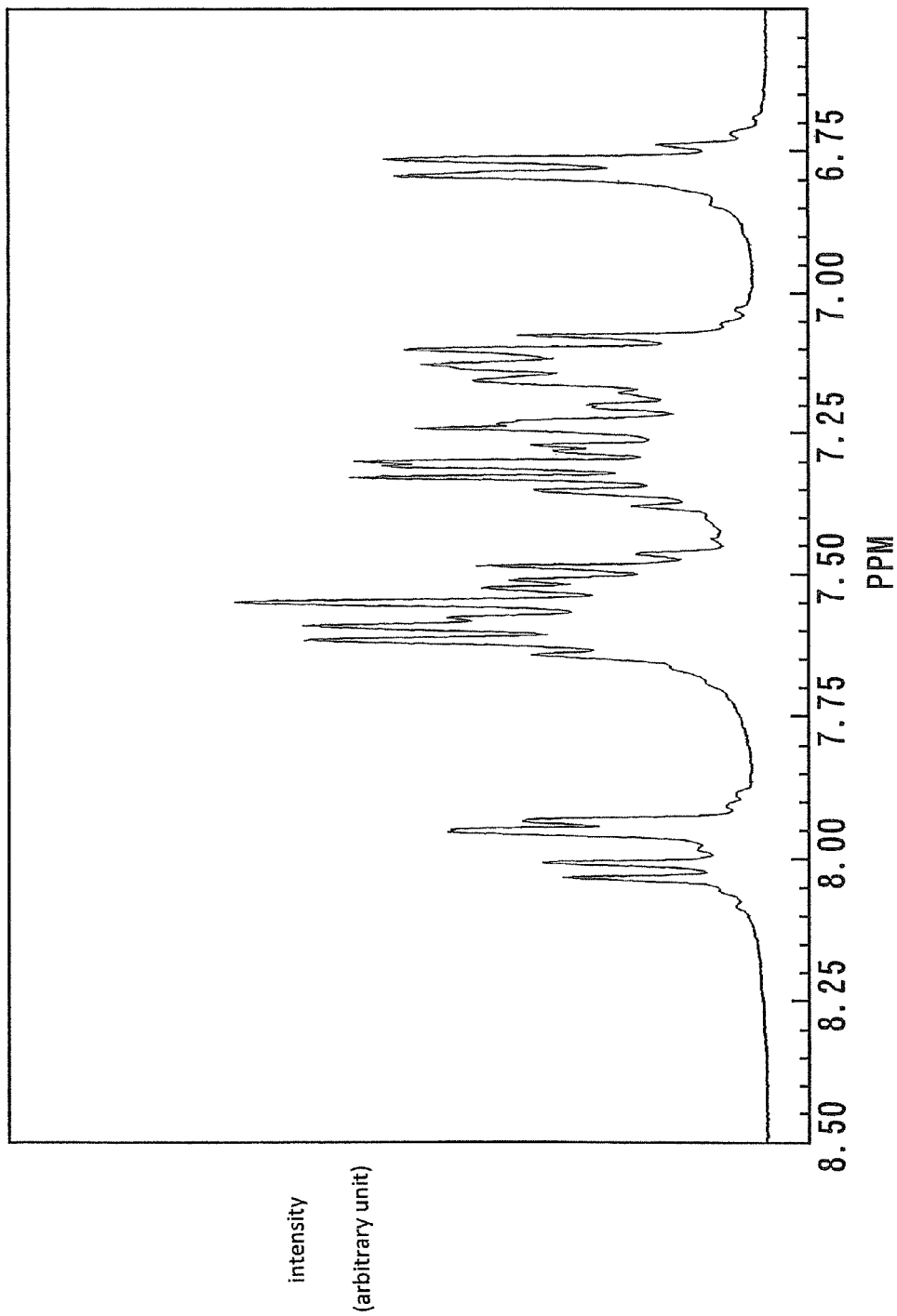
FIG. 16 shows a $^1$H-NMR chart of 3,6-bis[N-(9-phenylcarbazol-3-yl)-N-phenylamino]-9-phenylcarbazole.

Under a nitrogen atmosphere, 30 mL of dehydrated xylene was added to a mixture of 2.5 g (5 mmol) of 3,6-diiodo-9-phenylcarbazole, 3.4 g (10 mmol) of PCA, 30 mg (0.05 mmol) of bis(dibenzylideneacetone)palladium(0), 0.2 mL (0.5 mmol) of a hexane solution with 49 wt % of tri-tert-butylphosphine, and 3.0 g (30 mmol) of sodium-tert-butoxide. This mixture was stirred under a nitrogen atmosphere for 6.5 hours while heating at 90° C. After the termination of the reaction, about 500 mL of hot toluene was added to the suspension and this suspension was filtered through florisil, alumina, and Celite®. The obtained filtrate was concentrated and the concentrated solution was purified by using silica gel column chromatography (toluene:hexane=1:1). This was concentrated and ethyl acetate-hexane was added thereto to conduct recrystallization. 2.5 g (yield: 55%) of 3,6-bis[N-(9-phenylcarbazol-3-yl)-N-phenylamino]-9-phenylcarbazole which was cream-colored powder, was obtained. NMR data are shown below. $^1$H-NMR (300 MHz, DMSO-d): δ=6.74-6.80 (m, 6H), 7.08-7.64 (m, 33H), 7.94-8.04 (m, 6H). A $^1$H-NMR chart is shown in FIG. 15, and an enlarged view of a portion of 6.50 ppm to 8.50 ppm in FIG. 15 is shown in FIG. 16.

Figure 20:
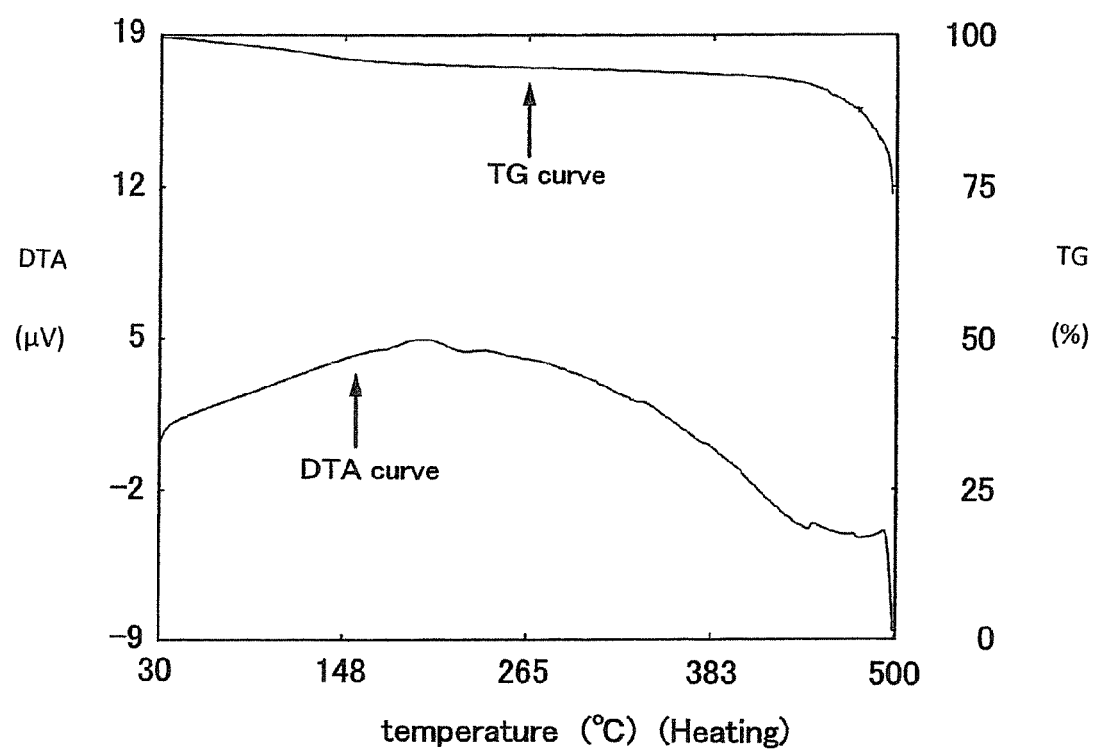
FIG. 20 shows a result of thermogravimetry of 3,6-bis[N-(9-phenylcarbazol-3-yl)-N-phenylamino]-9-phenylcarbazole.

A thermogravimetry-differential thermal analysis (TG-DTA) of the obtained PCzPCA2 was performed. The results are shown in FIG. 20. In FIG. 20, the vertical axis on the left side indicates differential heat (electromotive force of thermocouple (μV)) in the differential thermal analysis (DTA) and the vertical axis on the right side indicates gravity (%; gravity expressed assuming that gravity at the start of measurement is 100%) in the thermogravimetry (TG). Further, the lower horizontal axis indicates a temperature (° C.). By utilizing a thermo-gravimetric/differential thermal analyzer (TG/DTA 320, manufactured by Seiko Instruments Inc.), thermophysical properties were measured at a temperature rising rate of 10° C./min under a nitrogen atmosphere. As a result, from the relationship between gravity and temperature (thermogravimetry), the temperature at which the gravity becomes 95% or less of the gravity at the start of the measurement, was 476° C. under normal pressure.

Figure 17:
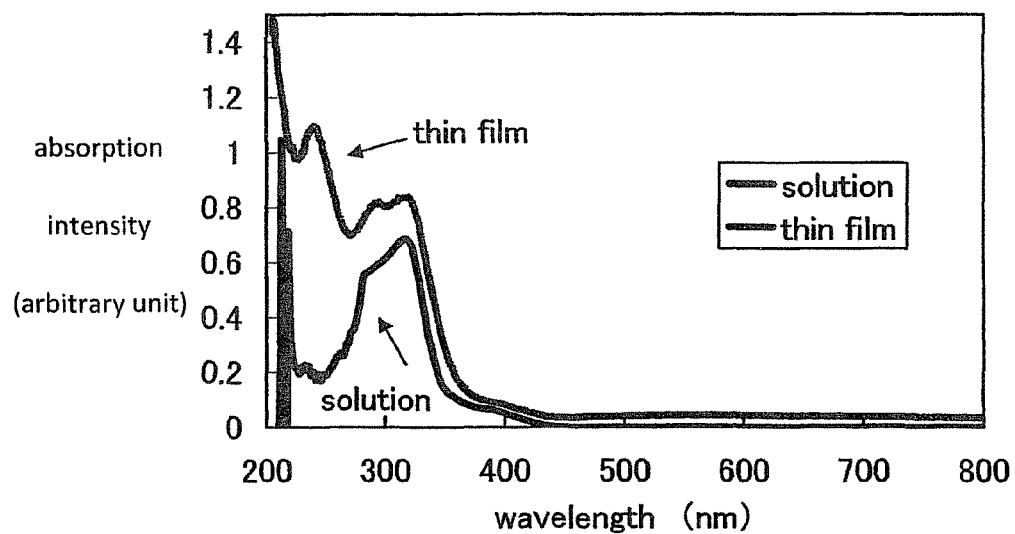
FIG. 17 shows an absorption spectrum of 3,6-bis[N-(9-phenylcarbazol-3-yl)-N-phenylamino]-9-phenylcarbazole.
Figure 18:
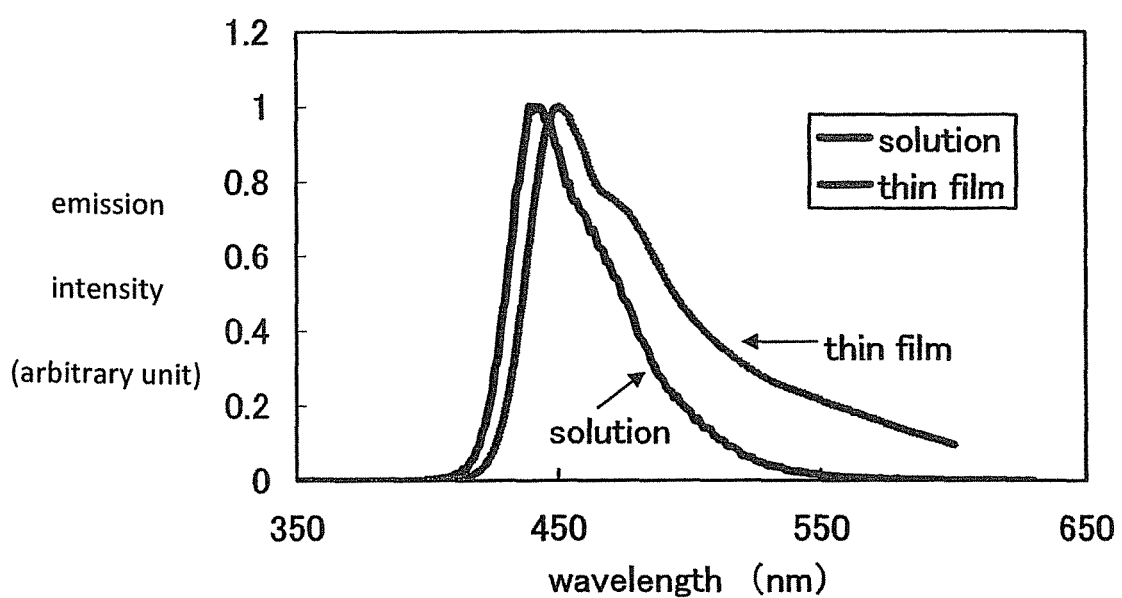
FIG. 18 shows an emission spectrum of 3,6-bis[N-(9-phenylcarbazol-3-yl)-N-phenylamino]-9-phenylcarbazole.

Absorption spectra of a toluene solution of PCzPCA2 and a thin film of PCzPCA2 are shown in FIG. 17. An ultraviolet-visible spectrophotometer (V-550, manufactured by JASCO Corporation) was used for the measurement. The solution was put in a quartz cell, and the thin film was evaporated over a quartz substrate as samples, and absorption spectra of them, from which an absorption spectrum of quartz was subtracted, are shown in FIG. 17. In FIG. 17, the horizontal axis indicates wavelength (nm) and the vertical axis indicates absorption intensity (arbitrary unit). The maximum absorption wavelength was 320 nm in the case of the toluene solution of PCzPCA2, and 320 nm in the case of the thin film of PCzPCA2. Emission spectra of the toluene solution of PCzPCA2 and the thin film of PCzPCA2 are shown in FIG. 18. In FIG. 18, the horizontal axis indicates wavelength (nm) and the vertical axis indicates emission intensity (arbitrary unit). The maximum emission wavelength was 442 nm (excitation wavelength: 325 nm) in the case of the toluene solution of PCzPCA2, and 449 nm (excitation wavelength: 320 nm) in the case of the thin film of PCzPCA2.

Further, the HOMO level and LUMO level of PCzPCA2 in a thin-film state were measured. A value of the HOMO level was obtained by converting a value of ionization potential measured by a photoelectron spectrometer (AC-2, manufactured by Riken Keiki Co., Ltd.) into a negative value. A value of the LUMO level was obtained by using an absorption edge of the thin film in FIG. 17 as an energy gap and adding the value of the absorption edge to the value of the HOMO level. As a result, the HOMO level and the LUMO level were −5.10 eV and −1.75 eV, respectively.

In addition, an oxidation characteristic of PCzPCA2 was measured by a cyclic voltammetry (CV) measurement. Note that an electrochemical analyzer (ALS model 600A, manufactured by BAS Inc.) was used for the measurement.

As for a solution used in the CV measurement, dehydrated dimethylformamide (DMF) was used as a solvent. Tetra-n-butylammonium perchlorate (n-Bu$_4$NClO$_4$), which was a supporting electrolyte, was dissolved in the solvent such that the concentration of the tetra-n-butylammonium perchlorate was 100 mmol/L. Further, PCzPCA2, which was an object to be measured, was dissolved therein and prepared so that the concentration thereof was 1 mmol/L. Further, a platinum electrode (PTE platinum electrode, manufactured by BAS Inc.) was used as a work electrode. A platinum electrode (VC-3 Pt counter electrode (5 cm), manufactured by BAS Inc.) was used as an auxiliary electrode. An Ag/Ag$^+$ electrode (RE 5 nonaqueous reference electrode, manufactured by BAS Inc.) was used as a reference electrode.

The oxidation reaction characteristic was measured as follows. A scan for changing a potential of the work electrode with respect to the reference electrode from 0.33 V to −0.01 V after the potential was changed from −0.01 V to 0.33 V was considered as one cycle, and measurement was performed for 100 cycles. Further, a scanning speed of the CV measurement was set to be 0.1 V/s.

Figure 22:
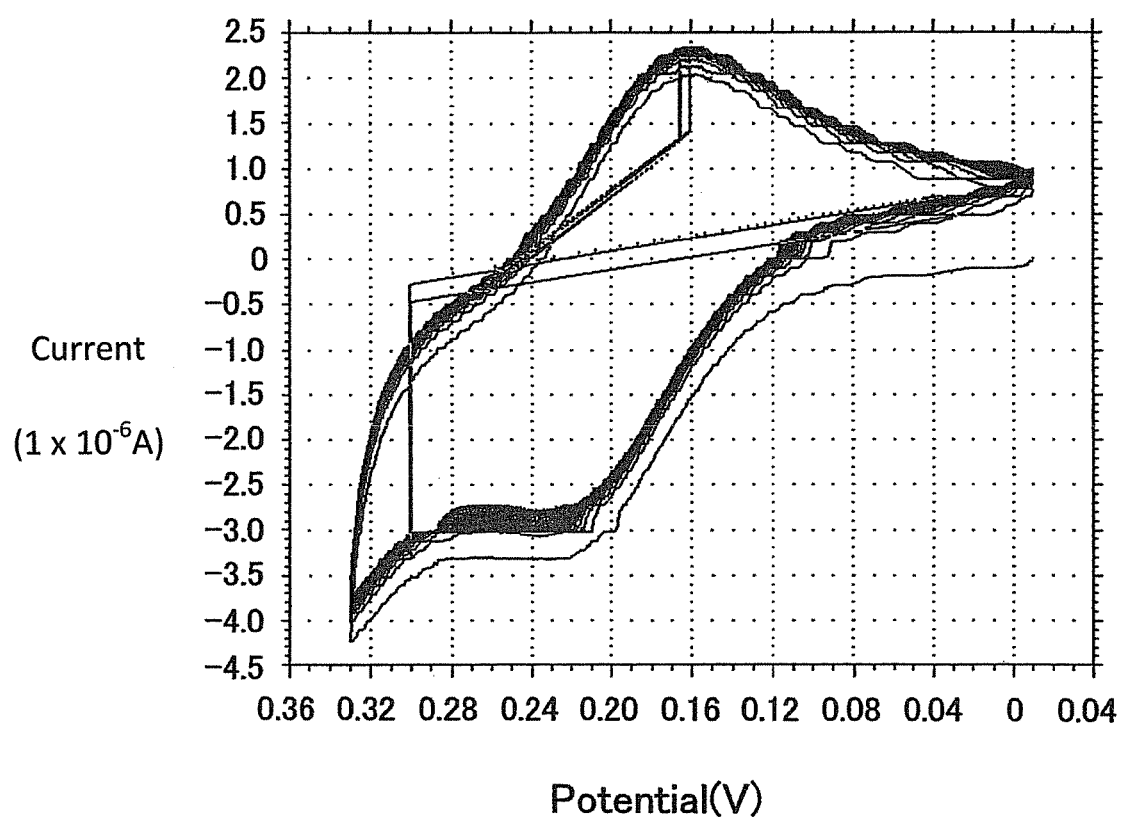
FIG. 22 shows a CV characteristic of 3,6-bis[N-(9-phenylcarbazol-3-yl)-N-phenylamino]-9-phenylcarbazole.

Results of examining the oxidation reaction characteristic of PCzPCA2 are shown in FIG. 22. In FIG. 22, the horizontal axis indicates a potential (V) of the work electrode with respect to the reference electrode, whereas the vertical axis indicates a value of current flowing between the work electrode and the auxiliary electrode (1×10$^{-6}$ A).

According to FIG. 22, it was found that an oxidation potential was 0.22 V (vs. Ag/Ag$^+$ electrode). Although the scanning was repeated for 100 cycles, changes in peak position and peak intensity of a CV curve were hardly seen in the oxidation reaction. Accordingly, it was found that the carbazole derivative of the present invention was extremely stable to the oxidation reaction.

Figure 24:
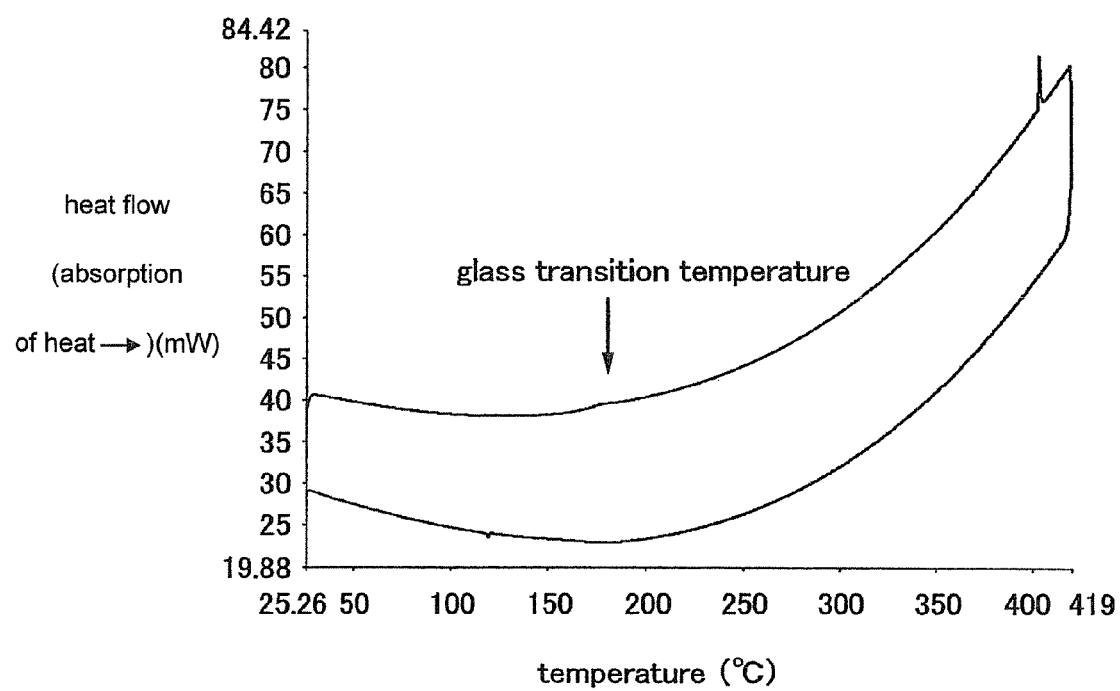
FIG. 24 shows a measurement result of differential scanning calorimetry of 3,6-bis[N-(9-phenylcarbazol-3-yl)-N-phenylamino]-9-phenylcarbazole.

A glass transition temperature of the obtained compound PCzPCA2 was examined with a differential scanning calorimeter (Pyris 1 DSC, manufactured by Perkin Elmer Co., Ltd.). Measurement results by DSC are shown in FIG. 24. According to the measurement results, it was found that the glass transition temperature of the obtained compound was 168° C. As just described, the obtained compound has a high glass transition temperature as high as 168° C., and has favorable heat resistance. In addition, in FIG. 24, there is no peak showing crystallization of the obtained compound, and thus, it is found that the obtained compound is hard to be crystallized.

Example 3

A synthesis method of 3-[N-(1-naphthyl)-N-(9-phenylcarbazol-3-yl)amino]-9-phenylcarbazole (abbr.: PCzPCN1), which is represented by Structural Formula (17), is explained as one example of a carbazole derivative of the present invention.

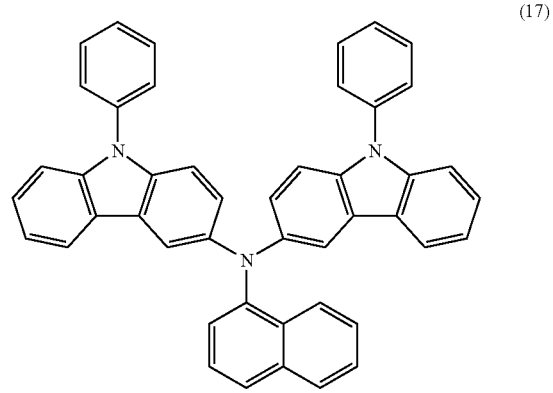

(17)

[Step 1]

A synthesis method of 3-[N-(1-naphthyl)amino]-9-phenylcarbazole (abbr.: PCN) is explained. A synthesis scheme of PCN is shown in (A-9).

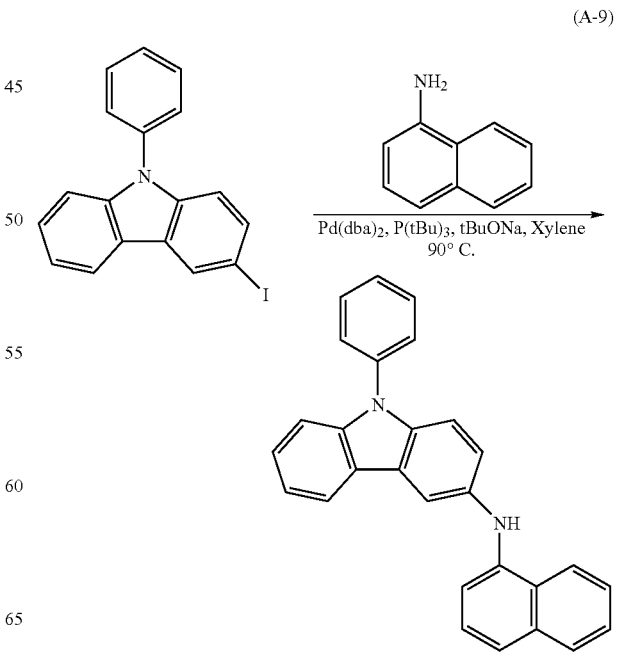

(A-9)

Figure 27:
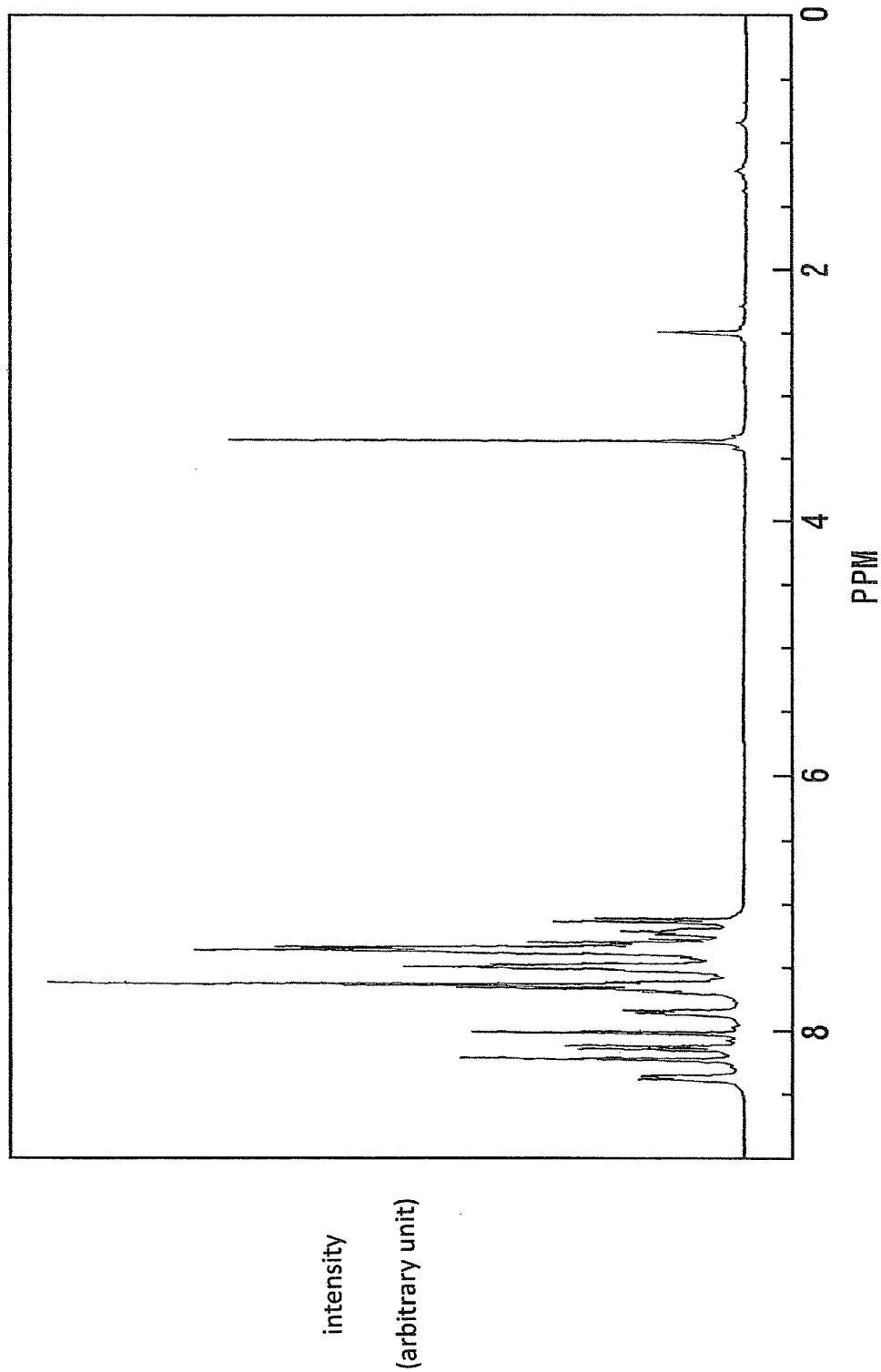
FIG. 27 shows a $^1$H-NMR chart of 3-[N-(1-naphthyl)amino]-9-phenylcarbazole.
Figure 28:
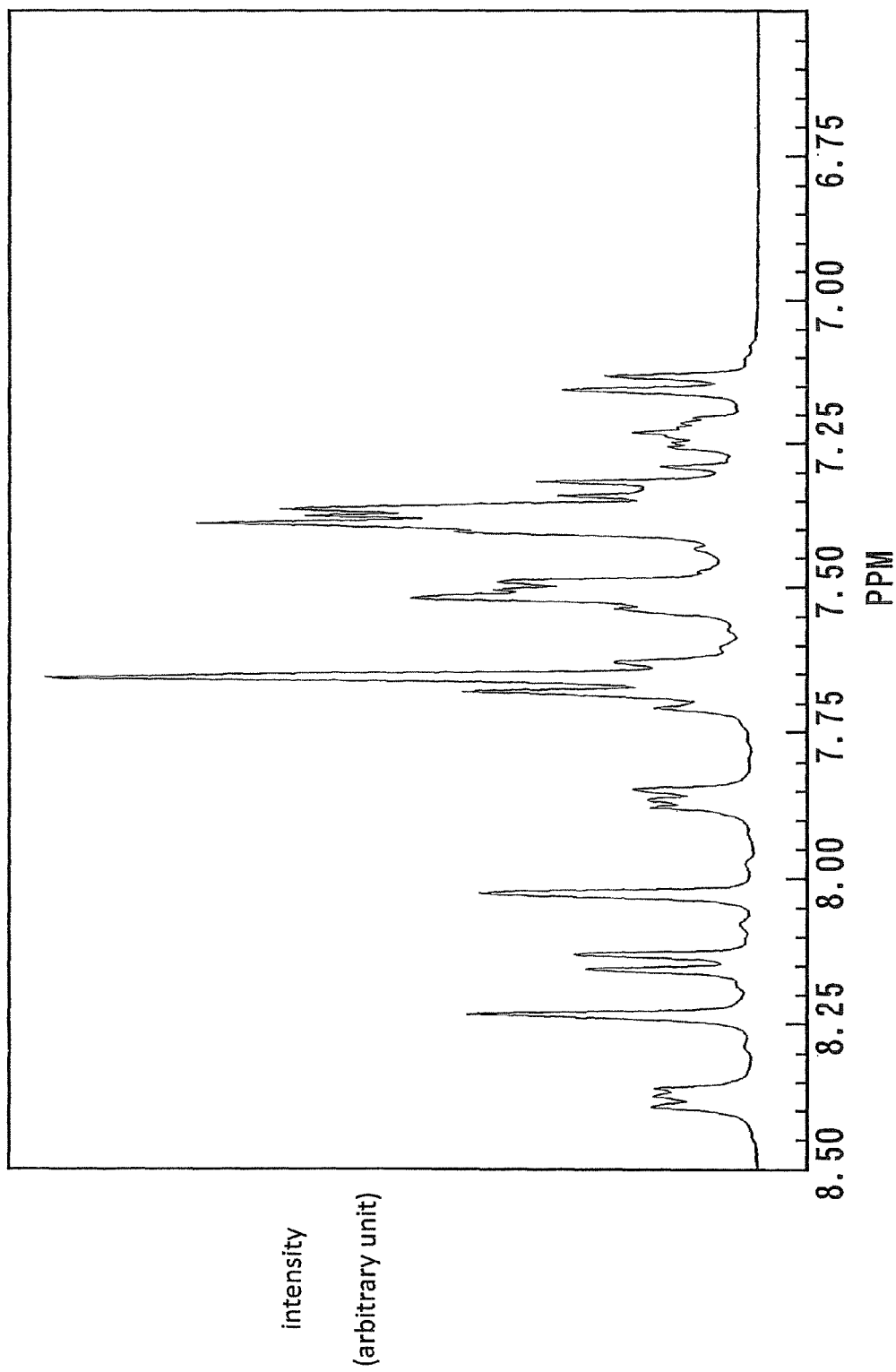
FIG. 28 shows a $^1$H-NMR chart of 3-[N-(1-naphthyl)amino]-9-phenylcarbazole.

Under a nitrogen atmosphere, 12 mL of dehydrated xylene was added to a mixture of 3.7 g (10 mmol) of 3-iodo-9-phenylcarbazole, 1.6 g (5 mmol) of 1-aminonaphthalene, 60 mg (0.1 mmol) of bis(dibenzylideneacetone)palladium(0), 0.2 mL of a hexane solution with 49 wt % of tri-tert-butylphosphine, and 3 g (30 mmol) of sodium-tert-butoxide. This mixture was stirred under a nitrogen atmosphere for 7 hours while heating at 90° C. After the termination of the reaction, about 200 mL of hot toluene was added to the suspension and this suspension was filtered through florisil, alumina, and Celite®. The obtained filtrate was concentrated and the concentrated solution was purified by silica gel column chromatography (toluene:hexane=1:1). This was concentrated and the obtained concentrated solution was recrystallized with ethyl acetate-hexane. 1.5 g (yield: 79%) of 3-[N-(1-naphthyl)amino]-9-phenylcarbazole which was cream-colored powder, was obtained. Data of NMR are shown below. $^1$H-NMR (300 MHz, DMSO-d): δ=7.13-7.71 (m, 15H), 7.85-7.88 (m, 1H), 8.03 (s, 1H), 8.15 (d, J=7.8, 1H), 8.24 (s, 1H), 8.36-8.39 (m, 1H). A $^1$H-NMR chart is shown in FIG. 27, and an enlarged view of a portion of 6.50 ppm to 8.50 ppm in FIG. 27 is shown in FIG. 28.

[Step 2]

Next, a synthesis method of 3-[N-(1-naphthyl)-N-(9-phenylcarbazol-3-yl)amino]-9-phenylcarbazole (abbr.: PCzPCN1) is explained. A synthesis scheme of PCzPCN1 is shown in (A-10).

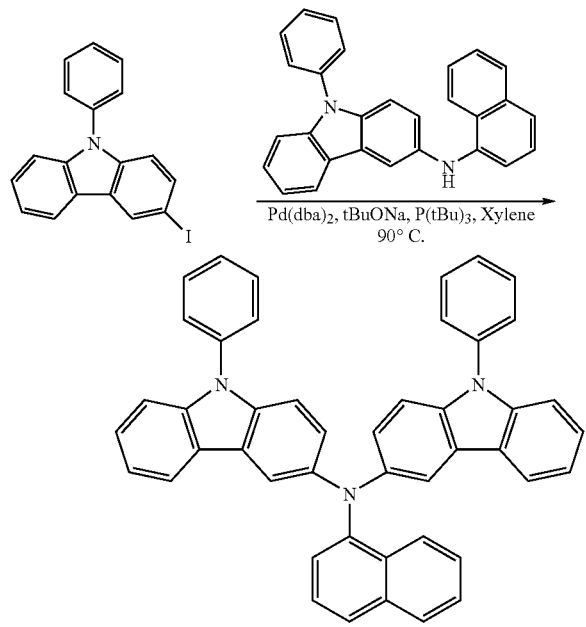

(A-10)

Figure 29:
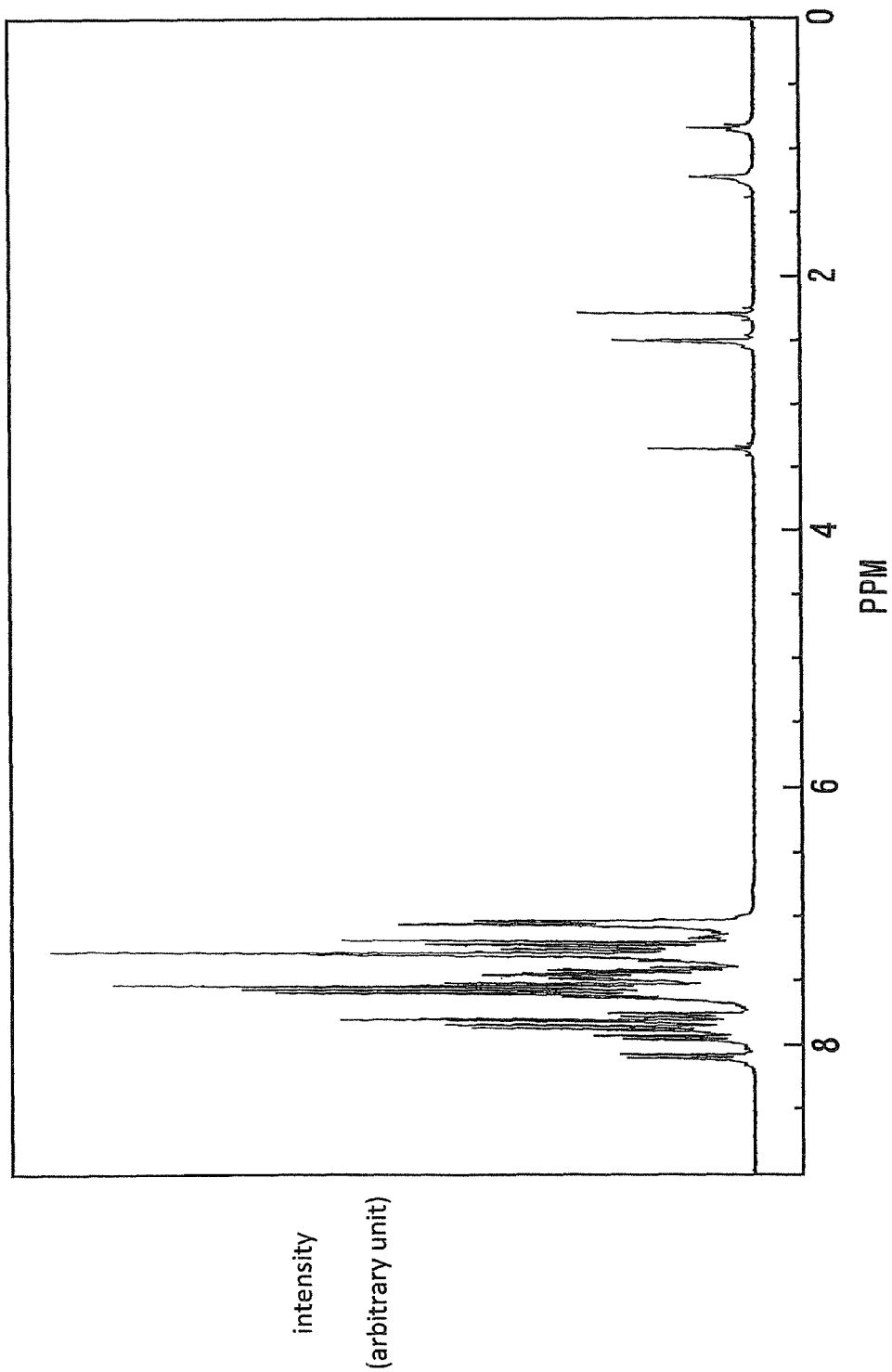
FIG. 29 shows a $^1$H-NMR chart of 3-[N-(1-naphthyl)-N-(9-phenylcarbazol-3-yl)amino]-9-phenylcarbazole.
Figure 30:
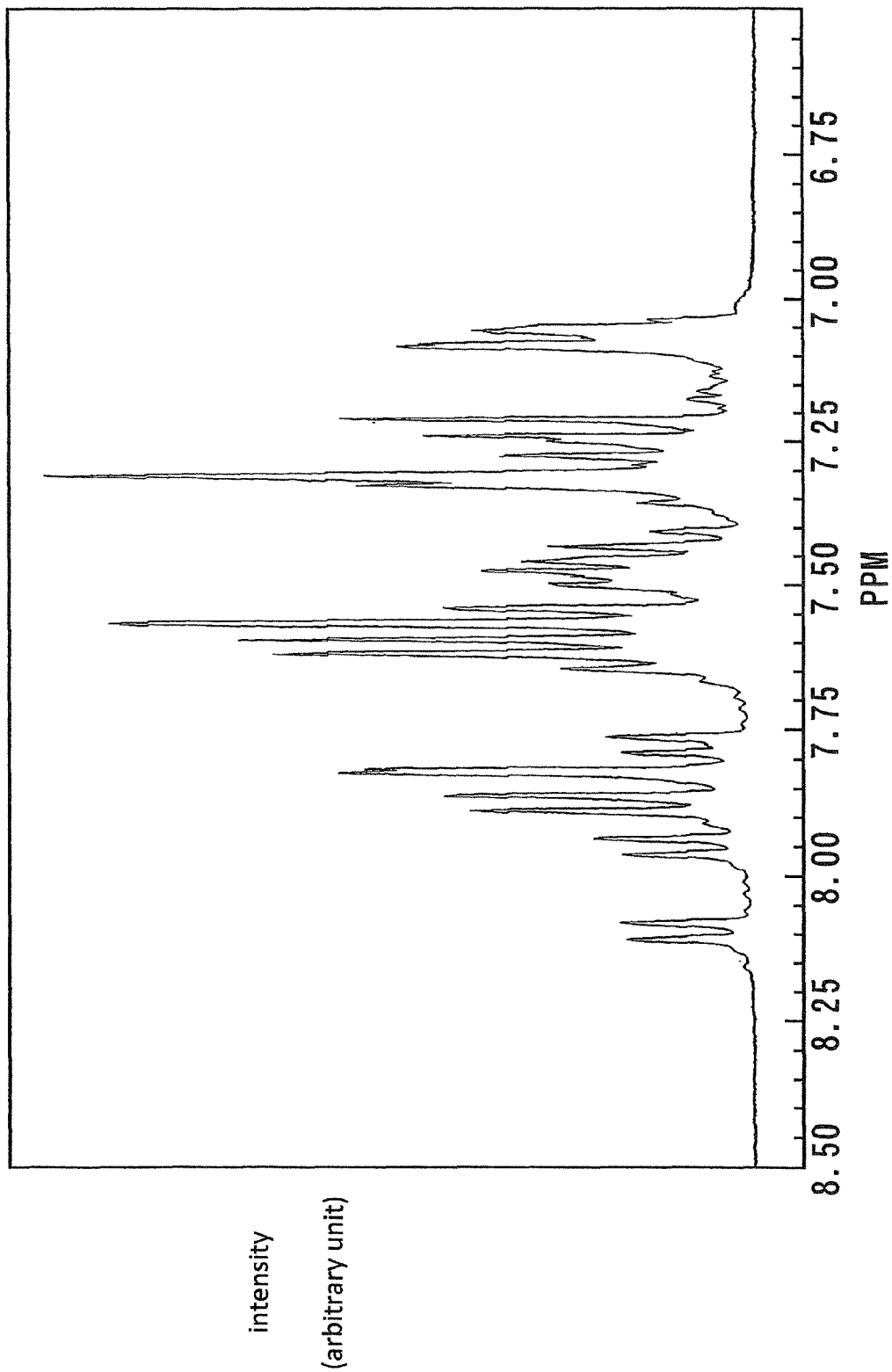
FIG. 30 shows a $^1$H-NMR chart of 3-[N-(1-naphthyl)-N-(9-phenylcarbazol-3-yl)amino]-9-phenylcarbazole.

Under a nitrogen atmosphere, 7 mL of dehydrated xylene was added to a mixture of 1.8 g (5 mmol) of 3-iodo-9-phenylcarbazole, 2.5 g (6.6 mmol) of PCN, 30 mg (0.05 mmol) of bis(dibenzylideneacetone)palladium(0), 0.2 mL (0.5 mmol) of a hexane solution with 49 wt % of tri-tert-butylphosphine, and 700 mg (7 mmol) of sodium-tert-butoxide. This mixture was stirred under a nitrogen atmosphere for 4.5 hours while heating at 90° C. After the termination of the reaction, about 500 mL of hot toluene was added to the suspension and this suspension was filtered through florisil, alumina, and Celite®. The obtained filtrate was concentrated and the concentrated solution was purified by silica gel column chromatography (toluene:hexane=1:1). This was concentrated and the obtained concentrated solution was recrystallized with ethyl acetate-hexane. 2.1 g (yield: 62%) of PCzPCN1 which was yellow powder, was obtained. NMR data are shown below. $^1$H-NMR (300 MHz, DMSO-d): δ=7.04-7.65 (m, 24H), 7.78 (d, J=8.4, 1H), 7.82 (d, J=2.1, 2H), 7.88 (d, J=7.8, 2H), 7.95 (d, J=8.4, 1H), 8.10 (d, J=9.0, 1H). A $^1$H-NMR chart is shown in FIG. 29, and an enlarged view of a portion of 6.50 ppm to 8.50 ppm in FIG. 29 is shown in FIG. 30.

Figure 40:
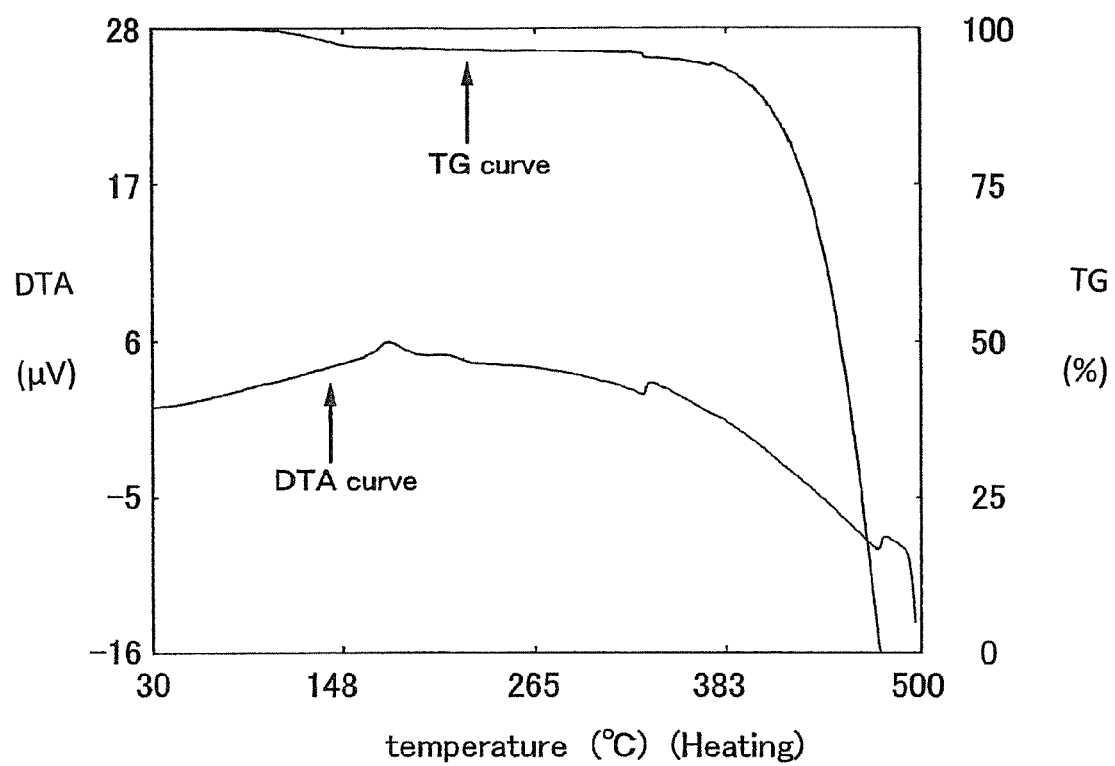
FIG. 40 shows a result of thermogravimetry of 3-[N-(1-naphthyl)-N-(9-phenylcarbazol-3-yl)amino]-9-phenylcarbazole which is a carbazole derivative of the present invention.

A thermogravimetry-differential thermal analysis (TG-DTA) of the obtained PCzPCN1 was performed in the same manner as in Examples 1 and 2. The results are shown in FIG. 40. In FIG. 40, the vertical axis on the left side indicates differential heat (electromotive force of thermocouple (μV)) in the differential thermal analysis (DTA) and the vertical axis on the right side indicates gravity (%; gravity expressed assuming that gravity at the start of measurement is 100%) in the thermogravimetry (TG). Further, the lower horizontal axis indicates a temperature (° C.). By utilizing a thermogravimetric/differential thermal analyzer (TG/DTA 320, manufactured by Seiko Instruments Inc.), thermophysical properties were measured at a temperature rising rate of 10° C./min under a nitrogen atmosphere. As a result, from the relationship between gravity and temperature (thermogravimetry), the temperature at which the gravity becomes 95% or less of the gravity at the start of the measurement, was 400° C. under normal pressure.

Figure 41:
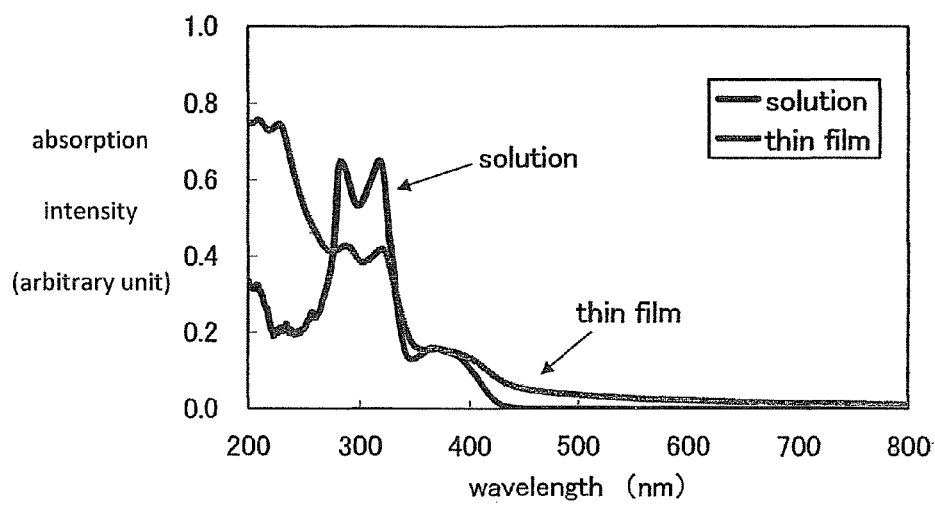
FIG. 41 shows an absorption spectrum of 3-[N-(1-naphthyl)-N-(9-phenylcarbazol-3-yl)amino]-9-phenylcarbazole which is a carbazole derivative of the present invention.
Figure 42:
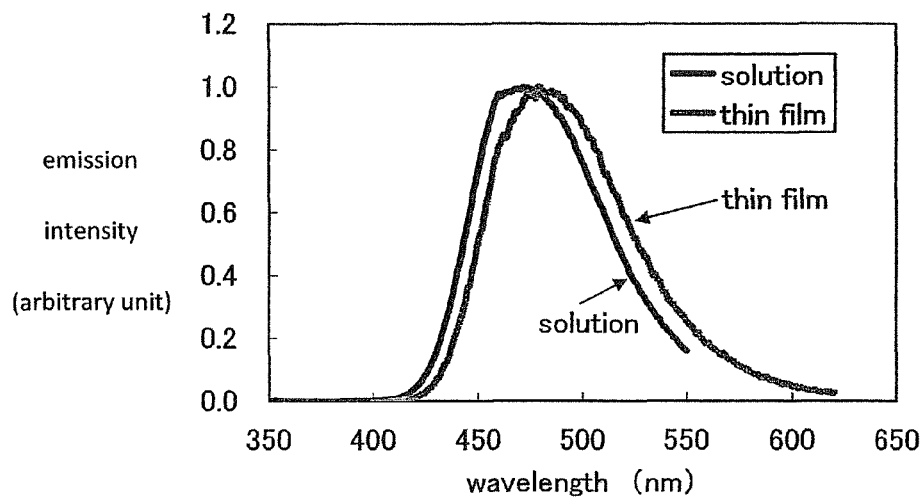
FIG. 42 shows an emission spectrum of 3-[N-(1-naphthyl)-N-(9-phenylcarbazol-3-yl)amino]-9-phenylcarbazole which is a carbazole derivative of the present invention.

Absorption spectra of a toluene solution of PCzPCN1 and a thin film of PCzPCN1 are shown in FIG. 41. An ultraviolet-visible spectrophotometer (V-550, manufactured by JASCO Corporation) was used for the measurement. The solution was put in a quartz cell, and the thin film was evaporated over a quartz substrate as samples, and absorption spectra of them, from which an absorption spectrum of quartz was subtracted, are shown in FIG. 41. In FIG. 41, the horizontal axis indicates wavelength (nm) and the vertical axis indicates absorption intensity (arbitrary unit). The maximum absorption wavelength was 314 nm in the case of the toluene solution of PCzPCN1, and 320 nm in the case of the thin film of PCzPCN1. Emission spectra of the toluene solution of PCzPCN1 and the thin film of PCzPCN1 are shown in FIG. 42. In FIG. 42, the horizontal axis indicates wavelength (nm) and the vertical axis indicates emission intensity (arbitrary unit). The maximum emission wavelength was 475 nm (excitation wavelength: 320 nm) in the case of the toluene solution of PCzPCN1, and 485 nm (excitation wavelength: 320 nm) in the case of the thin film of PCzPCN1.

Further, the HOMO level and LUMO level of PCzPCN1 in a thin-film state were measured. A value of the HOMO level was obtained by converting a value of ionization potential measured by a photoelectron spectrometer (AC-2, manufactured by Riken Keiki Co., Ltd.) into a negative value. A value of the LUMO level was obtained by using an absorption edge of the thin film in FIG. 41 as an energy gap and adding the value of the absorption edge to the value of the HOMO level. As a result, the HOMO level and the LUMO level were −5.15 eV and −2.82 eV, respectively.

In addition, an oxidation characteristic of PCzPCN1 was examined by a cyclic voltammetry (CV) measurement. Note that an electrochemical analyzer (ALS model 600A, manufactured by BAS Inc.) was used for the measurement.

As for a solution used in the CV measurement, dehydrated dimethylformamide (DMF) was used as a solvent. Tetra-n-butylammonium perchlorate (n-Bu$_4$NClO$_4$), which was a supporting electrolyte, was dissolved in the solvent so that the concentration of the tetra-n-butylammonium perchlorate was 100 mmol/L. Further, PCzPCN1, which was an object to be measured, was dissolved and prepared so that the concentration thereof was 1 mmol/L. Further, a platinum electrode (PTE platinum electrode, manufactured by BAS Inc.) was used as a work electrode. A platinum electrode (VC-3 Pt counter electrode (5 cm), manufactured by BAS Inc.) was used as an auxiliary electrode. An Ag/Ag$^+$ electrode (RE 5 nonaqueous reference electrode, manufactured by BAS Inc.) was used as a reference electrode.

The oxidation reaction characteristic was measured as follows. A scan for changing a potential of the work electrode with respect to the reference electrode from 0.50 V to –0.20 V after the potential was changed from –0.20 V to 0.50 V was considered as one cycle, and measurement was performed for 100 cycles. Note that a scanning speed of the CV measurement was set to be 0.1 V/s.

Figure 49:
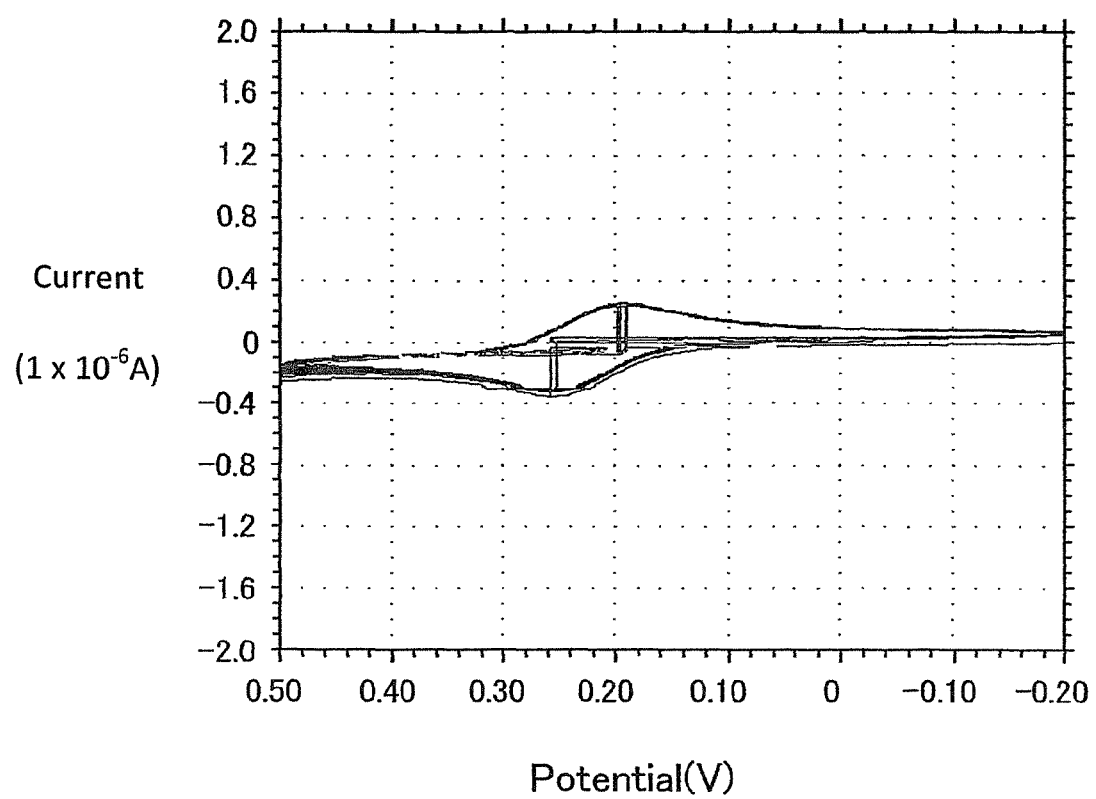
FIG. 49 shows a CV characteristic of 3-[N-(1-naphthyl)-N-(9-phenylcarbazol-3-yl)amino]-9-phenylcarbazole which is a carbazole derivative of the present invention.

Results of examining the oxidation reaction characteristic of PCzPCN1 are shown in FIG. 49. In FIG. 49, the horizontal axis indicates a potential (V) of the work electrode with respect to the reference electrode, whereas the vertical axis indicates a value of current flowing between the work electrode and the auxiliary electrode ($1 \times 10^{-6}$ A). According to FIG. 49, it was found that an oxidation potential was 0.25 V (vs. Ag/Ag$^+$ electrode). Although the scanning was repeated for 100 cycles, changes in peak positions and peak intensity of a CV curve were hardly seen in the oxidation reaction. Accordingly, it was found that the carbazole derivative of the present invention was extremely stable to the oxidation.

Figure 50:
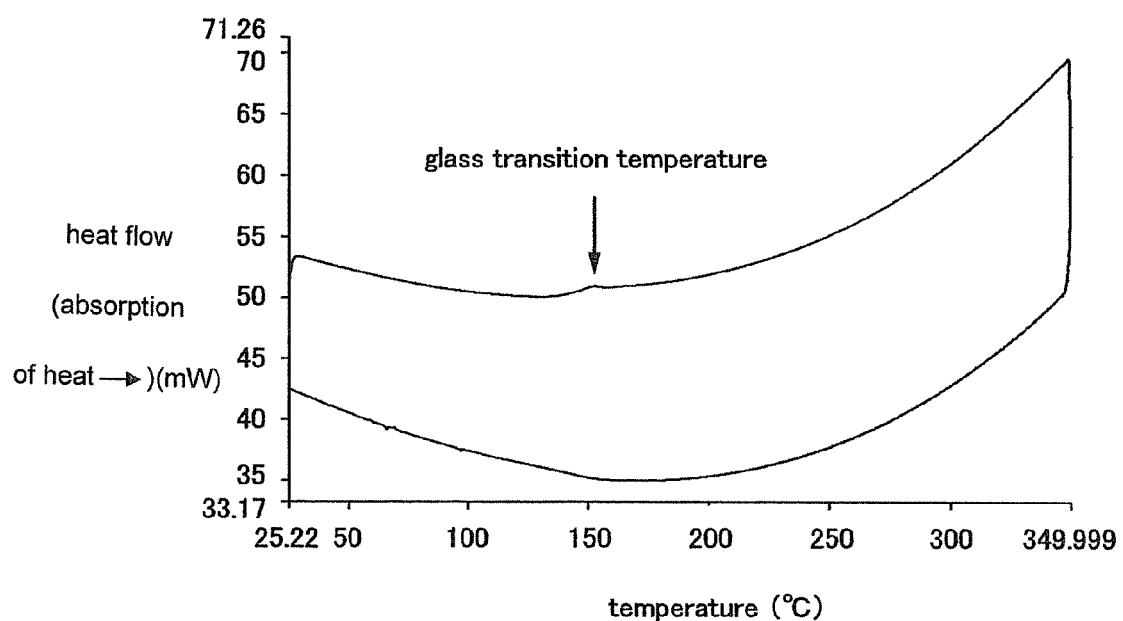
FIG. 50 shows a measurement result of differential scanning calorimetry of 3-[N-(1-naphthyl)-N-(9-phenylcarbazol-3-yl)amino]-9-phenylcarbazole which is a carbazole derivative of the present invention.

A glass transition temperature of the obtained compound PCzPCN1 was examined with a differential scanning calorimeter (Pyris 1 DSC, manufactured by Perkin Elmer Co., Ltd.). Measurement results by DSC are shown in FIG. 50. According to the measurement results, it was found that the glass transition temperature of the obtained compound was 142° C. As just described, the obtained compound has a glass transition temperature as high as 142° C., and has favorable heat resistance. In addition, in FIG. 50, there is no peak showing crystallization of the obtained compound, and thus, it is found that the obtained compound is hard to be crystallized.

Example 4

In this example, a specific example of a layer containing the carbazole derivative represented by General Formula (1) and an inorganic compound which exhibits an electron accepting property to the carbazole derivative is given. As the carbazole derivative, 3-[N-(9-phenylcarbazol-3-yl)-N-phenylamino]-9-phenylcarbazole (abbr.: PCzPCA1), which was synthesized in Example 1 and is represented by Structural Formula (10), was used, and as the inorganic compound, molybdenum oxide was used.

First, a glass substrate was fixed to a substrate holder in a vacuum evaporation apparatus. Next, PCzPCA1 and molybdenum oxide (VI) were separately put in different resistance-heating evaporation sources, and a layer containing PCzPCA1 and molybdenum oxide was formed in a vacuum by a co-evaporation method. At this time, the co-evaporation was performed so that a weight ratio of PCzPCA1 to molybdenum oxide was 4:1. Therefore, a molar ratio of PCzPCA1 to molybdenum oxide was 1.0:1.0. Note that a thickness thereof was 90 nm.

Figure 32:
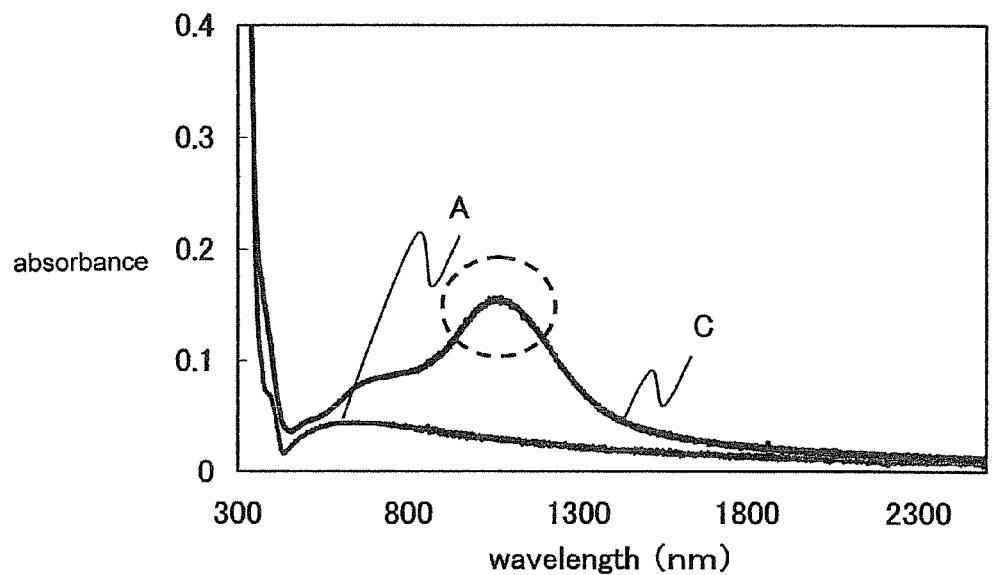
FIG. 32 shows an absorption spectrum of a composite material of the present invention.

A measurement result of an absorption spectrum of the PCzPCA1-molybdenum oxide mixed film which was formed in this manner is indicated by C in FIG. 32. For comparison, an absorption spectrum of a film of only PCzPCA1 (A in the diagram) is also shown.

As FIG. 32 shows, new absorption, which was not seen in the film of only PCzPCA1, was observed in the mixed film of C (a portion surrounded by dotted line in the diagram, and there is a peak in the vicinity of 1070 nm). It is thought that this is because molybdenum oxide exhibits an electron transporting property to PCzPCA1, and that molybdenum oxide accepts electrons from PCzPCA1 and holes are generated in PCzPCA1.

Consequently, the PCzPCA1-molybdenum oxide mixed film formed in this example, in which carriers are generated internally, can reduce a drive voltage of a light emitting element.

In addition, as FIG. 32 shows, notable absorption peak was not observed in a visible light region (400 nm to 700 nm) as for the PCzPCA1-molybdenum oxide mixed film.

Example 5

In this example, a specific example of a layer containing the carbazole derivative represented by General Formula (1) and an inorganic compound which exhibits an electron accepting property to the carbazole derivative is given. As the carbazole derivative, 3,6-bis[N-(9-phenylcarbazol-3-yl)-N-phenylamino]-9-phenylcarbazole (abbr.: PCzPCA2), which was synthesized in Example 1 and is represented by Structural Formula (36), was used, and as the inorganic compound, molybdenum oxide was used.

First, a glass substrate was fixed to a substrate holder in a vacuum evaporation apparatus. Next, PCzPCA2 and molybdenum oxide (VI) were separately put in different resistance-heating evaporation sources, and a layer containing PCzPCA2 and molybdenum oxide was formed in a vacuum by a co-evaporation method. At this time, the co-evaporation was performed so that a weight ratio of PCzPCA2 to molybdenum oxide was 4:1. Therefore, a molar ratio of PCzPCA2 to molybdenum oxide was 1.0:1.6. Note that a thickness thereof was 90 nm.

Figure 33:
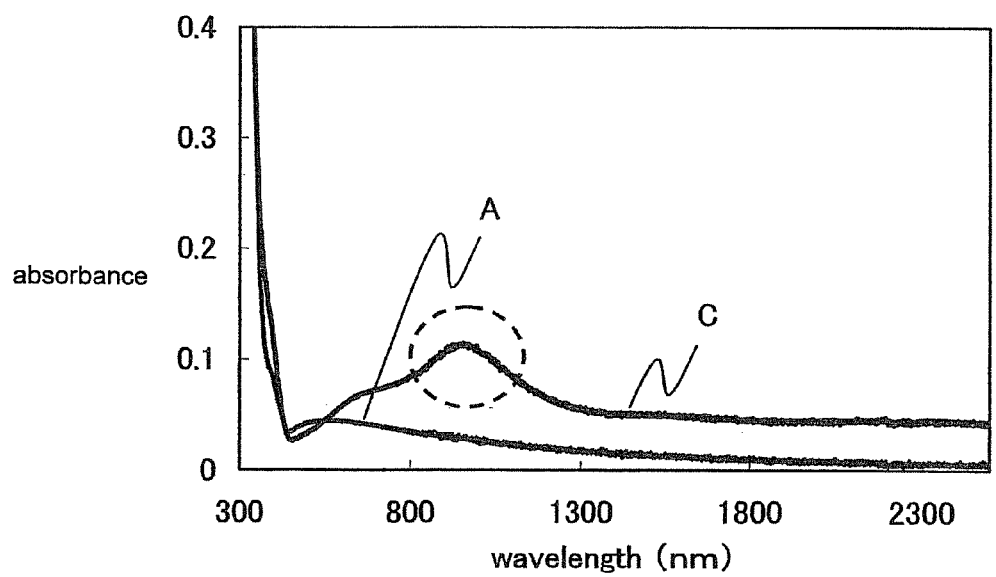
FIG. 33 shows an absorption spectrum of a composite material of the present invention.

A measurement result of an absorption spectrum of the PCzPCA2-molybdenum oxide mixed film which was formed in this manner is indicated by C in FIG. 33. For comparison, an absorption spectrum of a film of only PCzPCA2 (A in the diagram) is also shown.

As FIG. 33 shows, new absorption, which was not seen in the film of only PCzPCA2, was observed in the mixed film of C (a portion surrounded by dotted line in the diagram, and there is a peak in the vicinity of 960 nm). It is thought that this is because molybdenum oxide exhibits an electron accepting property to PCzPCA2, and that molybdenum oxide accepts electrons from PCzPCA2 and holes are generated in PCzPCA2.

Consequently, the PCzPCA2-molybdenum oxide mixed film formed in this example, in which carriers are generated internally, can reduce a drive voltage of a light emitting element.

In addition, as FIG. 33 shows, notable absorption was not observed in a visible light region (400 nm to 700 nm) as for the PCzPCA2-molybdenum oxide mixed film.

Example 6

Figure 34:
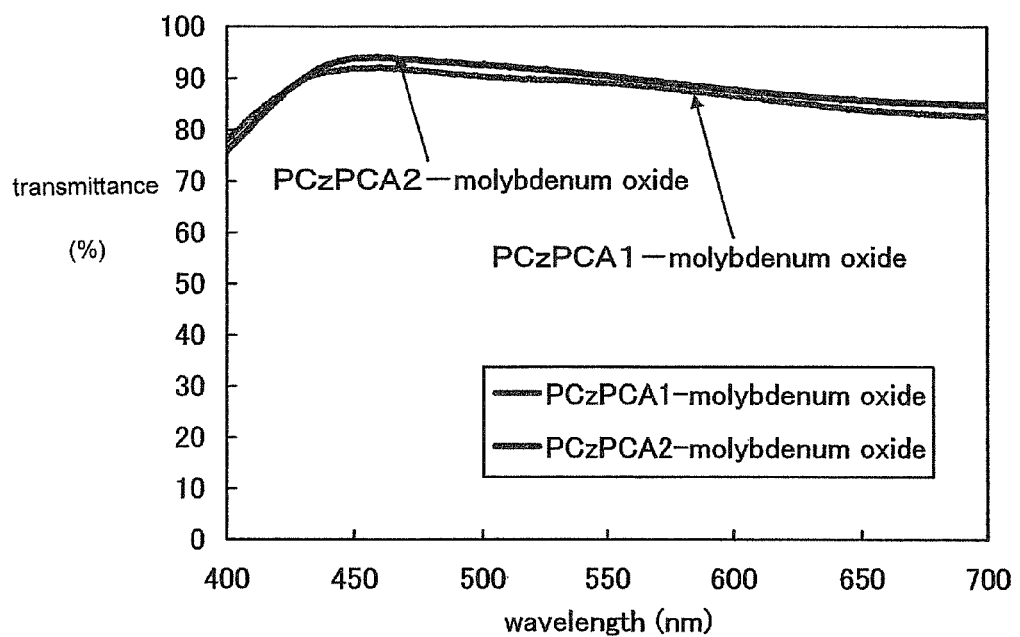
FIG. 34 shows transmittance of a composite material of the present invention.

Next, visible light transmittances of the mixed films manufactured in Examples 4 and 5 are shown in FIG. 34.

A diagram where the vertical axes of FIGS. 32 and 33 are converted from absorbance into transmittance and compared on the same graph is shown in FIG. 34. Note that a wavelength of the horizontal axis is limited to a visible light region (400 nm to 700 nm) in FIG. 34. As FIG. 34 shows, transmittances in the visible light region of the PCzPCA1-molybdenum oxide mixed film manufactured in Example 4 and the mixed film of PCzPCA2-molybdenum oxide mixed film manufactured in Example 5 show approximately 90% or more.

Figure 71:
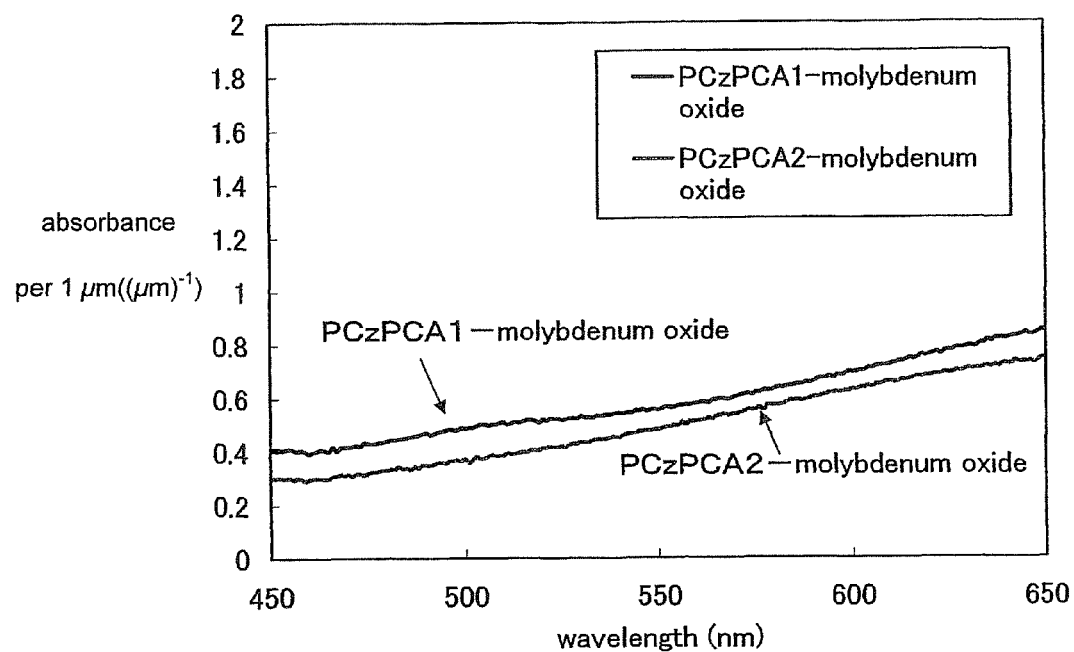
FIG. 71 shows absorbance per micrometer of a composite material of the present invention.

In addition, absorbances per micrometer in the range of blue (450 nm) to red (650 nm) of the PCzPCA1-molybdenum oxide mixed film manufactured in Example 4 and the PCzPCA2-molybdenum oxide mixed film manufactured in Example 5 are shown in FIG. 71. As FIG. 71 shows, absorbance per micrometer of the composite material of the invention is 2 $(\mu m)^{-1}$ or less in each case, and is low in the range of blue (450 nm) to red (650 nm). Therefore, the composite material of the invention has high transmittance at blue (450 nm), green (520 nm), and red (650 nm), and is suitable for a full-color display.

According to the above, it is found that the composite material of the invention has excellent visible light transmittance to a conventional composite material.

Example 7

In this example, a light emitting element using the composite material of the invention is explained.

First, a first electrode of the light emitting element was formed over a substrate. In this example, the first electrode functions as an anode. With the use of indium tin oxide containing silicon oxide that is a transparent conductive film as a material, an anode having an electrode size of 2 mm×2 mm was formed by a sputtering method.

Next, the substrate, over which the first electrode was formed, was fixed to a substrate holder in a vacuum evaporation apparatus so that the side, on which the first electrode was formed, faced downward. Then, a layer containing PCzPCA1 and molybdenum oxide was formed with a thickness of 50 nm by a co-evaporation method. At this time, the co-evaporation was performed so that a weight ratio of PCzPCA1 to molybdenum oxide was 4:2.

Subsequently, a hole transporting layer was formed of a material having an excellent hole transport property. As a material for forming the hole transporting layer, various kind of hole transporting materials can be used. In this example, the hole transporting layer was formed using α-NPD with a thickness of 10 nm by an evaporation method.

Subsequently, a light emitting layer was formed. Note that holes and electrons are recombined in the light emitting layer to cause light emission. In this example, with the use of $Alq_3$ serving as a host material and coumarin 6 serving as a guest material, the light emitting layer was formed with a thickness of 40 nm by a co-evaporation method so that coumarin 6 was contained in $Alq_3$ in the proportion of 1 wt %.

Then, an electron transporting layer was formed. As a material for forming the electron transporting layer, various kinds of electron transporting materials can be used. In this example, the electron transporting layer was formed using $Alq_3$ with a thickness of 10 nm by an evaporation method.

Subsequently, an electron injecting layer was formed. For the electron injecting layer, various kinds of electron injecting materials can be used. In this example, the electron injecting layer was formed using $Alq_3$ and lithium with a thickness of 30 nm by a co-evaporation method so that lithium was contained in $Alq_3$ in the proportion of 1 wt %.

After forming a layer containing a light emitting material in this manner, which was formed by laminating the layer containing the composite material of the invention, the hole transporting layer, the light emitting layer, the electron transporting layer, and the electron injecting layer, a second electrode was formed by a sputtering method or an evaporation method. In this example, the second electrode functions as a cathode. In this example, the second electrode was formed using Al by an evaporation method.

According to the above, the light emitting element of this example was manufactured. A current-voltage characteristic of the light emitting element which was manufactured in this example is shown in FIG. 35; a luminance-voltage characteristic thereof, FIG. 36; and a current efficiency-luminance characteristic thereof, FIG. 37.

Figure 35:
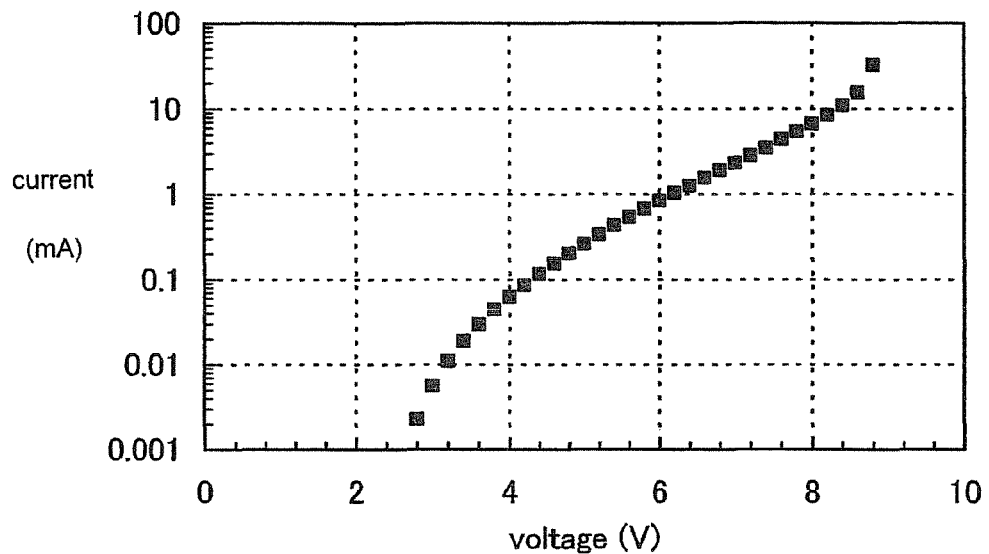
FIG. 35 shows a current-voltage characteristic of a light emitting element manufactured in Example 7.
Figure 36:
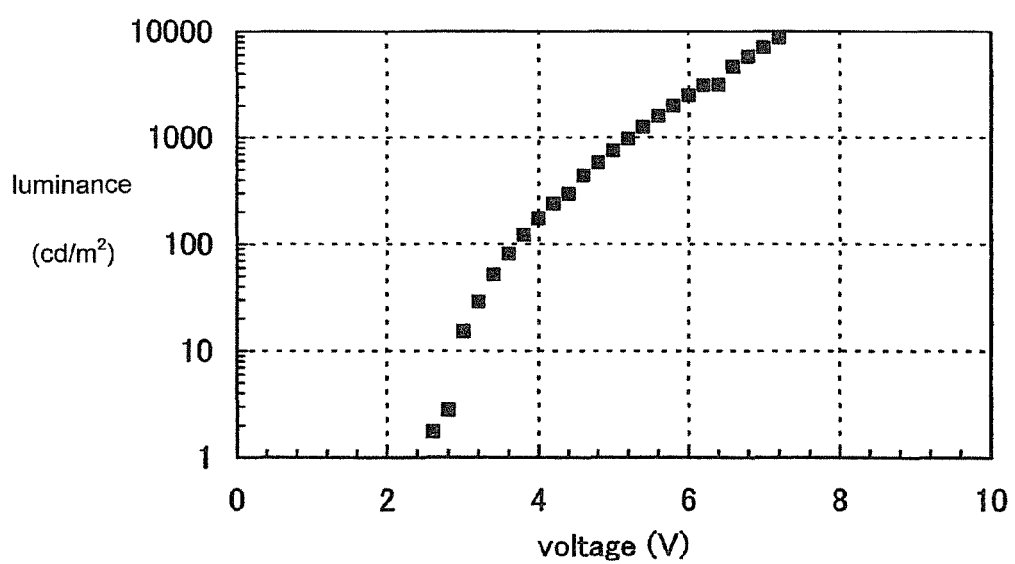
FIG. 36 shows a luminance-voltage characteristic of a light emitting element manufactured in Example 7.
Figure 37:
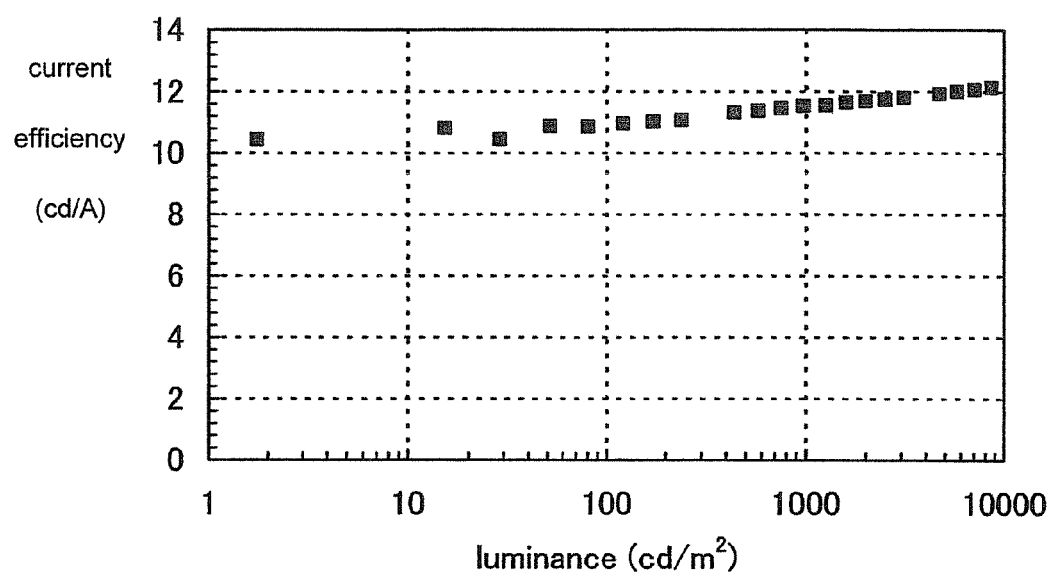
FIG. 37 shows a current efficiency-luminance characteristic of a light emitting element manufactured in Example 7.

FIG. 35 shows that current is made to flow more easily by using the composite material of the invention for the light emitting element. In addition, FIG. 36 shows that a drive voltage of the light emitting element is reduced. FIG. 37 shows that luminous efficiency is improved. It is thought that light extraction efficiency is improved since the composite material of the invention has high visible light transmittance.

In other words, it is found that a drive voltage to obtain light emission with a certain luminance can be reduced by using the composite material of the invention for the light emitting element. Specifically, in the case of the light emitting element which was manufactured in this example, a voltage required to cause light emission with a luminance of 1000 $cd/m^2$ is 5.2 V, and a current density at this time is 8.4 $mA/cm^2$. In other words, it is found that low voltage drive and low current drive become possible by using the composite material of the invention for the light emitting element.

Example 8

In this example, a light emitting element using the composite material of the invention is explained.

First, a first electrode of the light emitting element was formed over a substrate. In this example, the first electrode functions as an anode. With the use of indium tin oxide containing silicon oxide that is a transparent conductive film as a material, an anode having an electrode size of 2 mm×2 mm was formed by a sputtering method.

Next, the substrate, over which the first electrode was formed, was fixed to a substrate holder in a vacuum evaporation apparatus so that the side, on which the first electrode was formed, faced downward. Then, a layer containing PCzPCA1 and molybdenum oxide was formed with a thickness of 50 nm by a co-evaporation method. At this time, the co-evaporation was performed so that a weight ratio of PCzPCA1 to molybdenum oxide was 4:1.

Subsequently, a hole transporting layer was formed of a material having an excellent hole transport property. As a material for forming the hole transporting layer, various kinds of hole transporting materials can be used. In this example, the hole transporting layer was formed using α-NPD with a thickness of 10 n by an evaporation method.

Subsequently, a light emitting layer was formed. Note that holes and electrons are recombined in the light emitting layer to cause light emission. In this example, with the use of $Alq_3$ serving as a host material and coumarin 6 serving as a guest material, the light emitting layer was formed with a thickness of 40 nm by a co-evaporation method so that coumarin 6 was contained in $Alq_3$ in the proportion of 1 wt %.

Then, an electron transporting layer was formed. As a material for forming the electron transporting layer, various kinds of electron transporting materials can be used. In this example, the electron transporting layer was formed using $Alq_3$ with a thickness of 10 nm by an evaporation method.

Subsequently, an electron injecting layer was formed. For the electron injecting layer, various kinds of electron injecting materials can be used. In this example, the electron injecting layer was formed using $Alq_3$ and lithium with a thickness of 30 nm by a co-evaporation method so that lithium was contained in Alq$_3$ in the proportion of 1 wt %.

After forming a layer containing a light emitting material in this manner, which was formed by laminating the layer containing the composite material of the invention, the hole transporting layer, the light emitting layer, the electron transporting layer, and the electron injecting layer, a second electrode was formed by a sputtering method or an evaporation method. In this example, the second electrode functions as a cathode. In this example, the second electrode was formed using Al by an evaporation method.

Figure 38:
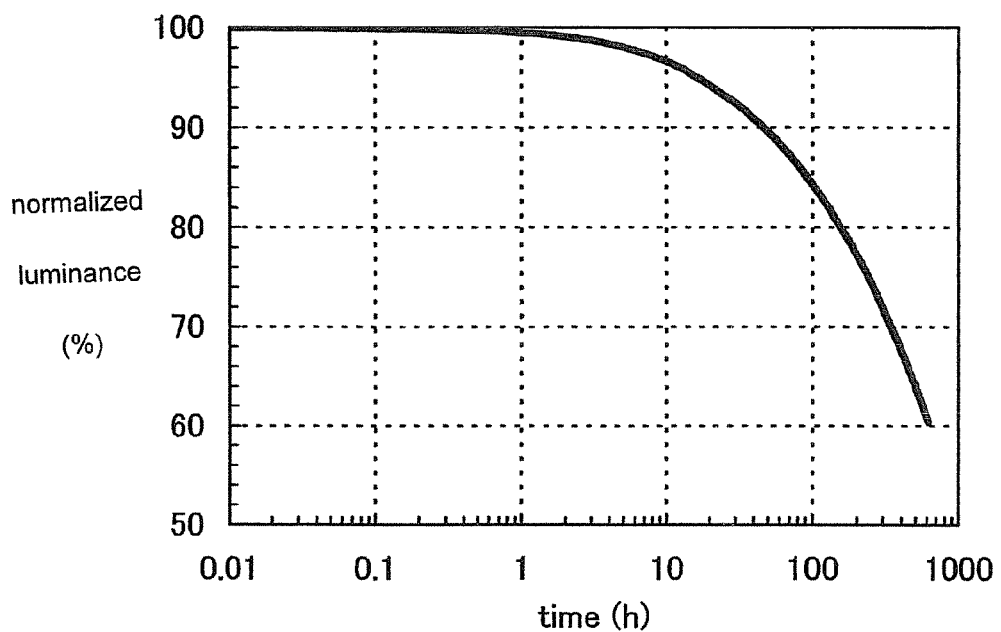
FIG. 38 shows a change over time in normalized luminance of a light emitting element manufactured in Example 7.
Figure 39:
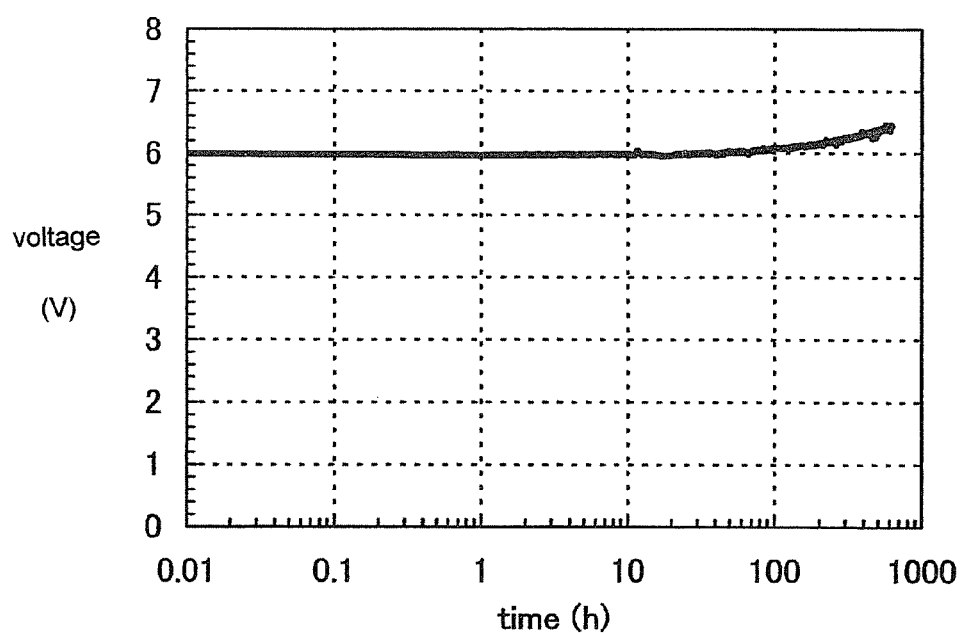
FIG. 39 shows a change over time in voltage of a light emitting element manufactured in Example 7.

In addition, a change over time in normalized luminance of the light emitting element manufactured in this example is shown in FIG. 38, and a change over time in voltage is shown in FIG. 39. As a measurement method, a change over time in luminance and a change over time in voltage were measured while setting an initial luminance at 3000 cd/m$^2$ and keeping a constant current flowing.

FIG. 38 shows that a luminance of the light emitting element manufactured in this example is less decreased due to a change over time. In addition, FIG. 39 shows that a voltage of the light emitting element manufactured in this example is less increased over time. Therefore, it is found that the light emitting element using the composite material of the invention has a long life and high reliability.

Example 9

In this example, a light emitting element using the composite material of the invention is explained.

First, a first electrode of the light emitting element was formed over a substrate. In this example, the first electrode functions as an anode. With the use of indium tin oxide containing silicon oxide that is a transparent conductive film as a material, an anode having an electrode size of 2 mm×2 mm was formed by a sputtering method.

Next, the substrate, over which the first electrode was formed, was fixed to a substrate holder in a vacuum evaporation apparatus so that the side, on which the first electrode was formed, faced downward. Then, a layer containing PCzPCA1 and molybdenum oxide was formed with a thickness of 50 nm by a co-evaporation method. At this time, the co-evaporation was performed so that a weight ratio of PCzPCA1 to molybdenum oxide was 4:2.

Subsequently, a hole transporting layer was formed of a material having an excellent hole transport property. As a material for forming the hole transporting layer, various kinds of hole transporting materials can be used. In this example, the hole transporting layer was formed using α-NPD with a thickness of 10 nm by an evaporation method.

Subsequently, a light emitting layer was formed. Note that holes and electrons are recombined in the light emitting layer to cause light emission. In this example, with the use of Alq$_3$ serving as a host material and coumarin 6 serving as a guest material, the light emitting layer was formed with a thickness of 40 nm by a co-evaporation method so that coumarin 6 was contained in Alq$_3$ in the proportion of 1 wt %.

Then, an electron transporting layer was formed. As a material for forming the electron transporting layer, various kinds of electron transporting materials can be used. In this example, the electron transporting layer was formed using Alq$_3$ with a thickness of 10 nm by an evaporation method.

Subsequently, an electron injecting layer was formed. For the electron injecting layer, various kinds of electron injecting materials can be used. In this example, the electron injecting layer was formed using Alq$_3$ and lithium with a thickness of 10 nm by a co-evaporation method so that lithium was contained in Alq$_3$ in the proportion of 1 wt %.

After forming a layer containing a light emitting material in this manner, which was formed by laminating the layer containing the composite material of the invention, the hole transporting layer, the light emitting layer, the electron transporting layer, and the electron injecting layer, a second electrode was formed by a sputtering method or an evaporation method. In this example, the second electrode functions as a cathode. In this example, the second electrode was formed using Al by an evaporation method. The light emitting element manufactured in this example is referred to as Element 1.

Example 10

In this example, a light emitting element using the composite material of the invention is explained.

First, a first electrode of the light emitting element was formed over a substrate. In this example, the first electrode functions as an anode. With the use of indium tin oxide containing silicon oxide that is a transparent conductive film as a material, an anode having an electrode size of 2 mm×2 mm was formed by a sputtering method.

Next, the substrate, over which the first electrode was formed, was fixed to a substrate holder in a vacuum evaporation apparatus so that the side, on which the first electrode was formed, faced downward. Then, a layer containing PCzPCN1 and molybdenum oxide was formed with a thickness of 50 nm by a co-evaporation method. At this time, the co-evaporation was performed so that a weight ratio of PCzPCN1 to molybdenum oxide was 4:2.

Subsequently, a hole transporting layer was formed of a material having an excellent hole transport property. As a material for forming the hole transporting layer, various kinds of hole transporting materials can be used. In this example, the hole transporting layer was formed using α-NPD with a thickness of 10 nm by an evaporation method.

Subsequently, a light emitting layer was formed. Note that holes and electrons are recombined in the light emitting layer to cause light emission. In this example, with the use of Alq$_3$ serving as a host material and coumarin 6 serving as a guest material, the light emitting layer was formed with a thickness of 40 nm by a co-evaporation method so that coumarin 6 was contained in Alq$_3$ in the proportion of 1 wt %.

Then, an electron transporting layer was formed. As a material for forming the electron transporting layer, various kinds of electron transporting materials can be used. In this example, the electron transporting layer was formed using Alq$_3$ with a thickness of 10 nm by an evaporation method.

Subsequently, an electron injecting layer was formed. For the electron injecting layer, various kinds of electron injecting materials can be used. In this example, the electron injecting layer was formed using Alq$_3$ and lithium with a thickness of 10 nm by a co-evaporation method so that lithium was contained in Alq$_3$ in the proportion of 1 wt %.

After forming a layer containing a light emitting material in this manner, which was formed by laminating the layer containing the composite material of the invention, the hole transporting layer, the light emitting layer, the electron transporting layer, and the electron injecting layer, a second electrode was formed by a sputtering method or an evaporation method. In this example, the second electrode functions as a cathode. In this example, the second electrode was formed using Al by an evaporation method. The light emitting element manufactured in this example is referred to as Element 2.

Figure 43:
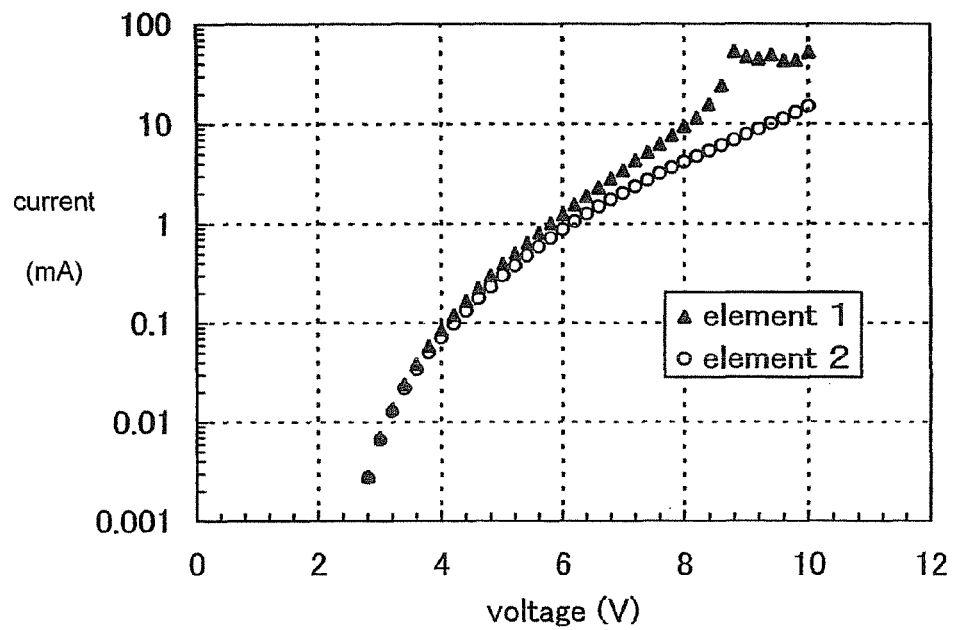
FIG. 43 shows a current-voltage characteristic of a light emitting element manufactured in Examples 9 and 10.
Figure 44:
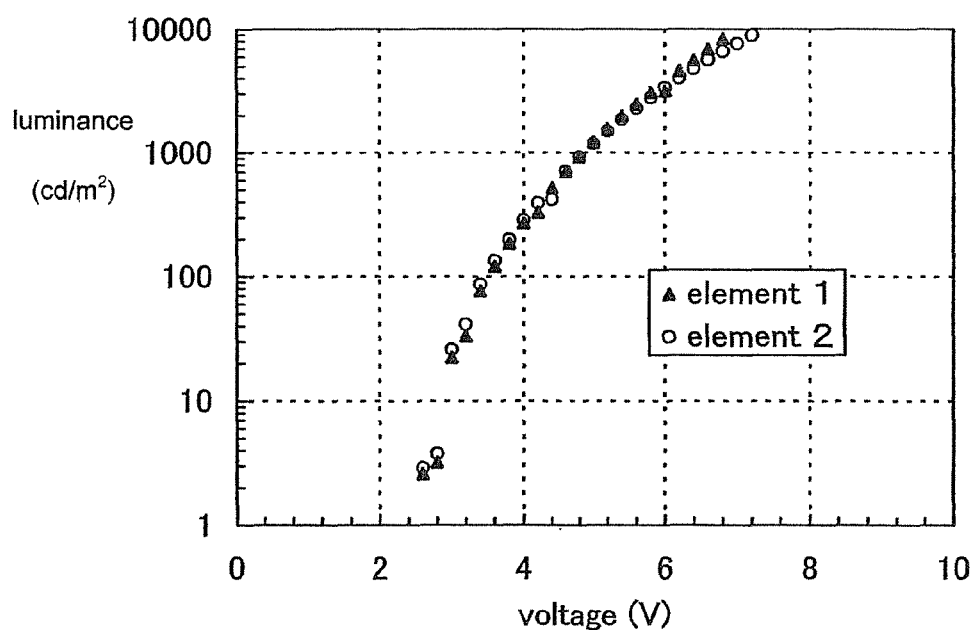
FIG. 44 shows a luminance-voltage characteristic of a light emitting element manufactured in Examples 9 and 10.
Figure 45:
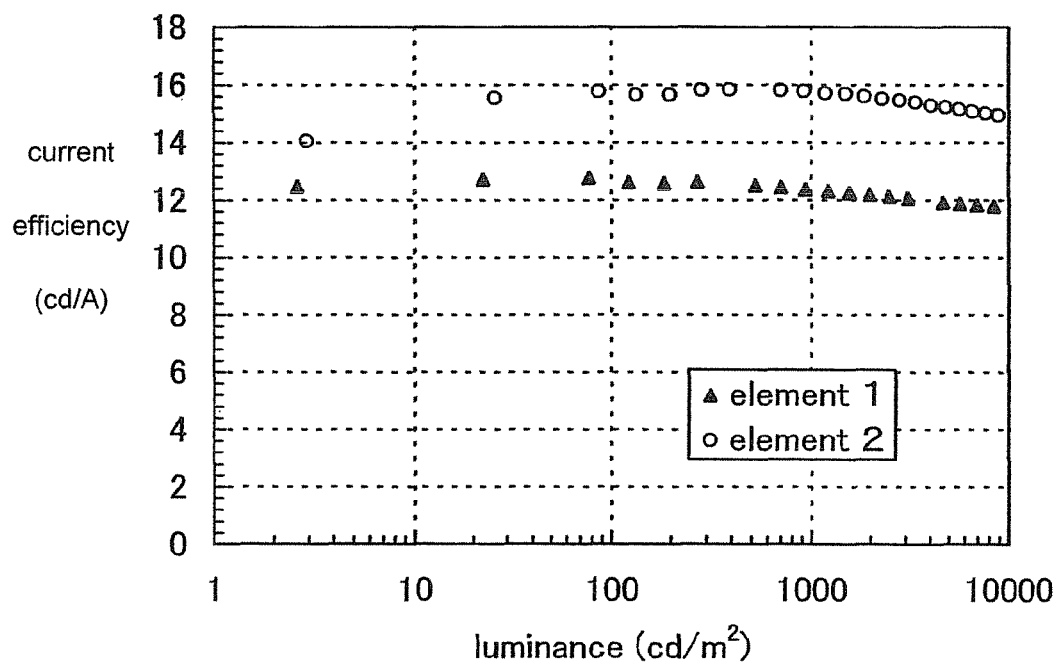
FIG. 45 shows a current efficiency-luminance characteristic of a light emitting element manufactured in Examples 9 and 10.

Current-voltage characteristics of Element 1 manufactured in Example 9 and Element 2 manufactured in Example 10 are shown in FIG. 43; luminance-voltage characteristics thereof, FIG. 44; and current efficiency-luminance characteristics thereof, FIG. 45.

FIG. 43 shows that current is made to flow more easily by using the composite material of the invention for the light emitting element. In addition, FIG. 44 shows that a drive voltage of the light emitting element is reduced. FIG. 45 shows that a luminous efficiency is improved. It is thought that this is because the composite material of the invention has high visible light transmittance, and that light extraction efficiency is improved. It is also thought that luminous efficiency is further improved since a carrier balance of Element 2 is improved.

In other words, it is found that a drive voltage to obtain light emission with a certain luminance can be reduced by using the composite material of the invention for the light emitting element. Specifically, in the case of Element 1, a voltage required to cause light emission with a luminance of 1000 cd/m$^2$ is 5.0 V, and a current density at this time is 9.9 mA/cm$^2$. Further, in the case of Element 2, a voltage required to cause light emission with a luminance of 1000 cd/m$^2$ is 5.0 V, and a current density at this time is 7.5 mA/cm$^2$. In other words, it is found that low voltage drive and low current drive become possible by using the composite material of the invention for the light emitting element.

Example 11

In this example, a light emitting element using the composite material of the invention is explained.

First, a first electrode of the light emitting element was formed over a substrate. In this example, the first electrode functions as an anode. With the use of indium tin oxide containing silicon oxide that is a transparent conductive film as a material, an anode having an electrode size of 2 mm×2 mm was formed by a sputtering method.

Next, the substrate, over which the first electrode was formed, was fixed to a substrate holder in a vacuum evaporation apparatus so that the side, on which the first electrode was formed, faced downward. Then, a layer containing PCzPCA1 and molybdenum oxide was formed with a thickness of 50 nm by a co-evaporation method. At this time, the co-evaporation was performed so that a weight ratio of PCzPCA1 to molybdenum oxide was 4:2.

Subsequently, a hole transporting layer was formed of a material having an excellent hole transport property. As a material for forming the hole transporting layer, various kinds of hole transporting materials can be used. In this example, the hole transporting layer was formed using α-NPD with a thickness of 10 nm by an evaporation method.

Subsequently, a light emitting layer was formed. Note that holes and electrons are recombined in the light emitting layer to cause light emission. In this example, with the use of Alq$_3$ serving as a host material and coumarin 6 serving as a guest material, the light emitting layer was formed with a thickness of 40 nm by a co-evaporation method so that coumarin 6 was contained in Alq$_3$ in the proportion of 1 wt %.

Then, an electron transporting layer was formed. As a material for forming the electron transporting layer, various kinds of electron transporting materials can be used. In this example, the electron transporting layer was formed using Alq$_3$ with a thickness of 10 nm by an evaporation method.

Subsequently, an electron injecting layer was formed. For the electron injecting layer, various kinds of electron injecting materials can be used. In this example, the electron injecting layer was formed using Alq$_3$ and lithium with a thickness of 10 nm by a co-evaporation method so that lithium was contained in Alq$_3$ in the proportion of 1 wt %.

Next, a layer containing PCzPCA1 and molybdenum oxide was formed with a thickness of 20 nm by a co-evaporation method. At this time, the co-evaporation was performed so that a weight ratio of PCzPCA1 to molybdenum oxide was 4:2.

After forming a layer containing a light emitting material in this manner, which was formed by laminating the layer containing the composite material of the invention, the hole transporting layer, the light emitting layer, the electron transporting layer, the electron injecting layer, and the layer containing the composite material of the invention, a second electrode was formed by a sputtering method or an evaporation method. In this example, the second electrode functions as a cathode. In this example, the second electrode was formed using Al by an evaporation method. The light emitting element manufactured in this example is referred to as Element 3.

Example 12

In this example, a light emitting element using the composite material of the invention is explained.

First, a first electrode of the light emitting element was formed over a substrate. In this example, the first electrode functions as an anode. With the use of indium tin oxide containing silicon oxide that is a transparent conductive film as a material, an anode having an electrode size of 2 mm×2 mm was formed by a sputtering method.

Next, the substrate, over which the first electrode was formed, was fixed to a substrate holder in a vacuum evaporation apparatus so that the side, on which the first electrode was formed, faced downward. Then, a layer containing PCzPCN1 and molybdenum oxide was formed with a thickness of 50 nm by a co-evaporation method. At this time, the co-evaporation was performed so that a weight ratio of PCzPCN1 to molybdenum oxide was 4:2.

Subsequently, a hole transporting layer was formed of a material having an excellent hole transport property. As a material for forming the hole transporting layer, various kinds of hole transporting materials can be used. In this example, the hole transporting layer was formed using α-NPD with a thickness of 10 nm by an evaporation method.

Subsequently, a light emitting layer was formed. Note that holes and electrons are recombined in the light emitting layer to cause light emission. In this example, with the use of Alq$_3$ serving as a host material and coumarin 6 serving as a guest material, the light emitting layer was formed with a thickness of 40 nm by a co-evaporation method so that coumarin 6 was contained in Alq$_3$ in the proportion of 1 wt %.

Then, an electron transporting layer was formed. As a material for forming the electron transporting layer, various kinds of electron transporting materials can be used. In this example, the electron transporting layer was formed using Alq$_3$ with a thickness of 10 nm by an evaporation method.

Subsequently, an electron injecting layer was formed. For the electron injecting layer, various kinds of electron injecting materials can be used. In this example, the electron injecting layer was formed using Alq$_3$ and lithium with a thickness of 10 nm by a co-evaporation method so that lithium was contained in Alq$_3$ in the proportion of 1 wt %.

Next, a layer containing PCzPCN1 and molybdenum oxide was formed with a thickness of 20 nm by a co-evaporation method. At this time, the co-evaporation was performed so that a weight ratio of PCzPCN1 to molybdenum oxide was 4:2.

After forming a layer containing a light emitting material in this manner, which was formed by laminating the layer containing the composite material of the invention, the hole transporting layer, the light emitting layer, the electron transporting layer, the electron injecting layer, and the layer containing the composite material of the invention, a second electrode was formed by a sputtering method or an evaporation method. In this example, the second electrode functions as a cathode. In this example, Al was evaporated by an evaporation method. The light emitting element manufactured in this example is referred to as Element 4.

Figure 46:
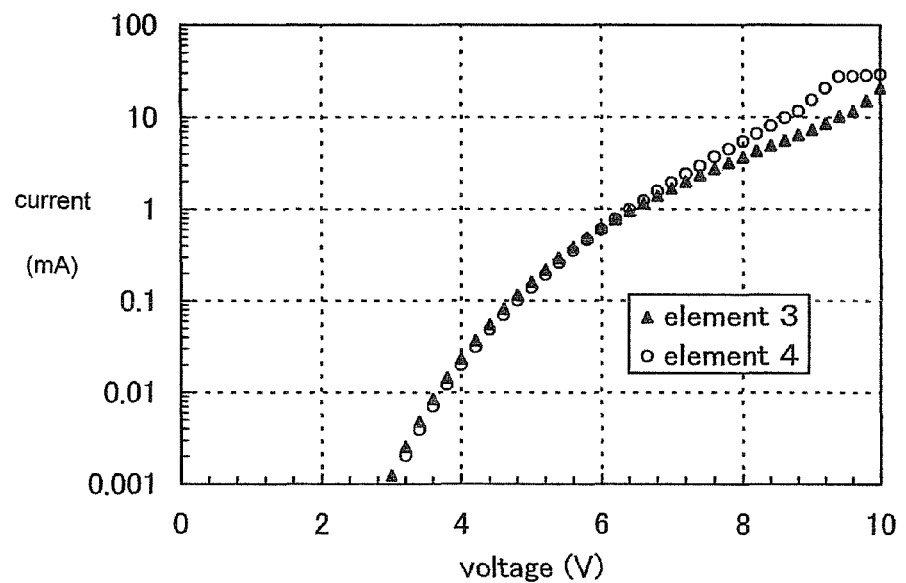
FIG. 46 shows a current-voltage characteristic of a light emitting element manufactured in Examples 11 and 12.
Figure 47:
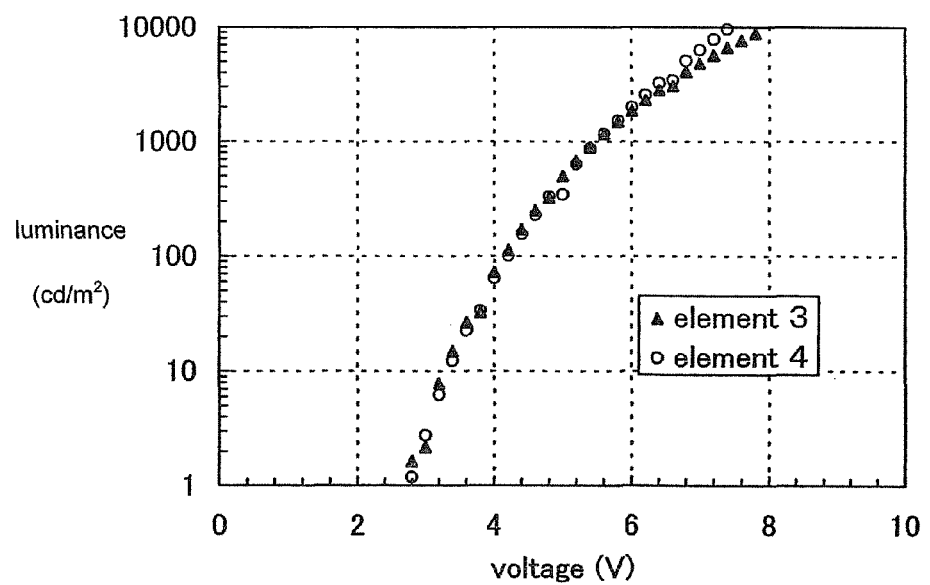
FIG. 47 shows a luminance-voltage characteristic of a light emitting element manufactured in Examples 11 and 12.
Figure 48:
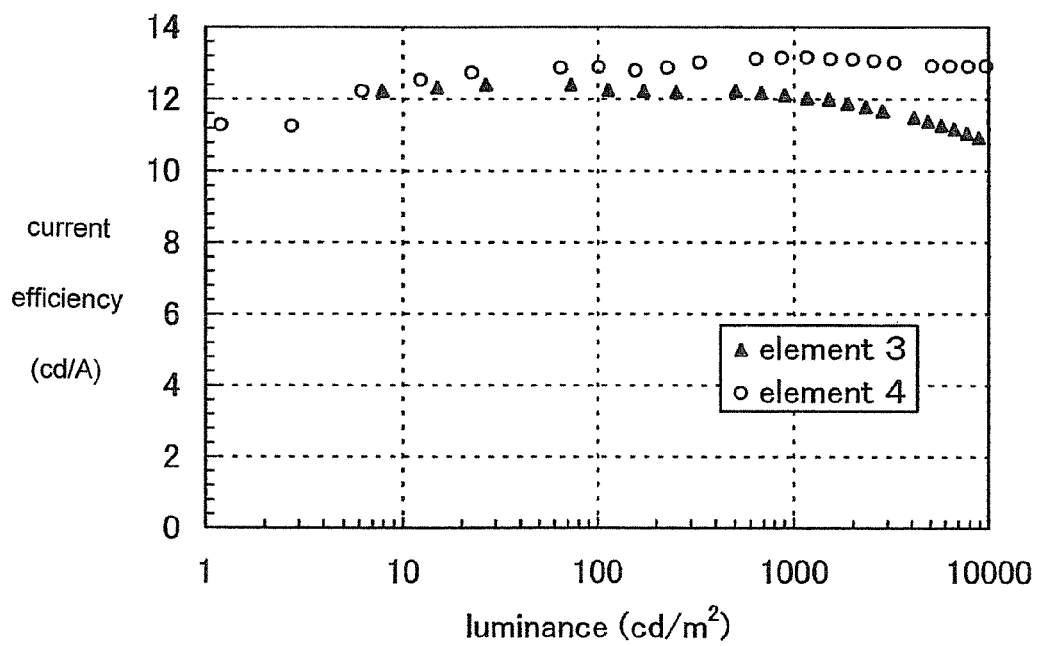
FIG. 48 shows a current efficiency-luminance characteristic of a light emitting element manufactured in Examples 11 and 12.

Current-voltage characteristics of Element 3 manufactured in Example 11 and Element 4 manufactured in Example 12 are shown in FIG. 46; luminance-voltage characteristics thereof, FIG. 47; and current efficiency-luminance characteristics thereof, FIG. 48.

FIG. 46 shows that current is made to flow more easily by using the composite material of the invention for the light emitting element. In addition, FIG. 47 shows that a drive voltage of the light emitting element is reduced. FIG. 48 shows that luminous efficiency is improved. It is thought that light extraction efficiency is improved since the composite material of the invention has high visible light transmittance.

In other words, it is found that a drive voltage to obtain light emission with a certain luminance can be reduced by using the composite material of the invention for the light emitting element. Specifically, in the case of Element 3, a voltage required to cause light emission with a luminance of 1000 cd/m$^2$ is 5.6 V, and a current density at this time is 9.7 mA/cm$^2$. Further, in the case of Element 4, a voltage required to cause light emission with a luminance of 1000 cd/m$^2$ is 5.6 V, and a current density at this time is 8.8 mA/cm$^2$. In other words, it is found that low voltage drive and low current drive become possible by using the composite material of the invention for the light emitting element.

Example 13

Figure 51A:
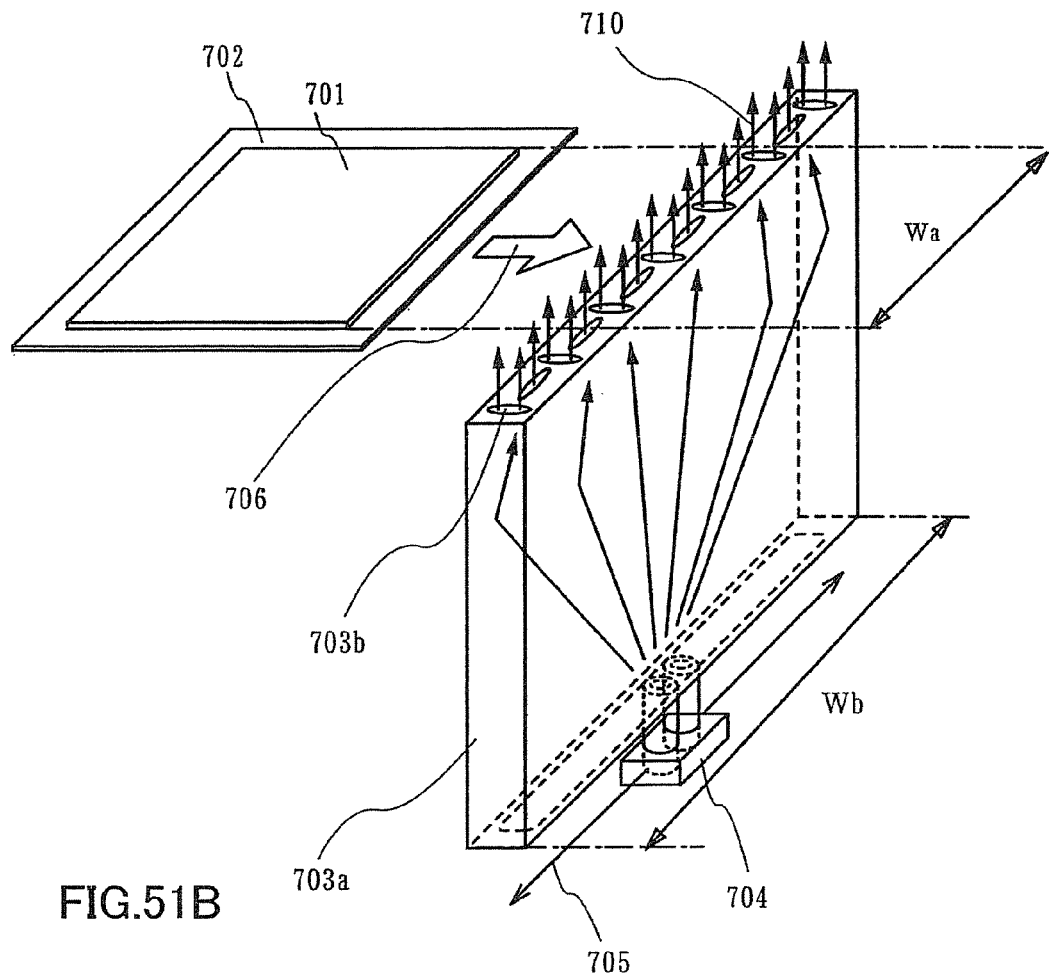
FIGS. 51A and 51B are perspective views of an evaporation apparatus.

In this example, an evaporation apparatus for forming a layer containing the composite material of the invention is explained. A perspective view of an example of an evaporation apparatus is shown in FIG. 51A. The mechanism of the evaporation apparatus is briefly described below.

A substrate 701 is aligned with an evaporation mask 702 in advance. The substrate is transported in the direction indicated by an arrow 706 in the aligned state. The substrate is transported so as to pass over an evaporation shield 703a. The evaporation shield 703a has an opening 703b, and an evaporation material from an evaporation source 704 is sublimated through the opening 703b. The evaporation shield 703a is heated so that the evaporation material does not adhere to the evaporation shield itself, in order to keep a sublimation direction (the direction indicated by an arrow 710) of the evaporation material.

The evaporation source 704 can be provided with a plurality of crucibles, and can be moved in the direction indicated by an arrow 705. A resistance-heating method is used as an evaporation method. Further, the range of movement of the evaporation source is desirably broader than a width of the substrate Wa. Further, a width of the evaporation shield Wb is also preferably broader than the width of the substrate Wa, so that uniformity of the thickness of an evaporated film is improved.

In other words, the evaporation apparatus shown in FIG. 51A includes a film formation chamber provided with an evaporation shield for keeping a sublimation direction of an evaporation material, and the evaporation shield is provided with a plurality of openings. The evaporation material is sublimated through the plurality of openings. An evaporation source, which is movable in a direction perpendicular to the moving direction (also referred to as a transfer direction) of a substrate, is provided under the evaporation shield. Further, the width Wb of the evaporation shield is broader than the width of the substrate Wa, so that uniformity of the thickness of an evaporated film is improved.

Note that, in the evaporation apparatus in FIG. 51A, the shape and the number of the opening 703b are not limited in particular.

Figure 51B:
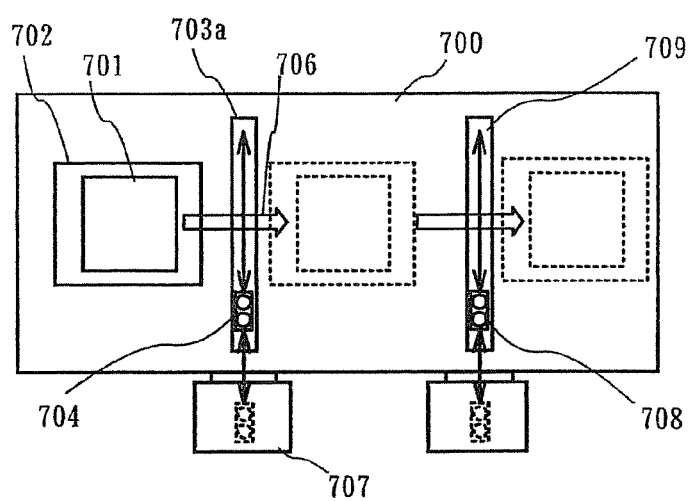

In order to supply an evaporation material to the crucible in the evaporation source, a setting chamber may be provided which connects to the film formation chamber through a gate. Further, a plurality of evaporation sources and evaporation shields may be provided in one film formation chamber. A top-view of an evaporation apparatus, in which a plurality of evaporation sources and setting chambers are provided, is shown in FIG. 51B. A setting chamber 707 is provided in the moving direction of the evaporation source (in the direction indicated by the arrow 705). The evaporation material may be supplied by moving the evaporation source to the setting chamber. In the case where the evaporation source is fixed in the film formation chamber, the evaporation material is supplied to the evaporation source necessarily in the film formation chamber at an atmospheric pressure. Therefore, it takes time to evacuate the film formation chamber for re-evaporation. When the setting chamber 707 is provided, atmospheric pressure and vacuum can be switched only in the setting chamber 707 while the vacuum is kept in the film formation chamber 700; thus, the evaporation material can be supplied in a short time.

Further, a second evaporation shield 709 may be provided in parallel to the evaporation shield 703a, and a second evaporation source 708 which moves in the direction perpendicular to the transfer direction of the substrate may be provided. A plurality of evaporation sources may be provided in one film formation chamber, which enables continuous formation of a laminated layer. Here, an example of providing two evaporation sources in one film formation chamber is described; however, more than two evaporation sources may be provided in one film formation chamber.

In other words, one film formation chamber may be provided with two evaporation shields in the direction perpendicular to the transfer direction of the substrate, and each evaporation shield may be provided with an evaporation source to continuously evaporate the same evaporation material. Film formation speed can be improved with the use of such an evaporation apparatus. Note that the two evaporation shields are provided in parallel to each other with enough distance therebetween.

Alternatively, different evaporation materials may be set in two evaporation sources to continuously form a laminated layer. For example, a first organic compound (carbazole derivative) and an inorganic compound are separately set in two crucibles of a first evaporation source, and a substrate is passed over the first evaporation source, so that a layer containing the composite material of the invention is evaporated over the substrate. Subsequently, the substrate is moved, a second organic compound is set in a crucible of a second evaporation source, and the substrate is passed over the second evaporation source, so that a light emitting layer can be evaporated over the layer containing the composite material of the invention.

Example 14

Figure 52:
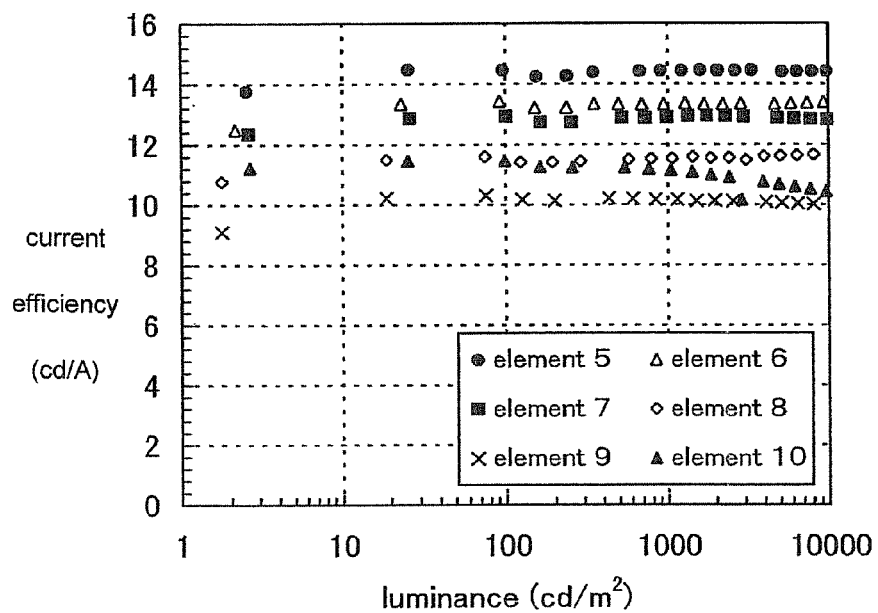
FIG. 52 shows a current efficiency-luminance characteristic of an element manufactured in Example 14.
Figure 53:
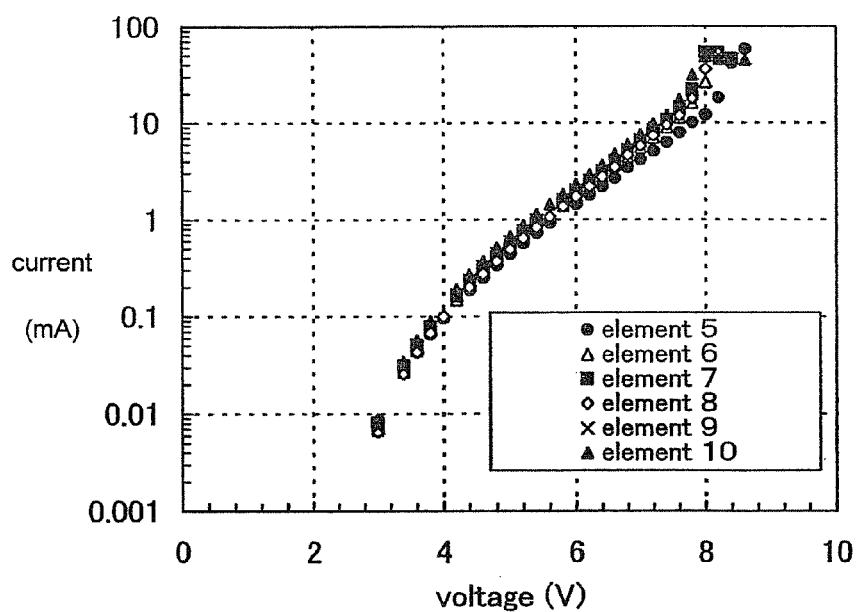
FIG. 53 shows a current-voltage characteristic of an element manufactured in Example 14.
Figure 54:
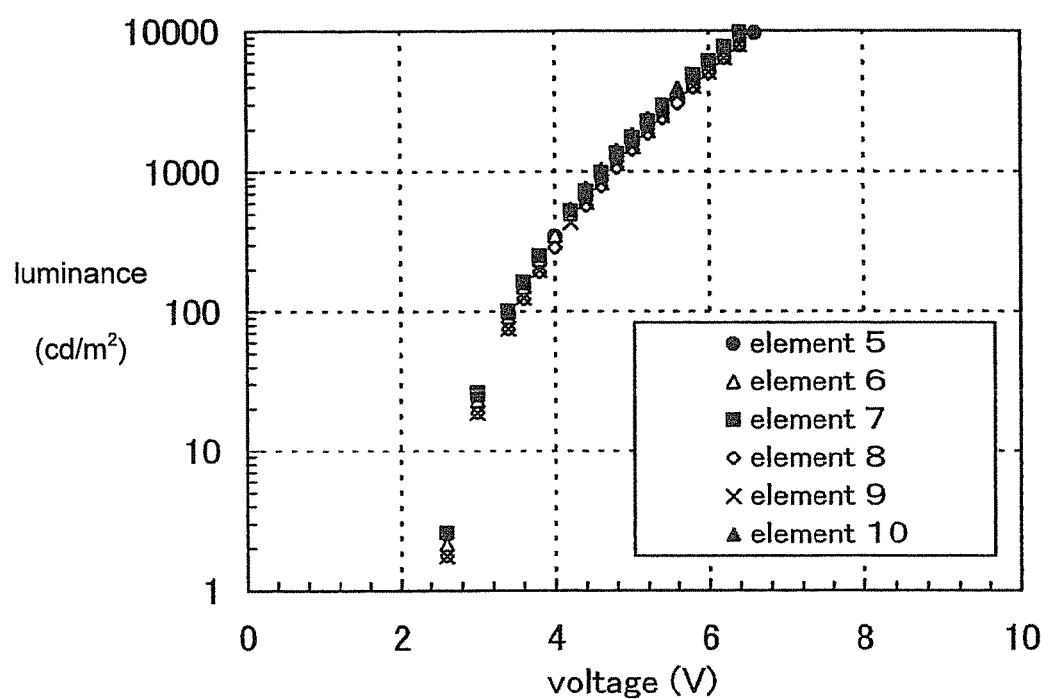
FIG. 54 shows a luminance-voltage characteristic of an element manufactured in Example 14.

In this example, element characteristics of a plurality of light emitting elements, each of which has a different mixing ratio of an organic compound and an inorganic compound in a layer containing a composite material, are explained, which area shown in FIGS. 52 to 54. An element composition of a light emitting element manufactured in this example is as shown in Table 1.

TABLE 1

|  | anode | layer containing composite material | hole transporting layer | light emitting layer | electron transporting layer | electron injecting layer | cathode |
|---|---|---|---|---|---|---|---|
| material | ITSO | PCzPCN1:MoOx | NPB | Alq:C6(1:0.01) | Alq | LiF | Al |
| thickness (nm) | — | 50 | 10 | 40 | 40 | 1 | — |

First, a method for manufacturing a light emitting element manufactured in this example is explained. A first electrode of the light emitting element was formed over a substrate. In this example, the first electrode functions as an anode. With the use of indium tin oxide containing silicon oxide that is a transparent conductive film as a material, an anode having an electrode size of 2 mm×2 mm was formed by a sputtering method.

Next, the substrate, over which the first electrode was formed, was fixed to a substrate holder in a vacuum evaporation apparatus so that the side, on which the first electrode was formed, faced downward. Then, a layer which contains a composite material including PCzPCN1 and molybdenum oxide was formed with a thickness of 50 nm by a co-evaporation method.

Subsequently, a hole transporting layer was formed of a material having an excellent hole transport property. As a material for forming the hole transporting layer, various kinds of hole transporting materials can be used. In this example, the hole transporting layer was formed using α-NPD with a thickness of 10 nm.

Subsequently, a light emitting layer was formed. Holes and electrons are recombined in this light emitting layer, so that light emission can be obtained. In this example, a host-guest light emitting layer was formed as the light emitting layer, and $Alq_3$ was used as a host material and coumarin 6 was used as a guest material. The light emitting layer was formed with a thickness of 40 nm by a co-evaporation method so that a weight ratio of $Alq_3$ to coumarin 6 was 1:0.01.

After forming the light emitting layer, an electron transporting layer was formed subsequently. As a material for forming the electron transporting layer, various kinds of electron transporting materials can be used. In this example, the electron transporting layer was formed using $Alq_3$ with a thickness of 40 nm by an evaporation method.

Subsequently, an electron injecting layer was formed. For the electron injecting layer, various kinds of electron injecting materials can be used. In this example, the electron injecting layer was formed by evaporating lithium fluoride with a thickness of 1 nm.

Lastly, a second electrode was formed, thereby manufacturing the light emitting element of this example. In this example, the second electrode was formed using Al by an evaporation method.

Note that in this example, six kinds of light emitting elements (Elements 5 to 10), each of which has a different mixing ratio of an organic compound and an inorganic compound in the layer containing the composite material, were manufactured. Data thereof are shown in FIGS. 52 to 54. Note that a mixing ratio (PCzPCN1:molybdenum oxide) of each element is expressed by a weight ratio, and that of Element 5 is 4:0.5; Element 6, 4:1; Element 7, 4:2; Element 8, 4:3; Element 9, 4:4; and Element 10, 4:5.

FIG. 52 shows current efficiency-luminance characteristics of Elements 5 to 10. According to this, within the range of mixing ratios of the composite material in the light emitting elements manufactured in this example, it is found that current efficiency becomes more favorable as the amount of the inorganic compound in the layer containing the composite material becomes smaller.

FIG. 53 shows current-voltage characteristics of Elements 5 to 10. According to this, within the range of mixing ratios of the composite material in the light emitting elements manufactured in this example, it is found that a current-voltage characteristic becomes more favorable as the amount of the inorganic compound in the layer containing the composite material becomes larger.

FIG. 54 shows luminance-voltage characteristics of Elements 5 to 10. According to this, within the range of mixing ratios of the composite material in the light emitting elements manufactured in this example, it is found that every element exhibits a favorable luminance-voltage characteristic.

Figure 67:
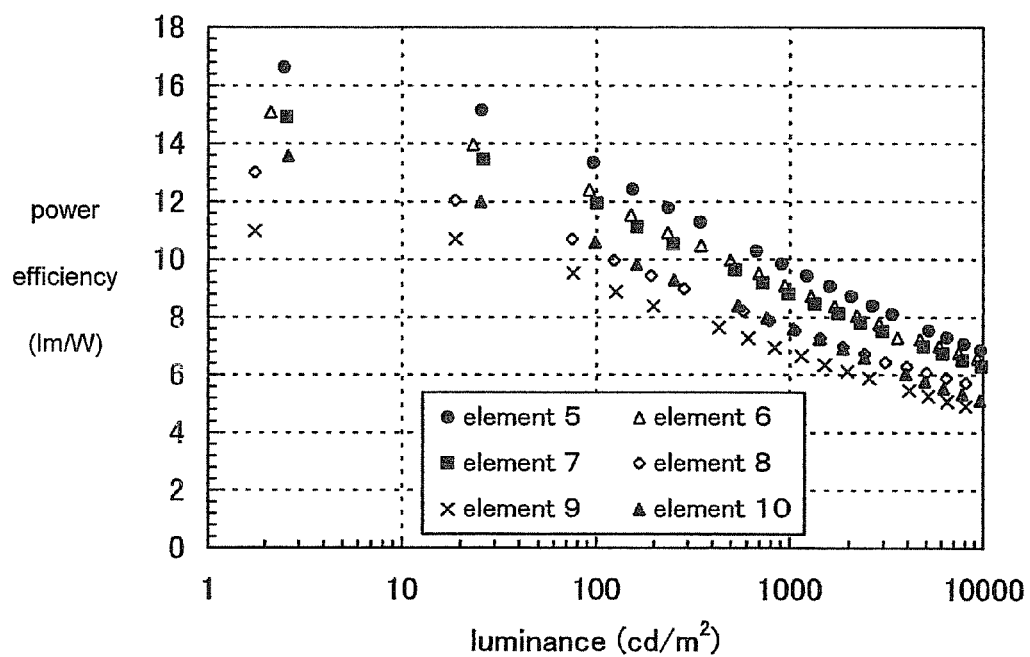
FIG. 67 shows a power efficiency-luminance characteristic of a light emitting element manufactured in Example 14.

In addition, FIG. 67 shows power efficiency-luminance characteristics of Elements 5 to 10 manufactured in this example. Higher power efficiency means lower power consumption. According to FIG. 67, within the range of mixing ratios of the composite material in the light emitting elements manufactured in this example, it is found that power efficiency becomes more favorable as the amount of the inorganic compound in the layer containing the composite material becomes smaller.

Example 15

In this example, a specific example of a layer containing the carbazole derivative represented by General Formula (1) and an inorganic compound which exhibits an electron accepting property to the carbazole derivative is given. As the carbazole derivative, PCzPCN1 was used, and as the inorganic compound, molybdenum oxide was used.

First, a glass substrate was fixed to a substrate holder in a vacuum evaporation apparatus. Next, PCzPCN1 and molybdenum oxide (VI) were separately put in different resistance-heating evaporation sources, and a layer containing PCzPCN1 and molybdenum oxide was formed under reduced pressure by a co-evaporation method. At this time, the co-evaporation was performed so that a weight ratio of PCzPCN1 to molybdenum oxide was 4:2. Note that a thickness thereof was 100 nm.

Figure 55:
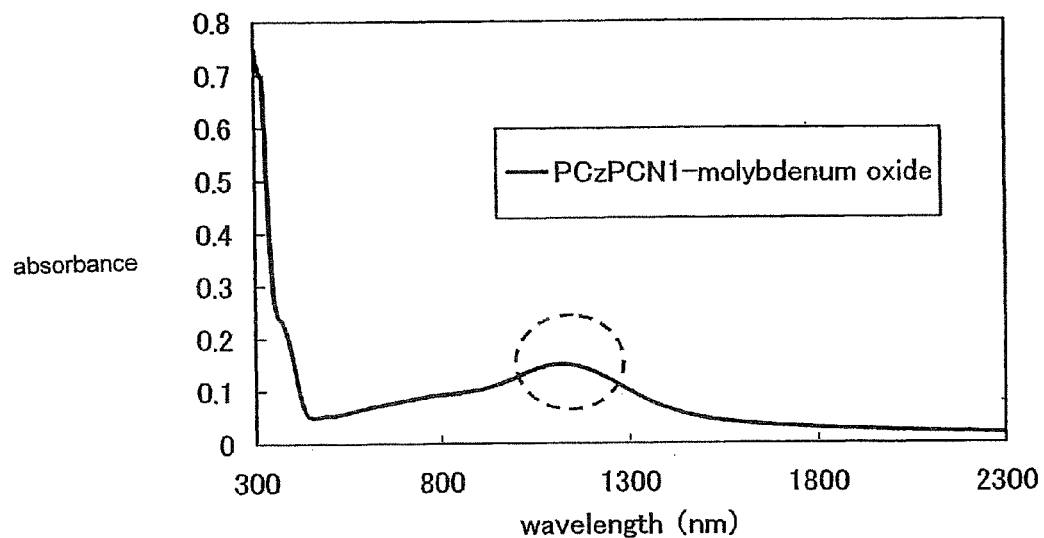
FIG. 55 shows an absorption spectrum of a composite material of the present invention.

A measurement result of an absorption spectrum of the PCzPCN1-molybdenum oxide mixed film which was formed in this manner is shown in FIG. 55.

As FIG. 55 shows, new absorption, which was not seen in the film of only PCzPCN1, was observed in the PCzPCN1-molybdenum oxide mixed film (a portion surrounded by dotted line in the diagram, and there is a peak in the vicinity of 1120 nm). It is thought that this is because molybdenum oxide exhibits an electron accepting property to PCzPCN1, and molybdenum oxide accepts electrons from PCzPCN1 and holes are generated in PCzPCN1.

Consequently, the PCzPCN1-molybdenum oxide mixed film formed in this example, in which carriers are generated internally, can reduce a drive voltage of a light emitting element.

In addition, as FIG. 55 shows, notable absorption was not observed in a visible light region (400 nm to 700 nm) as for the PCzPCN1-molybdenum oxide mixed film.

Example 16

Figure 56:
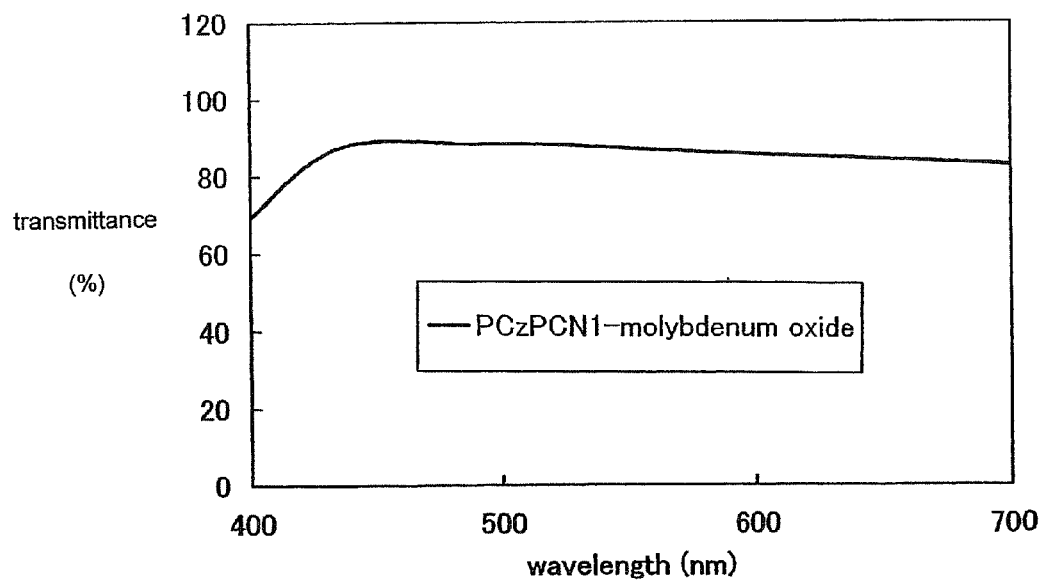
FIG. 56 shows transmittance of a composite material of the present invention.

Next, visible light transmittance of the mixed film manufactured in Example 15 is shown in FIG. 56.

A diagram where the vertical axis of FIG. 55 is converted from absorbance into transmittance is shown in FIG. 56. Note that a wavelength of the horizontal axis is limited to a visible light region (400 nm to 700 nm) in FIG. 56. As FIG. 56 shows, a transmittance in the visible light region of the PCzPCN1-molybdenum oxide mixed film manufactured in Example 15 shows approximately 90% or more.

Figure 72:
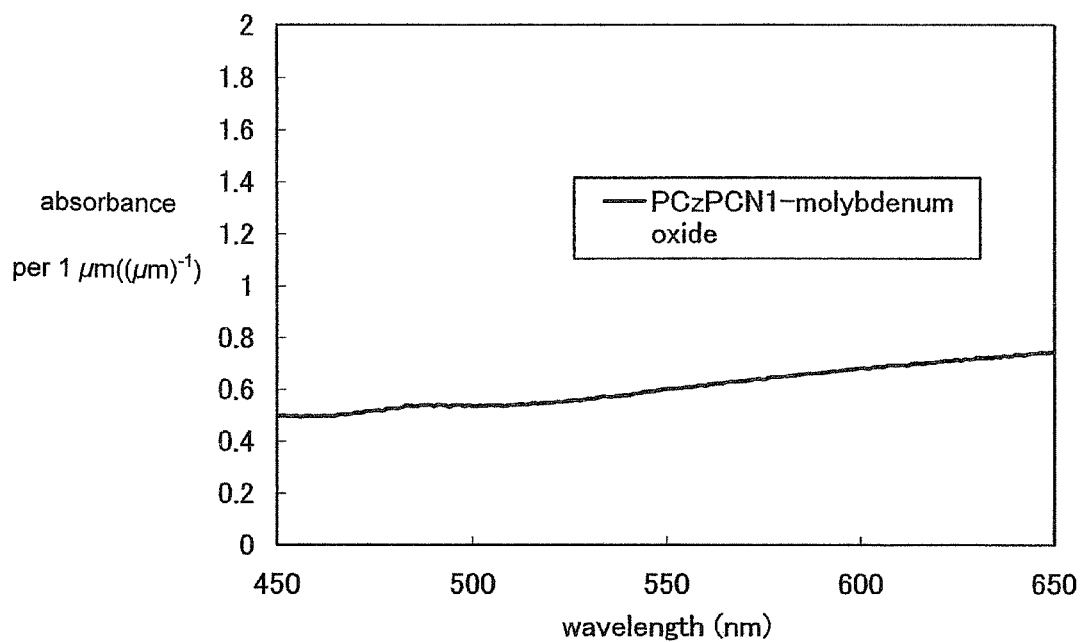
FIG. 72 shows absorbance per micrometer of a composite material of the present invention.

In addition, absorbance per micrometer in the range of blue (450 nm) to red (650 nm) of the PCzPCN1-molybdenum oxide mixed film manufactured in Example 15 is shown in FIG. 72. As FIG. 72 shows, absorbance per micrometer of the composite material of the invention is 2 $(\mu m)^{-1}$ or less, and is low in the range of blue (450 nm) to red (650 nm). Therefore, the composite material of the invention has high light transmittance at blue (450 nm), green (520 nm), and red (650 mm), and is suitable for a full-color display.

According to the above, it is found that the composite material of the invention is superior in visible light transmittance to a conventional composite material.

Example 17

In this example, a current-voltage characteristic of a layer containing the composite material of the invention was measured.

First, indium tin oxide containing silicon oxide (ITSO) was evaporated over a glass substrate by a sputtering method to form a first electrode. Note that the first electrode was formed to have a size of 2 mm×2 mm.

Subsequently, the substrate, over which the first electrode was formed, was fixed to a substrate holder in a vacuum evaporation apparatus so that the side, on which the first electrode was formed, faced downward.

Thereafter, a layer formed of the composite material of the invention was formed by co-evaporating PCzPCN1 and molybdenum oxide (VI) over the first electrode after evacuating the vacuum evaporation apparatus and reducing pressure. A thickness thereof was 200 nm. Note that the co-evaporation method is an evaporation method by which evaporation is performed simultaneously from a plurality of evaporation sources in one treatment chamber. A weight ratio of PCzPCN1 to molybdenum oxide (VI) was adjusted to be 4:2.

By evaporating aluminum (Al) using a resistance-heating evaporation method over the layer containing the composite material of the invention, a second electrode was formed, thereby manufacturing a light emitting element of the invention.

A current-voltage characteristic was measured by a two-terminal method, considering the case where ITSO is an anode and Al is a cathode, as a forward direction and the case where ITSO is a cathode and Al is an anode, as a reverse direction.

Figure 57:
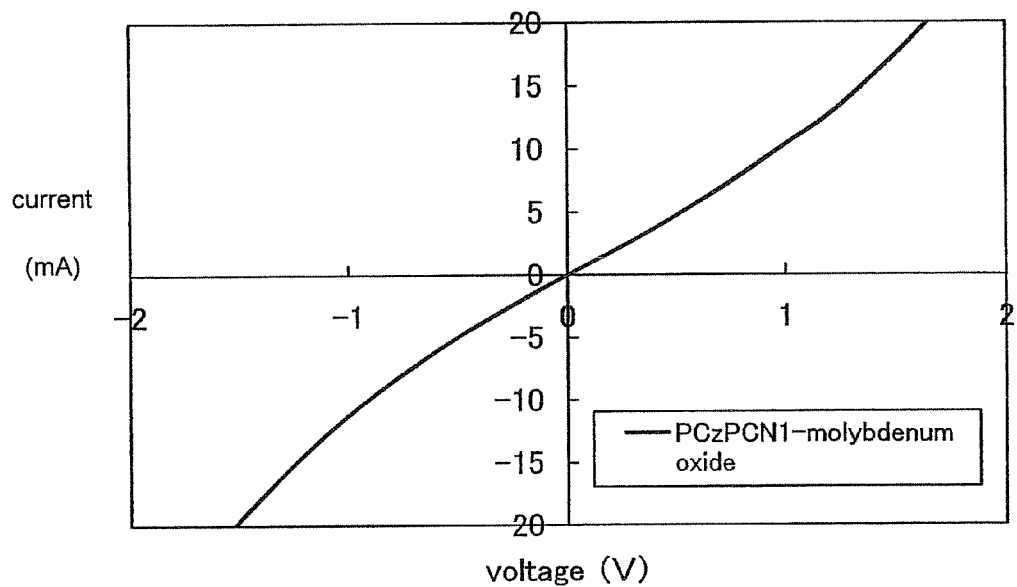
FIG. 57 shows a current-voltage characteristic of an element manufactured in Example 17.

A result of a current-voltage characteristic at room temperature (25° C.) is shown in FIG. 57. It is found that current flows in both the forward direction and the reverse direction in the element manufactured in this example, and that its current-voltage characteristic is symmetrical with respect to the origin. Since the current-voltage characteristic has symmetry in spite of using different electrodes of ITSO and Al, it is thought that an interface between the electrode and the layer containing the composite material of the invention does not form a Schottky contact.

Example 18

Figure 58:
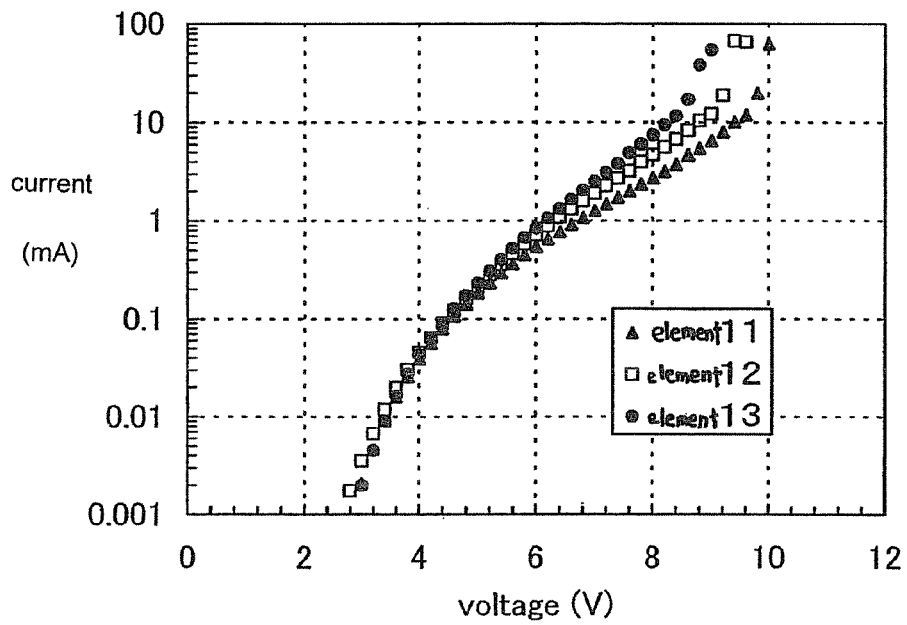
FIG. 58 shows a current-voltage characteristic of an element manufactured in Example 18.
Figure 59:
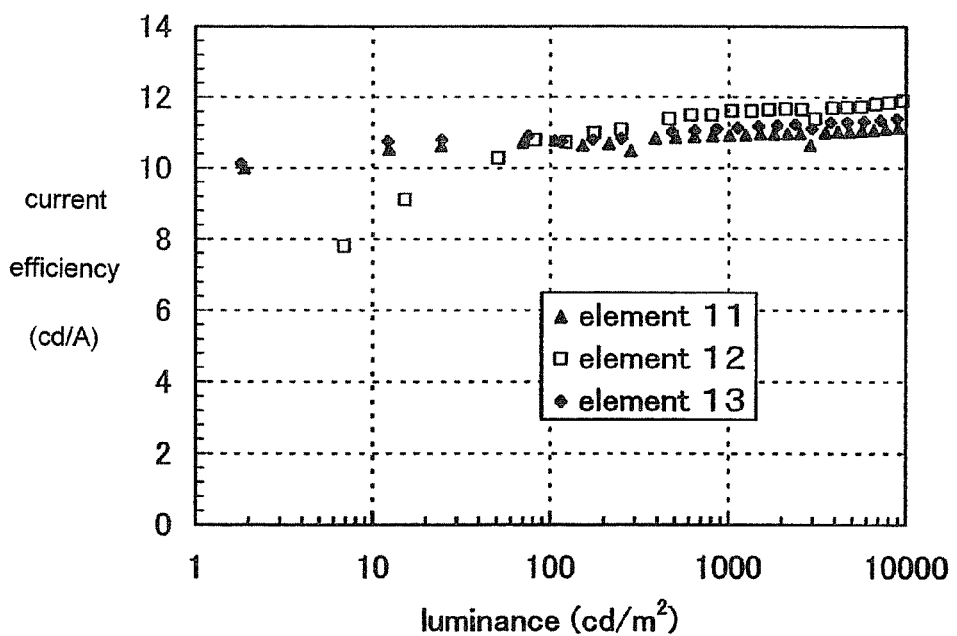
FIG. 59 shows a current efficiency-luminance characteristic of an element manufactured in Example 18.
Figure 60:
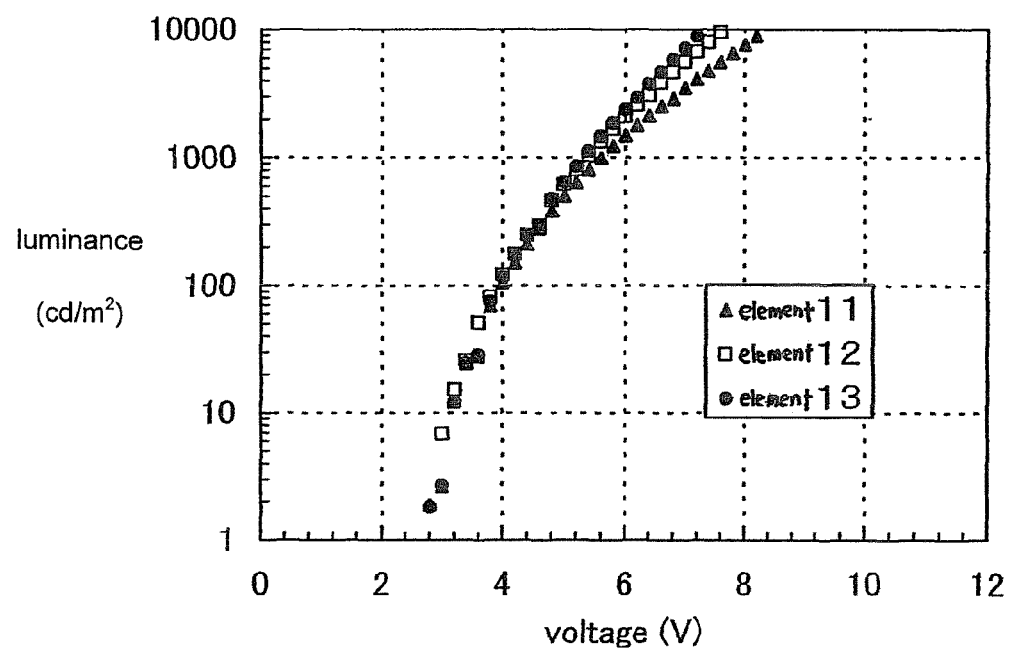
FIG. 60 shows a luminance-voltage characteristic of an element manufactured in Example 18.

In this example, a light emitting element having a layer containing a composite material was manufactured, and an influence of a mixing ratio of an organic compound and an inorganic compound on an emission property of the element was examined. Results thereof are shown in FIGS. 58 to 60. An element composition of the light emitting element manufactured in this example is as shown in Table 2.

TABLE 2

|  | anode | layer containing composite material | hole transporting layer | light emitting layer | electron transporting layer | electron injecting layer | cathode |
| --- | --- | --- | --- | --- | --- | --- | --- |
| material | ITSO | PCzPCN1:MoOx | NPB | Alq:C6(1:0.01) | Alq | LiF | Al |
| thickness (nm) | — | 120 | 10 | 40 | 30 | 1 | — |

First, a method for manufacturing the light emitting element manufactured in this example is explained. A first electrode of the light emitting element was formed over a substrate. In this example, the first electrode functions as an anode. With the use of indium tin oxide containing silicon oxide that is a transparent conductive film as an electrode material, the first electrode was formed by a sputtering method.

Next, the substrate, over which the first electrode was formed, was fixed to a substrate holder in a vacuum evaporation apparatus so that the side, on which the first electrode was formed, faced downward. Then, a layer which contains a composite material including PCzPCN1 and molybdenum oxide was formed with a thickness of 120 nm by a co-evaporation method.

Subsequently, a hole transporting layer was formed of a material having an excellent hole transport property. As a material for forming the hole transporting layer, various kinds of hole transporting materials can be used. In this example, the hole transporting layer was formed using α-NPD with a thickness of 10 nm.

Therefore, a light emitting layer was formed. Holes and electrons are recombined in this light emitting layer, so that light emission can be obtained. In this example, a host-guest light emitting layer was formed as the light emitting layer, and $Alq_3$ was used as a host material and coumarin 6 was used as a guest material. The light emitting layer was formed with a thickness of 40 nm by a co-evaporation method so that a weight ratio of $Alq_3$ to coumarin 6 was 1:0.01.

After the light emitting layer was formed, an electron transporting layer was formed subsequently. As a material for forming the electron transporting layer, various kinds of electron transporting materials can be used. In this example, the electron transporting layer was formed using $Alq_3$ with a thickness of 30 nm by an evaporation method.

Subsequently, an electron injecting layer was formed. For the electron injecting layer, various kinds of electron injecting materials can be used. In this example, the electron injecting layer was formed by evaporating lithium fluoride with a thickness of 1 nm.

Lastly, a second electrode was formed, thereby manufacturing the light emitting element of this example. In this example, the second electrode was formed by evaporating Al with a thickness of 200 nm by an evaporation method.

Note that in this example, three kinds of light emitting elements (Elements 11 to 13), each of which has a different mixing ratio of an organic compound and an inorganic compound in the layer containing the composite material, were manufactured. Data thereof are shown in FIGS. 58 to 60. Note that a mixing ratio (PCzPCN1:molybdenum oxide) of each element is expressed by a weight ratio, and that of Element 11 is 4:0.5; Element 12, 4:1; and Element 13, 4:2.

FIG. 58 shows current-voltage characteristics of Elements 11 to 13. According to FIG. 58, within the range of mixing ratios of the composite material in the light emitting elements manufactured in this example, it is found that a current-voltage characteristic becomes more favorable as the amount of the inorganic compound in the layer containing the composite material becomes larger.

FIG. 59 shows current efficiency-luminance characteristics of Elements 11 to 13. According to FIG. 59, within the range of mixing ratios of the composite material in the light emitting elements manufactured in this example, it is found that every element exhibits a favorable current efficiency-luminance characteristic.

FIG. 60 shows luminance-voltage characteristics of Elements 11 to 13. According to FIG. 60, within the range of mixing ratios of the composite material in the light emitting elements manufactured in this example, it is found that a luminance-voltage characteristic becomes more favorable as the amount of the inorganic compound in the layer containing the composite material becomes larger.

Example 19

In this example, a light emitting element using the composite material of the invention is explained.

First, a first electrode of the light emitting element was formed over a substrate. In this example, the first electrode functions as an anode. With the use of indium tin oxide containing silicon oxide that is a transparent conductive film as a material, an anode was formed by a sputtering method Next, the substrate, over which the first electrode was formed, was fixed to a substrate holder in a vacuum evaporation apparatus so that the side, on which the first electrode was formed, faced downward. Then, a layer containing PCzPCN1 and molybdenum oxide was formed with a thickness of 120 nm by a co-evaporation method. At this time, the co-evaporation was performed so that a weight ratio of PCzPCN1 to molybdenum oxide was 4:2.

Subsequently, a hole transporting layer was formed of a material having an excellent hole transport property. As a material for forming the hole transporting layer, various kinds of hole transporting materials can be used. In this example, the hole transporting layer was formed using α-NPD with a thickness of 10 nm by an evaporation method.

Subsequently, a light emitting layer was formed. Note that holes and electrons are recombined in the light emitting layer to cause light emission. In this example, with the use of $Alq_3$ serving as a host material and coumarin 6 serving as a guest material, the light emitting layer was formed with a thickness of 37.5 nm by a co-evaporation method so that coumarin 6 was contained in $Alq_3$ in the proportion of 1 wt %.

Then, an electron transporting layer was formed. As a material for forming the electron transporting layer, various kinds of electron transporting materials can be used. In this example, the electron transporting layer was formed using $Alq_3$ with a thickness of 37.5 nm by an evaporation method.

Subsequently, an electron injecting layer was formed. For the electron injecting layer, various kinds of electron injecting materials can be used. In this example, the electron injecting layer was formed by evaporating lithium fluoride with a thickness of 1 nm.

Lastly, a second electrode was formed, thereby manufacturing the light emitting element of this example. In this example, the second electrode was formed by evaporating Al with a thickness of 200 nm by an evaporation method. The light emitting element manufactured in this example is referred to as Element 14.

Figure 61:
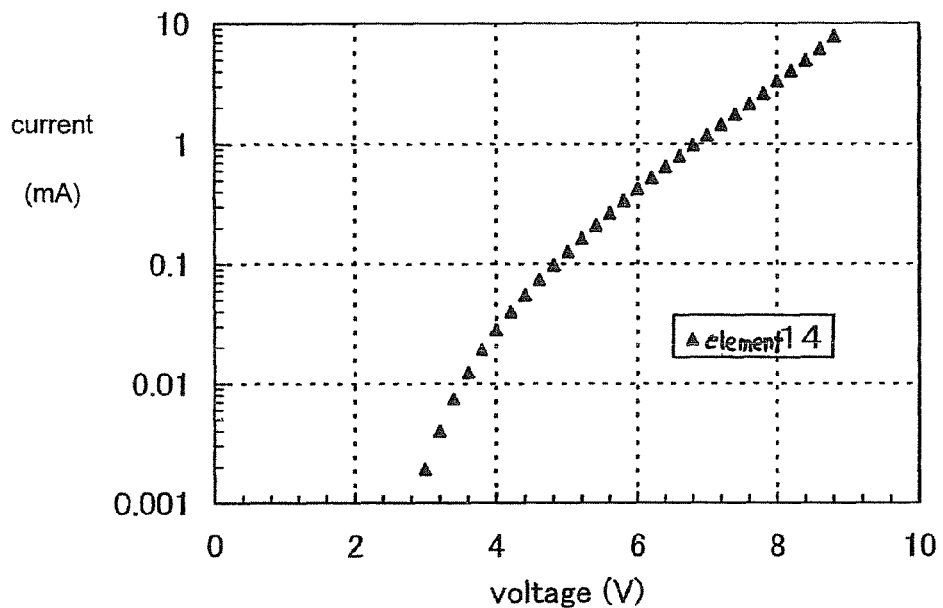
FIG. 61 shows a current-voltage characteristic of an element manufactured in Example 19.
Figure 62:
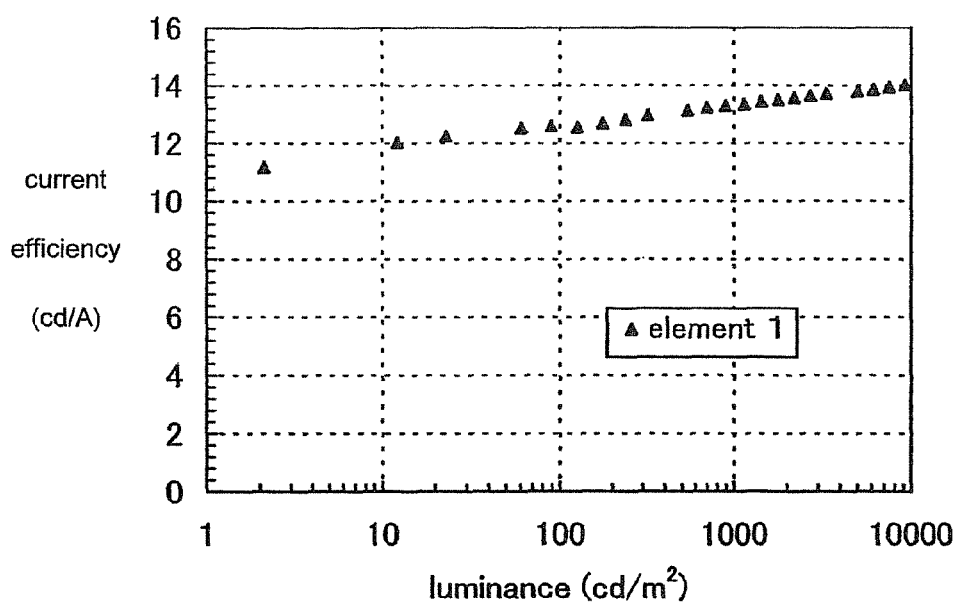
FIG. 62 shows a current efficiency-luminance characteristic of an element manufactured in Example 19.
Figure 63:
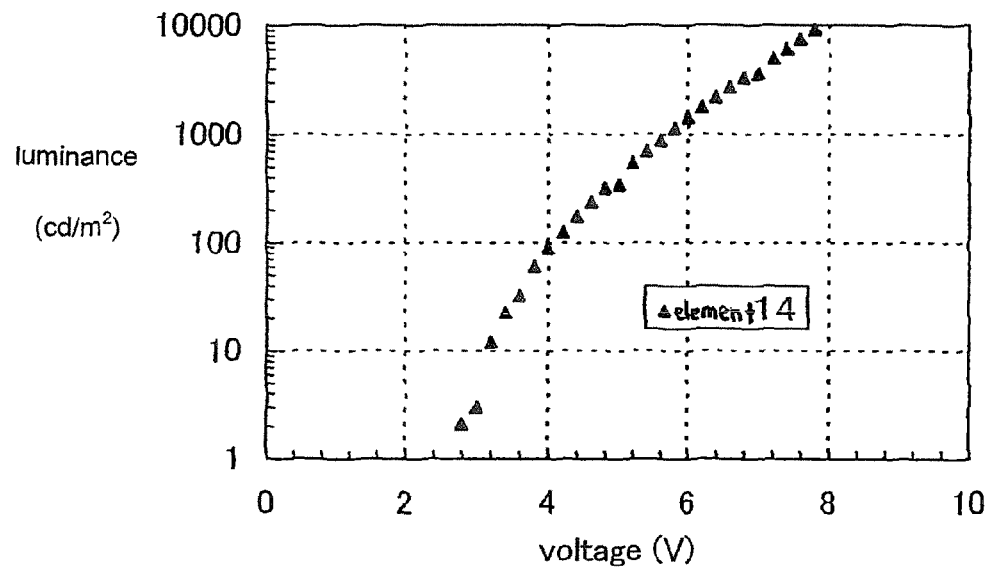
FIG. 63 shows a luminance-voltage characteristic of an element manufactured in Example 19.

A current-voltage characteristic of Element 14 manufactured in this example is shown in FIG. 61; a current efficiency-luminance characteristic thereof, FIG. 62; and a luminance-voltage characteristic thereof, FIG. 63.

As FIGS. 61 to 63 show, it is found that Element 14 manufactured in this example is excellent in all of the current-voltage characteristic, the current efficiency-luminance characteristic, and the luminance-voltage characteristic. This results partly from the fact that the layer containing the composite material of the invention does not have a strong absorption peak in a visible region. In addition, since the layer containing the composite material of the invention has high conductivity, it exhibits a favorable current-voltage characteristic.

In other words, it is found that a drive voltage to obtain light emission with a certain luminance can be reduced by using the composite material of the invention for the light emitting element. Specifically, a voltage required to cause light emission with a luminance of 1000 $cd/m^2$ is 5.8 V, and a current density at this time is 8.5 $mA/cm^2$. In other words, it is found that low voltage drive and low current drive become possible by using the composite material of the invention for the light emitting element.

Figure 64:
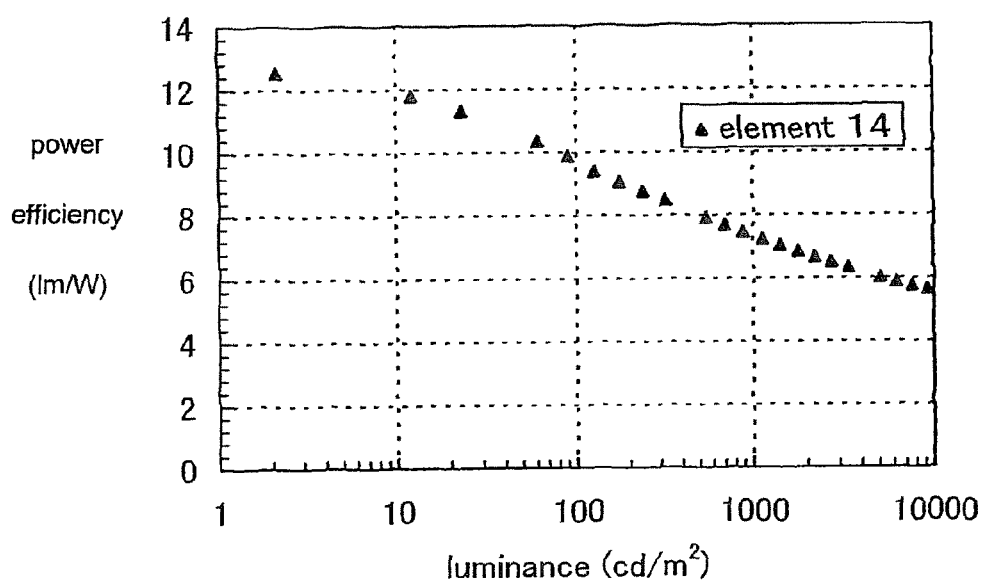
FIG. 64 shows a power efficiency-luminance characteristic of an element manufactured in Example 19.

In addition, a power efficiency-luminance characteristic of Element 14 manufactured in this example is shown in FIG. 64. Higher power efficiency means lower power consumption, and it is found from FIG. 64 that the light emitting element of the invention exhibits favorable power efficiency.

Figure 65:
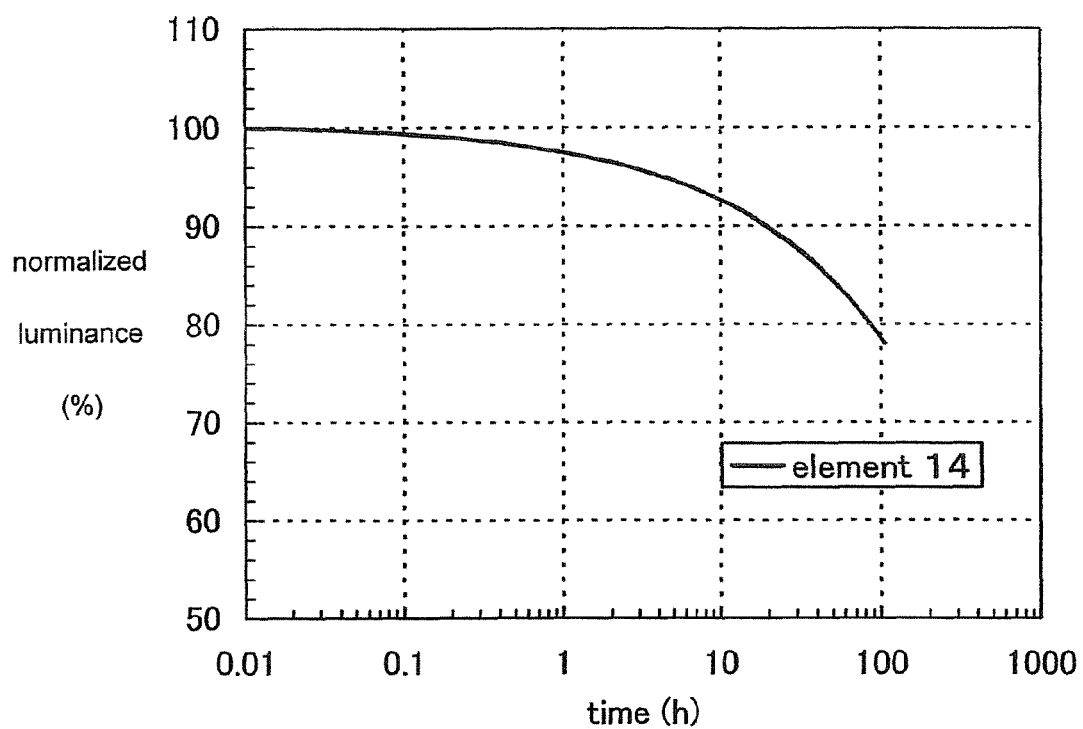
FIG. 65 shows a change over time in normalized luminance of an element manufactured in Example 19.

A change over time in normalized luminance of Element 14 manufactured in this example is shown in FIG. 65. Measurement was performed by setting an initial luminance at 3000 cd/m$^2$, applying a current at room temperature under constant current conditions, and monitoring a change over time in luminance and a change over time in voltage.

FIG. 65 shows that a luminance of the light emitting element manufactured in this example is less decreased due to a change over time. Therefore, it is found that the light emitting element using the composite material of the invention has a long life and high reliability.

Example 20

In this example, a light emitting element using the composite material of the invention is explained.

First, a first electrode of the light emitting element was formed over a substrate. In this example, the first electrode functions as an anode. With the use of indium tin oxide containing silicon oxide that is a transparent conductive film as an electrode material, an anode was formed by a sputtering method.

Next, the substrate, over which the first electrode was formed, was fixed to a substrate holder in a vacuum evaporation apparatus so that the side, on which the first electrode was formed, faced downward. Then, a layer which contains a composite material including PCzPCN1 and molybdenum oxide was formed with a thickness of 120 nm by a co-evaporation method.

Subsequently, a hole transporting layer was formed of a material having an excellent hole transport property. As a material for forming the hole transporting layer, various kinds of hole transporting materials can be used. In this example, the hole transporting layer was formed using α-NPD with a thickness of 10 nm by an evaporation method.

Subsequently, a light emitting layer was formed. Note that holes and electrons are recombined in the light emitting layer to cause light emission. In this example, with the use of Alq$_3$ serving as a host material and coumarin 6 serving as a guest material, the light emitting layer was formed with a thickness of 37.5 nm by a co-evaporation method so that coumarin 6 was contained in Alq$_3$ in the proportion of 1 wt %.

Then, an electron transporting layer was formed. As a material for forming the electron transporting layer, various kinds of electron transporting materials can be used. In this example, the electron transporting layer was formed using Alq$_3$ with a thickness of 37.5 nm by an evaporation method.

Subsequently, an electron injecting layer was formed. For the electron injecting layer, various kinds of electron injecting materials can be used. In this example, the electron injecting layer was formed by evaporating lithium fluoride with a thickness of 1 nm.

After forming a layer containing a light emitting material in this manner, which was formed by laminating the layer containing the composite material of the invention, the hole transporting layer, the light emitting layer, the electron transporting layer, and the electron injecting layer, a second electrode was formed by a sputtering method or an evaporation method. In this example, the second electrode functions as a cathode. In this example, the second electrode was formed using Al with a thickness of 200 nm by an evaporation method.

Note that in this example, two kinds of light emitting elements (Elements 15 and 16), each of which has a different mixing ratio of an organic compound and an inorganic compound in the layer containing the composite material, were manufactured, and data thereof are shown. Note that a mixing ratio (PCzPCN1:molybdenum oxide) of each element is expressed by weight ratio, and that of Element 15 is 4:1 and that of Element 16 is 4:2.

Figure 66:
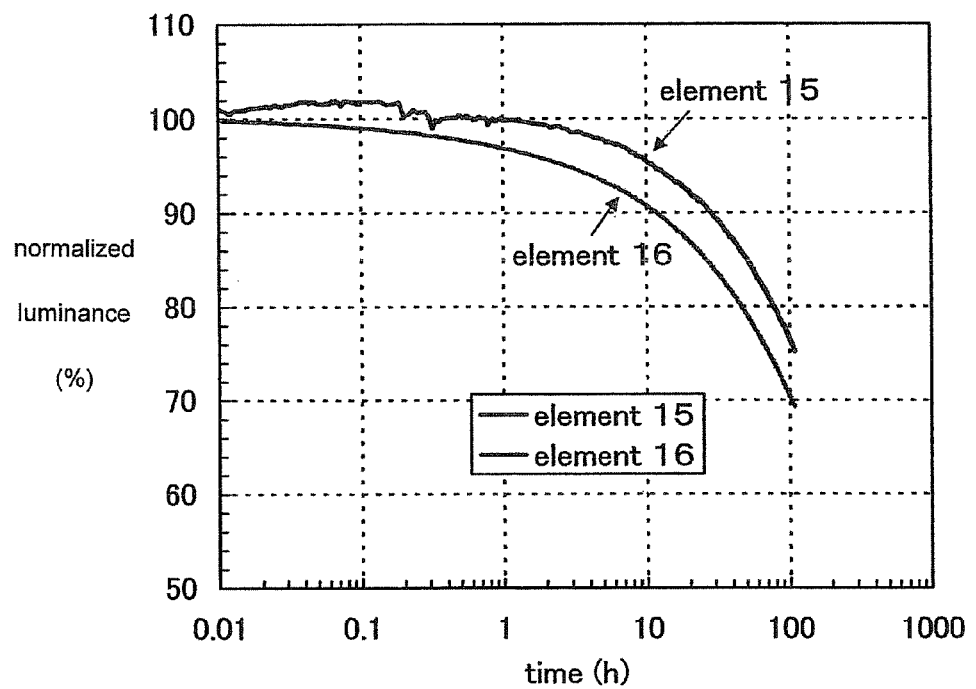
FIG. 66 shows a change over time in normalized luminance of an element manufactured in Example 20.

Changes over time in normalized luminance of Elements 15 and 16 manufactured in this example are shown in FIG. 66. Measurement was performed by setting an initial luminance at 3000 cd/m$^2$, applying a current at 60° C. under constant current conditions, and measuring a change over time in luminance and a change over time in voltage.

FIG. 66 shows that a luminance of the light emitting element manufactured in this example is less decreased due to a change over time. In particular, a luminance of Element 15 which has a low concentration of molybdenum oxide is less decreased due to a change over time. Therefore, it is found that the light emitting element using the composite material of the invention has a long life and high reliability.

Example 21

In this example, an electronic state of a layer containing the composite material of the invention was measured.

Figure 68:
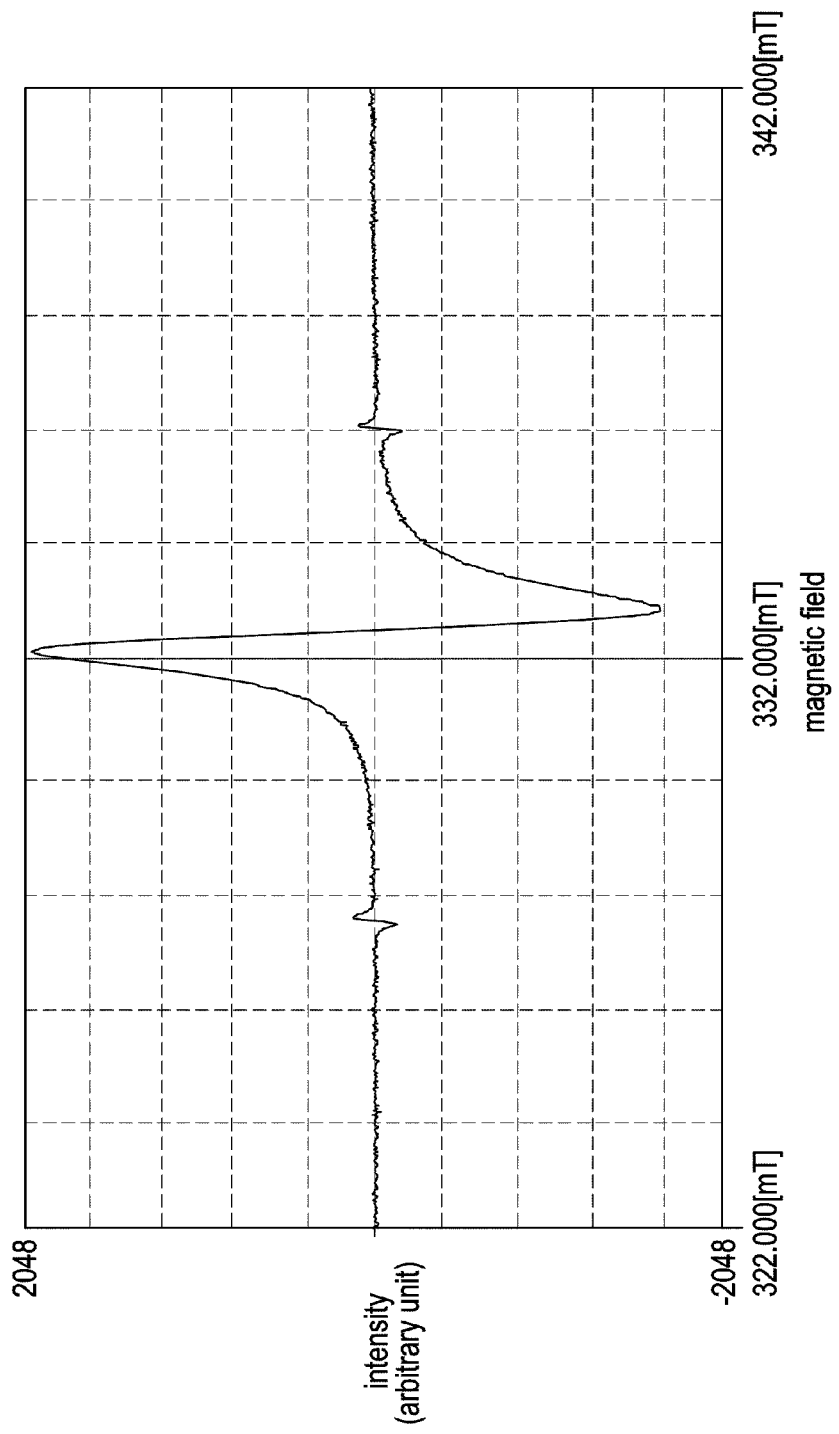
FIG. 68 shows an ESR measurement result of a layer containing PCzPCA1 and molybdenum oxide.

A layer containing PCzPCA1 and molybdenum oxide was formed over a quartz substrate by a co-evaporation method to have a thickness of 200 nm. At this time, the co-evaporation was performed so that a weight ratio of PCzPCA1 to molybdenum oxide was 1:0.5. ESR (Electron Spin Resonance) measurement was performed on this layer containing PCzPCA1 and molybdenum oxide. A result thereof is shown in FIG. 68. The ESR measurement is a measurement method, in which a strong magnetic field is applied to a sample having an unpaired electron to cause Zeeman splitting of an energy level of the unpaired electron, and resonance absorption transition of a microwave, which is equivalent to an energy difference between the levels, is utilized. This ESR measurement shows the presence or absence of an unpaired electron and a spin state by measuring a frequency and an intensity of a magnetic field when absorption occurs. Further, electron spin concentration can be obtained from absorption intensity. The measurement was performed using an electron spin resonance spectrometer (JES-TE200, manufactured by JEOL Ltd.) under the following conditions: a resonance frequency, 9.3 GHz; a modulation frequency, 100 kHz; a modulation width, 0.63 mT; amplification degree, 50; time constant, 0.1 sec; microwave input, 1 mW; sweep time, 4 min; and a measurement temperature, room temperature. Note that manganese supported by magnesium oxide was used as a sample for magnetic field calibration. In addition, as comparative examples, ESR measurement was also performed on a single film of PCzPCA1 (thickness: 200 nm) and a single film of molybdenum oxide (thickness: 200 nm). An ESR measurement result of the single film of PCzPCA1 is shown in FIG. 69, and that of the single film of molybdenum oxide is shown in FIG. 70.

Figure 69:
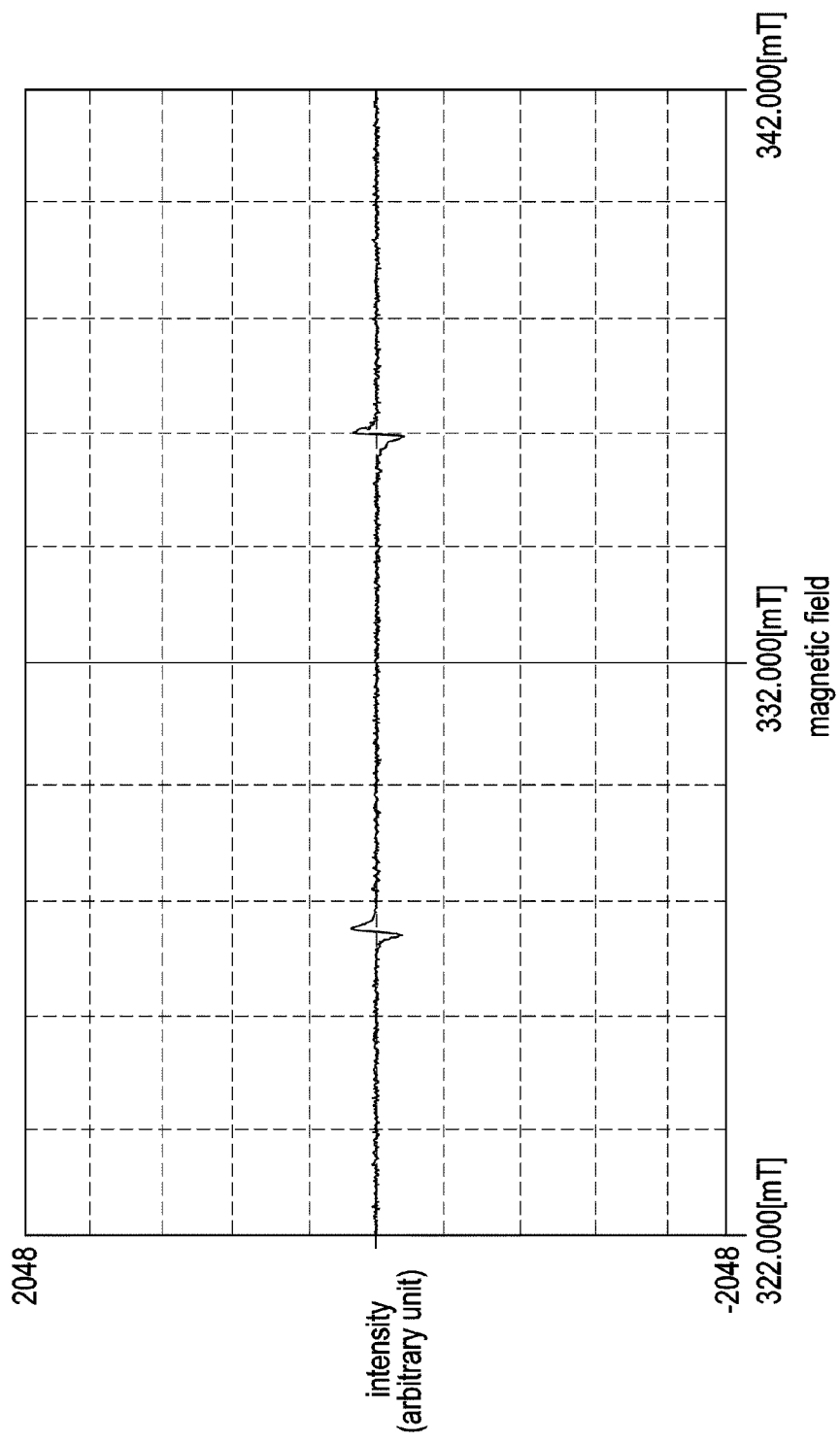
FIG. 69 shows an ESR measurement result of a single film of PCzPCA1.
Figure 70:
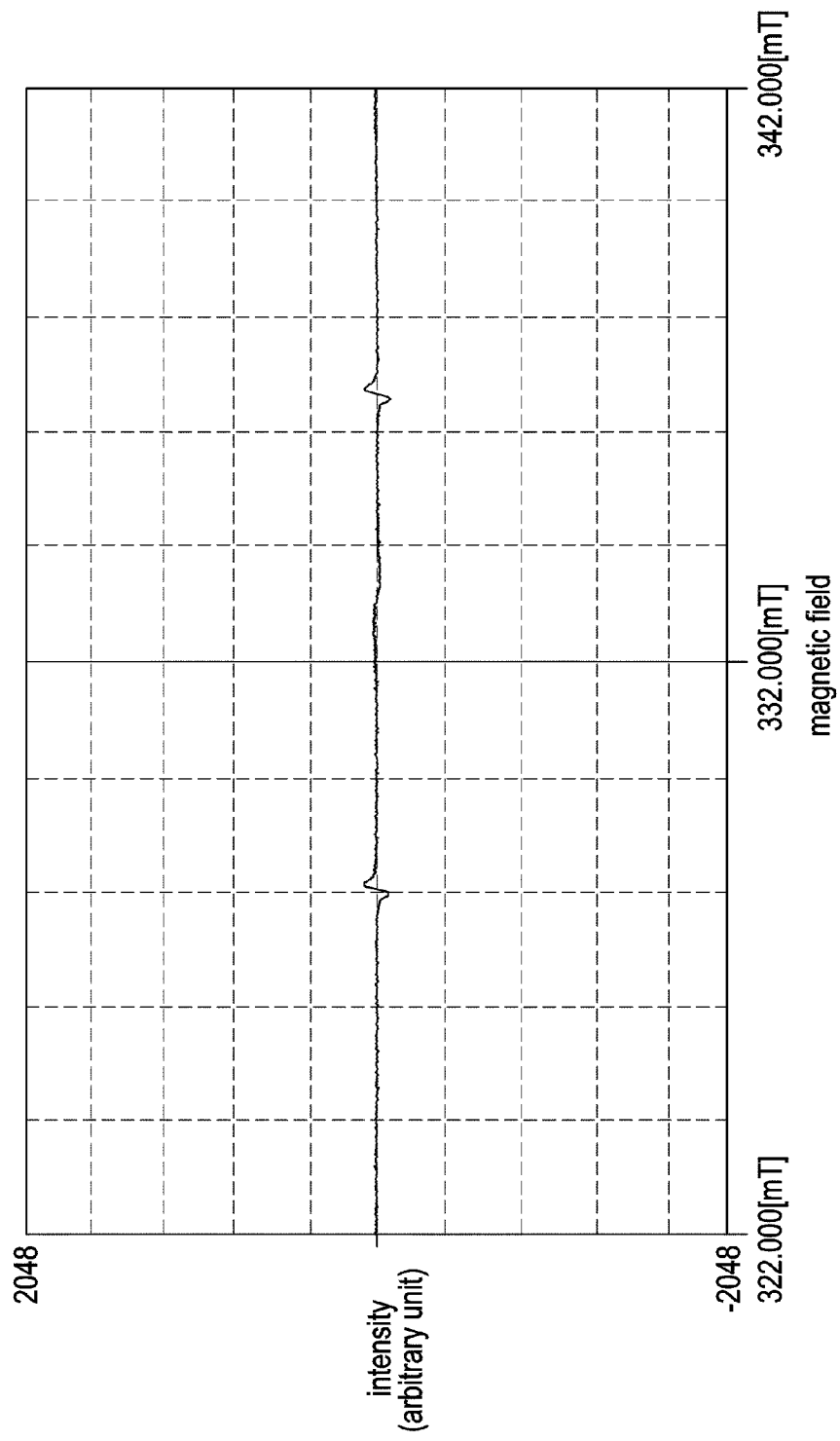
FIG. 70 shows an ESR measurement result of a single film of molybdenum oxide.

As FIGS. 68 to 70 show, an ESR signal was not detected in the single film of PCzPCA1 and the single film of molybdenum oxide, whereas an ESR signal was detected in the layer containing PCzPCA1 and molybdenum oxide. According to this, it is found that the layer containing PCzPCA1 and molybdenum oxide has an unpaired electron and has an electronic state different from those of the single film of PCzPCA1 and the single film of molybdenum oxide which do not have an unpaired electron. Note that it is found from FIG. 68 that the g value of the layer containing PCzPCA1 and molybdenum oxide is found to be 2.0024, which is extremely close to 2.0023, that is, the g value of a free electron. On the other hand, it is found that a line width is narrow, 0.67 mT, and a spin concentration is $3.4 \times 10^{20}$ spin/cm$^3$.

Example 22

In this example, a synthesis method of 3-[N-(9-phenylcarbazol-3-yl)-N-phenylamino]-9-phenylcarbazole (abbr.: PCzPCA1) represented by Structural Formula (10), which is different from that in Example 1, is explained. A synthesis scheme of PCzPCA1 is shown in (D-1).

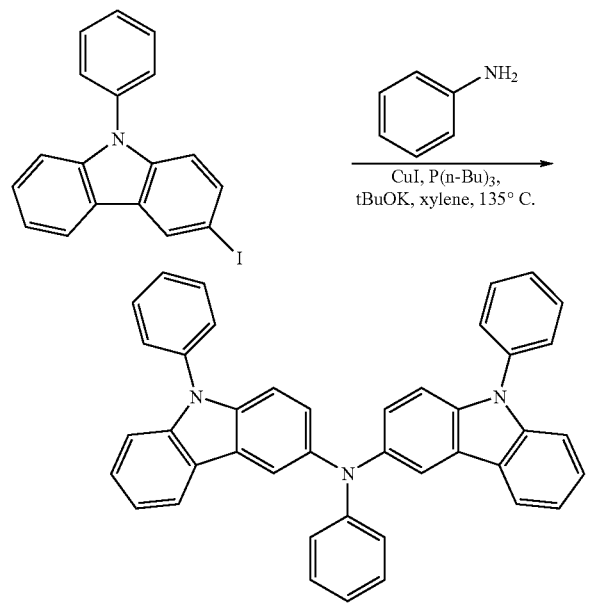

(D-1)

1.60 mg (4.33 mmol) of 3-iodo-9-phenylcarbazole, 19.0 mg (0.1 mmol) of copper iodide (1), 1.10 g (10 mmol) of tert-butoxy potassium, 1.0 mL of tri-n-butylphosphine (0.2 mol/L dehydrated hexane solution) were put in a 200-mL three-neck flask, and the atmosphere of the flask was substituted by nitrogen. 10 mL of xylene, 0.2 mL (2.1 mmol, 195.6 mg) of aniline were added thereto, and the mixture was refluxed at 135° C. for 6 hours. The reaction solution was cooled to a room temperature, and 100 mL of toluene was added thereto, then the mixture was filtered through florisil and Celite®. The obtained filtrate was washed with water twice and a water phase was extracted with toluene twice, the extracted solution with an organic phase were washed with a saturated sodium chloride solution, and dried with magnesium sulfate. The solution was filtered naturally, and a compound obtained by concentrating the filtrate was subjected to silica gel chromatography (a toluene-hexane mixed solution) to obtain an objective substance. 140 mg (yield: 21%) of a light-yellow solid was obtained.

By employing the synthesis method described in this example, a carbazole derivative of the present invention can be obtained by one-step reaction.

Example 23

In this example, a synthesis method of 3-[N-(1-naphthyl)-N-(9-phenylcarbazol-3-yl)amino]-9-phenylcarbazole (abbr.: PCzPCN1) represented by Structural Formula (17), which is different from that in Example 3, is explained. A synthesis scheme of PCzPCN1 is shown in (D-2).

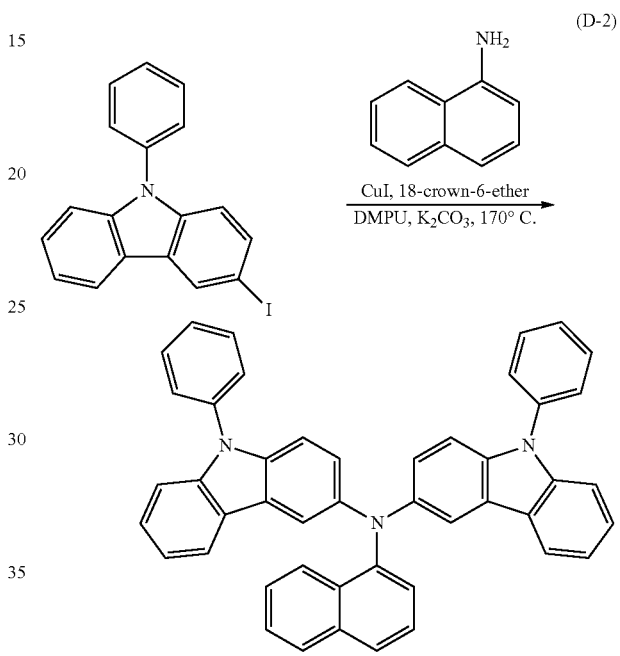

(D-2)

3.69 g (0.01 mol) of 3-iodo-9-phenylcarbazole, 716 mg (5 mmol) of 1-naphthylamine, 385 mg (2 mmol) of copper iodide, 2.74 g (0.02 mol) of potassium carbonate, and 771 mg (0.02 mol) of 18-crown-6-ether were put in a 200-mL three-neck flask, and the atmosphere of the flask was substituted by nitrogen. 8 mL of DMPU was added thereto, and the mixture was stirred at 170° C. for 24 hours. The reaction solution was cooled to a room temperature and washed with water twice, a water phase was extracted with toluene twice, and the extracted solution with an organic phase which had been washed in advance, were washed with a saturated sodium chloride solution and dried with magnesium sulfate. The solution was filtered naturally, and a compound obtained by concentrating the filtrate was purified with silica gel chromatography (hexane:toluene=7:3) to obtain an objective substance, i.e., 1.52 g (yield: 48%) of a light-yellow solid.

By employing the synthesis method described in this example, a carbazole derivative of the present invention can be obtained by one-step reaction.

Example 24

A synthesis method of 3-{N-[9-(4-biphenylyl)carbazol-3-yl]-N-phenylamino}-9-(4-biphenylyl)carbazole (abbr.: BCzBCA1), which is represented by Structural Formula (70), is explained as one example of a carbazole derivative of the present invention.

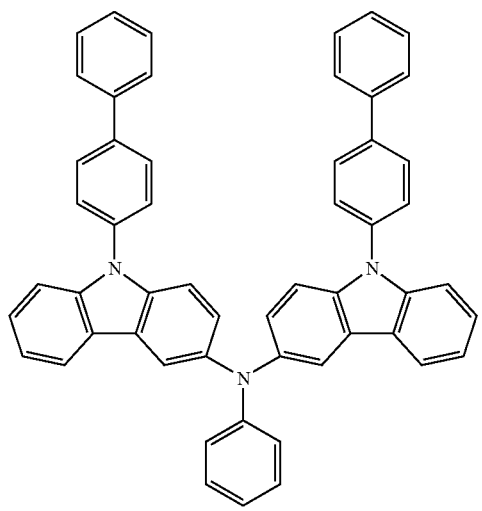

(70)

[Step 1]
A synthesis method of 9-(4-biphenylyl)carbazole is explained. A synthesis scheme of 9-(4-biphenylyl)carbazole is shown in (B-1).

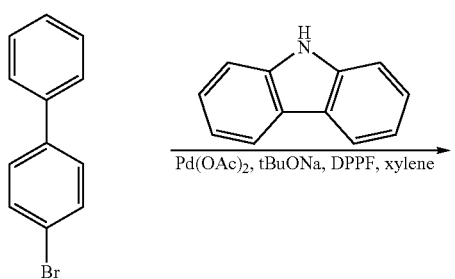

(B-1)

12 g (50 mmol) of 4-bromobiphenyl, 8.4 g (50 mmol) of carbazole, 230 mg (1 mmol) of palladium acetate, 1.8 g (3.0 mmol) of 1,1-bis(diphenylphosphino)ferrocene, and 13 g (180 mmol) of sodium-tert-butoxide were put in a three-neck flask and the atmosphere of the flask was substituted by nitrogen, and then, 80 mL of dehydrated xylene was added thereto, and deaeration was performed. Under a nitrogen atmosphere, it was heated and stirred at 120° C. for 7.5 hours. After the termination of the reaction, about 600 mL of hot toluene was added to this suspension, and filtered twice through florisil, alumina, and Celite®. The obtained filtrate was concentrated, hexane was added thereto, and recrystallization was conducted. This was filtered, and the residue was collected and dried to obtain 14 g (yield: 87%) of 9-(4-biphenylyl)carbazole which was cream-colored powder.

[Step 2]
A synthesis method of 3-bromo-9-(4-biphenylyl)carbazole is explained. A synthesis scheme of 3-bromo-9-(4-biphenylyl)carbazole is shown in (B-2).

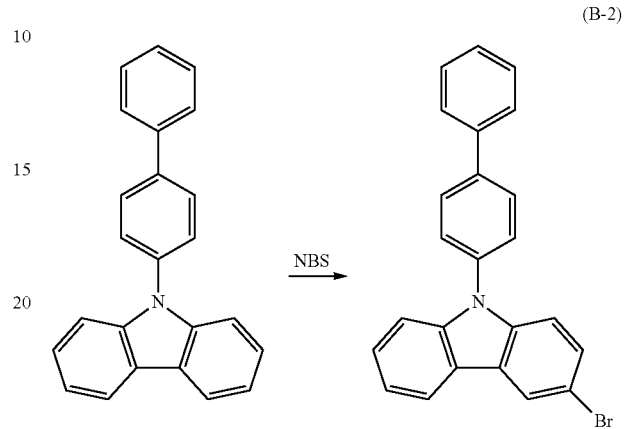

(B-2)

3.1 g (10 mmol) of 9-(4-biphenylyl)carbazole was dissolved in 100 mL of chloroform, and 1.8 g (10 mmol) of N-bromosuccinimide was added thereto slowly. The mixture was stirred overnight (for about 24 hours) and then washed with water. Magnesium sulfate was added thereto to remove water and it was filtered. The filtrate was concentrated, collected, and dried. 3.7 g (yield: 95%) of 3-bromo-9-(4-biphenylyl)carbazole, which was beige powder, was obtained.

[Step 3]
A synthesis method of 3-iodo-9-(4-biphenylyl)carbazole is explained. A synthesis scheme of 3-iodo-9-(4-biphenylyl)carbazole is shown in (B-3).

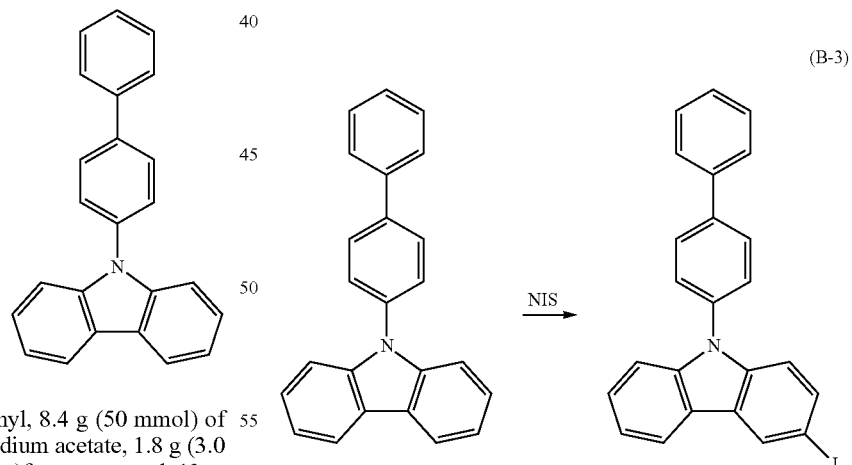

(B-3)

3.2 g (10 mmol) of 9-(4-biphenylyl)carbazole was dissolved in a mixed solution of 200 mL of glacial acetic acid, 200 mL of toluene, and 50 mL of ethyl acetate. 2.3 g (10 mmol) of N-iodosuccinimide was slowly added thereto. The mixture was stirred overnight (for about 24 hours) and then washed with water, a sodium thiosulfate water solution, and a saturated sodium chloride solution. Magnesium sulfate was added thereto to remove water and filtered to obtain a filtrate. The filtrate was concentrated, mixed with acetone and hexane, and then recrystallized with ultrasonic wave. This was filtered to obtain a residue. The residue was collected and dried. 4.4 g (yield: 98%) of 3-iodo-9-(4-biphenylyl)carbazole, which was beige powder, was obtained.

[Step 4]

A synthesis method of N-[(4-biphenylyl)carbazol-3-yl]-N-phenylamine (abbr.: BCA) is explained. A synthesis scheme of BCA is shown in (B-4).

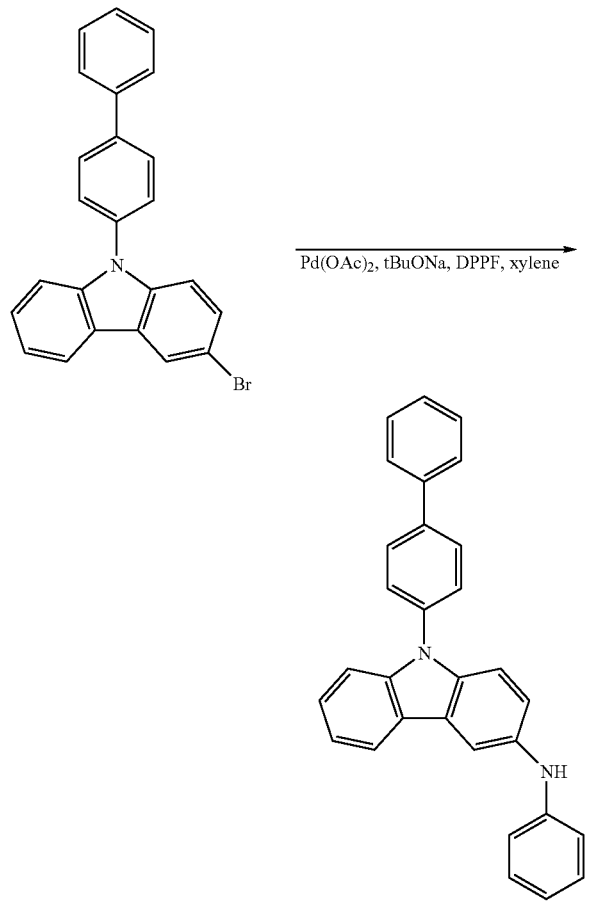

(B-4)

3.7 g (9.2 mmol) of 3-bromo-9-(4-biphenylyl)carbazole, 63 mg (0.3 mmol) of palladium acetate, 330 mg (0.6 mmol) of 1,1-bis(diphenylphosphino)ferrocene, and 1.5 g (15 mmol) of sodium-tert-butoxide were put in a three-neck flask and the atmosphere of the flask was substituted by nitrogen, and then, 20 mL of dehydrated xylene was added, and deaeration was performed. Then, 9.3 g (10 mmol) of aniline was added thereto. Under a nitrogen atmosphere, it was heated and stirred at 130° C. for 4 hours. After the termination of the reaction, about 300 mL of hot toluene was added to this suspension, and the mixture was filtered through florisil, alumina, and Celite®. The obtained filtrate was concentrated and hexane was added thereto. Then, it was precipitated by ultrasonic wave. This was filtered, and the residue was dried to obtain 3.5 g (yield: 93%) of N-[(4-biphenylyl)carbazol-3-yl]-N-phenylamine (BCA) which was cream-colored powder.

[Step 5]

A synthesis method of 3-{N-[9-(4-biphenylyl)carbazol-3-yl]-N-phenylamino}-9-(4-biphenylyl)carbazole (abbr.: BCzBCA1) is explained. A synthesis scheme of BCzBCA1 is shown in (B-5).

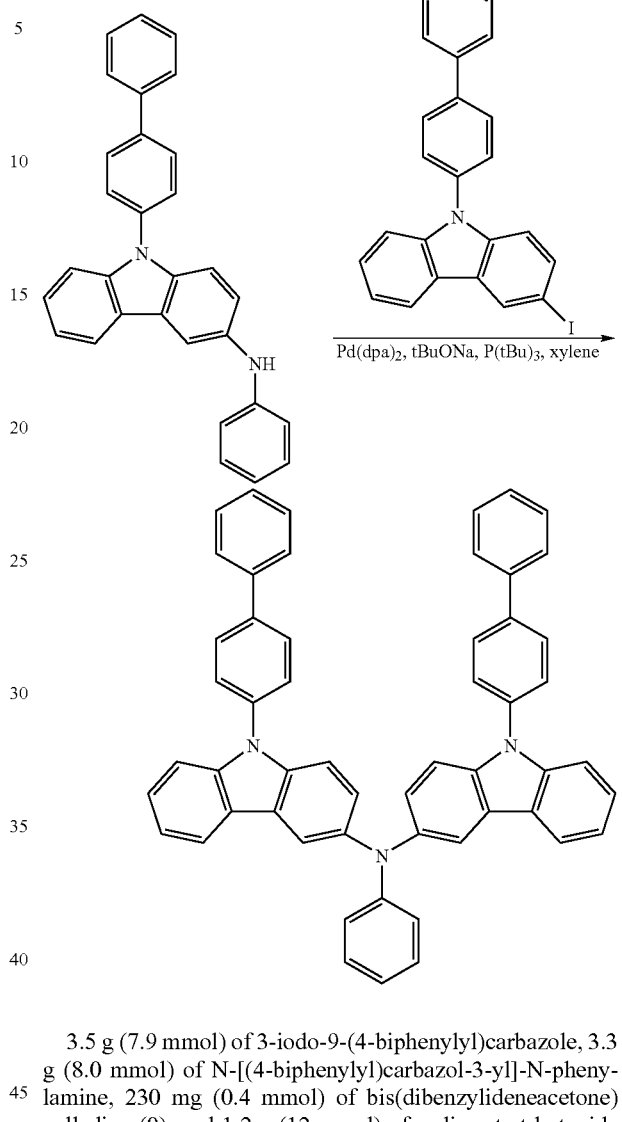

(B-5)

Figure 73A:
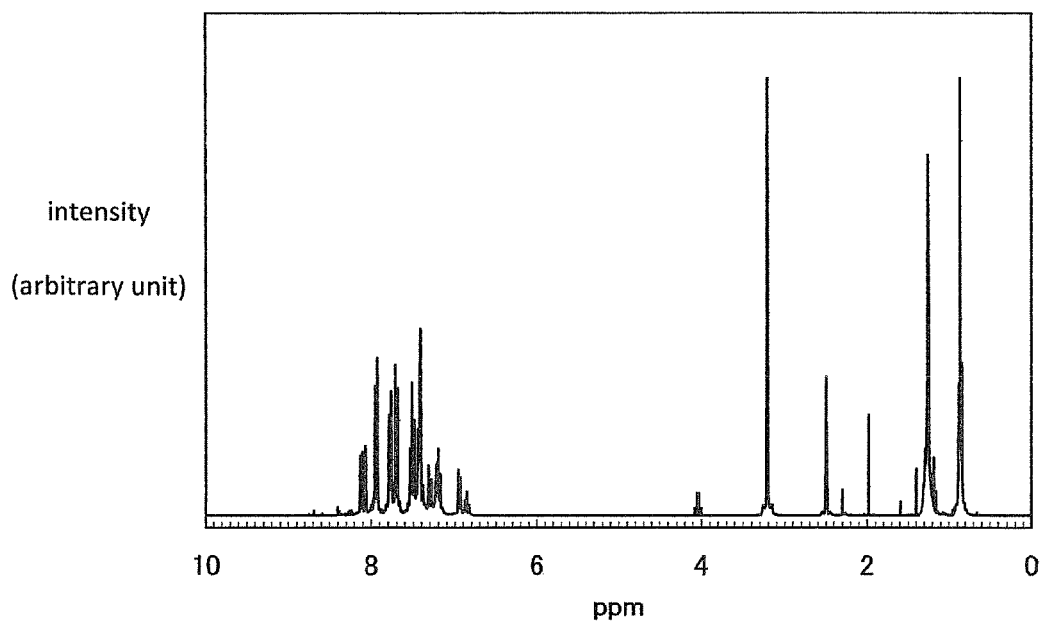
FIGS. 73A and 73B show $^1$H-NMR charts of 3-{N-[9-(4-biphenylyl)carbazol-3-yl]-N-phenylamino}-9-(4-biphenylyl)carbazole.
Figure 73B:
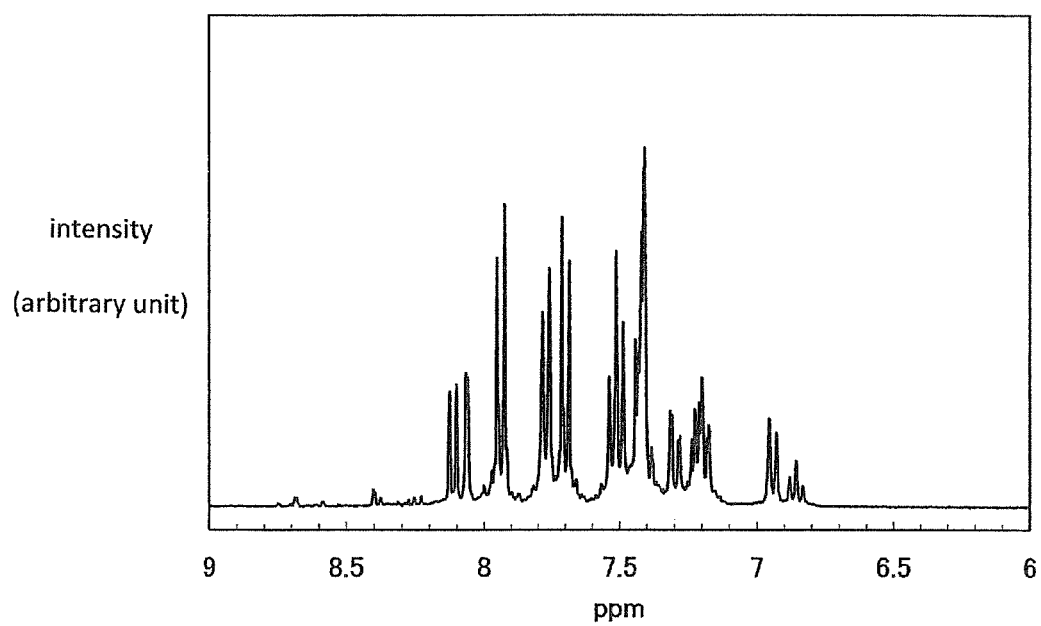
Figure 74A:
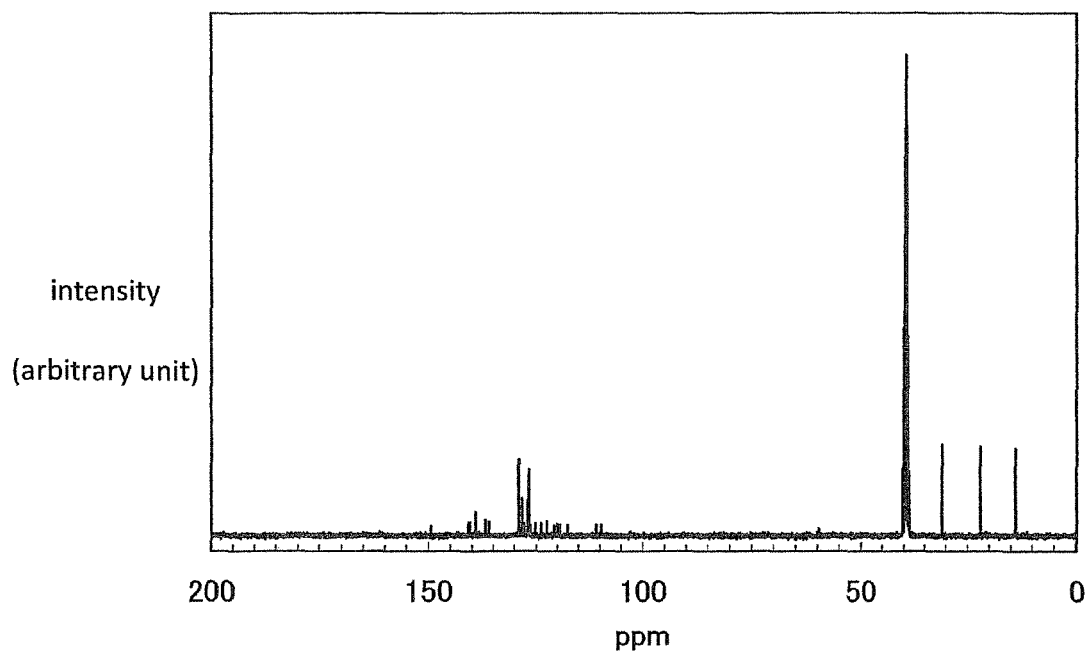
FIGS. 74A and 74B show $^{13}$C-NMR charts of 3-{N-[9-(4-biphenylyl)carbazol-3-yl]-N-phenylamino}-9-(4-biphenylyl)carbazole.
Figure 74B:
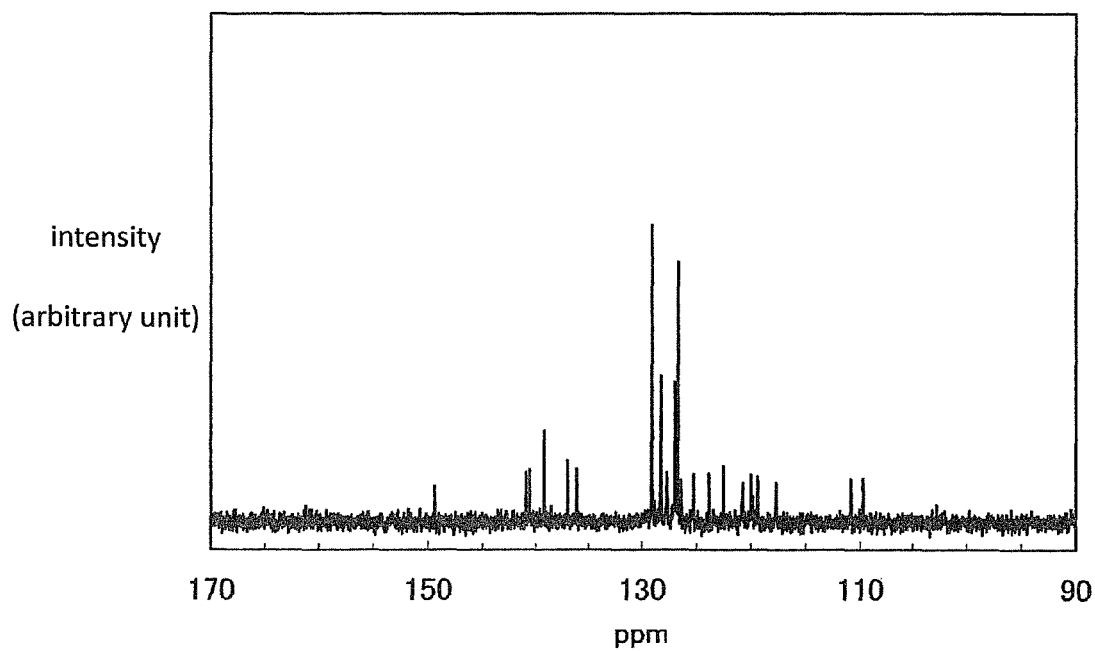

3.5 g (7.9 mmol) of 3-iodo-9-(4-biphenylyl)carbazole, 3.3 g (8.0 mmol) of N-[(4-biphenylyl)carbazol-3-yl]-N-phenylamine, 230 mg (0.4 mmol) of bis(dibenzylideneacetone)palladium(0), and 1.2 g (12 mmol) of sodium-tert-butoxide were put in a three-neck flask and the atmosphere of the flask was substituted by nitrogen. Then, 30 mL of dehydrated xylene was added thereto, and deaeration was performed. 1.4 mL (1.2 mmol) of a hexane solution with 10 wt % of tri-tert-butylphosphine was added thereto. Under a nitrogen atmosphere, it was heated and stirred at 110° C. for 3 hours. After the termination of the reaction, about 500 mL of hot toluene was added to this suspension, and filtered through florisil, alumina, and Celite®. The obtained filtrate was concentrated to obtain an objective substance using silica gel column chromatography (toluene:hexane=1:1). This was concentrated and hexane was added thereto. Then, it was precipitated by ultrasonic wave. 1.1 g (yield: 19%) of 3-{N-[9-(4-biphenylyl)carbazol-3-yl]-N-phenylamino}-9-(4-biphenylyl)carbazole (abbr.: BCzBCA1), which was cream-colored powder, was obtained. Data of $^1$H-NMR are shown below. $^1$H-NMR (300 MHz, DMSO-d): δ=6.86 (t, J=7.2, 1H), 6.94 (d, J=7.8, 2H), 7.18-7.24 (m, 4H), 7.30 (dd, J=8.9, 1.8, 2H), 7.41-7.54 (m, 12H), 7.70 (d, J=8.4, 4H), 7.77 (d, J=7.2, 4H), 7.94 (d, J=8.4, 4H), 8.06 (d, J=2.1, 2H), 8.12 (d, J=7.8, 2H). A $^1$H-NMR chart is shown in FIG. 73A, and an enlarged view of a portion of 6.0 ppm to 9.0 ppm in FIG. 73A is shown in FIG. 73B. Data of $^{13}$C-NMR are shown below. (75.5 MHz, DMSO-d): δ=109.6, 110.7, 117.4, 119.4, 119.7, 119.8, 120.5, 120.5, 122.4, 123.7, 125.0, 126.2, 1265, 126.8, 127.5, 128.1, 128.8, 136.0, 136.9, 139.1, 139.1, 140.6, 140.8, 149.3. A chart of $^{13}$C-NMR is shown in FIG. 74A. An enlarged view of the portion of 6.0 ppm to 9.0 ppm in FIG. 74A is shown in FIG. 74B.

A thermogravimetry-differential thermal analysis (TG-DTA) was performed on the obtained BCzBCA1 in the same manner as in Examples 1 to 3. By using a thermo-gravimetric/differential thermal analyzer (TG/DTA 320, manufactured by Seiko Instruments Inc.), thermophysical properties were measured at a temperature rising rate of 10° C./min under a nitrogen atmosphere. As a result, from the relationship between gravity and temperature (thermogravimetry), the temperature at which the gravity becomes 95% or less of the gravity at the start of the measurement, was 425° C. under normal pressure.

Figure 75:
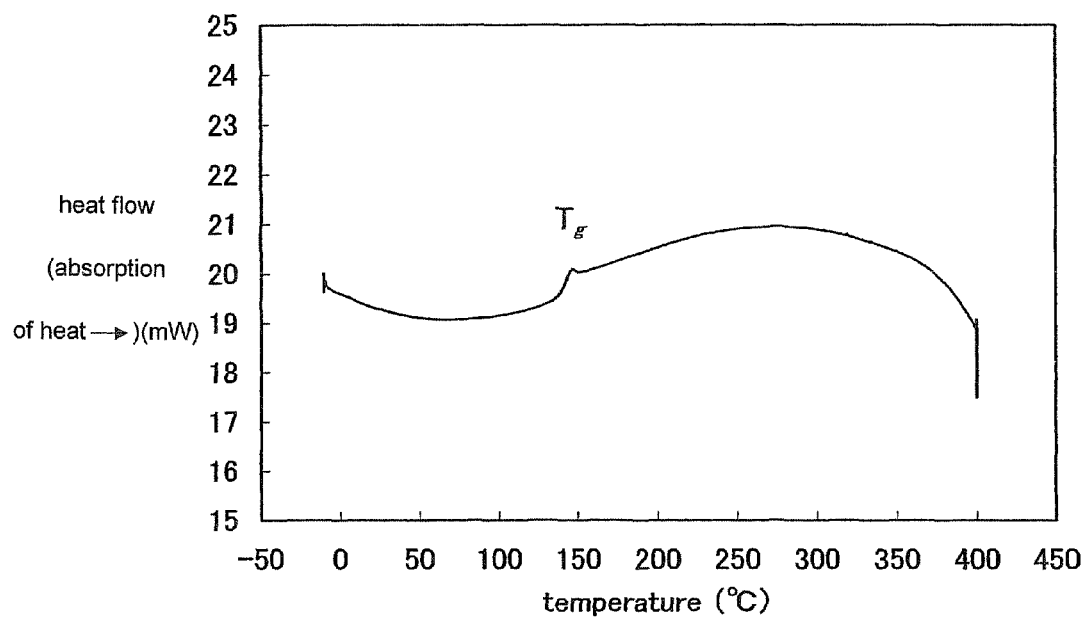
FIG. 75 shows a DSC chart of 3-{N-[9-(4-biphenylyl)carbazol-3-yl]-N-phenylamino}-9-(4-biphenylyl)carbazole.

A glass transition point (Tg) was measured with a differential scanning calorimeter (Pyris 1 DSC, manufactured by Perkin Elmer Co., Ltd.). After a sample was heated from –10° C. to 400° C. at 40° C./min, it was cooled to –10° C. at 40° C./min. Thereafter, the sample was heated to 400° C. at 10° C./min, and thus, a DSC chart shown in FIG. 75 was obtained. According to this chart, it is found that the glass transition point (Tg) of BCzBCA1 is 137° C. Therefore, it is found that BCzBCA1 has a high glass transition point. In this measurement, a heat absorption peak which shows a melting point was not observed.

Figure 76:
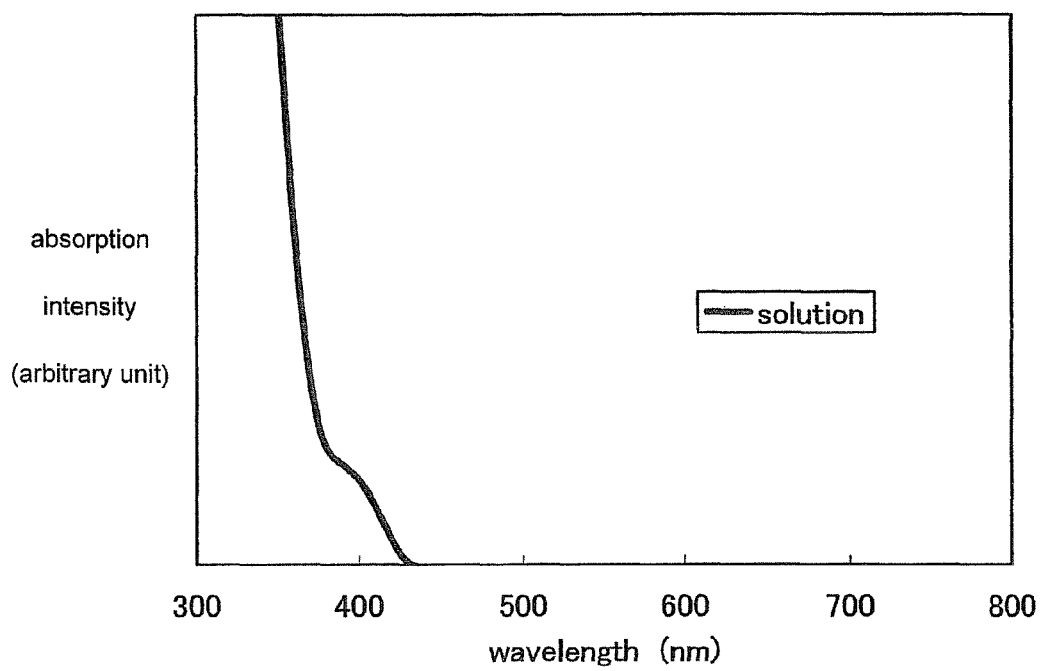
FIG. 76 shows an absorption spectrum of a toluene solution of 3-{N-[9-(4-biphenylyl)carbazol-3-yl]-N-phenylamino}-9-(4-biphenylyl)carbazole which is a carbazole derivative of the present invention.
Figure 77:
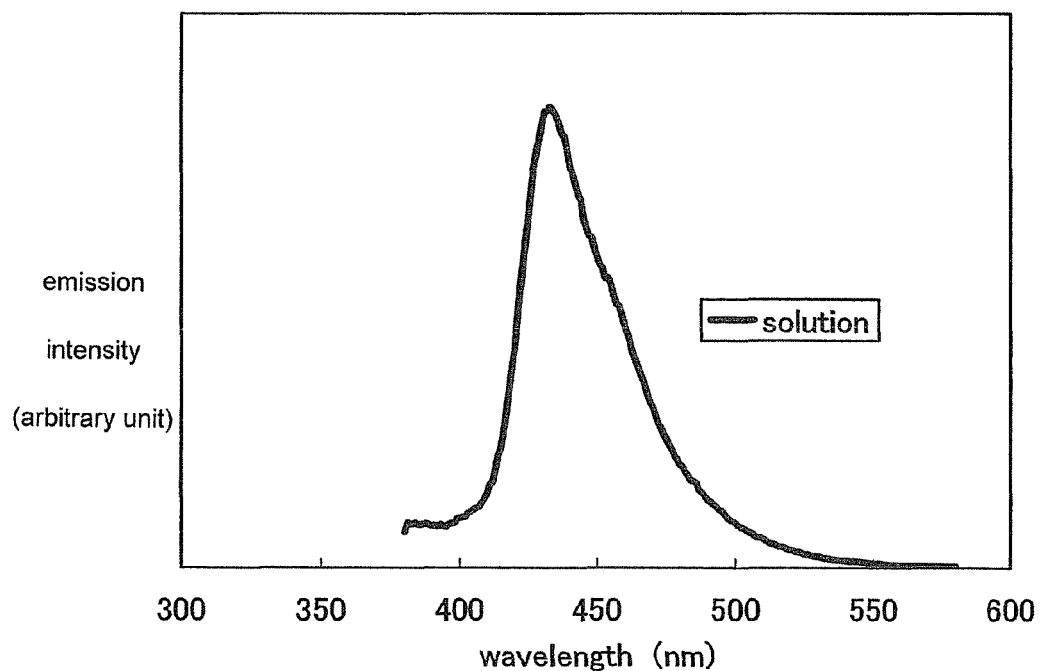
FIG. 77 shows an emission spectrum of a toluene solution of 3-{N-[9-(4-biphenylyl)carbazol-3-yl]-N-phenylamino}-9-(4-biphenylyl)carbazole which is a carbazole derivative of the present invention.

An absorption spectrum of a toluene solution of BCzBCA1 is shown in FIG. 76. An ultraviolet-visible spectrophotometer (V-550, manufactured by JASCO Corporation) was used for the measurement. The solution was put in a quartz cell as a sample, and the absorption spectrum, from which an absorption spectrum of quartz was subtracted, is shown in FIG. 76. In FIG. 76, the horizontal axis indicates wavelength (nm) and the vertical axis indicates absorption intensity (arbitrary unit). The maximum absorption wavelength was 395 nm in the case of the toluene solution of BCzBCA1. An emission spectrum of the toluene solution of BCzBCA1 is shown in FIG. 77. In FIG. 77, the horizontal axis indicates wavelength (nm) and the vertical axis indicates emission intensity (arbitrary unit). The maximum emission wavelength was 434 nm (excitation wavelength: 323 nm) in the case of the toluene solution of BCzBCA1.

Figure 78:
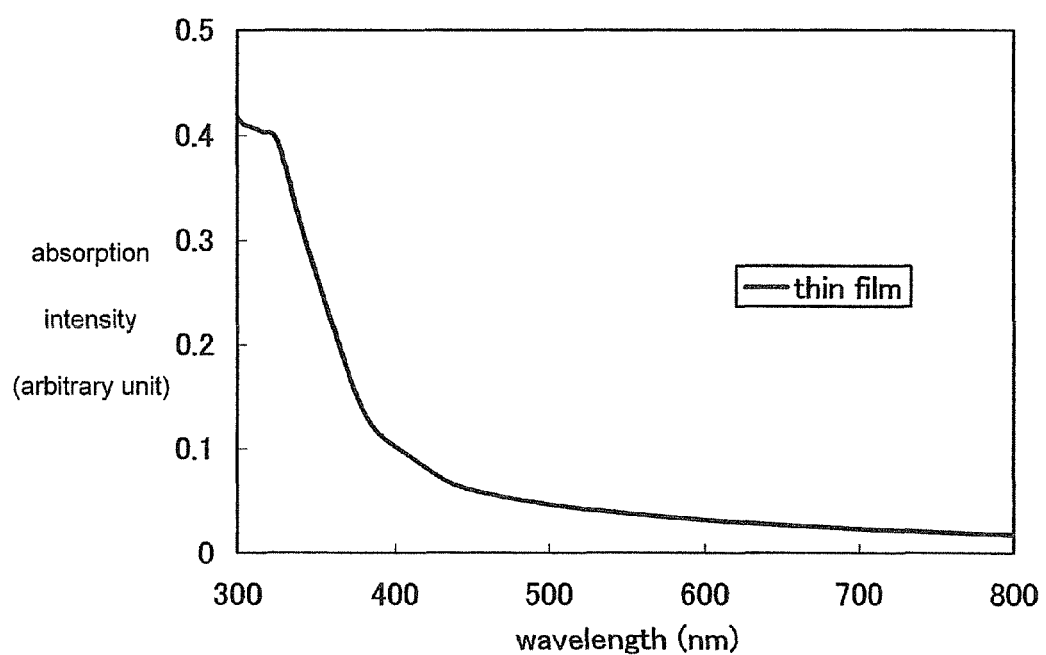
FIG. 78 shows an absorption spectrum of a thin film of 3-{N-[9-(4-biphenylyl)carbazol-3-yl]-N-phenylamino}-9-(4-biphenylyl)carbazole which is a carbazole derivative of the present invention.
Figure 79:
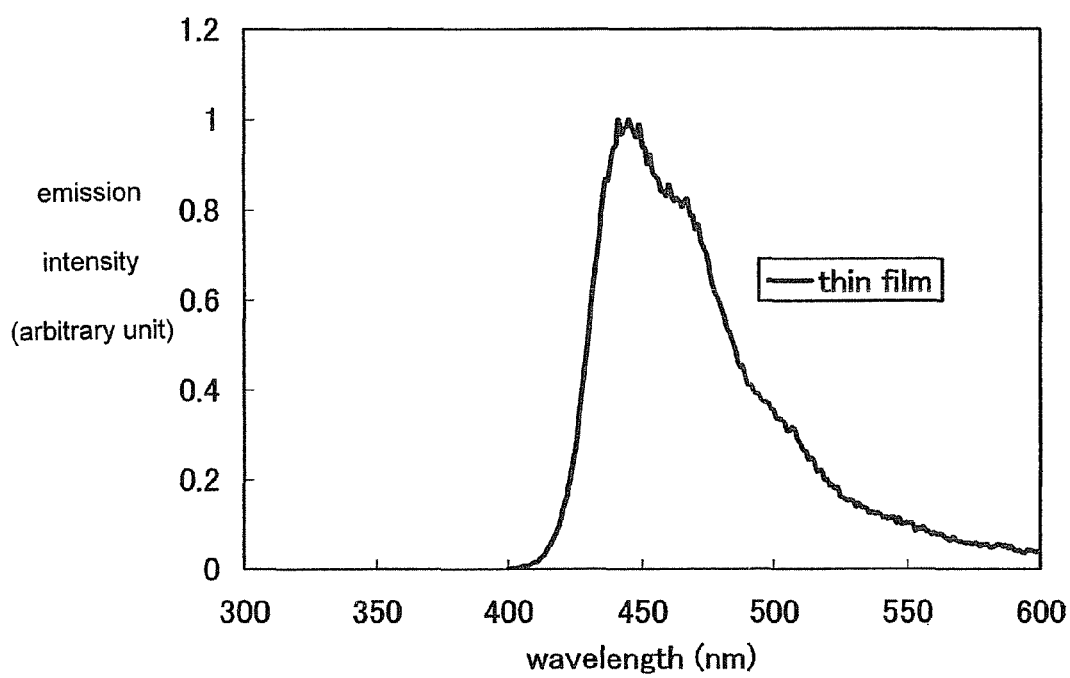
FIG. 79 shows an emission spectrum of a thin film of 3-{N-[9-(4-biphenylyl)carbazol-3-yl]-N-phenylamino}-9-(4-biphenylyl)carbazole which is a carbazole derivative of the present invention.

An absorption spectrum of a thin film of BCzBCA1 is shown in FIG. 78. An ultraviolet-visible spectrophotometer (V-550, manufactured by JASCO Corporation) was used for the measurement. The thin film was evaporated over a quartz substrate as a sample, and an absorption spectrum, from which an absorption spectrum of quartz was subtracted, is shown in FIG. 78. In FIG. 78, the horizontal axis indicates wavelength (nm) and the vertical axis indicates absorption intensity (arbitrary unit). The maximum absorption wavelength was 318 nm in the case of the thin film of BCzBCA1. An emission spectrum of the thin film of BCzBCA1 is shown in FIG. 79. In FIG. 79, the horizontal axis indicates wavelength (nm) and the vertical axis indicates emission intensity (arbitrary unit). The maximum emission wavelength was 445 nm (excitation wavelength: 318 nm) in the case of the thin film of BCzBCA1.

Further, the HOMO level and LUMO level of BCzBCA1 in a thin-film state were measured. A value of the HOMO level was obtained by converting a value of ionization potential measured by a photoelectron spectrometer (AC-2, manufactured by Riken Keiki Co., Ltd.) into a negative value. A value of the LUMO level was obtained by using an absorption edge of the thin film in FIG. 78 as an energy gap and adding the value of the absorption edge to the value of the HOMO level. As a result, the HOMO level and the LUMO level were –5.14 eV and –2.04 eV, respectively.

Example 25

A synthesis method of 3,6-bis[N-(1-naphthyl)-N-(9-phenylcarbazol-3-yl)amino]-9-(4-biphenylyl)carbazole (abbr.: BCzPCN2), which is represented by Structural Formula (71), is explained as one example of a carbazole derivative of the present invention.

(71)

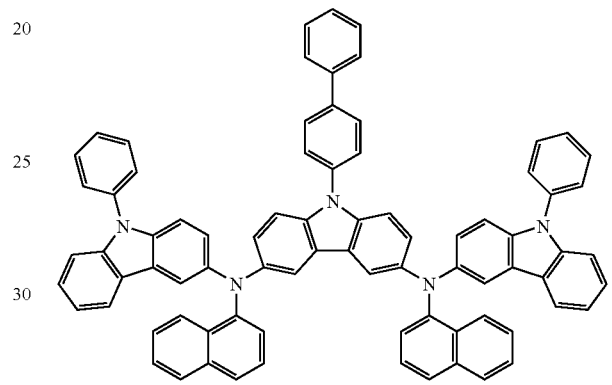

[Step 1]

A synthesis method of 3,6-dibromo-9-(4-biphenylyl)carbazole is explained. A synthesis scheme of 3,6-dibromo-9-(4-biphenylyl)carbazole is shown in (C-1).

(C-1)

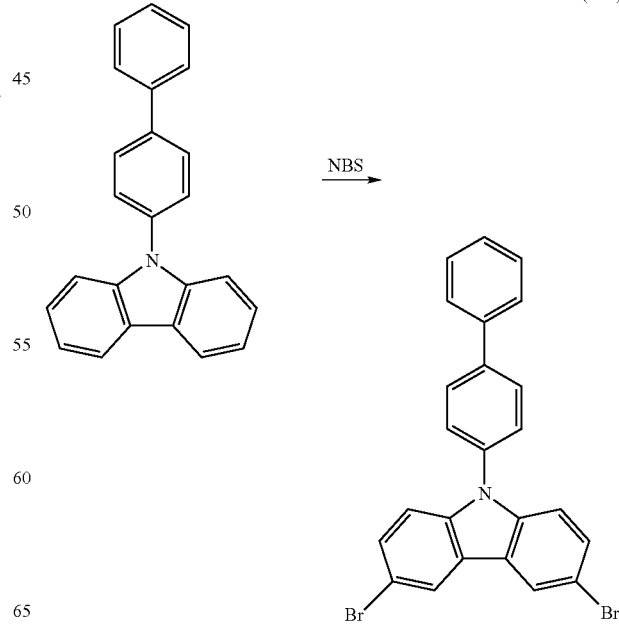

Figure 80A:
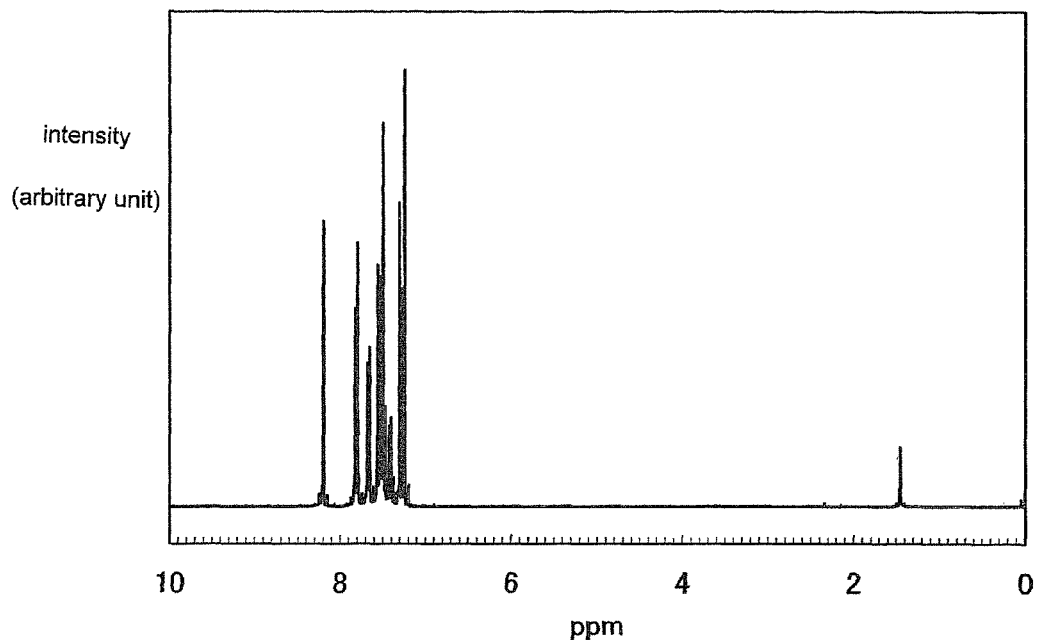
FIGS. 80A and 80B show $^1$H-NMR charts of 3,6-dibromo-9-(4-biphenylyl)carbazole.
Figure 80B:
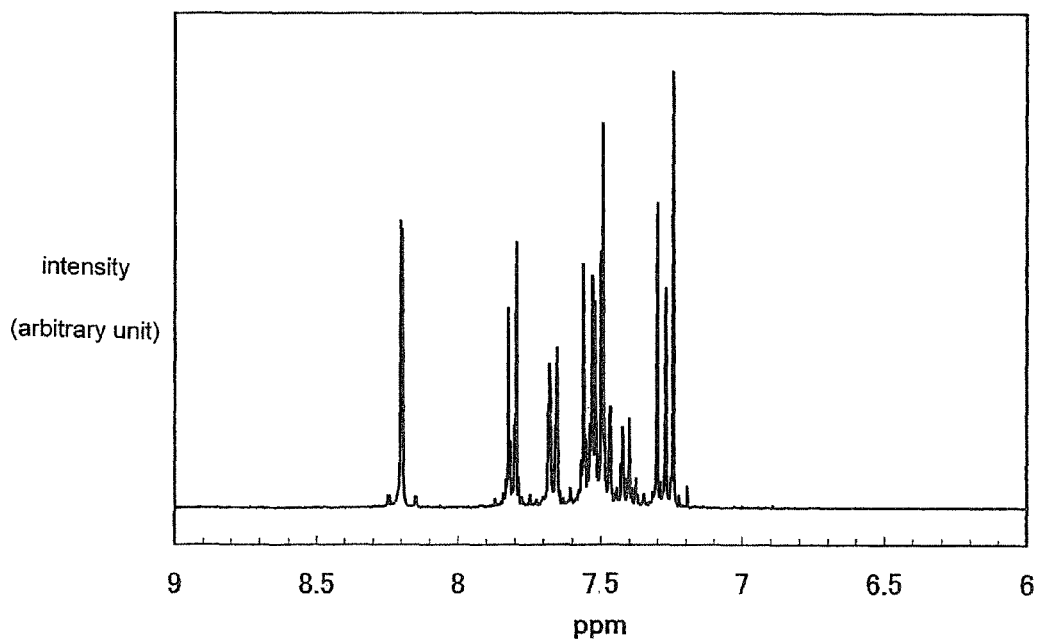
Figure 81A:
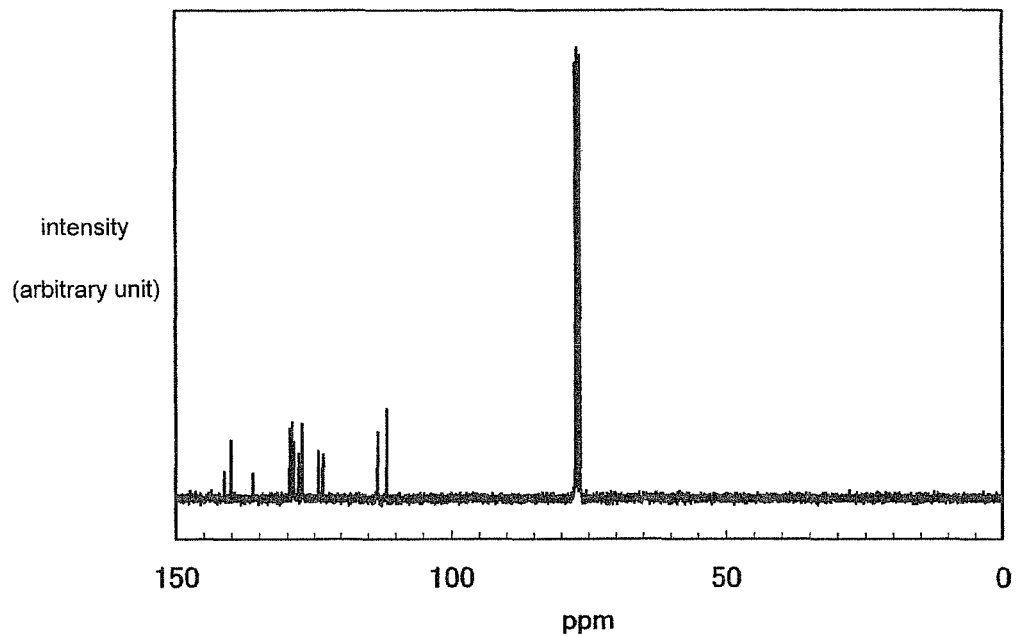
FIGS. 81A and 81B show $^{13}$C-NMR charts of 3,6-dibromo-9-(4-biphenylyl)carbazole.
Figure 81B:
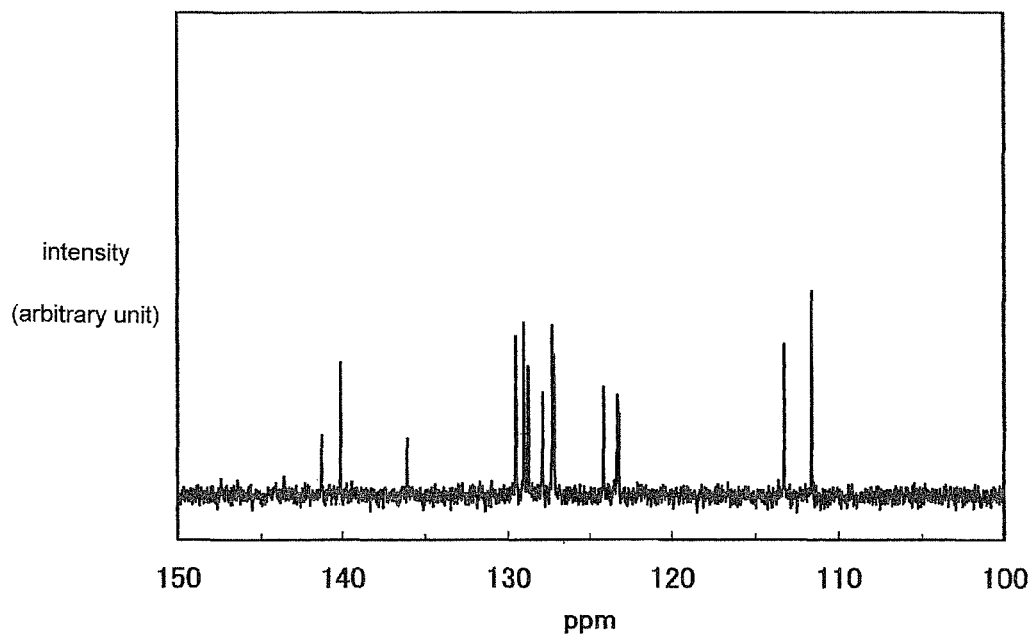

9.6 g (30 mmol) of 9-(4-biphenylyl)carbazole was dissolved in a mixed solution of 250 mL of toluene, 250 mL of ethyl acetate, and 50 mL of glacial acetic acid. 13 g (75 mmol) of N-bromosuccinimide was slowly added thereto. The mixture was stirred for 5 days (for about 100 hours), washed with water and a sodium thiosulfate water solution, neutralized with a sodium hydroxide water solution, and then washed with water again. Magnesium sulfate was added thereto to remove water and filtered to obtain a filtrate. The filtrate was concentrated, collected, and dried. 15 g (yield: 100%) of 3,6-dibromo-9-(4-biphenylyl)carbazole, which was beige powder, was obtained. Data of NMR are shown below. $^{1}$H-NMR (300 MHz, CDCl$_{3}$-d): δ=7.29 (d, J=8.7, 2H), 7.40 (t, J=7.5, 1H), 7.47-7.56 (m, 6H), 7.67 (d, J=7.5, 2H), 7.81 (d, J=8.4, 2H), 8.20 (d, J=2.1, 2H). A $^{1}$H-NMR chart is shown in FIG. 80A. An enlarged view of a portion of 6.0 ppm to 9.0 ppm in FIG. 80A is shown in FIG. 80B. Data of $^{13}$C-NMR are shown below. $^{13}$C-NMR (75.5 MHz, CDCl$_{3}$-d): δ=111.6, 113.3, 123.3, 123.3, 124.2, 127.2, 127.3, 127.9, 128.8, 129.0, 129.5, 136.1, 140.1, 141.3. A $^{13}$C-NMR chart is shown in FIGS. 81A and 81B. An enlarged view of a portion of 100 ppm to 150 ppm in FIG. 81A is shown in FIG. 81B.

[Step 2]

A synthesis method of 3,6-bis[N-(1-naphthyl)-N-(9-phenylcarbazol-3-yl)amino]-9-(4-biphenylyl)carbazole (abbr.: BCzPCN2) is explained. A synthesis scheme of BCzPCN2 is shown in (C-2).

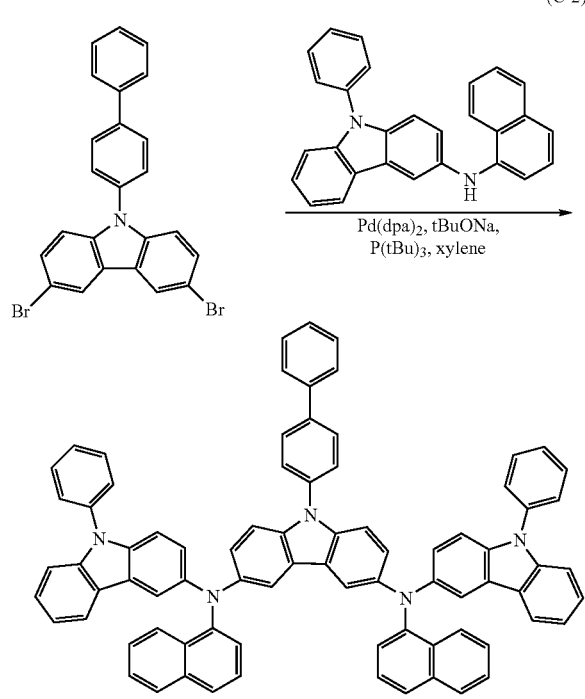

(C-2)

Figure 82A:
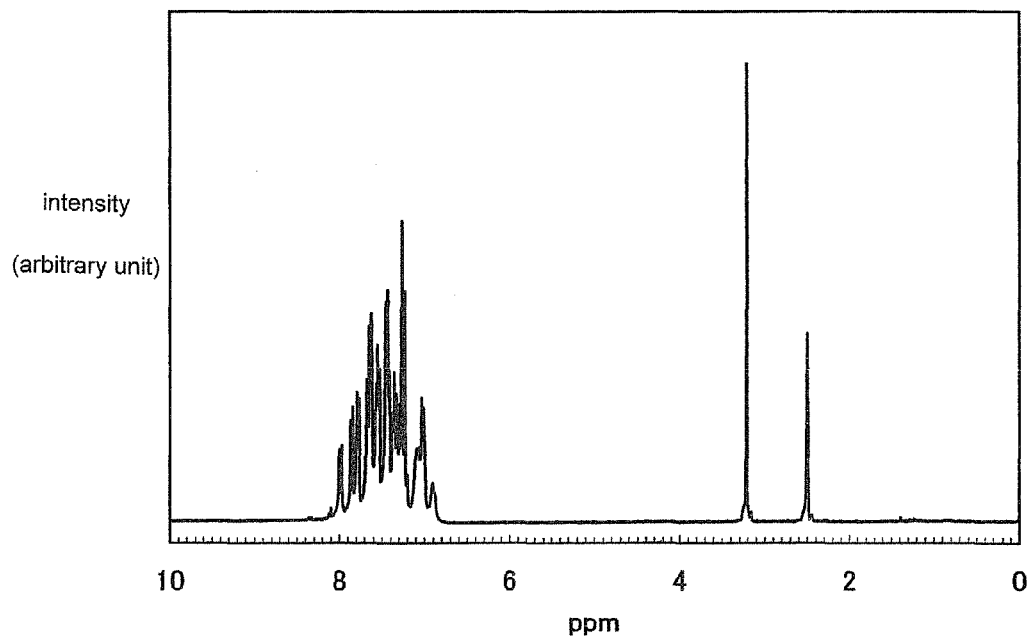
FIGS. 82A and 82B show $^1$H-NMR charts of 3,6-bis[N-(1-naphthyl)-N-(9-phenylcarbazol-3-yl)amino]-9-(4-biphenylyl)carbazole.
Figure 82B:
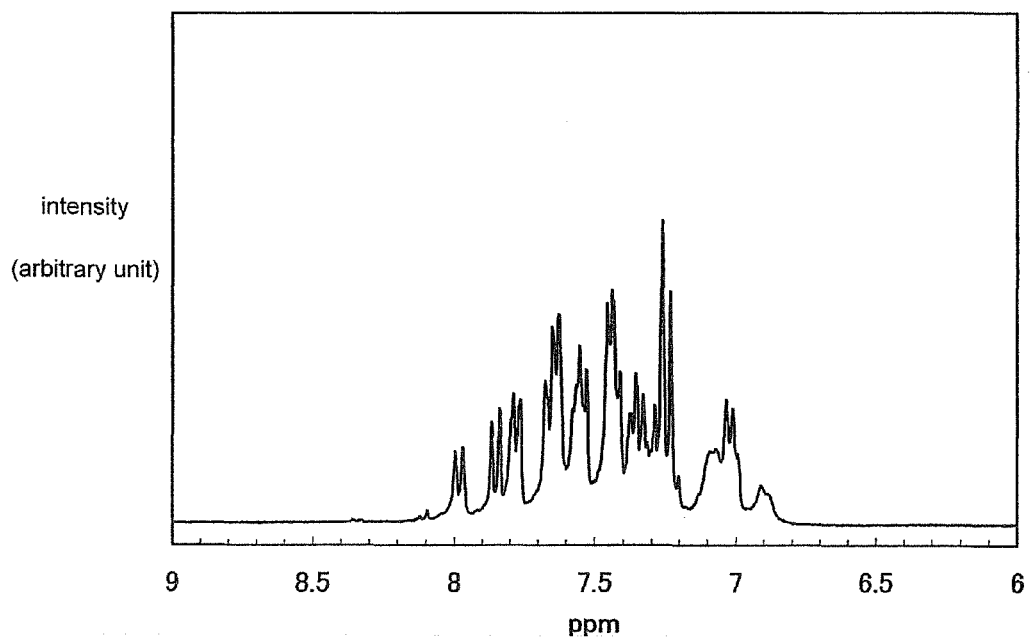
Figure 83A:
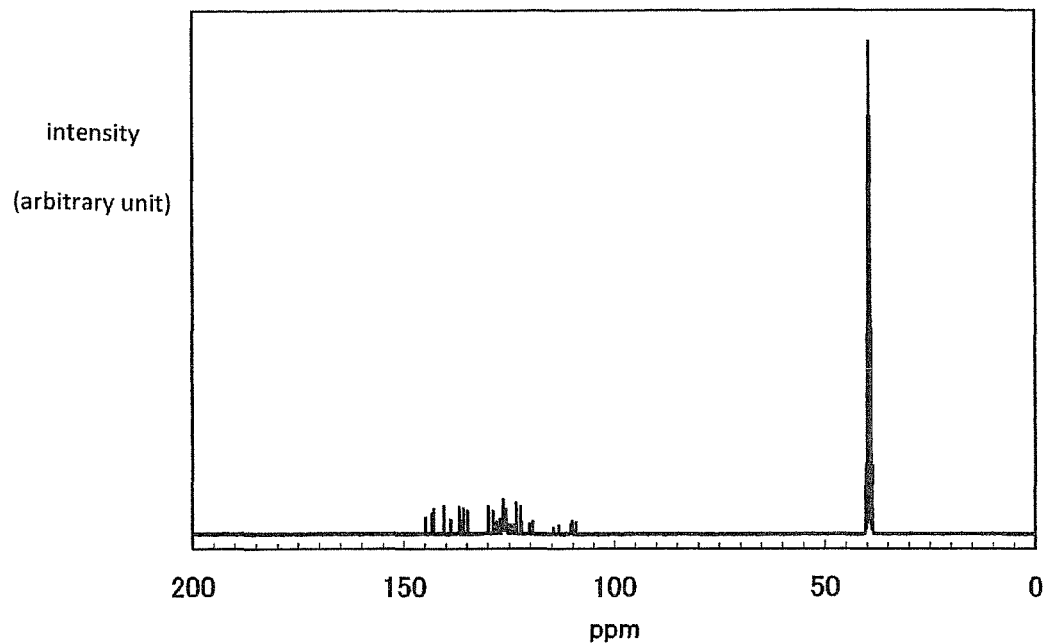
FIGS. 83A and 83B show $^{13}$C-NMR charts of 3,6-bis[N-(1-naphthyl)-N-(9-phenylcarbazol-3-yl)amino]-9-(4-biphenylyl)carbazole.
Figure 83B:
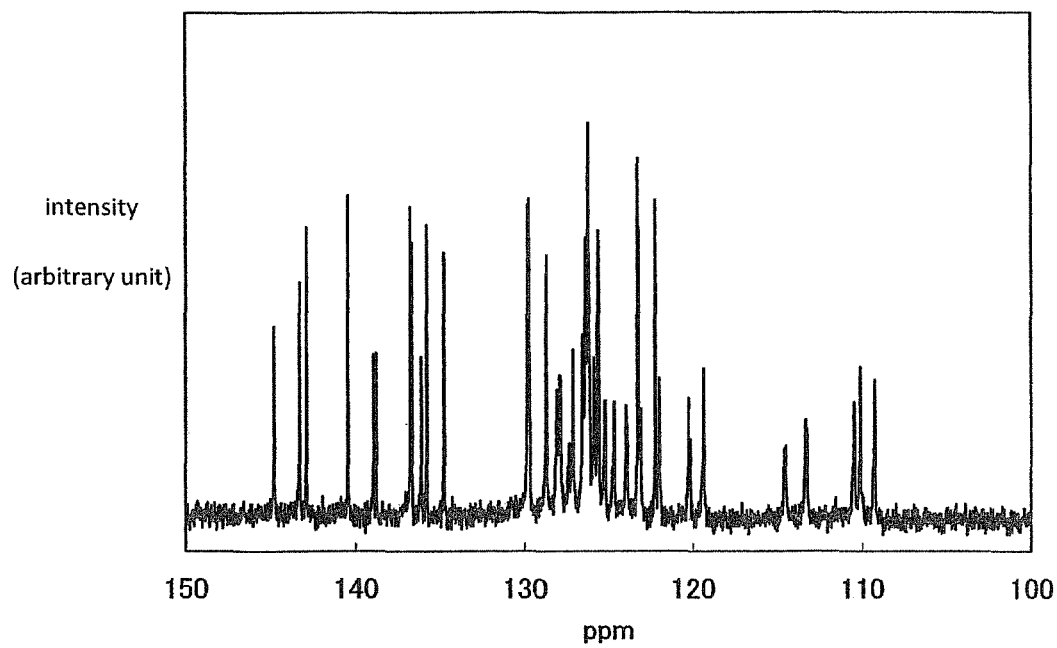

2.4 g (5.0 mmol) of 3,6-dibromo-9-(4-biphenylyl)carbazole, 3.8 g (10 mmol) of PCN, 580 mg (1.0 mmol) of bis(dibenzylideneacetone)palladium(0), 6.0 mL (3 mmol) of a hexane solution with 10 wt % of tri-tert-butylphosphine, and 3.0 g (30 mmol) of sodium-tert-butoxide were put in a three-neck flask and the atmosphere of the flask was substituted by nitrogen. Then, 10 mL of dehydrated xylene was added thereto, and deaeration was performed. The mixture was heated and stirred at 130° C. for 12 hours. After the termination of the reaction, about 550 mL of hot toluene was added to this suspension, and filtered through florisil, alumina, and Celite®. The obtained filtrate was concentrated to obtain an objective substance using silica gel column chromatography (toluene:hexane=2:1). This was concentrated and hexane was added thereto. Then, it was precipitated by ultrasonic wave. 2.7 g (yield: 51%) of 3,6-bis[N-(1-naphthyl)-N-(9-phenylcarbazol-3-yl)amino]-9-(4-biphenylyl)carbazole (abbr.: BCzPCN2), which was lemon-colored powder, was obtained. Data of NMR are shown below. $^{1}$H-NMR (300 MHz, DMSO-d): δ=6.88-7.67 (m, 45H), 7.76-7.79 (d, J=7.8, 4H), 7.84-7.86 (d, J=7.8, 2H), 7.97-7.99 (d, J=7.8, 2H). A $^{1}$H-NMR chart is shown in FIG. 82A, and an enlarged view of a portion of 6.0 ppm to 9.0 ppm in FIG. 82A is shown in FIG. 82B. Data of $^{13}$C-NMR are shown below. $^{13}$C-NMR (75.5 MHz, DMSO-d): δ=109.3, 110.1, 110.5, 113.3, 113.3, 114.5, 114.6, 119.4, 120.2, 122.0, 122.2, 123.1, 123.2, 123.3, 124.0, 124.7, 125.2, 125.6, 125.9, 126.2, 126.4, 126.5, 127.1, 127.4, 127.9, 128.1, 128.7, 129.7, 129.8, 134.8, 135.8, 136.1, 136.7, 136.8, 138.8, 139.0, 140.4, 142.9, 143.3, 144.8. A $^{13}$C-NMR chart is shown in FIG. 83A. An enlarged view of a portion of 100 ppm to 150 ppm in FIG. 83A is shown in FIG. 83B.

A thermogravimetry-differential thermal analysis (TG-DTA) was performed on the obtained BCzPCN2 in the same manner as in Examples 1 to 4. By using a thermo-gravimetric/differential thermal analyzer (TG/DTA 320, manufactured by Seiko Instruments Inc.), thermophysical properties were evaluated at a temperature rising rate of 10° C./min under a nitrogen atmosphere. As a result, from the relationship between gravity and temperature (thermogravimetry), the temperature at which the gravity becomes 95% or less of the gravity at the start of the measurement, was 500° C. or more under normal pressure.

Figure 84:
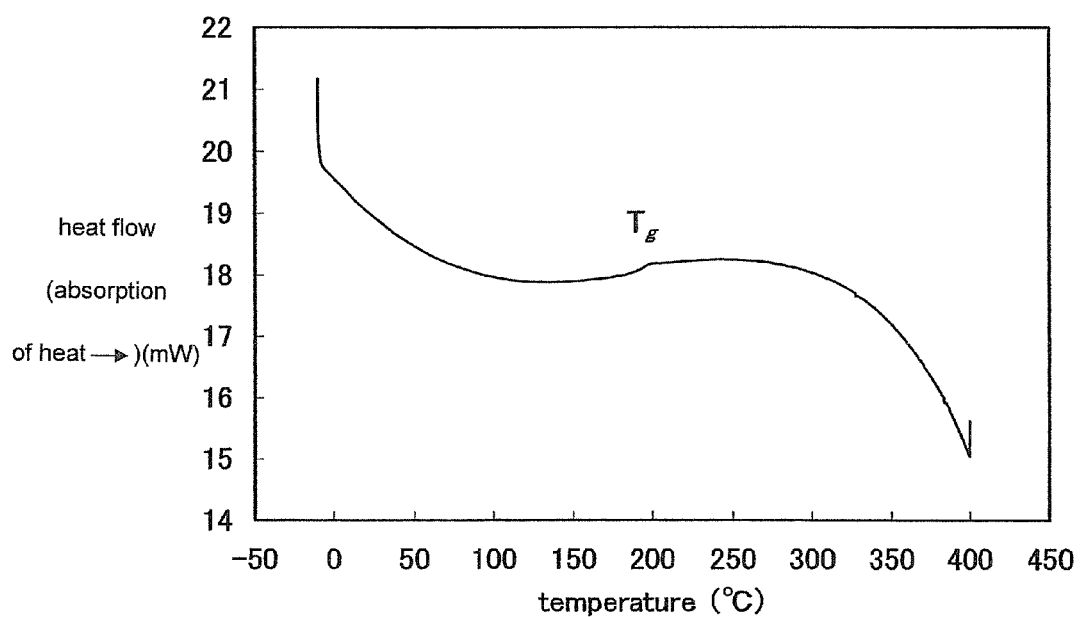
FIG. 84 shows a DSC chart of 3,6-bis[N-(1-naphthyl)-N-(9-phenylcarbazol-3-yl)amino]-9-(4-biphenylyl)carbazole.

A glass transition point (Tg) was measured with a differential scanning calorimeter (Pyris 1 DSC, manufactured by Perkin Elmer Co., Ltd.). After a sample was heated from −10° C. to 400° C. at 40° C./min, it was cooled to −10° C. at 40° C./min. After that, the sample was heated to 400° C. at 10° C./min, and thus, a DSC chart shown in FIG. 84 was obtained. According to this chart, it is found that a glass transition point (Tg) of BCzPCN2 is 185° C. Therefore, it is found that BCzPCN2 has a high glass transition point. In this measurement, a heat absorption peak which shows a melting point was not observed.

Figure 85:
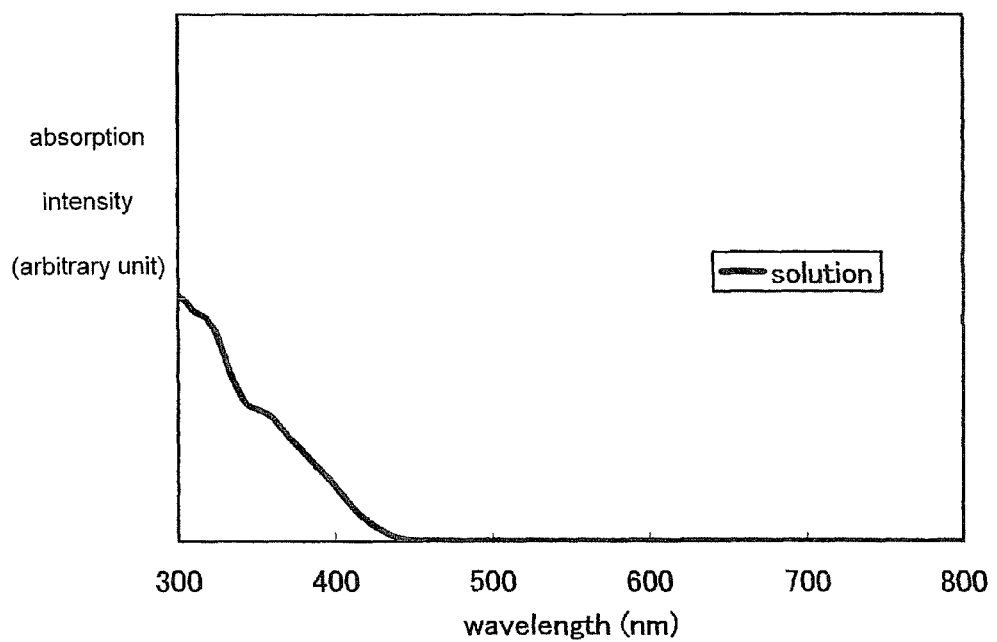
FIG. 85 shows an absorption spectrum of 3,6-bis[N-(1-naphthyl)-N-(9-phenylcarbazol-3-yl)amino]-9-(4-biphenylyl)carbazole.
Figure 86:
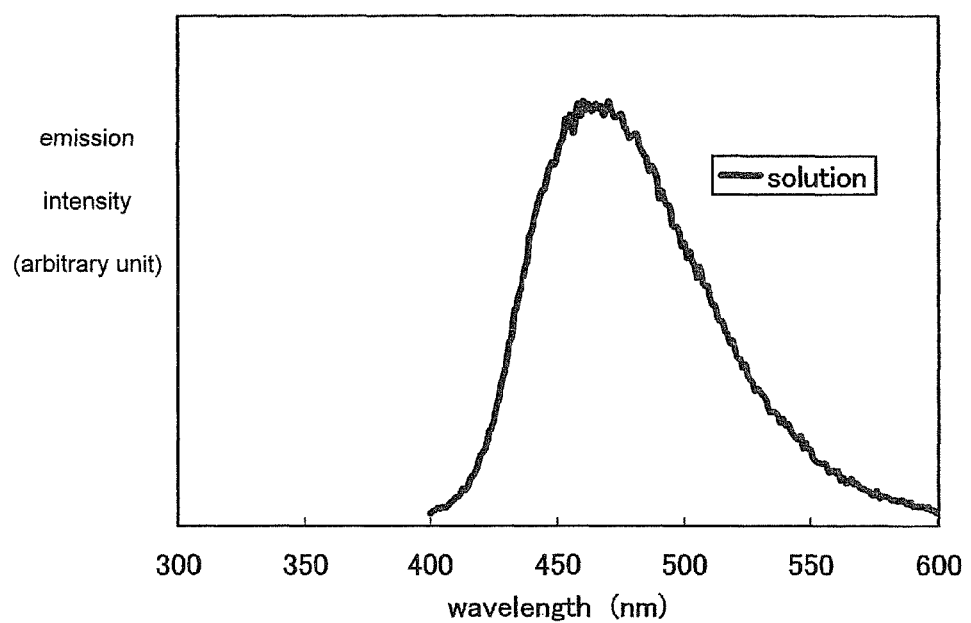
FIG. 86 shows an emission spectrum of 3,6-bis[N-(1-naphthyl)-N-(9-phenylcarbazol-3-yl)amino]-9-(4-biphenylyl)carbazole.

An absorption spectrum of a toluene solution of BCzPCN2 is shown in FIG. 85. An ultraviolet-visible spectrophotometer (V-550, manufactured by JASCO Corporation) was used for the measurement. The solution was put in a quartz cell as a sample, and an absorption spectrum, from which an absorption spectrum of quartz was subtracted, is shown in FIG. 85. In FIG. 85, the horizontal axis indicates wavelength (nm) and the vertical axis indicates absorption intensity (arbitrary unit). The maximum absorption wavelength was 370 nm in the case of the toluene solution of BCzPCN2. An emission spectrum of the toluene solution of BCzPCN2 is shown in FIG. 86. In FIG. 86, the horizontal axis indicates wavelength (m) and the vertical axis indicates emission intensity (arbitrary unit). The maximum emission wavelength was 465 nm (excitation wavelength: 320 nm) in the case of the toluene solution of BCzPCN2.

Example 26

In this example, a light emitting element using the composite material of the invention is explained.

First, a first electrode of the light emitting element was formed over a substrate. In this example, the first electrode functions as an anode. With the use of indium tin oxide containing silicon oxide that is a transparent conductive film as a material, an anode was formed by a sputtering method.

Next, the substrate, over which the first electrode was formed, was fixed to a substrate holder in a vacuum evaporation apparatus so that the side, on which the first electrode was formed, faced downward. Then, a layer containing BCzBCA1 and molybdenum oxide was formed with a thickness of 50 nm by a co-evaporation method. At this time, the co-evaporation was performed so that a weight ratio of BCzBCA1 to molybdenum oxide was 4:1 (=BCzBCA1:molybdenum oxide).

Subsequently, a hole transporting layer was formed of a material having an excellent hole transport property. As a material for forming the hole transporting layer, various kinds of hole transporting materials can be used. In this example, the hole transporting layer was formed using α-NPD with a thickness of 10 nm by an evaporation method.

Subsequently, a light emitting layer was formed. Note that holes and electrons are recombined in the light emitting layer to cause light emission. In this example, with the use of $Alq_3$ serving as a host material and coumarin 6 serving as a guest material, the light emitting layer was formed with a thickness of 40 nm by a co-evaporation method so that a weight ratio of $Alq_3$ to coumarin 6 is 1:0.01.

Then, an electron transporting layer was formed. In this example, the electron transporting layer was formed using $Alq_3$ with a thickness of 10 nm by an evaporation method.

Subsequently, an electron injecting layer was formed. In this example, the electron injecting layer was formed by evaporating $Alq_3$ and lithium to have a thickness of 20 nm, with a weight ratio adjusted to be 1:0.01 (=$Alq_3$:lithium).

Lastly, a second electrode was formed, thereby manufacturing the light emitting element of the invention. In this example, the second electrode was formed by evaporating Al with a thickness of 200 nm by an evaporation method. The light emitting element manufactured in this example is referred to as Element 17.

Figure 87:
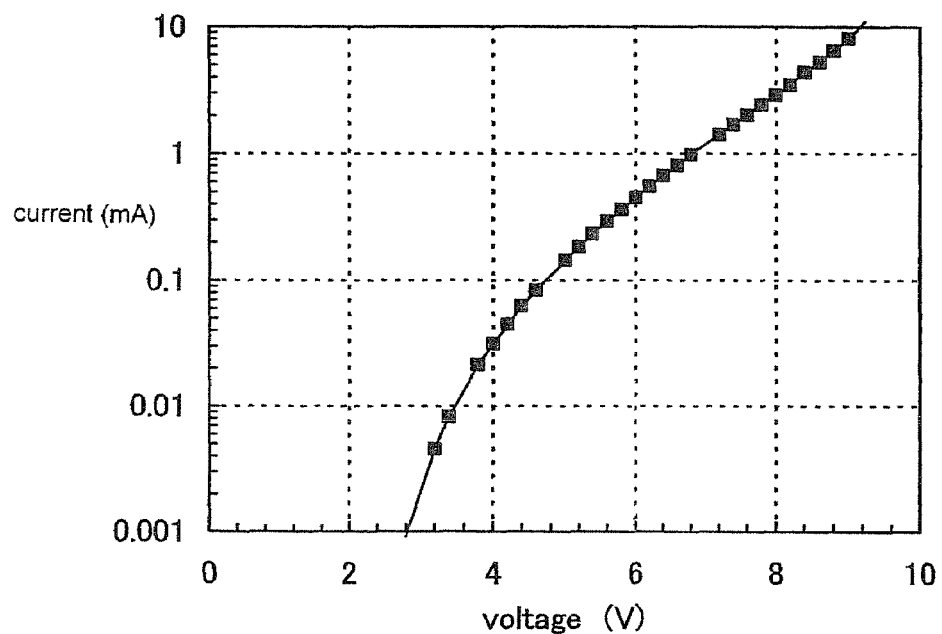
FIG. 87 shows a current-voltage characteristic of an element manufactured in Example 26.
Figure 88:
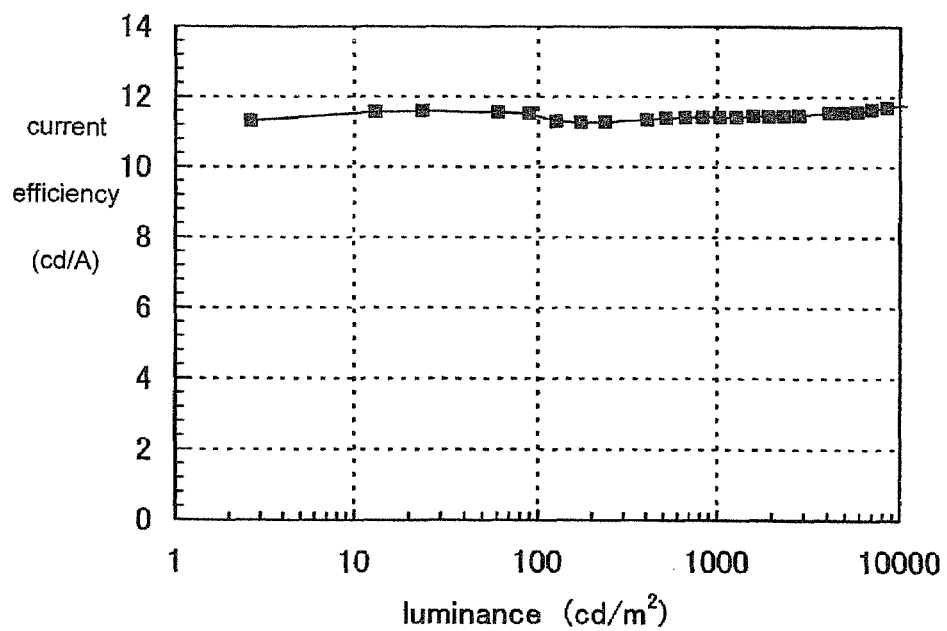
FIG. 88 shows a current efficiency-luminance characteristic of an element manufactured in Example 26.
Figure 89:
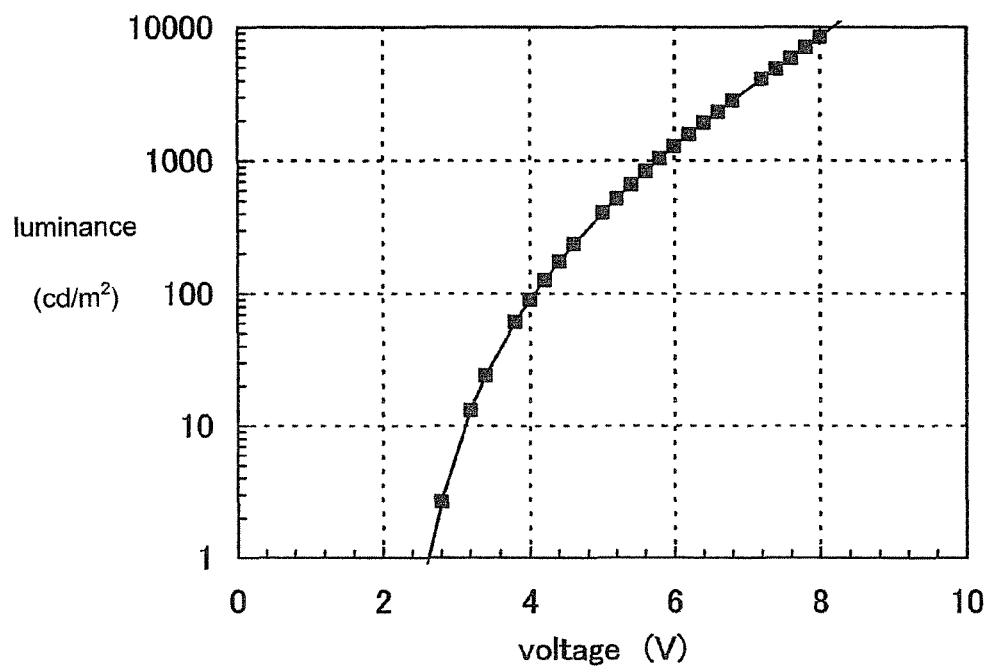
FIG. 89 shows a luminance-voltage characteristic of an element manufactured in Example 26.

A current-voltage characteristic of Element 17 manufactured in this example is shown in FIG. 87; a current efficiency-luminance characteristic thereof, FIG. 88; and a luminance-voltage characteristic thereof, FIG. 89.

As FIGS. 87 to 89 show, it is found that Element 17 manufactured in this example is excellent in all of the current-voltage characteristic, the current efficiency-luminance characteristic, and the luminance-voltage characteristic. This results partly from the fact that the layer containing the composite material of the invention does not have a strong absorption peak in a visible region. In addition, since the layer containing the composite material of the invention has high conductivity, it exhibits a favorable current-voltage characteristic.

In other words, it is found that a drive voltage to obtain light emission with a certain luminance can be reduced by using the composite material of the invention for the light emitting element. Specifically, in the case of Element 17, a voltage required to cause light emission with a luminance of 1000 cd/m² is 5.8 V, and a current density at this time is 9.1 mA/cm². In other words, it is found that low voltage drive and low current drive become possible by using the composite material of the invention for the light emitting element.

Figure 90:
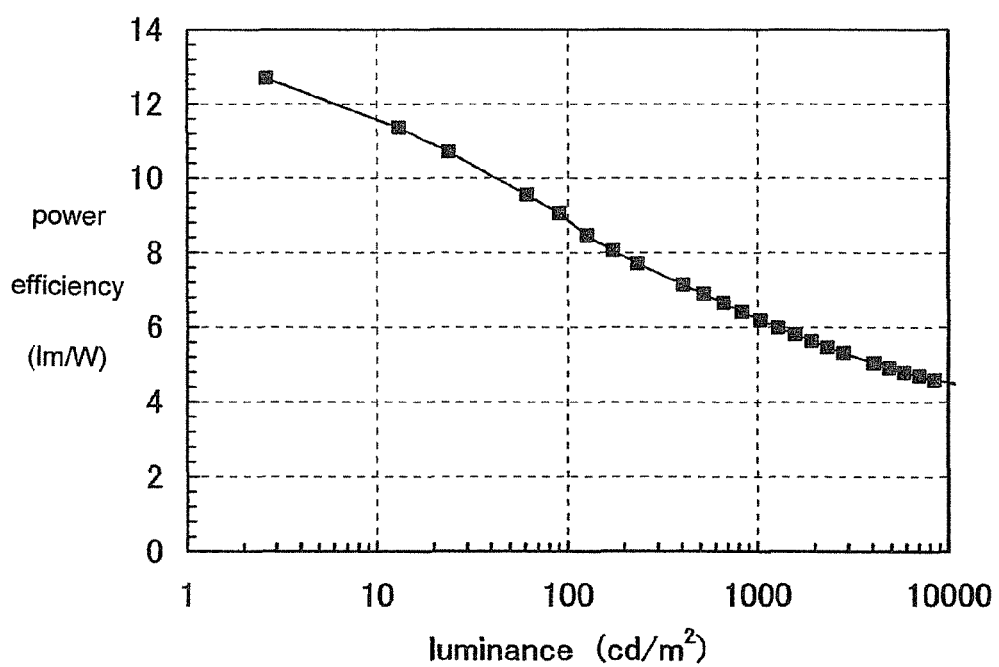
FIG. 90 shows a power efficiency-luminance characteristic of an element manufactured in Example 26.

In addition, a power efficiency-luminance characteristic of Element 17 manufactured in this example is shown in FIG. 90. Higher power efficiency means lower power consumption, and it is found from FIG. 90 that the light emitting element of the invention exhibits favorable power efficiency.

What is claimed is:
1. A composite material comprising:
a carbazole derivative represented by General Formula (3); and
a transition-metal oxide,

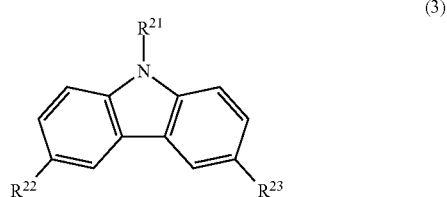

(3)

wherein $R^{21}$ represents any one of hydrogen, an alkyl group having 1 to 6 carbon atoms, an aryl group having 6 to 25 carbon atoms, a heteroaryl group having 5 to 9 carbon atoms, an arylalkyl group, and an acyl group having 1 to 7 carbon atoms; $R^{22}$ represents any one of hydrogen, an alkyl group having 1 to 6 carbon atoms, and an aryl group having 6 to 12 carbon atoms; and $R^{23}$ represents a substituent represented by General Formula (4), and

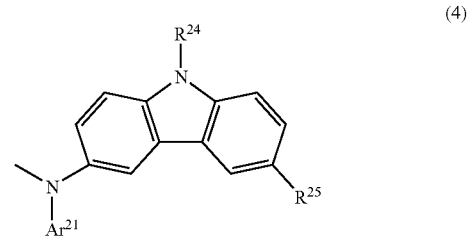

(4)

wherein $R^{24}$ represents any one of hydrogen, an alkyl group having 1 to 6 carbon atoms, an aryl group having 6 to 25 carbon atoms, a heteroaryl group having 5 to 9 carbon atoms, an arylalkyl group, and an acyl group having 1 to 7 carbon atoms; $Ar^{21}$ represents one of an aryl group having 6 to 25 carbon atoms and a heteroaryl group having 5 to 9 carbon atoms; and $R^{25}$ represents any one of hydrogen, an alkyl group having 1 to 6 carbon atoms, and an aryl group having 6 to 12 carbon atoms.

2. A composite material according to claim 1, wherein $R^{22}$ is any one of hydrogen, tert-butyl, phenyl, and biphenyl.

3. A composite material according to claim 1, wherein the transition-metal oxide exhibits an electron accepting property to the carbazole derivative.

4. A composite material according to claim 1, wherein the transition-metal oxide is any one or more of titanium oxide, vanadium oxide, molybdenum oxide, tungsten oxide, rhenium oxide, ruthenium oxide, chromium oxide, zirconium oxide, hafnium oxide, tantalum oxide, and silver oxide.

5. A light emitting element comprising a layer containing the composite material according to claim 1 between a pair of electrodes.

6. A light emitting element according to claim 5, wherein the layer containing the composite material is provided so as to be in contact with an electrode functioning as an anode of the pair of electrodes.

7. A light emitting device comprising the light emitting element according to claim 5.

8. A light emitting device according to claim 7, the further comprising a control means comprising a thin film transistor, wherein the thin film transistor is electrically connected to the light emitting element.

9. An electric appliance comprising a display portion, wherein the display portion is provided with the light emitting element according to claim 5.

10. An electric appliance according to claim 9, further comprising a control means comprising a thin film transistor, wherein the thin film transistor is electrically connected to the light emitting element.

11. A lighting system including the light emitting element according to claim 5.

12. A composite material according to claim 1, wherein the carbazole derivative represented by General Formula (3) and the transition-metal oxide are mixed.

13. A composite material according to claim 1, wherein the transition-metal oxide accepts electrons from the carbazole derivative so that carriers are generated in the composite material.

14. A composite material comprising:
a carbazole derivative represented by General Formula (5); and
a transition-metal oxide,

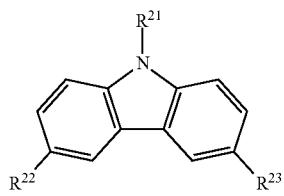

(5)

wherein $R^{21}$ represents any one of hydrogen, an alkyl group having 1 to 6 carbon atoms, an aryl group having 6 to 25 carbon atoms, a heteroaryl group having 5 to 9 carbon atoms, an arylalkyl group, and an acyl group having 1 to 7 carbon atoms; each of $R^{22}$ and $R^{23}$ represents a substituent represented by General Formula (6), and

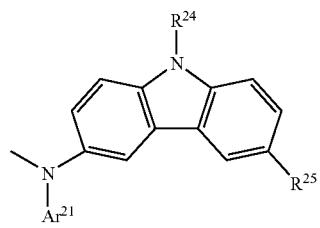

(6)

wherein $R^{24}$ represents any one of hydrogen, an alkyl group having 1 to 6 carbon atoms; an aryl group having 6 to 25 carbon atoms, a heteroaryl group having 5 to 9 carbon atoms, an arylalkyl group, and an acyl group having 1 to 7 carbon atoms; $Ar^{21}$ represents one of an aryl group having 6 to 25 carbon atoms and a heteroaryl group having 5 to 9 carbon atoms; and $R^{25}$ represents any one of hydrogen, an alkyl group having 1 to 6 carbon atoms, and an aryl group having 6 to 12 carbon atoms.

15. A composite material according to claim 14, wherein $R^{25}$ is any one of hydrogen, tert-butyl, phenyl, and biphenyl.

16. A composite material according to claim 14, wherein $R^{24}$ is phenyl.

17. A composite material according to claim 14, wherein $R^{21}$ is phenyl.

18. A composite material according to claim 14, wherein the transition-metal oxide exhibits an electron accepting property to the carbazole derivative.

19. A composite material according to claim 14, wherein the transition-metal oxide is any one or more of titanium oxide, vanadium oxide, molybdenum oxide, tungsten oxide, rhenium oxide, ruthenium oxide, chromium oxide, zirconium oxide, hafnium oxide, tantalum oxide, and silver oxide.

20. A light emitting element comprising a layer containing the composite material according to claim 14 between a pair of electrodes.

21. A light emitting element according to claim 20, wherein the layer containing the composite material is provided so as to be in contact with an electrode functioning as an anode of the pair of electrodes.

22. A light emitting device comprising the light emitting element according to claim 20.

23. A light emitting device according to claim 22, further comprising a control means comprising a thin film transistor, wherein the thin film transistor is electrically connected to the light emitting element.

24. An electric appliance comprising a display portion, wherein the display portion is provided with the light emitting element according to claim 20.

25. An electric appliance according to claim 24, further comprising a control means comprising a thin film transistor, wherein the thin film transistor is electrically connected to the light emitting element.

26. A lighting system including the light emitting element according to claim 20.

27. A composite material according to claim 14, wherein the carbazole derivative represented by General Formula (5) and the transition-metal oxide are mixed.

28. A composite material according to claim 14, wherein the transition-metal oxide accepts electrons from the carbazole derivative so that carriers are generated in the composite material.

* * * * *